US010983960B2

(12) United States Patent
Faith et al.

(10) Patent No.: US 10,983,960 B2
(45) **Date of Patent: *Apr. 20, 2021**

(54) MULTI-SOURCE, MULTI-DIMENSIONAL, CROSS-ENTITY, MULTIMEDIA CENTRALIZED PERSONAL INFORMATION DATABASE PLATFORM APPARATUSES, METHODS AND SYSTEMS

(71) Applicant: Visa International Service Association, San Francisco, CA (US)

(72) Inventors: Patrick Faith, Foster City, CA (US); Theodore Harris, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 16/532,095

(22) Filed: Aug. 5, 2019

(65) Prior Publication Data

US 2019/0361845 A1 Nov. 28, 2019

Related U.S. Application Data

(63) Continuation of application No. 13/758,472, filed on Feb. 4, 2013, now Pat. No. 10,430,381, which is a (Continued)

(51) Int. Cl.

*G06F 16/00* (2019.01)
*G06F 16/16* (2019.01)

(Continued)

(52) U.S. Cl.

CPC ........ *G06F 16/164* (2019.01); *G06F 16/2379* (2019.01); *G06F 16/245* (2019.01);

(Continued)

(58) Field of Classification Search

CPC .. G06F 16/164; G06F 16/245; G06F 16/2379; G06F 16/9024; G06F 16/9535;

(Continued)

(56) References Cited

U.S. PATENT DOCUMENTS

| | | |
|---|---|---|
| 789,106 A | 5/1905 | Seymour |
| 4,896,363 A | 1/1990 | Taylor |

(Continued)

FOREIGN PATENT DOCUMENTS

| | | |
|---|---|---|
| CN | 1841425 A | 10/2006 |
| CN | 1922623 A | 2/2007 |

(Continued)

OTHER PUBLICATIONS

Notice of Allowance dated Jun. 15, 2020 for U.S. Appl. No. 16/440,486 (pp. 1-8).

(Continued)

*Primary Examiner* — Diedra McQuitery
(74) *Attorney, Agent, or Firm* — Loeb & Loeb LLP

(57) ABSTRACT

The MULTI-SOURCE, MULTI-DIMENSIONAL, CROSS-ENTITY, MULTIMEDIA CENTRALIZED PERSONAL INFORMATION DATABASE PLATFORM APPARATUSES, METHODS AND SYSTEMS ("CPDB") transform data aggregated from various computer resources using CPDB components into updated entity profiles and/or social graphs. In one implementation, the CPDB aggregates data records including search results, purchase transaction data, service usage data, service enrollment data, and social data. The CPDB identifies data field types within the data records and their associated data values. From the data field types and their associated data values, the CPDB identifies an entity. The CPDB generates correlations of the entity to other entities identifiable from the data field types and their associated data values. The CPDB also associates attributes (Continued)

Example: User Service Usage Attributes Data Model to the entity by drawing inferences related to the entity from the data field types and their associated data values. Using the generated correlations and associated attributes, the CPDB generates an updated profile and social graph of the entity. The CPDB provides the updated profile and social graph for an automated web form filling request.

20 Claims, 81 Drawing Sheets

Related U.S. Application Data continuation-in-part of application No. 13/520,481, filed on Mar. 31, 2014, now Pat. No. 10,223,691, and a continuation-in-part of application No. PCT/US2013/024538, filed on Feb. 2, 2013.

(60) Provisional application No. 61/594,063, filed on Feb. 2, 2012.

(51) Int. Cl.

| | |
|---|---|
| ***G06F 16/245*** | (2019.01) |
| ***G06F 16/23*** | (2019.01) |
| ***G06Q 30/06*** | (2012.01) |
| ***G06F 16/901*** | (2019.01) |
| ***G06F 16/9536*** | (2019.01) |
| ***G06Q 50/00*** | (2012.01) |
| ***G06Q 10/00*** | (2012.01) |
| ***G06Q 99/00*** | (2006.01) |
| *G06F 16/9535* | (2019.01) |

(52) U.S. Cl.

CPC ...... *G06F 16/9024* (2019.01); *G06F 16/9536* (2019.01); *G06Q 10/00* (2013.01); *G06Q 30/06* (2013.01); *G06Q 30/0631* (2013.01); *G06Q 30/0643* (2013.01); *G06Q 50/01* (2013.01); *G06Q 99/00* (2013.01); *G06F 16/9535* (2019.01)

(58) Field of Classification Search

CPC ................ G06F 16/9536; G06Q 30/06; G06Q 30/0631; G06Q 30/0643; G06Q 10/00; G06Q 50/01; G06Q 99/00

See application file for complete search history.

(56) References Cited

U.S. PATENT DOCUMENTS

| | | | |
|---|---|---|---|
| 5,177,342 | A | 1/1993 | Adams |
| 5,221,838 | A | 6/1993 | Gutman |
| 5,237,164 | A | 8/1993 | Takada |
| 5,311,594 | A | 5/1994 | Penzias |
| 5,383,113 | A | 1/1995 | Kight |
| 5,384,449 | A | 1/1995 | Peirce |
| 5,446,890 | A | 8/1995 | Renslo |
| 5,459,656 | A | 10/1995 | Fields |
| 5,500,513 | A | 3/1996 | Langhans |
| 5,510,777 | A | 4/1996 | Pilc |
| 5,521,362 | A | 5/1996 | Powers |
| 5,526,409 | A | 6/1996 | Conrow |
| 5,530,438 | A | 6/1996 | Bickham |
| 5,536,045 | A | 7/1996 | Adams |
| 5,590,038 | A | 12/1996 | Pitroda |
| 5,613,012 | A | 3/1997 | Hoffman |
| 5,615,110 | A | 3/1997 | Wong |
| 5,615,264 | A | 3/1997 | Kazmierczak |
| 5,621,201 | A | 4/1997 | Langhans |
| 5,640,193 | A | 6/1997 | Wellner |
| 5,649,118 | A | 7/1997 | Carlisle |
| 5,655,007 | A | 8/1997 | McAllister |
| 5,748,737 | A | 5/1998 | Daggar |
| 5,781,438 | A | 7/1998 | Lee |
| 5,796,832 | A | 8/1998 | Kawan |
| 5,815,657 | A | 9/1998 | Williams |
| 5,850,446 | A | 12/1998 | Berger |
| 5,878,337 | A | 3/1999 | Joao |
| 5,883,810 | A | 3/1999 | Franklin |
| 5,884,271 | A | 3/1999 | Pitroda |
| 5,892,838 | A | 4/1999 | Brady |
| 5,903,830 | A | 5/1999 | Joao |
| 5,914,472 | A | 6/1999 | Foladare |
| 5,943,624 | A | 8/1999 | Fox |
| 5,953,710 | A | 9/1999 | Fleming |
| 5,956,699 | A | 9/1999 | Wong |
| 5,963,924 | A | 10/1999 | Williams |
| 6,000,832 | A | 12/1999 | Franklin |
| 6,006,200 | A | 12/1999 | Boies |
| 6,014,635 | A | 1/2000 | Harris |
| 6,044,360 | A | 3/2000 | Picciallo |
| 6,052,675 | A | 4/2000 | Checchio |
| 6,064,990 | A | 5/2000 | Goldsmith |
| 6,092,053 | A | 7/2000 | Boesch |
| 6,160,903 | A | 12/2000 | Hamid |
| 6,161,130 | A | 12/2000 | Horvitz |
| 6,163,771 | A | 12/2000 | Walker |
| 6,164,533 | A | 12/2000 | Barton |
| 6,182,894 | B1 | 2/2001 | Hackett |
| 6,195,447 | B1 | 2/2001 | Ross |
| 6,202,052 | B1 | 3/2001 | Miller |
| 6,202,933 | B1 | 3/2001 | Poore |
| 6,226,624 | B1 | 5/2001 | Watson |
| 6,227,447 | B1 | 5/2001 | Campisano |
| 6,236,981 | B1 | 5/2001 | Hill |
| 6,243,688 | B1 | 6/2001 | Kalina |
| 6,263,447 | B1 | 7/2001 | French |
| 6,267,292 | B1 | 7/2001 | Walker |
| 6,327,578 | B1 | 12/2001 | Linehan |
| 6,336,099 | B1 | 1/2002 | Barnett |
| 6,339,766 | B1 | 1/2002 | Gephart |
| 6,341,724 | B2 | 1/2002 | Campisano |
| 6,381,584 | B1 | 4/2002 | Ogram |
| 6,385,596 | B1 | 5/2002 | Wiser |
| 6,385,655 | B1 | 5/2002 | Smith |
| 6,422,462 | B1 | 7/2002 | Cohen |
| 6,425,523 | B1 | 7/2002 | Shem-Ur |
| 6,439,345 | B1 | 8/2002 | Recktenwald |
| 6,456,984 | B1 | 9/2002 | Demoff |
| 6,473,500 | B1 | 10/2002 | Risafi |
| 6,529,725 | B1 | 3/2003 | Joao |
| 6,535,855 | B1 | 3/2003 | Cahill |
| 6,560,581 | B1 | 5/2003 | Fox |
| 6,592,044 | B1 | 7/2003 | Wong |
| 6,601,761 | B1 | 8/2003 | Katis |
| 6,636,833 | B1 | 10/2003 | Flitcroft |
| 6,735,572 | B2 | 5/2004 | Landesmann |
| 6,748,367 | B1 | 6/2004 | Lee |
| 6,805,287 | B2 | 10/2004 | Bishop |
| 6,853,982 | B2 | 2/2005 | Smith |
| 6,857,073 | B2 | 2/2005 | French |
| 6,865,522 | B1 | 3/2005 | Gastiger |
| 6,873,974 | B1 | 3/2005 | Schutzer |
| 6,879,965 | B2 | 4/2005 | Fung |
| 6,891,953 | B1 | 5/2005 | DeMello |
| 6,898,598 | B2 | 5/2005 | Himmel |
| 6,901,387 | B2 | 5/2005 | Wells |
| 6,925,439 | B1 | 8/2005 | Pitroda |
| 6,931,382 | B2 | 8/2005 | Laage |
| 6,934,528 | B2 | 8/2005 | Loureiro |
| 6,938,019 | B1 | 8/2005 | Uzo |
| 6,941,285 | B2 | 9/2005 | Sarcanin |
| 6,944,595 | B1 | 9/2005 | Graser |
| 6,980,670 | B1 | 12/2005 | Hoffman |
| 6,990,470 | B2 | 1/2006 | Hogan |
| 6,991,157 | B2 | 1/2006 | Bishop |
| 6,999,943 | B1 | 2/2006 | Johnson |
| 7,024,383 | B1 | 4/2006 | Mancini |
| 7,028,052 | B2 | 4/2006 | Chapman |
| 7,047,041 | B2 | 5/2006 | Vanska |
| 7,051,002 | B2 | 5/2006 | Keresman, III |
| 7,051,929 | B2 | 5/2006 | Li |

(56) References Cited

U.S. PATENT DOCUMENTS 7,069,249 B2 6/2006 Stolfo
7,089,208 B1 8/2006 Levchin
7,096,003 B2 8/2006 Joao
7,103,576 B2 9/2006 Mann
7,111,789 B2 9/2006 Rajasekaran
7,113,930 B2 9/2006 Eccles
7,117,172 B1 10/2006 Black
7,136,835 B1 11/2006 Flitcroft
7,155,411 B1 12/2006 Blinn
7,156,311 B2 1/2007 Attia
7,167,903 B2 1/2007 Percival
7,177,835 B1 2/2007 Walker
7,177,848 B2 2/2007 Hogan
7,180,457 B2 2/2007 Trott
7,194,437 B1 3/2007 Britto
7,206,847 B1 4/2007 Alberth
7,209,561 B1 4/2007 Shankar
7,212,979 B1 5/2007 Matz
7,228,011 B1 6/2007 Queeno
RE39,736 E 7/2007 Morrill
7,264,154 B2 9/2007 Harris
7,266,557 B2 9/2007 Aschen
7,268,667 B2 9/2007 Beenau
7,268,668 B2 9/2007 Beenau
7,287,692 B1 10/2007 Patel
7,290,704 B1 11/2007 Ball
7,292,999 B2 11/2007 Hobson
7,313,546 B2 12/2007 Alarcon-Luther
7,318,049 B2 1/2008 Iannacci
7,337,119 B1 2/2008 Geschwender
7,337,144 B1 2/2008 Blinn
7,343,149 B2 3/2008 Benco
7,343,351 B1 3/2008 Bishop
7,349,885 B2 3/2008 Gangi
7,350,230 B2 3/2008 Forrest
7,353,382 B2 4/2008 Labrou
7,356,505 B2 4/2008 March
7,357,310 B2 4/2008 Calabrese
7,359,880 B2 4/2008 Abel
7,373,669 B2 5/2008 Eisen
7,379,899 B1 5/2008 Junger
7,379,919 B2 5/2008 Hogan
7,392,222 B1 6/2008 Hamilton
RE40,444 E 7/2008 Linehan
7,395,242 B2 7/2008 Blinn
7,398,250 B2 7/2008 Blinn
7,413,113 B1 8/2008 Zhu
7,415,443 B2 8/2008 Hobson
7,415,469 B2 8/2008 Singh
7,427,021 B2 9/2008 Kemper
7,444,676 B1 10/2008 Asghari-Kamrani
7,450,966 B2 11/2008 Vanska
7,469,151 B2 12/2008 Khan
7,477,780 B2 1/2009 Boncyk
7,499,889 B2 3/2009 Golan
7,500,607 B2 3/2009 Williams
7,505,935 B2 3/2009 Mendiola
7,533,064 B1 5/2009 Boesch
7,536,318 B1 5/2009 Wolfe
7,536,335 B1 5/2009 Weston
7,536,360 B2 5/2009 Stolfo
7,540,012 B1 5/2009 Herzberg
7,548,889 B2 6/2009 Bhambri
7,567,934 B2 7/2009 Flitcroft
7,567,936 B1 7/2009 Peckover
7,571,139 B1 8/2009 Giordano
7,571,140 B2 8/2009 Weichert
7,571,142 B1 8/2009 Flitcroft
7,580,898 B2 8/2009 Brown
7,584,153 B2 9/2009 Brown
7,593,858 B2 9/2009 Matz
7,593,896 B1 9/2009 Flitcroft
7,603,311 B1 10/2009 Yadav-ranjan
7,606,560 B2 10/2009 Labrou
7,627,531 B2 12/2009 Breck
7,627,895 B2 12/2009 Gifford
7,630,937 B1 12/2009 Mo
7,634,295 B2 12/2009 Hayaashi
7,644,037 B1 1/2010 Ostrovsky
7,644,859 B1 1/2010 Zhu
7,650,314 B1 1/2010 Saunders
7,660,749 B2 2/2010 Koski
7,664,733 B2 2/2010 Erol
7,668,754 B1 2/2010 Bridgelall
7,669,760 B1 3/2010 Zettner
7,676,434 B2 3/2010 Evans
7,685,037 B2 3/2010 Reiners
7,685,067 B1 3/2010 Britto
7,698,221 B2 4/2010 Blinn
7,702,578 B2 4/2010 Fung
7,707,113 B1 4/2010 Dimartino
7,707,120 B2 4/2010 Dominguez
7,708,194 B2 5/2010 Vawter
7,708,198 B2 5/2010 Gangi
7,712,655 B2 5/2010 Wong
7,712,658 B2 5/2010 Gangi
7,720,436 B2 5/2010 Hamynen
7,734,527 B2 6/2010 Uzo
7,739,194 B2 6/2010 Blinn
7,742,984 B2 6/2010 Mohsenzadeh
7,753,265 B2 7/2010 Harris
7,770,789 B2 8/2010 Oder
7,774,076 B2 8/2010 Skowronek
7,783,569 B2 8/2010 Abel
7,784,684 B2 8/2010 Labrou
7,784,685 B1 8/2010 Hopkins
7,793,851 B2 9/2010 Mullen
7,797,215 B1 9/2010 Zerenner
7,801,826 B2 9/2010 Labrou
7,801,829 B2 9/2010 Gray
7,802,719 B2 9/2010 Johnson
7,805,376 B2 9/2010 Smith
7,805,378 B2 9/2010 Berardi
7,810,720 B2 10/2010 Lovett
7,818,264 B2 10/2010 Hammad
7,819,307 B2 10/2010 Lyons
7,827,288 B2 11/2010 Da
7,828,206 B2 11/2010 Hessburg
7,828,220 B2 11/2010 Mullen
7,828,992 B2 11/2010 Kilickiran
7,835,960 B2 11/2010 Breck
7,837,125 B2 11/2010 Biskupski
7,841,523 B2 11/2010 Oder
7,841,539 B2 11/2010 Newton
7,844,530 B2 11/2010 Ziade
7,844,550 B2 11/2010 Walker
7,848,980 B2 12/2010 Carlson
7,849,014 B2 12/2010 Erikson
7,849,020 B2 12/2010 Johnson
7,853,529 B1 12/2010 Walker
7,853,995 B2 12/2010 Chow
7,865,414 B2 1/2011 Fung
7,870,027 B1 1/2011 Tannenbaum
7,873,579 B2 1/2011 Hobson
7,873,580 B2 1/2011 Hobson
7,877,299 B2 1/2011 Bui
7,878,400 B2 2/2011 Harris
7,890,370 B2 2/2011 Whitsitt
7,890,393 B2 2/2011 Talbert
7,891,563 B2 2/2011 Oder
7,895,119 B2 2/2011 Praisner
7,896,238 B2 3/2011 Fein
7,899,744 B2 3/2011 Bishop
7,904,360 B2 3/2011 Evans
7,908,216 B1 3/2011 Davis
7,908,227 B2 3/2011 Zizzimopoulos
7,922,082 B2 4/2011 Muscato
7,926,714 B1 4/2011 Zhu
7,931,195 B2 4/2011 Mullen
7,933,779 B2 4/2011 Rooks
7,937,324 B2 5/2011 Patterson
7,938,318 B2 5/2011 Fein
7,942,337 B2 5/2011 Jain
7,954,705 B2 6/2011 Mullen

(56) References Cited

U.S. PATENT DOCUMENTS

| | | | |
|---|---|---|---|
| 7,959,076 | B1 | 6/2011 | Hopkins |
| 7,962,418 | B1 | 6/2011 | Wei |
| 7,963,441 | B2 | 6/2011 | Emmons |
| 7,967,196 | B1 | 6/2011 | Bierbaum |
| 7,971,782 | B1 | 7/2011 | Shams |
| 7,996,259 | B1 | 8/2011 | Distefano, III |
| 7,996,288 | B1 | 8/2011 | Stolfo |
| 8,016,192 | B2 | 9/2011 | Messerges |
| 8,020,763 | B1 | 9/2011 | Kowalchyk |
| 8,024,260 | B1 | 9/2011 | Hogl |
| 8,025,223 | B2 | 9/2011 | Saunders |
| 8,028,041 | B2 | 9/2011 | Olliphant |
| 8,032,438 | B1 | 10/2011 | Barton |
| 8,041,338 | B2 | 10/2011 | Chen |
| 8,046,256 | B2 | 10/2011 | Chien |
| 8,050,997 | B1 | 11/2011 | Nosek |
| 8,060,413 | B2 | 11/2011 | Castell |
| 8,060,448 | B2 | 11/2011 | Jones |
| 8,060,449 | B1 | 11/2011 | Zhu |
| 8,073,565 | B2 | 12/2011 | Johnson |
| 8,074,876 | B2 | 12/2011 | Foss |
| 8,074,877 | B2 | 12/2011 | Mullen |
| 8,074,879 | B2 | 12/2011 | Harris |
| 8,082,210 | B2 | 12/2011 | Hansen |
| 8,090,351 | B2 | 1/2012 | Klein |
| 8,095,113 | B2 | 1/2012 | Kean |
| 8,095,602 | B1 | 1/2012 | Orbach |
| 8,104,679 | B2 | 1/2012 | Brown |
| 8,108,261 | B2 | 1/2012 | Carlier |
| RE43,157 | E | 2/2012 | Bishop |
| 8,109,436 | B1 | 2/2012 | Hopkins |
| 8,117,127 | B1 | 2/2012 | Sanders |
| 8,121,942 | B2 | 2/2012 | Carlson |
| 8,121,956 | B2 | 2/2012 | Carlson |
| 8,126,449 | B2 | 2/2012 | Beenau |
| 8,127,982 | B1 | 3/2012 | Casey |
| 8,131,666 | B2 | 3/2012 | OBrien |
| 8,140,418 | B1 | 3/2012 | Casey |
| 8,145,188 | B2 | 3/2012 | Park |
| 8,145,561 | B1 | 3/2012 | Zhu |
| 8,145,566 | B1 | 3/2012 | Ahuja |
| 8,145,569 | B2 | 3/2012 | Gong |
| 8,145,898 | B2 | 3/2012 | Kamalakantha |
| 8,150,767 | B2 | 4/2012 | Wankmueller |
| 8,150,772 | B2 | 4/2012 | Mardikar |
| 8,151,328 | B1 | 4/2012 | Lundy |
| 8,151,330 | B2 | 4/2012 | Vishik |
| 8,151,336 | B2 | 4/2012 | Savoor |
| 8,155,999 | B2 | 4/2012 | De Boer |
| 8,156,000 | B1 | 4/2012 | Thompson |
| 8,156,026 | B2 | 4/2012 | Junger |
| 8,156,042 | B2 | 4/2012 | Winkelman, III |
| 8,156,549 | B2 | 4/2012 | Rice |
| 8,157,178 | B2 | 4/2012 | Dewan |
| 8,157,181 | B2 | 4/2012 | Bates |
| 8,160,935 | B2 | 4/2012 | Bui |
| 8,160,959 | B2 | 4/2012 | Rackley, III |
| 8,165,961 | B1 | 4/2012 | Dimartino |
| 8,166,068 | B2 | 4/2012 | Stevens |
| RE43,351 | E | 5/2012 | Jordan |
| 8,170,921 | B2 | 5/2012 | Stocker |
| 8,171,525 | B1 | 5/2012 | Pelly |
| 8,175,235 | B2 | 5/2012 | Mumford |
| 8,175,965 | B2 | 5/2012 | Moore |
| 8,175,967 | B2 | 5/2012 | OLeary |
| 8,175,968 | B2 | 5/2012 | OLeary |
| 8,175,973 | B2 | 5/2012 | Davis |
| 8,175,975 | B2 | 5/2012 | Cai |
| 8,175,979 | B2 | 5/2012 | Baentsch |
| 8,176,416 | B1 | 5/2012 | Williams |
| 8,176,554 | B1 | 5/2012 | Kennedy |
| 8,179,563 | B2 | 5/2012 | King |
| 8,180,289 | B1 | 5/2012 | Glickman |
| 8,180,705 | B2 | 5/2012 | Kowalchyk |
| 8,180,804 | B1 | 5/2012 | Narayanan |
| 8,190,513 | B2 | 5/2012 | Felger |
| 8,190,523 | B2 | 5/2012 | Patterson |
| 8,191,775 | B2 | 6/2012 | Hildred |
| 8,195,233 | B2 | 6/2012 | Morikuni |
| 8,195,544 | B2 | 6/2012 | Horsfall |
| 8,195,547 | B2 | 6/2012 | Aaltonen |
| 8,195,565 | B2 | 6/2012 | Bishop |
| 8,195,576 | B1 | 6/2012 | Grigg |
| 8,196,131 | B1 | 6/2012 | Von Behren |
| 8,196,813 | B2 | 6/2012 | Vadhri |
| 8,200,582 | B1 | 6/2012 | Zhu |
| 8,200,868 | B1 | 6/2012 | T Hooft |
| 8,204,774 | B2 | 6/2012 | Chwast |
| 8,204,829 | B2 | 6/2012 | Alvarez |
| 8,205,791 | B2 | 6/2012 | Randazza |
| 8,209,245 | B2 | 6/2012 | Dennes |
| 8,209,744 | B2 | 6/2012 | Zhu |
| 8,214,288 | B2 | 7/2012 | Olliphant |
| 8,214,289 | B2 | 7/2012 | Scipioni |
| 8,214,291 | B2 | 7/2012 | Pelegero |
| 8,214,292 | B2 | 7/2012 | Duggal |
| 8,214,293 | B2 | 7/2012 | Powell |
| 8,214,886 | B2 | 7/2012 | Foley |
| 8,215,546 | B2 | 7/2012 | Lin |
| 8,219,411 | B2 | 7/2012 | Matz |
| 8,219,474 | B2 | 7/2012 | Sutton |
| 8,219,489 | B2 | 7/2012 | Patterson |
| 8,219,490 | B2 | 7/2012 | Hammad |
| 8,220,047 | B1 | 7/2012 | Soghoian |
| 8,224,702 | B2 | 7/2012 | Mangerink |
| 8,224,754 | B2 | 7/2012 | Pastusiak |
| 8,224,773 | B2 | 7/2012 | Spiegel |
| 8,225,385 | B2 | 7/2012 | Chow |
| 8,225,997 | B1 | 7/2012 | Bierbaum |
| 8,227,936 | B1 | 7/2012 | Folk |
| 8,229,354 | B2 | 7/2012 | Sklovsky |
| 8,229,808 | B1 | 7/2012 | Heit |
| 8,229,844 | B2 | 7/2012 | Felger |
| 8,229,851 | B2 | 7/2012 | Doran |
| 8,229,852 | B2 | 7/2012 | Carlson |
| 8,229,854 | B2 | 7/2012 | Stephen |
| 8,233,841 | B2 | 7/2012 | Griffin |
| 8,234,183 | B2 | 7/2012 | Smith |
| 8,239,276 | B2 | 8/2012 | Lin |
| 8,244,580 | B2 | 8/2012 | Mankoff |
| 8,245,139 | B2 | 8/2012 | Michelman |
| 8,249,925 | B2 | 8/2012 | Broms |
| 8,249,965 | B2 | 8/2012 | Tumminaro |
| 8,255,278 | B1 | 8/2012 | Young |
| 8,255,323 | B1 | 8/2012 | Casey |
| 8,255,324 | B2 | 8/2012 | Bercy |
| 8,265,993 | B2 | 9/2012 | Chien |
| 8,275,704 | B2 | 9/2012 | Bishop |
| 8,280,777 | B2 | 10/2012 | Mengerink |
| 8,281,991 | B2 | 10/2012 | Wentker |
| 8,281,998 | B2 | 10/2012 | Tang |
| 8,282,002 | B2 | 10/2012 | Shams |
| 8,285,640 | B2 | 10/2012 | Scipioni |
| 8,285,820 | B2 | 10/2012 | Olliphant |
| 8,285,832 | B2 | 10/2012 | Schwab |
| 8,286,875 | B2 | 10/2012 | Tang |
| 8,290,433 | B2 | 10/2012 | Fisher |
| 8,290,819 | B2 | 10/2012 | Bawcutt |
| 8,290,829 | B1 | 10/2012 | Katz |
| 8,295,898 | B2 | 10/2012 | Ashfield |
| 8,296,187 | B2 | 10/2012 | Light |
| 8,296,204 | B2 | 10/2012 | Templeton |
| 8,296,228 | B1 | 10/2012 | Kloor |
| 8,296,231 | B2 | 10/2012 | Britto |
| 8,301,500 | B2 | 10/2012 | Pharris |
| 8,301,510 | B2 | 10/2012 | Boesch |
| 8,301,556 | B2 | 10/2012 | Hogl |
| 8,311,520 | B2 | 11/2012 | Choi |
| 8,312,096 | B2 | 11/2012 | Cohen |
| 8,321,267 | B2 | 11/2012 | Hoerenz |
| 8,321,294 | B2 | 11/2012 | Carlier |
| 8,321,315 | B2 | 11/2012 | Abel |
| 8,321,338 | B2 | 11/2012 | Baumgart |
| 8,321,343 | B2 | 11/2012 | Ramavarjula |

(56) References Cited

U.S. PATENT DOCUMENTS 8,321,364 B1 11/2012 Gharpure
8,326,756 B2 12/2012 Egendorf
8,326,769 B1 12/2012 Weisman
8,326,770 B1 12/2012 Weisman
8,327,450 B2 12/2012 Clement
8,328,095 B2 12/2012 Oder
8,332,272 B2 12/2012 Fisher
8,332,275 B2 12/2012 Poon
8,332,323 B2 12/2012 Stals
8,335,720 B2 12/2012 Juang
8,335,726 B1 12/2012 Ling
8,335,822 B2 12/2012 Ahmed
8,335,921 B2 12/2012 Von Behren
8,335,932 B2 12/2012 Von Behren
8,336,088 B2 12/2012 Raj
8,340,666 B2 12/2012 Ramer
8,341,029 B1 12/2012 Ramalingam
8,346,643 B2 1/2013 Boyer
8,346,659 B1 1/2013 Mohsenzadeh
8,346,663 B2 1/2013 Kawan
8,346,666 B2 1/2013 Lindelsee
8,352,323 B2 1/2013 Fisher
8,352,362 B2 1/2013 Mohsenzadeh
8,352,499 B2 1/2013 Bharat
8,352,749 B2 1/2013 Von Behren
8,355,987 B2 1/2013 Hirson
8,359,070 B1 1/2013 Zhu
8,364,587 B2 1/2013 Nuzum
8,364,590 B1 1/2013 Casey
8,370,264 B1 2/2013 Wei
8,376,225 B1 2/2013 Hopkins
8,380,177 B2 2/2013 Laracey
8,380,349 B1 2/2013 Hickman
8,386,078 B1 2/2013 Hickman
8,387,873 B2 3/2013 Saunders
8,396,750 B1 3/2013 Hariharan
8,396,810 B1 3/2013 Cook
8,401,539 B2 3/2013 Beenau
8,401,898 B2 3/2013 Chien
8,401,904 B1 3/2013 Simakov
8,402,555 B2 3/2013 Grecia
8,403,211 B2 3/2013 Brooks
8,412,586 B1 4/2013 Foulser
8,412,623 B2 4/2013 Moon
8,412,630 B2 4/2013 Ross
8,412,837 B1 4/2013 Emigh
8,417,633 B1 4/2013 Chmara
8,417,642 B2 4/2013 Oren
8,423,462 B1 4/2013 Amacker
8,429,521 B2 4/2013 Lloyd
8,437,633 B2 4/2013 Chmara
8,447,699 B2 5/2013 Batada
8,453,223 B2 5/2013 Svigals
8,453,925 B2 6/2013 Fisher
8,458,487 B1 6/2013 Palgon
8,484,134 B2 7/2013 Hobson
8,485,437 B2 7/2013 Mullen
8,494,959 B2 7/2013 Hathaway
8,498,908 B2 7/2013 Mengerink
8,504,475 B2 8/2013 Brand
8,504,478 B2 8/2013 Saunders
8,510,816 B2 8/2013 Quach
8,433,116 B2 9/2013 Davis
8,527,360 B2 9/2013 Groat
8,533,860 B1 9/2013 Grecia
8,538,845 B2 9/2013 Liberty
8,555,079 B2 10/2013 Shablygin
8,560,004 B1 10/2013 Tsvetkov
8,566,168 B1 10/2013 Bierbaum
8,567,670 B2 10/2013 Stanfield
8,571,939 B2 10/2013 Lindsey
8,577,336 B2 11/2013 Mechaley
8,577,803 B2 11/2013 Chatterjee
8,577,813 B2 11/2013 Weiss
8,578,176 B2 11/2013 Mattsson
8,583,494 B2 11/2013 Fisher
8,584,251 B2 11/2013 McGuire
8,589,237 B2 11/2013 Fisher
8,589,271 B2 11/2013 Evans
8,589,291 B2 11/2013 Carlson
8,595,098 B2 11/2013 Starai
8,595,812 B2 11/2013 Bomar
8,595,850 B2 11/2013 Spies
8,606,638 B2 12/2013 Dragt
8,606,700 B2 12/2013 Carlson
8,606,720 B1 12/2013 Baker
8,612,325 B2 12/2013 Stacy
8,615,468 B2 12/2013 Varadarajan
8,620,754 B2 12/2013 Fisher
8,627,420 B2 1/2014 Furlan
8,635,157 B2 1/2014 Smith
8,639,621 B1 1/2014 Ellis
8,646,059 B1 2/2014 von Behren
8,651,374 B2 2/2014 Brabson
8,656,180 B2 2/2014 Shablygin
8,661,495 B2 2/2014 Reisman
8,662,384 B2 3/2014 Dodin
8,739,016 B1 5/2014 Goldman
8,751,391 B2 6/2014 Freund
8,762,263 B2 6/2014 Gauthier
8,793,186 B2 7/2014 Patterson
8,838,982 B2 9/2014 Carlson
8,856,539 B2 10/2014 Weiss
8,887,308 B2 11/2014 Grecia
8,893,009 B2 11/2014 Raleigh
9,065,643 B2 6/2015 Hurry
9,070,129 B2 6/2015 Sheets
9,082,119 B2 7/2015 Ortiz
9,100,826 B2 8/2015 Weiss
9,105,050 B2 8/2015 Tietzen
9,160,741 B2 10/2015 Wentker
9,195,750 B2 11/2015 Hayden
9,229,964 B2 1/2016 Stevelinck
9,245,267 B2 1/2016 Singh
9,249,241 B2 2/2016 Dai
9,256,871 B2 2/2016 Anderson
9,280,765 B2 3/2016 Hammad
9,307,342 B2 4/2016 Sojoodi
9,355,393 B2 5/2016 Purves
9,448,972 B2 9/2016 Greenberg
9,524,089 B1 12/2016 Ghosh
9,530,137 B2 12/2016 Weiss
9,582,598 B2 2/2017 Kalgi
9,626,351 B2 4/2017 Davis
9,710,807 B2 7/2017 Theurer
9,772,987 B2 9/2017 Davis
9,804,834 B1 10/2017 Lopyrev
9,846,863 B2 12/2017 Grossi
9,904,537 B2 2/2018 Lopyrev
10,360,561 B2 7/2019 Poon
2001/0037297 A1 3/2001 McNair
2001/0029485 A1 10/2001 Brody
2001/0034720 A1 10/2001 Armes
2001/0049635 A1 12/2001 Chung
2001/0054003 A1 12/2001 Chien
2001/0056359 A1 12/2001 Abreu
2001/0056409 A1 12/2001 Bellovin
2002/0002522 A1 1/2002 Clift
2002/0004783 A1 1/2002 Paltenghe
2002/0007320 A1 1/2002 Hogan
2002/0016749 A1 2/2002 Borecki
2002/0026575 A1 2/2002 Wheeler
2002/0029193 A1 3/2002 Ranjan
2002/0035548 A1 3/2002 Hogan
2002/0040325 A1 4/2002 Takae
2002/0046184 A1 4/2002 Villaret
2002/0052778 A1 5/2002 Murphy
2002/0069122 A1 6/2002 Yun
2002/0073045 A1 6/2002 Rubin
2002/0077976 A1 6/2002 Meyer
2002/0077978 A1 6/2002 OLeary
2002/0087894 A1 7/2002 Foley
2002/0099642 A1 7/2002 Schwankl
2002/0099647 A1 7/2002 Howorka

(56) References Cited

U.S. PATENT DOCUMENTS

2002/0099656 A1 7/2002 Poh Wong
2002/0107755 A1 8/2002 Steed
2002/0111919 A1 8/2002 Weller
2002/0112014 A1 8/2002 Bennett
2002/0116271 A1 8/2002 Mankoff
2002/0116341 A1 8/2002 Hogan
2002/0120864 A1 8/2002 Wu
2002/0128977 A1 9/2002 Nambiar
2002/0133467 A1 9/2002 Hobson
2002/0138290 A1 9/2002 Metcalfe
2002/0138445 A1 9/2002 Laage
2002/0141575 A1 10/2002 Hird
2002/0143614 A1 10/2002 MacLean
2002/0147913 A1 10/2002 Lun Yip
2002/0174030 A1 11/2002 Praisner
2002/0178370 A1 11/2002 Gurevich
2002/0194081 A1 12/2002 Perkowski
2003/0014307 A1 1/2003 Heng
2003/0018524 A1 1/2003 Fishman
2003/0026404 A1 2/2003 Joyce
2003/0028451 A1 2/2003 Ananian
2003/0028481 A1 2/2003 Flitcroft
2003/0055785 A1 3/2003 Lahiri
2003/0080185 A1 5/2003 Werther
2003/0097318 A1 5/2003 Yu
2003/0101134 A1 5/2003 Liu
2003/0126076 A1 7/2003 Kwok
2003/0130955 A1 7/2003 Hawthorne
2003/0144935 A1 7/2003 Sobek
2003/0174823 A1 9/2003 Justice
2003/0177361 A1 9/2003 Wheeler
2003/0179230 A1 9/2003 Seidman
2003/0191709 A1 10/2003 Elston
2003/0191711 A1 10/2003 Jamison
2003/0191945 A1 10/2003 Keech
2003/0195659 A1 10/2003 Kasuga
2003/0200142 A1 10/2003 Hicks
2003/0200184 A1 10/2003 Dominguez
2003/0212589 A1 11/2003 Kish
2003/0212642 A1 11/2003 Weller
2003/0216996 A1 11/2003 Cummings
2003/0220835 A1 11/2003 Barnes
2004/0010462 A1 1/2004 Moon
2004/0030601 A1 2/2004 Pond
2004/0050928 A1 3/2004 Bishop
2004/0059682 A1 3/2004 Hasumi
2004/0068443 A1 4/2004 Hopson
2004/0078332 A1 4/2004 Ferguson
2004/0093281 A1 5/2004 Silverstein
2004/0103037 A1 5/2004 Wetmore
2004/0103063 A1 5/2004 Takayama
2004/0111698 A1 6/2004 Soong
2004/0128197 A1 7/2004 Bam
2004/0138999 A1 7/2004 Friedman
2004/0139008 A1 7/2004 Mascavage
2004/0143532 A1 7/2004 Lee
2004/0148255 A1 7/2004 Beck
2004/0158532 A1 8/2004 Breck
2004/0204128 A1 10/2004 Zakharia
2004/0210449 A1 10/2004 Breck
2004/0210498 A1 10/2004 Freund
2004/0215560 A1 10/2004 Amalraj
2004/0215963 A1 10/2004 Kaplan
2004/0230536 A1 11/2004 Fung
2004/0232225 A1 11/2004 Bishop
2004/0236646 A1 11/2004 Wu
2004/0236819 A1 11/2004 Anati
2004/0243520 A1 12/2004 Bishop
2004/0254891 A1 12/2004 Blinn
2004/0260646 A1 12/2004 Berardi
2004/0267608 A1 12/2004 Mansfield
2004/0267655 A1 12/2004 Davidowitz
2004/0267878 A1 12/2004 Osias
2005/0010483 A1 1/2005 Ling
2005/0037735 A1 2/2005 Courts
2005/0038724 A1 2/2005 Roever
2005/0065819 A1 3/2005 Pamela
2005/0080730 A1 4/2005 Sorrentino
2005/0080732 A1 4/2005 Warin
2005/0080747 A1 4/2005 Anderson
2005/0080821 A1 4/2005 Breil
2005/0097320 A1 5/2005 Golan
2005/0101309 A1 5/2005 Croome
2005/0102188 A1 5/2005 Hutchison
2005/0108178 A1 5/2005 York
2005/0114784 A1 5/2005 Spring
2005/0137969 A1 6/2005 Shah
2005/0144082 A1 6/2005 Coolman
2005/0171894 A1 8/2005 Traynor
2005/0171898 A1 8/2005 Bishop
2005/0184145 A1 8/2005 Law
2005/0187873 A1 8/2005 Labrou
2005/0192893 A1 9/2005 Keeling
2005/0192895 A1 9/2005 Rogers
2005/0199709 A1 9/2005 Linlor
2005/0220326 A1 10/2005 Sim
2005/0234817 A1 10/2005 VanFleet
2005/0246278 A1 11/2005 Gerber
2005/0246293 A1 11/2005 Ong
2005/0251446 A1 11/2005 Jiang
2005/0254714 A1 11/2005 Anne
2005/0256802 A1 11/2005 Ammermann
2005/0261967 A1 11/2005 Barry
2005/0269401 A1 12/2005 Spitzer
2005/0269402 A1 12/2005 Spitzer
2005/0273462 A1 12/2005 Reed
2006/0002607 A1 1/2006 Boncyk
2006/0020542 A1 1/2006 Litle
2006/0053056 A1 3/2006 Alspach-goss
2006/0059277 A1 3/2006 Zito
2006/0069619 A1 3/2006 Walker
2006/0075235 A1 4/2006 Renkis
2006/0085328 A1 4/2006 Cohen
2006/0085477 A1 4/2006 Phillips
2006/0124729 A1 6/2006 Martin
2006/0129427 A1 6/2006 Wennberg
2006/0163349 A1 7/2006 Neugebauer
2006/0178918 A1 8/2006 Mikurak
2006/0178986 A1 8/2006 Giordano
2006/0178994 A1 8/2006 Stolfo
2006/0190347 A1 8/2006 Cuervo
2006/0195598 A1 8/2006 Fujita
2006/0208060 A1 9/2006 Mendelovich
2006/0212434 A1 9/2006 Crawford
2006/0226216 A1 10/2006 Keithley
2006/0235795 A1 10/2006 Johnson
2006/0237528 A1 10/2006 Bishop
2006/0247982 A1 11/2006 Stolfo
2006/0277143 A1 12/2006 Almonte
2006/0278704 A1 12/2006 Saunders
2006/0282332 A1 12/2006 Pfleging
2006/0293947 A1 12/2006 Nicholson
2007/0011025 A1 1/2007 Cracchiolo
2007/0016523 A1 1/2007 Blair
2007/0022007 A1 1/2007 Lawe
2007/0038515 A1 2/2007 Postrel
2007/0038516 A1 2/2007 Apple
2007/0055571 A1 3/2007 Fox
2007/0067215 A1 3/2007 Agarwal
2007/0087820 A1 4/2007 Van
2007/0094066 A1 4/2007 Kumar
2007/0100691 A1 5/2007 Patterson
2007/0100728 A1 5/2007 Rotman
2007/0106504 A1 5/2007 Deng
2007/0106607 A1 5/2007 Seib
2007/0106627 A1 5/2007 Srivastava
2007/0107044 A1 5/2007 Yuen
2007/0113289 A1 5/2007 Blumenau
2007/0125840 A1 6/2007 Law
2007/0129955 A1 6/2007 Dalmia
2007/0136193 A1 6/2007 Starr
2007/0136211 A1 6/2007 Brown
2007/0143204 A1 6/2007 Claus
2007/0150413 A1 6/2007 Morgenstern

(56) References Cited

U.S. PATENT DOCUMENTS

2007/0156726 A1 7/2007 Levy
2007/0162350 A1 7/2007 Friedman
2007/0170247 A1 7/2007 Friedman
2007/0179885 A1 8/2007 Bird
2007/0180119 A1 8/2007 Khivesara
2007/0198435 A1 8/2007 Siegal
2007/0198587 A1 8/2007 Kobayasfii
2007/0208662 A1 9/2007 Jeronimus
2007/0208671 A1 9/2007 Brown
2007/0214078 A1 9/2007 Coppinger
2007/0214250 A1 9/2007 Ahmed
2007/0226152 A1 9/2007 Jones
2007/0233590 A1 10/2007 Hardison
2007/0233615 A1 10/2007 Tumminaro
2007/0239502 A1 10/2007 Babu
2007/0245414 A1 10/2007 Chan
2007/0276765 A1 11/2007 Hazel
2007/0288377 A1 12/2007 Shaked
2007/0291995 A1 12/2007 Rivera
2008/0004116 A1 1/2008 Van
2008/0004952 A1 1/2008 Koli
2008/0010096 A1 1/2008 Patterson
2008/0013335 A1 1/2008 Tsutsumi
2008/0015988 A1 1/2008 Brown
2008/0021829 A1 1/2008 Kranzley
2008/0027218 A1 1/2008 Daugs
2008/0027850 A1 1/2008 Britten
2008/0029607 A1 2/2008 Mullen
2008/0035738 A1 2/2008 Mullen
2008/0048022 A1 2/2008 Vawter
2008/0052226 A1 2/2008 Agarwal
2008/0054068 A1 3/2008 Mullen
2008/0054079 A1 3/2008 Mullen
2008/0054081 A1 3/2008 Mullen
2008/0059370 A1 3/2008 Sada
2008/0065554 A1 3/2008 Hogan
2008/0065555 A1 3/2008 Mullen
2008/0077489 A1 3/2008 Gilley
2008/0082424 A1 4/2008 Walton
2008/0086365 A1 4/2008 Zollino
2008/0090513 A1 4/2008 Collins
2008/0091553 A1 4/2008 Koski
2008/0091616 A1 4/2008 Helwin
2008/0097856 A1 4/2008 Blagg
2008/0103795 A1 5/2008 Jakubowski
2008/0114639 A1 5/2008 Meek
2008/0114737 A1 5/2008 Neely
2008/0126145 A1 5/2008 Racklet, III
2008/0133351 A1 6/2008 White
2008/0140568 A1 6/2008 Henry
2008/0140684 A1* 6/2008 O'Reilly ............... G06F 16/353
2008/0147883 A1 6/2008 Philyaw
2008/0154623 A1 6/2008 Derker
2008/0162361 A1 7/2008 Sklovsky
2008/0167965 A1 7/2008 Von
2008/0172274 A1 7/2008 Hurowitz
2008/0172331 A1 7/2008 Graves
2008/0177574 A1 7/2008 Marcos
2008/0177672 A1 7/2008 Brunner
2008/0201232 A1 8/2008 Walker
2008/0201264 A1 8/2008 Brown
2008/0201265 A1 8/2008 Newton
2008/0221945 A1 9/2008 Pace
2008/0223918 A1 9/2008 Williams
2008/0228646 A1 9/2008 Myers
2008/0229217 A1 9/2008 Kembel
2008/0235261 A1 9/2008 Malek
2008/0024561 A1 10/2008 Fein
2008/0243305 A1 10/2008 Lee
2008/0243702 A1 10/2008 Hart
2008/0245855 A1 10/2008 Fein
2008/0245861 A1 10/2008 Fein
2008/0270300 A1 10/2008 Jones
2008/0272188 A1 11/2008 Keithley
2008/0283591 A1 11/2008 Oder
2008/0288376 A1 11/2008 Panthaki
2008/0288889 A1 11/2008 Hunt
2008/0300980 A1 12/2008 Benjamin
2008/0301055 A1 12/2008 Borgs
2008/0302869 A1 12/2008 Mullen
2008/0302876 A1 12/2008 Mullen
2008/0313264 A1 12/2008 Pestoni
2008/0319905 A1 12/2008 Carlson
2009/0006181 A1 1/2009 Ghosh
2009/0006262 A1 1/2009 Brown
2009/0010488 A1 1/2009 Matsuoka
2009/0013266 A1 1/2009 Gandhi
2009/0018895 A1 1/2009 Weinblatt
2009/0024527 A1 1/2009 Sellen
2009/0024636 A1 1/2009 Shiloh
2009/0037255 A1 2/2009 Chiu
2009/0037326 A1 2/2009 Chitti
2009/0037333 A1 2/2009 Flitcroft
2009/0037388 A1 2/2009 Cooper
2009/0043702 A1 2/2009 Bennett
2009/0048934 A1 2/2009 Haddad
2009/0048971 A1 2/2009 Hathaway
2009/0061884 A1 3/2009 Rajan
2009/0063261 A1 3/2009 Scribner
2009/0064056 A1 3/2009 Anderson
2009/0076953 A1 3/2009 Saville
2009/0076966 A1 3/2009 Bishop
2009/0083065 A1 3/2009 Unland
2009/0089176 A1 4/2009 Mccabe
2009/0089193 A1 4/2009 Paintin
2009/0104888 A1 4/2009 Cox
2009/0106112 A1 4/2009 Dalmia
2009/0106151 A1 4/2009 Nelsen
2009/0106160 A1 4/2009 Skowronek
2009/0106234 A1* 4/2009 Siedlecki .............. G06F 16/211
2009/0108080 A1 4/2009 Meyer
2009/0112775 A1 4/2009 Chiulli
2009/0119176 A1 5/2009 Johnson
2009/0119190 A1 5/2009 Realini
2009/0119211 A1 5/2009 Johnson
2009/0125429 A1 5/2009 Takayama
2009/0132347 A1 5/2009 Anderson
2009/0132366 A1 5/2009 Lam
2009/0132395 A1* 5/2009 Lam ....................... G06Q 40/12 705/30
2009/0134217 A1 5/2009 Flitcroft
2009/0144104 A1 6/2009 Johnson
2009/0144201 A1* 6/2009 Gierkink ................ G06Q 30/02 705/64
2009/0157555 A1 6/2009 Biffle
2009/0159673 A1 6/2009 Mullen
2009/0159700 A1 6/2009 Mullen
2009/0159707 A1 6/2009 Mullen
2009/0164344 A1 6/2009 Shiftan
2009/0170608 A1 7/2009 Herrmann
2009/0171778 A1 7/2009 Powell
2009/0173782 A1 7/2009 Muscato
2009/0182664 A1 7/2009 Trombley
2009/0187492 A1 7/2009 Hammad
2009/0200371 A1 8/2009 Kean
2009/0210300 A1 8/2009 Cansler
2009/0216910 A1 8/2009 Duchesneau
2009/0222347 A1 9/2009 Whitten
2009/0228211 A1 9/2009 Rasanen
2009/0233579 A1 9/2009 Castell
2009/0234751 A1 9/2009 Chan
2009/0240620 A1 9/2009 Kendrick
2009/0241159 A1 9/2009 Campagna
2009/0248583 A1 10/2009 Chhabra
2009/0248738 A1* 10/2009 Martinez ............... G06F 16/211
2009/0254471 A1 10/2009 Seidel
2009/0254479 A1 10/2009 Pharris
2009/0254535 A1 10/2009 Eickelmann
2009/0265274 A1 10/2009 Hahn-Carlson
2009/0271246 A1 10/2009 Alvarez
2009/0271265 A1 10/2009 Lay
2009/0276347 A1 11/2009 Kargman
2009/0281948 A1 11/2009 Carlson

(56) References Cited

U.S. PATENT DOCUMENTS

2009/0288012 A1* 11/2009 Hertel .................. G06Q 20/326 715/738
2009/0294527 A1 12/2009 Brabson
2009/0307060 A1 12/2009 Merz
2009/0307135 A1 12/2009 Gupta
2009/0307139 A1 12/2009 Mardikar
2009/0308921 A1 12/2009 Mullen
2009/0313132 A1 12/2009 McKenna
2009/0319638 A1 12/2009 Faith
2009/0327045 A1 12/2009 Olives
2009/0327088 A1 12/2009 Puthupparambil
2009/0327131 A1 12/2009 Beenau
2010/0004989 A1 1/2010 Bonalle
2010/0005025 A1 1/2010 Kumar
2010/0008535 A1 1/2010 Abulafia
2010/0009663 A1 1/2010 Chang
2010/0010964 A1 1/2010 Skowronek
2010/0012728 A1 1/2010 Rosset
2010/0021149 A1 1/2010 Mulder
2010/0023386 A1 1/2010 Avisar
2010/0023455 A1 1/2010 Dispensa
2010/0023457 A1 1/2010 Riviere
2010/0036741 A1 2/2010 Cleven
2010/0036775 A1 2/2010 Edens
2010/0036884 A1 2/2010 Brown
2010/0042456 A1 2/2010 Stinchcombe
2010/0042537 A1 2/2010 Smith
2010/0042540 A1 2/2010 Graves
2010/0049879 A1 2/2010 Leavitt
2010/0057548 A1 3/2010 Edwards
2010/0063903 A1 3/2010 Whipple
2010/0070359 A1 3/2010 Heasley
2010/0076873 A1 3/2010 Taylor
2010/0078471 A1 4/2010 Lin
2010/0078472 A1 4/2010 Lin
2010/0082444 A1 4/2010 Lin
2010/0082445 A1 4/2010 Hodge
2010/0082447 A1 4/2010 Lin
2010/0082455 A1 4/2010 Rosenblatt
2010/0082480 A1 4/2010 Korosec
2010/0082481 A1 4/2010 Lin
2010/0082485 A1 4/2010 Lin
2010/0082490 A1 4/2010 Rosenblatt
2010/0082491 A1 4/2010 Rosenblatt
2010/0088188 A1 4/2010 Kumar
2010/0088237 A1 4/2010 Wankmueller
2010/0094730 A1 4/2010 Koski
2010/0094755 A1 4/2010 Kloster
2010/0094878 A1 4/2010 Soroca
2010/0100480 A1 4/2010 Altman
2010/0106644 A1 4/2010 Annan
2010/0114664 A1 5/2010 Jobin
2010/0120408 A1 5/2010 Beenau
2010/0121707 A1 5/2010 Goeldi
2010/0125492 A1 5/2010 Lin
2010/0125495 A1 5/2010 Smith
2010/0125509 A1 5/2010 Kranzley
2010/0125803 A1 5/2010 Johnson
2010/0131347 A1 5/2010 Sarptipi
2010/0131415 A1 5/2010 Sartipi
2010/0133334 A1 6/2010 Vadhri
2010/0133339 A1 6/2010 Gibson
2010/0138026 A1 6/2010 Kaushal
2010/0138347 A1 6/2010 Chen
2010/0145860 A1 6/2010 Pelegero
2010/0153865 A1 6/2010 Barnes
2010/0155470 A1 6/2010 Woronec
2010/0161433 A1 6/2010 White
2010/0162126 A1 6/2010 Donaldson
2010/0174599 A1 7/2010 Rosenblatt
2010/0179855 A1* 7/2010 Chen .................. G06Q 30/0201 705/7.31
2010/0185505 A1 7/2010 Sprogoe
2010/0185531 A1 7/2010 Van
2010/0185545 A1 7/2010 Royyuru
2010/0191578 A1 7/2010 Tran
2010/0191622 A1 7/2010 Reiss
2010/0191770 A1 7/2010 Cho
2010/0198626 A1 8/2010 Cho
2010/0211445 A1 8/2010 Bodington
2010/0211452 A1 8/2010 D
2010/0211469 A1 8/2010 Salmon
2010/0211499 A1 8/2010 Zanzot
2010/0211505 A1 8/2010 Saunders
2010/0217613 A1 8/2010 Kelly
2010/0217682 A1 8/2010 Chan
2010/0223186 A1 9/2010 Hogan
2010/0228668 A1 9/2010 Hogan
2010/0235284 A1 9/2010 Moore
2010/0243728 A1 9/2010 Wiesman
2010/0250351 A1 9/2010 Gillenson
2010/0256976 A1 10/2010 Atsmon
2010/0258620 A1 10/2010 Torreyson
2010/0268645 A1 10/2010 Martino
2010/0276484 A1 11/2010 Banerjee
2010/0287048 A1 11/2010 Ramer
2010/0287229 A1 11/2010 Hauser
2010/0291904 A1 11/2010 Musfeldt
2010/0293032 A1 11/2010 Engelsma
2010/0299267 A1 11/2010 Faith
2010/0299292 A1 11/2010 Collazo
2010/0305848 A1 12/2010 Stallman
2010/0306075 A1 12/2010 Drance
2010/0306076 A1 12/2010 Taveau
2010/0306113 A1 12/2010 Grey
2010/0312645 A1 12/2010 Niekadlik
2010/0312676 A1 12/2010 Muthukumaran
2010/0312724 A1 12/2010 Pinckney
2010/0325041 A1 12/2010 Berardi
2010/0332262 A1 12/2010 Horvitz
2010/0332283 A1 12/2010 Ng
2011/0004498 A1 1/2011 Readshaw
2011/0010292 A1 1/2011 Giordano
2011/0016047 A1 1/2011 Wu
2011/0016320 A1 1/2011 Bergsten
2011/0035273 A1 2/2011 Parikh
2011/0040640 A1 2/2011 Erikson
2011/0040655 A1 2/2011 Hendrickson
2011/0047017 A1 2/2011 Lieblang
2011/0047075 A1 2/2011 Fourez
2011/0047076 A1 2/2011 Carlson
2011/0078082 A1 3/2011 Gupta
2011/0082789 A1 4/2011 Boyd
2011/0083018 A1 4/2011 Kesanupalli
2011/0087596 A1 4/2011 Dorsey
2011/0087726 A1 4/2011 Shim
2011/0093335 A1 4/2011 Fordyce
2011/0093397 A1 4/2011 Carlson
2011/0099057 A1 4/2011 Tenyer
2011/0105183 A1 5/2011 Hsiao
2011/0106698 A1 5/2011 Issacson
2011/0109737 A1 5/2011 Aben
2011/0119300 A1 5/2011 Marcade
2011/0125597 A1 5/2011 Oder
2011/0137740 A1 6/2011 Bhattacharya
2011/0137742 A1 6/2011 Parikh
2011/0153437 A1 6/2011 Archer
2011/0153498 A1 6/2011 Makhotin
2011/0154466 A1 6/2011 Harper
2011/0161233 A1 6/2011 Tieken
2011/0178896 A1 7/2011 Nakajima
2011/0178926 A1 7/2011 Lindelsee
2011/0180598 A1 7/2011 Morgan
2011/0184827 A1 7/2011 Hubert
2011/0191244 A1 8/2011 Dai
2011/0208418 A1 8/2011 Looney
2011/0215146 A1 9/2011 Shams
2011/0218870 A1 9/2011 Shams
2011/0221692 A1 9/2011 Seydoux
2011/0238474 A1 9/2011 Carr
2011/0238511 A1 9/2011 Park
2011/0238573 A1 9/2011 Varadarajan
2011/0246290 A1 10/2011 Howard
2011/0246317 A1 10/2011 Coppinger

(56) References Cited

U.S. PATENT DOCUMENTS

2011/0251892 A1 10/2011 Laracey
2011/0258049 A1 10/2011 Ramer
2011/0258111 A1 10/2011 Raj
2011/0258123 A1 10/2011 Dawkins
2011/0270665 A1 11/2011 Kim
2011/0272471 A1 11/2011 Mullen
2011/0272478 A1 11/2011 Mullen
2011/0276380 A1 11/2011 Mullen
2011/0276381 A1 11/2011 Mullen
2011/0276424 A1 11/2011 Mullen
2011/0276425 A1 11/2011 Mullen
2011/0282780 A1 11/2011 French
2011/0288684 A1 11/2011 Farlow
2011/0295745 A1 12/2011 White
2011/0296508 A1 12/2011 Os
2011/0302081 A1 12/2011 Saunders
2011/0312423 A1 12/2011 Mosites
2011/0320344 A1 12/2011 Faith
2011/0320345 A1 12/2011 Taveau
2012/0005026 A1 1/2012 Khan
2012/0011009 A1 1/2012 Lindsey
2012/0011063 A1 1/2012 Killian
2012/0016731 A1 1/2012 Smith
2012/0022943 A1 1/2012 Howard
2012/0023026 A1 1/2012 Chen
2012/0023417 A1 1/2012 Nesladek
2012/0023567 A1 1/2012 Hammad
2012/0028609 A1 2/2012 Hruska
2012/0030047 A1 2/2012 Fuentes
2012/0030101 A1 2/2012 Boyd
2012/0035998 A1 2/2012 Chien
2012/0036071 A1 2/2012 Fulton
2012/0041881 A1 2/2012 Basu
2012/0047237 A1 2/2012 Arvidsson
2012/0066065 A1 3/2012 Switzer
2012/0066078 A1 3/2012 Kingston
2012/0072311 A1 3/2012 Khan
2012/0072350 A1 3/2012 Goldthwaite
2012/0078735 A1 3/2012 Bauer
2012/0078798 A1 3/2012 Downing
2012/0078799 A1 3/2012 Jackson
2012/0084132 A1 4/2012 Khan
2012/0084204 A1 4/2012 Castell
2012/0095852 A1 4/2012 Bauer
2012/0095865 A1 4/2012 Doherty
2012/0095895 A1 4/2012 Aston
2012/0101881 A1 4/2012 Taylor
2012/0110044 A1 5/2012 Nagpal
2012/0116902 A1 5/2012 Cardina
2012/0116966 A1 5/2012 Tan
2012/0118950 A1 5/2012 Belk
2012/0123838 A1 5/2012 Sparks
2012/0123882 A1 5/2012 Carlson
2012/0123940 A1 5/2012 Killian
2012/0124496 A1 5/2012 Rose
2012/0129514 A1 5/2012 Beenau
2012/0130794 A1 5/2012 Strieder
2012/0136780 A1 5/2012 El-Awady
2012/0143706 A1 6/2012 Crake
2012/0143767 A1 6/2012 Abadir
2012/0143772 A1 6/2012 Abadir
2012/0150750 A1 6/2012 Law
2012/0158580 A1 6/2012 Eram
2012/0158589 A1 6/2012 Katzin
2012/0158593 A1 6/2012 Garfinkle
2012/0158792 A1 6/2012 MacLaurin
2012/0158893 A1 6/2012 Boyns
2012/0159163 A1 6/2012 von Behren
2012/0165978 A1 6/2012 Li
2012/0166333 A1 6/2012 von Behren
2012/0166655 A1 6/2012 Maddali
2012/0173431 A1 7/2012 Ritchie
2012/0173962 A1 7/2012 Oh
2012/0185386 A1 7/2012 Salama
2012/0190386 A1 7/2012 Anderson
2012/0197691 A1 8/2012 Grigg
2012/0197794 A1 8/2012 Grigg
2012/0197807 A1 8/2012 Schlesser
2012/0203662 A1 8/2012 Morgan
2012/0203664 A1 8/2012 Torossian
2012/0203665 A1 8/2012 Morgan
2012/0203666 A1 8/2012 Torossian
2012/0203673 A1 8/2012 Morgan
2012/0209749 A1 8/2012 Hammad
2012/0215640 A1 8/2012 Ramer
2012/0215648 A1 8/2012 Rose
2012/0215650 A1 8/2012 Oba
2012/0215684 A1 8/2012 Kidron
2012/0215688 A1 8/2012 Musser
2012/0215696 A1 8/2012 Salonen
2012/0221421 A1 8/2012 Hammad
2012/0221502 A1 8/2012 Jerram
2012/0226582 A1 9/2012 Hammad
2012/0231844 A1 9/2012 Coppinger
2012/0233004 A1 9/2012 Bercaw
2012/0233170 A1 9/2012 Musgrove
2012/0239417 A1 9/2012 Pourfallah
2012/0239556 A1 9/2012 Magruder
2012/0239560 A1 9/2012 Pourfallah
2012/0246070 A1 9/2012 Vadhri
2012/0246071 A1 9/2012 Jain
2012/0246079 A1 9/2012 Wilson
2012/0254108 A1 10/2012 Wedewer
2012/0259763 A1 10/2012 Pessin
2012/0265631 A1 10/2012 Cronic
2012/0265685 A1 10/2012 Brudnicki
2012/0271770 A1 10/2012 Harris
2012/0284035 A1 11/2012 Gillin
2012/0290472 A1 11/2012 Mullen
2012/0297446 A1 11/2012 Webb
2012/0300932 A1 11/2012 Cambridge
2012/0303425 A1 11/2012 Katzin
2012/0303503 A1 11/2012 Cambridge
2012/0303736 A1 11/2012 Novotny
2012/0303961 A1 11/2012 Kean
2012/0304273 A1 11/2012 Bailey
2012/0310725 A1 12/2012 Chien
2012/0310826 A1 12/2012 Chatterjee
2012/0310831 A1 12/2012 Harris
2012/0316992 A1 12/2012 Oborne
2012/0317035 A1 12/2012 Royyuru
2012/0317036 A1 12/2012 Bower
2012/0317149 A1 12/2012 Jagota
2012/0323664 A1 12/2012 Klems
2012/0330874 A1 12/2012 Jerram
2013/0013499 A1 1/2013 Kalgi
2013/0017784 A1 1/2013 Fisher
2013/0018757 A1 1/2013 Anderson
2013/0019098 A1 1/2013 Gupta
2013/0024364 A1 1/2013 Shrivastava
2013/0024371 A1 1/2013 Hariramani
2013/0024916 A1 1/2013 Evans
2013/0030828 A1 1/2013 Pourfallah
2013/0031006 A1 1/2013 McCullagh
2013/0054337 A1 2/2013 Brendell
2013/0054466 A1 2/2013 Muscato
2013/0054470 A1 2/2013 Campos
2013/0054474 A1 2/2013 Yeager
2013/0080238 A1 3/2013 Kelly
2013/0081122 A1 3/2013 Svigals
2013/0085877 A1 4/2013 Ruehrig
2013/0090750 A1 4/2013 Herrman
2013/0091028 A1 4/2013 Oder
2013/0103574 A1 4/2013 Conrad
2013/0110658 A1 5/2013 Lyman
2013/0110678 A1 5/2013 Vigier
2013/0111599 A1 5/2013 Gargiulo
2013/0117170 A1 5/2013 Coppinger
2013/0117185 A1 5/2013 Collison
2013/0124290 A1 5/2013 Fisher
2013/0124291 A1 5/2013 Fisher
2013/0124364 A1 5/2013 Mittal
2013/0138525 A1 5/2013 Bercaw
2013/0144785 A1 6/2013 Karpenko

(56) References Cited

U.S. PATENT DOCUMENTS

| | | | | |
|---|---|---|---|---|
| 2013/0144888 | A1 | 6/2013 | Faith | |
| 2013/0144957 | A1* | 6/2013 | Sherman | G06Q 50/01 709/206 |
| 2013/0145148 | A1 | 6/2013 | Shablygin | |
| 2013/0145172 | A1 | 6/2013 | Shablygin | |
| 2013/0151417 | A1 | 6/2013 | Gupta | |
| 2013/0159081 | A1 | 6/2013 | Shastry | |
| 2013/0159112 | A1 | 6/2013 | Schultz | |
| 2013/0159178 | A1 | 6/2013 | Colon | |
| 2013/0159184 | A1 | 6/2013 | Thaw | |
| 2013/0159196 | A1 | 6/2013 | Dizoglio | |
| 2013/0166332 | A1 | 6/2013 | Hammad | |
| 2013/0166402 | A1 | 6/2013 | Parento | |
| 2013/0166456 | A1 | 6/2013 | Zhang | |
| 2013/0166621 | A1 | 6/2013 | Zhu | |
| 2013/0173736 | A1 | 7/2013 | Krzeminski | |
| 2013/0179340 | A1 | 7/2013 | Alba | |
| 2013/0185202 | A1 | 7/2013 | Goldthwaite | |
| 2013/0191286 | A1 | 7/2013 | Cronic | |
| 2013/0191289 | A1 | 7/2013 | Cronic | |
| 2013/0198071 | A1 | 8/2013 | Jurss | |
| 2013/0198080 | A1 | 8/2013 | Anderson | |
| 2013/0200146 | A1 | 8/2013 | Moghadam | |
| 2013/0204776 | A1 | 8/2013 | King | |
| 2013/0204787 | A1 | 8/2013 | Dubois | |
| 2013/0204793 | A1 | 8/2013 | Kerridge | |
| 2013/0212007 | A1 | 8/2013 | Mattsson | |
| 2013/0212017 | A1 | 8/2013 | Bangia | |
| 2013/0212019 | A1 | 8/2013 | Mattsson | |
| 2013/0212024 | A1 | 8/2013 | Mattsson | |
| 2013/0212026 | A1 | 8/2013 | Powell | |
| 2013/0212666 | A1 | 8/2013 | Mattsson | |
| 2013/0218640 | A1 | 8/2013 | Kidder | |
| 2013/0218657 | A1 | 8/2013 | Salmon | |
| 2013/0218698 | A1 | 8/2013 | Moon | |
| 2013/0218721 | A1 | 8/2013 | Borhan | |
| 2013/0218765 | A1 | 8/2013 | Hammad | |
| 2013/0218769 | A1 | 8/2013 | Pourfallah | |
| 2013/0226799 | A1 | 8/2013 | Raj | |
| 2013/0226813 | A1 | 8/2013 | Voltz | |
| 2013/0246199 | A1 | 9/2013 | Carlson | |
| 2013/0246202 | A1 | 9/2013 | Tobin | |
| 2013/0246203 | A1 | 9/2013 | Laracey | |
| 2013/0246258 | A1 | 9/2013 | Dessert | |
| 2013/0246259 | A1 | 9/2013 | Dessert | |
| 2013/0246267 | A1 | 9/2013 | Tobin | |
| 2013/0254028 | A1 | 9/2013 | Salci | |
| 2013/0254052 | A1 | 9/2013 | Royyuru | |
| 2013/0254102 | A1 | 9/2013 | Royyuru | |
| 2013/0254117 | A1 | 9/2013 | von Mueller | |
| 2013/0262296 | A1 | 10/2013 | Thomas | |
| 2013/0262302 | A1 | 10/2013 | Lettow | |
| 2013/0262315 | A1 | 10/2013 | Hruska | |
| 2013/0262316 | A1 | 10/2013 | Hruska | |
| 2013/0262317 | A1 | 10/2013 | Collinge | |
| 2013/0275300 | A1 | 10/2013 | Killian | |
| 2013/0275307 | A1 | 10/2013 | Khan | |
| 2013/0275308 | A1 | 10/2013 | Paraskeva | |
| 2013/0282502 | A1 | 10/2013 | Jooste | |
| 2013/0282575 | A1 | 10/2013 | Mullen | |
| 2013/0282588 | A1 | 10/2013 | Hruska | |
| 2013/0297501 | A1 | 11/2013 | Monk | |
| 2013/0297504 | A1 | 11/2013 | Nwokolo | |
| 2013/0297508 | A1 | 11/2013 | Belamant | |
| 2013/0304649 | A1 | 11/2013 | Cronic | |
| 2013/0308778 | A1 | 11/2013 | Fosmark | |
| 2013/0311382 | A1 | 11/2013 | Fosmark | |
| 2013/0317982 | A1 | 11/2013 | Mengerink | |
| 2013/0325579 | A1 | 12/2013 | Salmon | |
| 2013/0332344 | A1 | 12/2013 | Weber | |
| 2013/0339240 | A1 | 12/2013 | Anderson | |
| 2013/0339253 | A1 | 12/2013 | Sincai | |
| 2013/0346302 | A1 | 12/2013 | Purves | |
| 2013/0346305 | A1 | 12/2013 | Mendes | |
| 2013/0346314 | A1 | 12/2013 | Mogollon | |
| 2014/0006195 | A1 | 1/2014 | Wilson | |
| 2014/0006198 | A1 | 1/2014 | Daly | |
| 2014/0006283 | A1 | 1/2014 | Hogg | |
| 2014/0007213 | A1 | 1/2014 | Sanin | |
| 2014/0013106 | A1 | 1/2014 | Red path | |
| 2014/0013114 | A1 | 1/2014 | Red path | |
| 2014/0013452 | A1 | 1/2014 | Aissi | |
| 2014/0019352 | A1 | 1/2014 | Shrivastava | |
| 2014/0025581 | A1 | 1/2014 | Caiman | |
| 2014/0025585 | A1 | 1/2014 | Caiman | |
| 2014/0025958 | A1 | 1/2014 | Caiman | |
| 2014/0032417 | A1 | 1/2014 | Mattsson | |
| 2014/0032418 | A1 | 1/2014 | Weber | |
| 2014/0040127 | A1 | 2/2014 | Chatterjee | |
| 2014/0040137 | A1 | 2/2014 | Carlson | |
| 2014/0040139 | A1 | 2/2014 | Brudnicki | |
| 2014/0040144 | A1 | 2/2014 | Plomske | |
| 2014/0040145 | A1 | 2/2014 | Ozvat | |
| 2014/0040148 | A1 | 2/2014 | Ozvat | |
| 2014/0040628 | A1 | 2/2014 | Fort | |
| 2014/0041018 | A1 | 2/2014 | Bomar | |
| 2014/0046853 | A1 | 2/2014 | Spies | |
| 2014/0047517 | A1 | 2/2014 | Ding | |
| 2014/0047551 | A1 | 2/2014 | Nagasundaram | |
| 2014/0052532 | A1 | 2/2014 | Tsai | |
| 2014/0052620 | A1 | 2/2014 | Rogers | |
| 2014/0052637 | A1 | 2/2014 | Jooste | |
| 2014/0068706 | A1 | 3/2014 | Aissi | |
| 2014/0074637 | A1 | 3/2014 | Hammad | |
| 2014/0095589 | A1 | 4/2014 | Johnson | |
| 2014/0108172 | A1 | 4/2014 | Weber | |
| 2014/0108197 | A1 | 4/2014 | Smith | |
| 2014/0114857 | A1 | 4/2014 | Griggs | |
| 2014/0136945 | A1 | 5/2014 | Ligman | |
| 2014/0143137 | A1 | 5/2014 | Carlson | |
| 2014/0164243 | A1 | 6/2014 | Aabye | |
| 2014/0188586 | A1 | 7/2014 | Carpenter | |
| 2014/0294701 | A1 | 10/2014 | Dai | |
| 2014/0297534 | A1 | 10/2014 | Patterson | |
| 2014/0310080 | A1 | 10/2014 | Salmon | |
| 2014/0310183 | A1 | 10/2014 | Weber | |
| 2014/0330721 | A1 | 11/2014 | Wang | |
| 2014/0330722 | A1 | 11/2014 | Laxminarayanan | |
| 2014/0331265 | A1 | 11/2014 | Mozell | |
| 2014/0337175 | A1 | 11/2014 | Katzin | |
| 2014/0337236 | A1 | 11/2014 | Wong | |
| 2014/0344153 | A1 | 11/2014 | Raj | |
| 2014/0365295 | A1 | 12/2014 | Postrel | |
| 2014/0372308 | A1 | 12/2014 | Sheets | |
| 2015/0019443 | A1 | 1/2015 | Sheets | |
| 2015/0019944 | A1 | 1/2015 | Kalgi | |
| 2015/0026049 | A1 | 1/2015 | Theurer | |
| 2015/0032625 | A1 | 1/2015 | Dill | |
| 2015/0032626 | A1 | 1/2015 | Dill | |
| 2015/0032627 | A1 | 1/2015 | Dill | |
| 2015/0046338 | A1 | 2/2015 | Laxminarayanan | |
| 2015/0046339 | A1 | 2/2015 | Wong | |
| 2015/0052064 | A1 | 2/2015 | Karpenko | |
| 2015/0088756 | A1 | 3/2015 | Makhotin | |
| 2015/0089350 | A1 | 3/2015 | Davis | |
| 2015/0106239 | A1 | 4/2015 | Gaddam | |
| 2015/0112870 | A1 | 4/2015 | Nagasundaram | |
| 2015/0112871 | A1 | 4/2015 | Kumnick | |
| 2015/0120472 | A1 | 4/2015 | Aabye | |
| 2015/0127529 | A1 | 5/2015 | Makhotin | |
| 2015/0127547 | A1 | 5/2015 | Powell | |
| 2015/0140960 | A1 | 5/2015 | Powell | |
| 2015/0142673 | A1 | 5/2015 | Nelsen | |
| 2015/0154588 | A1 | 6/2015 | Purves | |
| 2015/0161597 | A1 | 6/2015 | Subramanian | |
| 2015/0178724 | A1 | 6/2015 | Ngo | |
| 2015/0180836 | A1 | 6/2015 | Wong | |
| 2015/0186864 | A1 | 7/2015 | Jones | |
| 2015/0193222 | A1 | 7/2015 | Pirzadeh | |
| 2015/0195133 | A1 | 7/2015 | Sheets | |
| 2015/0199679 | A1 | 7/2015 | Palanisamy | |
| 2015/0199689 | A1 | 7/2015 | Kumnick | |
| 2015/0220917 | A1 | 8/2015 | Aabye | |
| 2015/0269566 | A1 | 9/2015 | Gaddam | |

(56) References Cited

U.S. PATENT DOCUMENTS

| | | | |
|---|---|---|---|
| 2015/0302453 | A1 | 10/2015 | Tietzen |
| 2015/0312038 | A1 | 10/2015 | Palanisamy |
| 2015/0319158 | A1 | 11/2015 | Kumnick |
| 2015/0332262 | A1 | 11/2015 | Lingappa |
| 2015/0339767 | A1 | 11/2015 | Chen |
| 2015/0356560 | A1 | 12/2015 | Shastry |
| 2016/0028550 | A1 | 1/2016 | Gaddam |
| 2016/0042263 | A1 | 2/2016 | Gaddam |
| 2016/0065370 | A1 | 3/2016 | Le Saint |
| 2016/0092696 | A1 | 3/2016 | Guglani |
| 2016/0092872 | A1 | 3/2016 | Prakash |
| 2016/0103675 | A1 | 4/2016 | Aabye |
| 2016/0119296 | A1 | 4/2016 | Laxminarayanan |
| 2016/0224976 | A1 | 8/2016 | Basu |
| 2016/0291920 | A1 | 10/2016 | Sirpal |
| 2016/0379192 | A1 | 12/2016 | Purves |
| 2017/0046696 | A1 | 2/2017 | Powell |
| 2017/0103387 | A1 | 4/2017 | Weber |
| 2017/0134479 | A1 | 5/2017 | Kalgi |
| 2017/0220818 | A1 | 8/2017 | Nagasundaram |
| 2017/0228723 | A1 | 8/2017 | Taylor |
| 2017/0300314 | A1 | 10/2017 | Lopyrev |
| 2017/0346876 | A1 | 11/2017 | Lim |
| 2018/0075081 | A1 | 3/2018 | Chipman |

FOREIGN PATENT DOCUMENTS

| | | | |
|---|---|---|---|
| CN | 1928907 | A | 3/2007 |
| CN | 101025806 | A | 8/2007 |
| CN | 101075316 | A | 11/2007 |
| CN | 101231727 | A | 7/2008 |
| CN | 101334876 | A | 12/2008 |
| CN | 101388125 | A | 3/2009 |
| CN | 101719255 | A | 6/2010 |
| CN | 101840550 | A | 9/2010 |
| CN | 101924690 | A | 12/2010 |
| CN | 101945127 | A | 1/2011 |
| CN | 101958025 | A | 1/2011 |
| CN | 102143290 | A | 8/2011 |
| CN | 102779304 | | 11/2012 |
| CN | 102947847 | | 2/2013 |
| EP | 0745961 | A2 | 12/1996 |
| EP | 0855659 | A1 | 7/1998 |
| EP | 1921578 | A1 | 5/2008 |
| EP | 2156397 | A1 | 2/2010 |
| EP | 2503496 | | 9/2012 |
| JP | 2001344544 | A | 12/2001 |
| JP | 2005004621 | A | 1/2005 |
| JP | 2007328549 | | 12/2007 |
| JP | 2008527495 | A | 7/2008 |
| JP | 2008545210 | A | 12/2008 |
| JP | 2009151730 | A | 7/2009 |
| JP | 2009176259 | | 8/2009 |
| JP | 2011186660 | A | 9/2011 |
| JP | 2012027824 | A | 2/2012 |
| KR | 20000058839 | A | 10/2000 |
| KR | 20010055426 | | 7/2001 |
| KR | 100432430 | B1 | 5/2004 |
| KR | 20060117177 | A | 11/2006 |
| KR | 20070104087 | A | 10/2007 |
| SG | 2013069539 | | 10/2013 |
| WO | 2000046769 | A1 | 8/2000 |
| WO | 2001035304 | A1 | 5/2001 |
| WO | 0165502 | A2 | 9/2001 |
| WO | 2003001866 | A1 | 1/2003 |
| WO | 03023674 | A1 | 3/2003 |
| WO | 2003046697 | A2 | 6/2003 |
| WO | 2003071386 | A2 | 8/2003 |
| WO | 2003083737 | A1 | 10/2003 |
| WO | 2004042536 | A2 | 5/2004 |
| WO | 2005079254 | A2 | 9/2005 |
| WO | 2006113834 | A2 | 10/2006 |
| WO | 2009032523 | A1 | 3/2009 |
| WO | 2010078522 | A1 | 7/2010 |
| WO | 2010148704 | A1 | 12/2010 |
| WO | 2010148737 | A1 | 12/2010 |
| WO | 2012068078 | A2 | 5/2012 |
| WO | 2012098556 | A1 | 7/2012 |
| WO | 2012112822 | A2 | 8/2012 |
| WO | 2012142370 | A2 | 10/2012 |
| WO | 2012167941 | A1 | 12/2012 |
| WO | 2013048538 | A1 | 4/2013 |
| WO | 2013056104 | A1 | 4/2013 |
| WO | 2013119914 | A1 | 8/2013 |
| WO | 2013179271 | A2 | 12/2013 |

OTHER PUBLICATIONS

Office Action dated Jul. 10, 2020 for U.S. Appl. No. 16/017,241 (pp. 1-9).
Chinese Office Action (with English language translation) for Application No. CN201480023694.9, dated Jan. 21, 2020, 12 pages.
Office Action dated Feb. 4, 2020 for U.S. Appl. No. 13/629,006 (pp. 1-7).
Indian Examination Report for Application No. 8894/DELNP/2015, dated Oct. 21, 2019, 7 pages.
Notice of Allowance dated Nov. 8, 2019 for U.S. Appl. No. 14/698,317 (pp. 1-10).
Office Action dated Oct. 29, 2019 for U.S. Appl. No. 14/216,382 (pp. 1-8).
Office Action dated Oct. 31, 2019 for U.S. Appl. No. 15/627,085 (pp. 1-9).
Office Action dated Dec. 12, 2019 for U.S. Appl. No. 14/935,122 (pp. 1-12).
Aissi et al., U.S. Appl. No. 61/738,832 (unpublished), Management of Sensitive Data filed Dec. 18, 2012.
Australian Examination Report for AU2017203295 dated Apr. 19, 2018, 4 pages.
Australian Patent Office, Patent Examination Report No. 2 in Australian Patent Application No. 2012217606, dated Jun. 15, 2016, 6 pages.
Brick-and-mortar retailers snatching customers away from E-tailers. (Feb. 16, 2012). PR Newswire Retrieved from https:// dialog. proguest.com/professional/docview/1346330115?accountid= 142257 (Year: 2012) 3 pages.
Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, 2 p.
Charland et al., Mobile Application Development: Web vs. Native, Apr. 2011, 9 pages.
Chinese Office Action (with English language translation) dated Jan. 30, 2019 for Application No. 201280019629.X, 10 pages.
Chinese Office Action (with English language translation) for Application No. 201480023694.9 dated Dec. 3, 2018, 17 pages.
Chinese Office Action (with English language translation) for Application No. 201480023694.9, dated Jun. 26, 2019, 7 pages.
Chinese Office Action dated Nov. 6, 2017 for CN Application No. 201280018719.7, 24 pages.
Chinese Office Action dated Oct. 10, 2017 for CN Application No. 201280019629.X, 7 pages.
Chipman, et al., U.S. Appl. No. 15/265,282 (Unpublished), Self-Cleaning Token Vault, filed Sep. 14, 2016. 47 pages.
Corrected Petition for Inter Partes Review of U.S. Pat. No. 8,533,860 Challenging Claims 1-30 Under 35 U.S.C. .sctn.312 and 37 C.F.R. sctn.42.104, dated Mar. 14, 2016, before the USPTO Patent Trial and Appeal Board, IPR 2016-00600, 65 pages.
David Breitkopf, "ACS to Take Over Mich. WC Distribution Program", American Banker, New York, NY: Jul. 20, 2006, vol. 171. Issue 138, p. 6.
Dimmick, U.S. Appl. No. 14/952,444 (unpublished), Tokenization Request Via Access Device, filed Nov. 25, 2015, 78 pages.
Dimmick, U.S. Appl. No. 14/952,514 (unpublished), Systems Communications With Non-Sensitive Identifiers, filed Nov. 25, 2015, 72 pages.
Dizaj, Mohammad Vahid Alizadeh, Moghaddam, Rexa Askari, Momenebellah, Samad, New Mobile Payment Protocol: Mobile Pay

(56) References Cited

OTHER PUBLICATIONS

Center Protocol 2 (MPCP2) by Using New Key Agreement Protocol: VAM, 3d International Conference on Electronics Computer Technology, vol. 2, Apr. 2011, pp. 12-18.
European Patent Office, Supplementary European Search Report and European Search Opinion, in EP Application No. 12749451.6, dated Apr. 20, 2015, 7 pages.
Ex Parte Quayle Action dated Jan. 18, 2019 for U.S. Appl. No. 16/182,288 (pp. 1-5).
Flurscheim et al., U.S. Appl. No. 62/108,403 (unpublished), Wearables With NFC HCE filed Jan. 27, 2015.
Gaddam et al., U.S. Appl. No. 62/053,736 (unpublished), Completing Transactions Without a User Payment Device, filed Sep. 22, 2014.
Galland et al., U.S. Appl. No. 62/128,709 (unpublished), Tokenizing Transaction Amounts, filed Mar. 5, 2015.
Gao et al., "A 2D Barcode-Based Mobile Payment System", (2009), XP031561633 (10 pages).
Gao, Jerry, Kulkarni, Vijay, Ranavat, Himanshu, Chang, Lee, Mei, Hsing, A2D Barcode-Based Mobile Payment System, 3d International Conference on Multimedia and Ubiquitous Engineering, Jun. 2009, pp. 320-329.
Gopalan, NP & Selvan, B Siva. TCP/IP Illustrated. Prentice-Hall. 2008. pp. 101-102, 175-176 and 235. 7 pages.
Hoverson et al., U.S. Appl. No. 62/038,174 (unpublished), Customized Payment Gateway, filed Aug. 15, 2014.
I. Malavolta, Web-based hybrid mobile apps: state of the practice and research opportunities, 2 pages (Year: 2016).
Immaneni et al., Hybrid retrieval from the unified web, Mar. 2007, 5 pages.
International Preliminary Report on Patentability dated Jan. 14, 2014 cited in related/ corresponding International PCT Appl. No. PCT/US2012/045875 filed Jul. 7, 2012. (11 pages).
International Preliminary Report on Patentability dated Jan. 16, 2014 in related/corresponding PCT Patent Appl. No. PCT/US2012/045601 filed Jul. 5, 2012. (7 pages).
International Search Report and Written Opinion for PCT/US2010/033229 dated Dec. 29, 2010. (8 pages).
International Search Report and Written Opinion for PCT/US11/57173 dated Mar. 15, 2012. (11 pages).
International Search Report and Written Opinion for PCT/US11/57179 dated Jan. 5, 2012. (7 pages).
International Search Report and Written Opinion for PCT/US11/57180 dated Mar. 15, 2012 (11 pages).
International Search Report and Written Opinion for PCT/US12/37597 dated Sep. 21, 2012 (11 pages).
International Search Report and Written Opinion for PCT/US12/41437 dated Aug. 24, 2012. (20 pages).
International Search Report and Written Opinion for PCT/US12/47092 dated Nov. 26, 2012. 11 pages.
International Search Report and Written Opinion for PCT/US12/55636 dated Nov. 30, 2012. 2 pages.
International Search Report and Written Opinion for PCT/US12/56759 dated Feb. 25, 2013. 12 pages.
International Search Report and Written Opinion for PCT/US12/57528 dated Dec. 17, 2012. 8 pages.
International Search Report and Written Opinion for PCT/US12/65738 dated Apr. 19, 2013. 9 pages.
International Search Report and Written Opinion for PCT/US12/66898 dated Feb. 11, 2013. 14 pages.
International Search Report and Written Opinion for PCT/US13/46875, dated Oct. 24, 2013, 14 pages.
International Search Report and Written Opinion for PCT/US2010/033861 dated Dec. 9, 2010 (7 pages).
International Search Report and Written Opinion for PCT/US2010/041860 dated Feb. 1, 2011. (8 pages).
International Search Report and Written Opinion for PCT/US2010/046833 dated Apr. 26, 2011 (8 pages).
International Search Report and Written Opinion for PCT/US2010/048344 dated Nov. 15, 2010. (7 pages).
International Search Report and Written Opinion for PCT/US2011/024941 dated Apr. 19, 2011 (6 pages).
International Search Report and Written Opinion for PCT/US2011/032093 dated Aug. 24, 2011 (11 pages).
International Search Report and Written Opinion for PCT/US2011/26734 dated Apr. 29, 2011 (7 pages).
International Search Report and Written Opinion for PCT/US2011/29790 dated May 19, 2011 (6 pages).
International Search Report and Written Opinion for PCT/US2012/026205, dated May 29, 2012. 2 pages.
International Search Report and Written Opinion for PCT/US2012/027043 dated Jul. 13, 2012. 15 pages.
International Search Report and Written Opinion for PCT/US2012/045601 dated Feb. 1, 2013. 11 pages.
International Search Report and Written Opinion for PCT/US2012/057528, dated May 29, 2012. (8 pages).
International Search Report and Written Opinion for PCT/US2012/069557 dated Feb. 22, 2013. 8 pages.
International Search Report and Written Opinion for PCT/US2013/020411 dated May 21, 2013. 18 pages.
International Search Report and Written Opinion for PCT/US2013/024538, dated May 31, 2013. 15 pages.
International Search Report and Written Opinion for PCT/US2013/031084, dated Jun. 4, 2013. 9 pages.
International Search Report and Written Opinion for PCT/US2014/030517, dated Aug. 18, 2014. (9 pages).
International Search Report and Written Opinion issued in connection with PCT/US11/42062 dated Sep. 29, 2011 (8 pages).
International Search Report and Writtten Opinion for PCT/US2011/039178 dated Sep. 16, 2011 (7 pages).
International Search Report for PCT/US09/54921 dated Oct. 21, 2009. (2 pages).
International Search Report for PCT/US11/49393 dated Dec. 5, 2011. (2 pages).
International Search Report for PCT/US11/65305 dated Apr. 16, 2012. 2 pages.
International Search Report for PCT/US12/21000 dated May 15, 2012.2 pages.
International Search Report for PCT/US12/23856 dated Jun. 6, 2012. 3 pages.
International Search Report for PCT/US12/24772 dated Jul. 24, 2012. 3 pages.
International Search Report for PCT/US12/25530 dated Aug. 7, 2012. 4 pages.
International Search Report for PCT/US12/39638 dated Sep. 24, 2012. 4 pages.
International Search Report for PCT/US12/45875 dated Nov. 16, 2012. 4 pages.
International Search Report for PCT/US12/57577 dated Nov. 29, 2012. 2 pages.
International Search Report for PCT/US2010/033229 dated Dec. 29, 2010, 8 pages.
International Search Report for PCT/US2010/033547 dated Dec. 14, 2010 (3 pages).
International Search Report for PCT/US2010/045445 dated Feb. 24, 2011 (3 pages).
International Search Report for PCT/US2010/045500 dated Mar. 29, 2011 (3 pages).
International Search Report for PCT/US2011/035268 dated Aug. 5, 2011 (3 pages).
International Search Report PCT/US12/27620 dated Aug. 10, 2012. 3 pages.
IP Australia, Patent Examination Report No. 1, Australian Application No. 2012220669, dated Sep. 8, 2014, 6 pages.
IP Australia, Patent Examination Report No. 2, Australian Application No. 2012220669, dated Jun. 8, 2016, 4 pages.
Jiang Hao, "Research on the discovery mechanism of relay node in the middle of the peer network", the full-text database of excellent Master's degree thesis in China, (May 15, 2009).
Kalgi et al., U.S. Appl. No. 62/024,426 (unpublished), Secure Transactions Using Mobile Devices, filed Jul. 14, 2014.
Kinagi, U.S. Appl. No. 62/117,291 (unpublished), Token and Cryptogram Using Transaction Specific Information filed Feb. 17, 2015.

(56) References Cited

OTHER PUBLICATIONS

Le Saint et al., U.S. Appl. No. 15/008,388 (unpublished), Methods for Secure Credential Provisioning, filed Jan. 27, 2016. 89 pages.
Lee et al., osgGap: scene graph library for mobile based on hybrid web app framework, Nov. 2013, 4 pages.
Li, U.S. Appl. No. 61/894,749 (unpublished), Methods and Systems for Authentication and Issuance of Tokens in a Secure Environment filed Oct. 23, 2013.
Lowry P B XML data mediation and collaboration: a proposed comprehensive architecture and query requirements for using XML to mediate heterogeneous data sources and targets, Proceedings of the 34th Hawaii International Conference on System Sciences—2001, Jan. 3, 2001; Jan. 3, 2001-Jan. 6, 2001, IEEE, pp. 1-9.
McCarney et al., "Tapas: Design, Implementation, and Usability Evaluation of a Password Manager," Copyright 2012, ACM 978 1-4503-1312-4/12/12 (10 pages).
McGuire, U.S. Appl. No. 14/600,523 (unpublished), Secure Payment Processing Usnig Authorization Request, filed Jan. 20, 2015. 42 pages.
Notice of Allowance dated Oct. 10, 2018 for U.S. Appl. No. 14/242,403 (pp. 1-11).
Notice of Allowance dated Apr. 12, 2019 for U.S. Appl. No. 16/182,288 (pp. 1-8).
Notice of Allowance dated Feb. 27, 2019 for U.S. Appl. No. 15/839,493 (pp. 1-9).
Notice of Allowance dated Jul. 23, 2018 for U.S. Appl. No. 15/406,325 (pp. 1-9).
Notice of Allowance dated Jun. 27, 2018 for U.S. Appl. No. 13/542,443 (pp. 1-13).
Notice of Allowance dated May 30, 2019 for U.S. Appl. No. 13/758,472 (pp. 1-10).
Notice of Allowance dated Nov. 30, 2018 for U.S. Appl. No. 15/717,409 (pp. 1-8).
Notice of Allowance dated Oct. 11, 2018 for U.S. Appl. No. 13/520,481 (pp. 1-9).
Office Action dated Feb. 28, 2018 for U.S. Appl. No. 14/242,403 (pp. 1-11).
Office Action dated Apr. 12, 2018 for U.S. Appl. No. 13/520,481 (pp. 1-8).
Office Action dated Dec. 27, 2018 for U.S. Appl. No. 13/398,817 (pp. 1-10).
Office Action dated Dec. 3, 2018 for U.S. Appl. No. 14/935,122 (pp. 1-13).
Office Action dated Jan. 17, 2019 for U.S. Appl. No. 14/216,382 (pp. 1-7).
Office Action dated Jul. 10, 2019 for U.S. Appl. No. 13/398,817 (pp. 1-8).
Office Action dated Jul. 16, 2018 for U.S. Appl. No. 14/698,317 (pp. 1-13).
Office Action dated Jun. 21, 2018 for U.S. Appl. No. 14/216,351 (pp. 1-12).
Office Action dated Jun. 22, 2018 for U.S. Appl. No. 13/629,006 (pp. 1-8).
Office Action dated Jun. 27, 2018 for U.S. Appl. No. 15/717,409 (pp. 1-7).
Office Action dated Jun. 27, 2019 for U.S. Appl. No. 13/629,006 (pp. 1-7).
Office Action dated Mar. 1, 2019 for U.S. Appl. No. 14/698,317 (pp. 1-11).
Office Action dated May 14, 2019 for U.S. Appl. No. 14/935,122 (pp. 1-11).
Office Action dated May 22, 2018 for U.S. Appl. No. 14/216,382 (pp. 1-8).
Office Action dated Nov. 2, 2018 for U.S. Appl. No. 13/624,779 (pp. 1-18).
Office Action dated Oct. 4, 2018 for U.S. Appl. No. 13/758,472 (pp. 1-22).
Office Action dated Sep. 21, 2018 for U.S. Appl. No. 15/839,493 (pp. 1-21).
Pan Kexian "Development of the Location-Based Service LBS Application of Intelligent Mobile Phone", Information Technologies, Oct. 25, 2009, pp. 134-137, cited on Oct. 10, 2017 in CN201280019629.
Patterson, U.S. Appl. No. 15/019,157 (unpublished), Token Processing Utilizing Multiple Authorizations, filed Feb. 9, 2016. 62 pages.
Patterson, U.S. Appl. No. 62/054,346 (unpublished), Mirrored Token Vault, filed Sep. 23, 2014.
Petition for Inter Partes Review of U.S. Pat. No. 8,402,555 Challenging Claims 1-26 Under 35 U.S.C. 312 and 37 C.F.R. 42.104, dated Mar. 22, 2016, before the USPTO Patent Trial and Appeal Board, IPR 2016-00789, 65 pages.
Petition for Inter Partes Review of U.S. Pat. No. 8,533,860 Challenging Claims 1-30 Under 35 U.S.C. 312 and 37 C.F.R. 42.104, filed Feb. 17, 2016, Before the USPTO Patent Trial and Appeal Board, IPR 2016-00600, 65 pages.
Petition for Inter Partes Review of U.S. Pat. No. 8,887,308 Challenging Claim 1 Under 35 U.S.C. 312 and 37 C.F. R. 42.104, dated Mar. 3, 2016, before the USPTO Patent Trial and Appeal Board, IPR 2016-00602, 58 pages.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Prakash et al., U.S. Appl. No. 14/955,716 (unpublished), Provisioning Platform for Machine-to-Machine Devices, filed Dec. 1, 2015. 72 pages.
Prakash et al., U.S. Appl. No. 62/037,033 (unpublished), Sharing Payment Token, filed Aug. 13, 2014.
Rangarajan et al., U.S. Appl. No. 61/751,763 (unpublished), Payments Bridge filed Jan. 11, 2013.
Ratha, N., and Bolle, R., 1. History of Fingerprint Pattern Recognition—1.1 Introduction; 1.2 The Development of Fingerprint Classification Systems "Automatic Fingerprint Recognition Systems," Springer-Verlag, (2004) (466 pages).
Sabba et al., U.S. Appl. No. 15/011,366 (unpublished), Token Check Offline, filed Jan. 29, 2016. 60 pages.
Shadrach, D.C. "A Weighted Metric Based Adaptive Algorithm for Web Server Load Balancing." 2009 Third International Symposium on Intelligent Information Technology Application, http://ieeexplore.ieee.org/xpl/articleDetails.jsp?amumber=5369384, pp. 449-452.
Sharma et al., U.S. Appl. No. 62/003,717 (unpublished), Mobile Merchant Application filed May 28, 2014.
ShopSavvy Blog. Feb. 2012. Retrieved from https://web.archive.Org/web/20120212104611/http://shopsavvy.com/blog. pp. 1-13 (Year: 2012).
Smartphone e-payment and Google Ad send blog, 'Google Wallet on Smartphone', <http://stockpedia.blogspot.kr/2011/06/google-wallet.html> Jun. 10, 2011, pp. 1-3.
Stack Exchange, Why aren't there automated translators from one programming language to another, 2010 (5 pages).
State Intellectual Property of the People's Republic of China, First Office Action in Chinese Application No. 201280019629.X, dated Aug. 1, 2016, 15 pages.
State Intellectual Property Office of the People's Republic of China, First Office Action in Chinese Application No. 201280018719.7, dated Jul. 4, 2016, 15 pages.
Stubbs et al., U.S. Appl. No. 62/103,522 (unpublished), Methods and Systems for Wallet Provider Provisioning filed Jan. 14, 2015.
U.S. Appl. No. 15/462,658 (Unpublished), Replacing Token on a Multi-Token User Device, filed Mar. 17, 2017. 53 pages.
U.S. Appl. No. 12/940,664 (unpublished), entitled "System and Method for Determining Transaction Distance" filed Nov. 5, 2010. (51 pages).
U.S. Appl. No. 61/250,440, filed Oct. 9, 2009, entitled "Systems and Methods to Provide Loyalty Programs". 164 pages.
Vitt, Elizabeth et al. Data Integration Solutions for Master Data Management (Feb. 2006). https://technet.microsoft.com/en-us/library/aa964123(v=sql.90).aspx (19 pages).
Vitt, Elizabeth, et al. "Microsoft SQL Server 2005 Analysis Services Performance Guide." White Paper, White Paper (2007). (116 pages).

(56) References Cited

OTHER PUBLICATIONS

Wang Lepeng et al. "Discuss of Foursquare Pattern and Its Deelopment Strategies in China" Scientific and Technological Information, Aug. 15, 2010, pp. 90-91, cited on Oct. 10, 2017 in CN201280019629.
Wang, U.S. Appl. No. 62/000,288 (unpublished), Payment System Canonical Address Format, filed May 19, 2014.
Wang, U.S. Appl. No. 62/042,050 (unpublished), Payment Device Authentication and Authorization System, filed Aug. 26, 2014.
Win Anyu, "A cluster based routing relay node selection algorithm", 2010 Asia-Pacific Conference on Information Network and Digital Content Security (2010APCID), (Dec. 31, 2010).
Wong et al., U.S. Appl. No. 14/966,948 (unpublished), Automated Access Data Provisioning filed Dec. 11, 2015. 52 pages.
Wong et al., U.S. Appl. No. 61/879,362 (unpublished), Systems and Methods for Managing Mobile Cardholder Verification Methods filed Sep. 18, 2013.
Written Opinion for PCT/US12/27620 dated Aug. 10, 2012. 5 pages.
Xing Chang-you and Chen Ming; "Network distance prediction technology", Journal of Software , (Sep. 30, 2009), vol. 20, No. 9, p. 2470-2482 http://www.jos.org.cn/josen/ch/reader/view_abstract.aspx?flag=1&file_no=3559&journal_id=jos.
Yang Jingjing "Help Web: Life Search Forerunner" Scientific and Technological Information, Aug. 5, 2010, pp. 36-37, cited on Oct. 10, 2017 in CN201280019629.
Liang, J., Shi, R., Liang, F., & Gao, Z. H. (2001). WAP clients & SET protocol. Dr.Dobb's Journal, 26(6), 85-91. Retrieved from http:/ /dialog.proguest.conn/professional/docview/202692023?accountid=131444 (Year: 2001).
Office Action dated Apr. 1, 2020 for U.S. Appl. No. 16/140,879 (pp. 1-17).
Office Action dated Mar. 13, 2020 for U.S. Appl. No. 15/494,294 (pp. 1-8).
Office Action dated Mar. 6, 2020 for U.S. Appl. No. 16/017,241 (pp. 1-7).
Office Action dated Mar. 6, 2020 for U.S. Appl. No. 16/440,486 (pp. 1-8).
Chinese Office Action (with English language translation) for Application No. CN201710037081.6, dated Mar. 17, 2020, 23 pages.
Notice of Allowance dated Jun. 10, 2020 for U.S. Appl. No. 15/494,294 (pp. 1-10).
Office Action dated May 19, 2020 for U.S. Appl. No. 15/627,085 (pp. 1-11).
Office Action dated Oct. 22, 2020 for U.S. Appl. No. 14/244,488 (pp. 1-13).
Office Action dated Oct. 27, 2020 for U.S. Appl. No. 16/294,676 (pp. 1-9).
Chinese Office Action (with English language translation) for Application No. CN201710037081.6, dated Oct. 21, 2020, 11 pages.
Office Action dated Nov. 12, 2020 for U.S. Appl. No. 16/273,976 (pp. 1-9).
Office Action dated Dec. 4, 2020 for U.S. Appl. No. 16/017,241 (pp. 1-10).
Office Action dated Aug. 21, 2020 for U.S. Appl. No. 15/988,485 (pp. 1-10).
Office Action dated Sep. 4, 2020 for U.S. Appl. No. 15/627,085 (pp. 1-10).
Office Action dated Oct. 9, 2020 for U.S. Appl. No. 16/283,251 (pp. 1-6).

* cited by examiner

Example: User Service Usage Attributes Data Model

Example: User Profile Attributes Data Model

Example: User Profile Attributes Data Model

Example: User Profile Attributes Data Model

Example: User Service Usage Attributes Data Model

Example: User Service Usage Attributes Data Model

Example: User Service Usage Attributes Data Model

Example: Centralized Personal Information Platform Components

Example: Search Results Aggregation

Example: Search Results Aggregation ("SRA") component 500

Example: Card-Based Transaction Execution

Example: Card-Based Transaction Execution

Example: Card-Based Transaction Execution

Example: Card-Based Transaction Execution

Example: Card-Based Transaction Execution ("CTE") component 700

Example: Card-Based Transaction Execution ("CTE") component 700

Example: Card-Based Transaction Execution ("CTE") component 700

Example: Card-Based Transaction Execution ("CTE") component 700

Example: Card-Based Transaction Execution ("CTE") component 700

Example: Transaction Data Aggregation

Example: Transaction Data Aggregation (TDA) component 600

Example: Social Data Aggregation

Example: Social Data Aggregation ("SDA") component 1100

Example: Value-Add Service Enrollment

Example: Value-Add Service Enrollment ("VASE") component 1300

Example: Aggregated Data Record Normalization ("ADRN") component 1400

Example: Data Record Normalization ("ADRN") Component 1400

Example: Data Field Recognition ("DFR") component 1500

Example: Entity Type Classification ("ETC") component 1600

Example: Cross-Entity Correlation (“CEC”) component 1700

Example: Entity Attribute Association ("EAA") component 1800

Example: Entity Profile-Graph Updating (“EPGU”) component 1900

Example: Search Term Generation (“STG”) component 2000

Example: Electronic Virtual Wallet User Interface

Example: Electronic Virtual Wallet User Interface

Example: Electronic Virtual Wallet User Interface

Example: Electronic Virtual Wallet User Interface

Example: Electronic Virtual Wallet User Interface

Example: Merchant Analytics Platform

Example Data Flow: Merchant Analytics

Example Data Flow: Merchant Analytics

Example: Merchant Analytics (“MA”) component

Example: User Behavioral Pattern Analytics ("UBPA") component

Example: User Pattern Identification (UPI) component

Example: Econometrical Investment Strategy Analysis

Example: Econometrical Investment Strategy Analysis

Example Data Flow: Econometrical Analysis of an Investment Strategy

Example Data Flow: Econometrical Analysis of an Investment Strategy

Example Data Flow: Econometrical Analysis of an Investment Strategy

Example Logic Flow: Transaction Data Normalization (TDN) component

Example Logic Flow: Card-Based Transaction Classification (CTC) component

Example: Transaction Data Filtering (TDF) component

Example Logic Flow: Consumer Data Anonymization (CDA) component

Example Logic Flow: Econometrical Strategy Analysis (ESA) component

Example Logic Flow: Econometrical Strategy Analysis (ESA) component

Example Logic Flow: Business Analytics Reporting (BAR) component

Example Logic Flow: Analytical Model Sharing (AMS) component

Example Logic Flow: Encryptmatics XML Converter (EXC) component

Example: Email Data Aggregation

Example: Distributed Linking Node Mesh

Example: Distributed Linking Node Mesh Search

Example: Distributed Linking Node Mesh Search

Example: Distributed Linking Node Mesh Search

Example: Distributed Linking Node Mesh Search

Example: Distributed Linking Node Mesh Search

Example: Distributed Linking Node Mesh Search

Example: Distributed Linking Node Mesh Index Creation

Example: Distributed Linking Node Mesh Index Creation

Example: Encryptmatics XML Converter (EXC) component

Example Logic Flow: Encryptmatics XML Converter (EXC) Component, Input Language Loading Example Logic Flow: Encryptmatics XML Converter (EXC) Component, Input Model Conversion Example Logic Flow: Encryptmatics XML Converter (EXC) Component, Input Model Conversion Example: Tumblar Data Source Manipulation / Anonymization Component (e.g., TDS Component)

Example Logic Flow: Tumblar Data Source Manipulation / Anonymization Component (e.g., TDS Component)

Example Data Flow: Mesh Aggregation and Cluster Querying

Example Logic Flow: Cluster Response Analysis and Transaction Triggering ("CRA") Component Example: Application Embodiment – Discovery Shopping Mode Example: Application Embodiment – Discovery Shopping Mode Example: Application Embodiment – Discovery Shopping Mode

MULTI-SOURCE, MULTI-DIMENSIONAL, CROSS-ENTITY, MULTIMEDIA CENTRALIZED PERSONAL INFORMATION DATABASE PLATFORM APPARATUSES, METHODS AND SYSTEMS

PRIORITY CLAIM

This application is a continuation of U.S. patent application Ser. No. 13/758,472, filed Feb. 4, 2013, which is a non-provisional of and claims priority under 35 USC §§ 119, 120 to: U.S. provisional patent application Ser. No. 61/594,063 filed Feb. 2, 2012, and is a continuation-in-part of U.S. patent application Ser. No. 13/520,481 filed Jul. 3, 2012.

U.S. patent application Ser. No. 13/758,472 also claims priority under 35 U.S.C. § 365, 371 to PCT application no. PCT/US13/24538 filed Feb. 2, 2013.

The entire contents of the aforementioned application(s) are expressly incorporated by reference herein.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address apparatuses, methods and systems for consumer data management and analytics, and more particularly, include MULTI-SOURCE, MULTI-DIMENSIONAL, CROSS-ENTITY, MULTIMEDIA CENTRALIZED PERSONAL INFORMATION DATABASE PLATFORM APPARATUSES, METHODS AND SYSTEMS ("CPDB").

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Many people share information through online social media streams using various communication devices or applications. Moreover, consumers may access online stores using the Internet on a computer or mobile device to make purchases from various service providers or merchants.

BRIEF DESCRIPTION OF THE DRAWINGS

The accompanying appendices and/or drawings illustrate various non-limiting, example, innovative aspects in accordance with the present descriptions.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc. The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

CPDB

The MULTI-SOURCE, MULTI-DIMENSIONAL, CROSS-ENTITY, MULTIMEDIA CENTRALIZED PERSONAL INFORMATION DATABASE PLATFORM APPARATUSES, METHODS AND SYSTEMS (hereinafter "CPDB") transform data aggregated from various computer resources, via CPDB components, into updated entity profiles, social graphs and/or investment recommendations. The CPDB components, in various embodiments, implement advantageous features as set forth below.

Centralized Personal Information Platform

Figure 1:
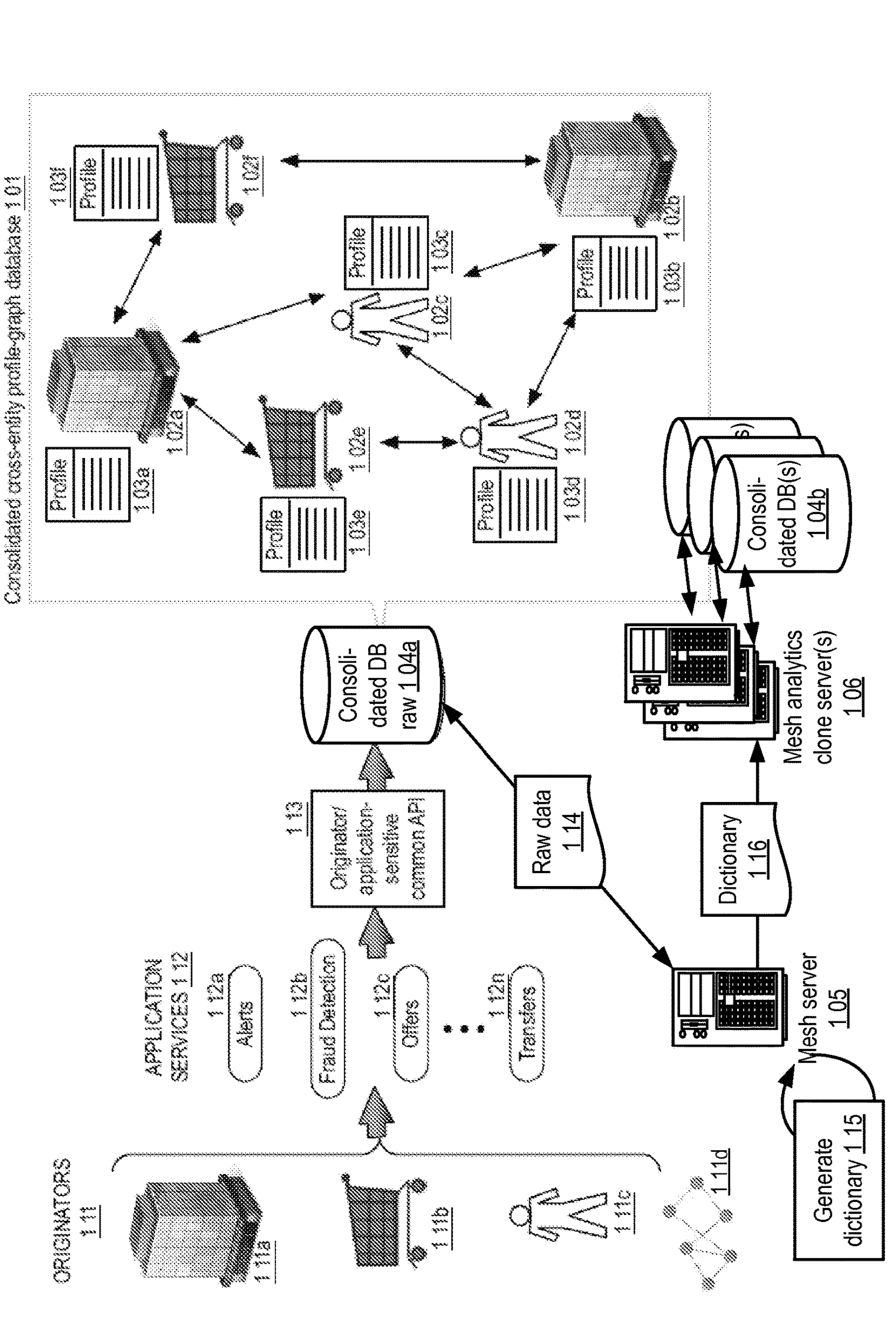
FIG. 1 shows a block diagram illustrating example aspects of a centralized personal information platform in some embodiments of the CPDB.
Figure 2A:
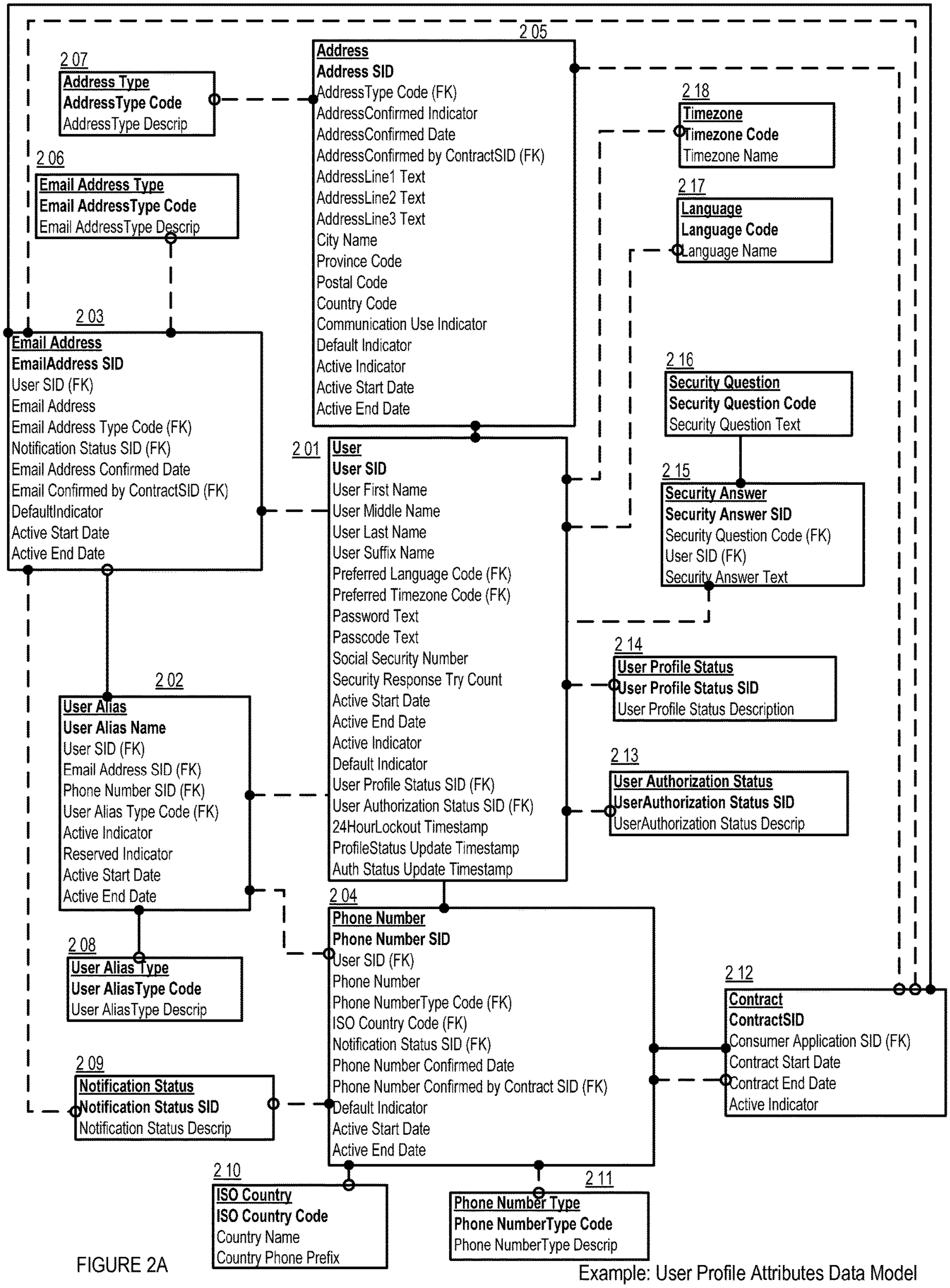
FIGS. 2A-F show block diagrams illustrating example aspects of data models within a centralized personal information platform in some embodiments of the CPDB.
Figure 2B:
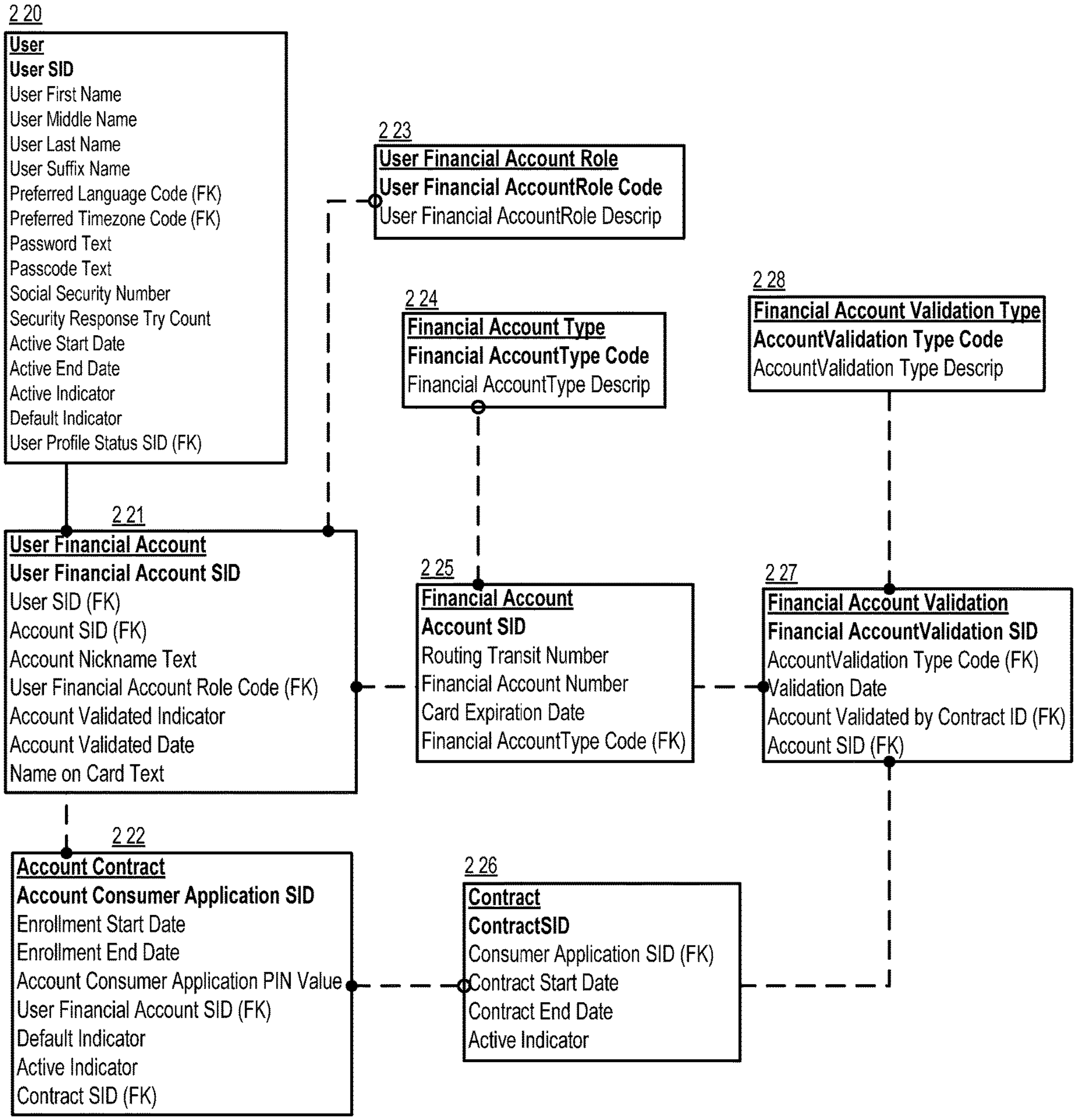
Figure 2C:
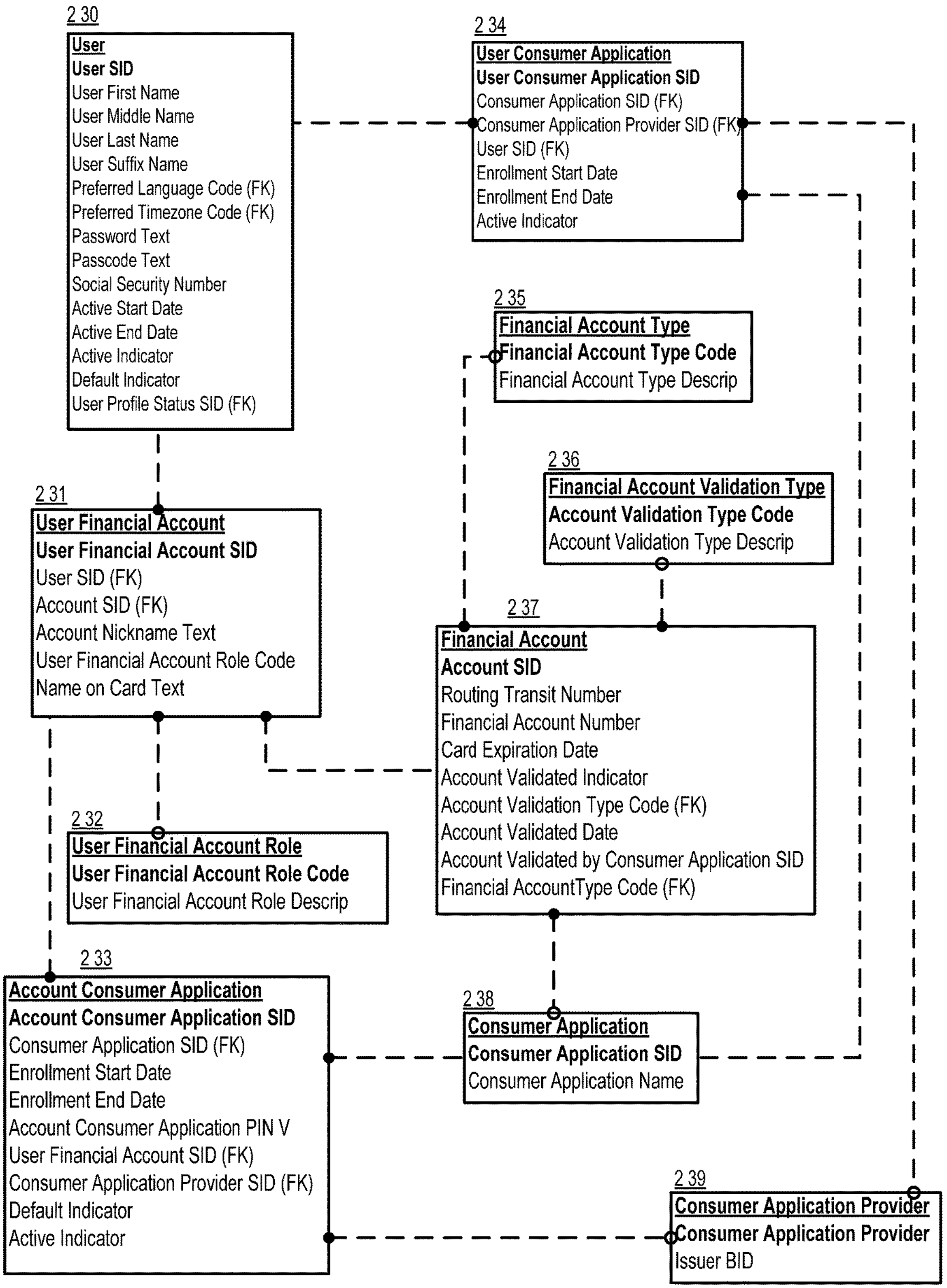
Figure 2D:
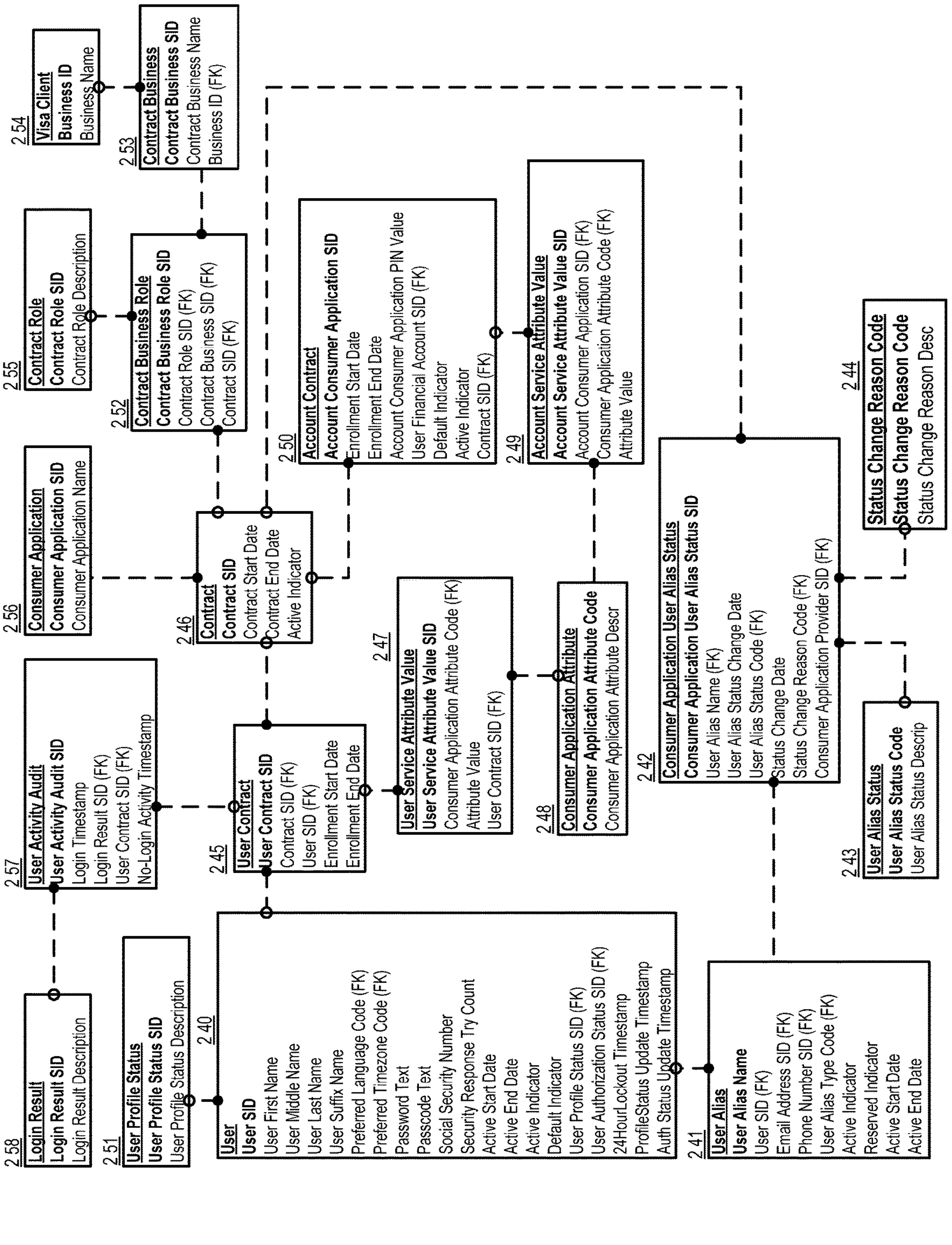
Figure 2E:
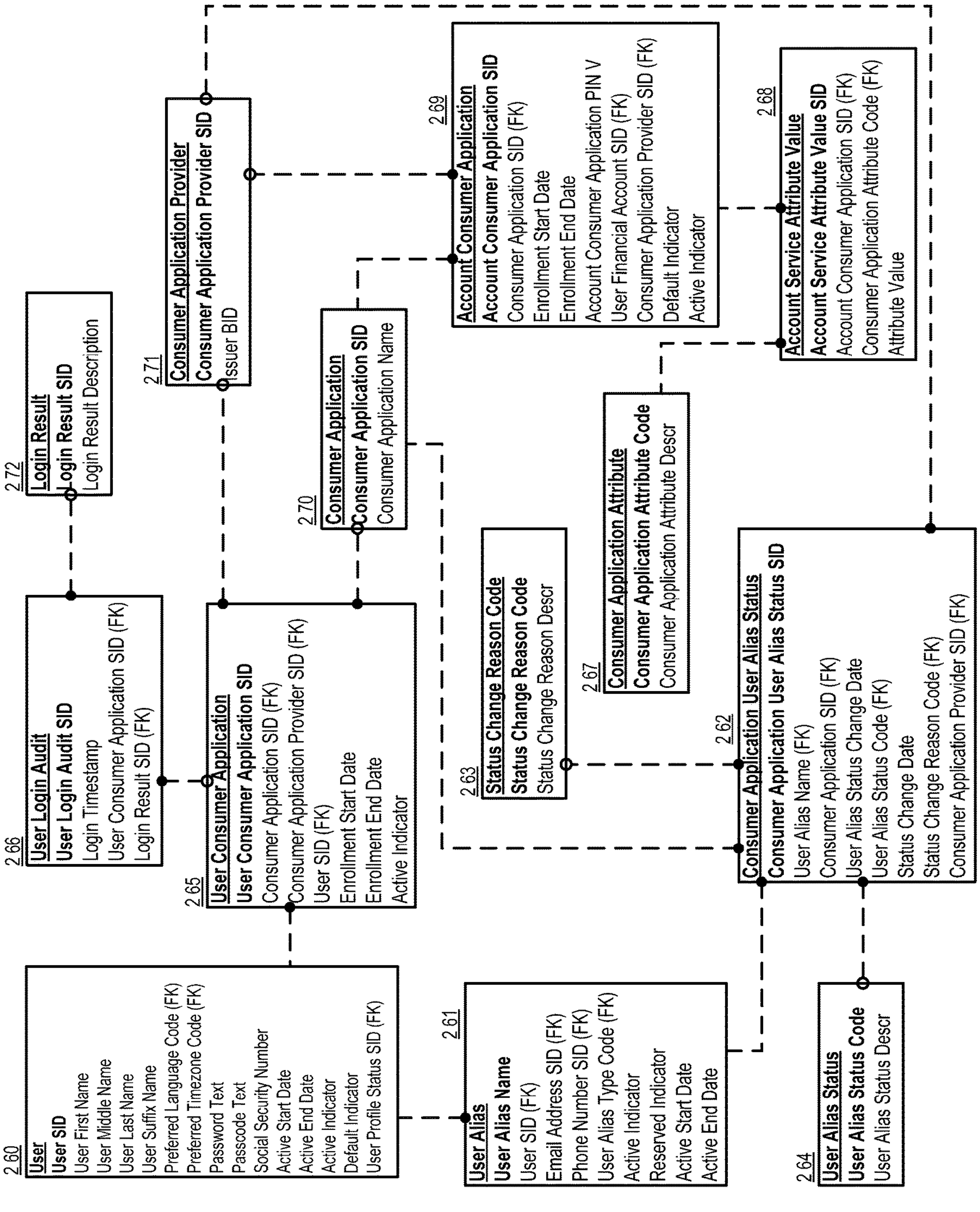
Figure 2F:
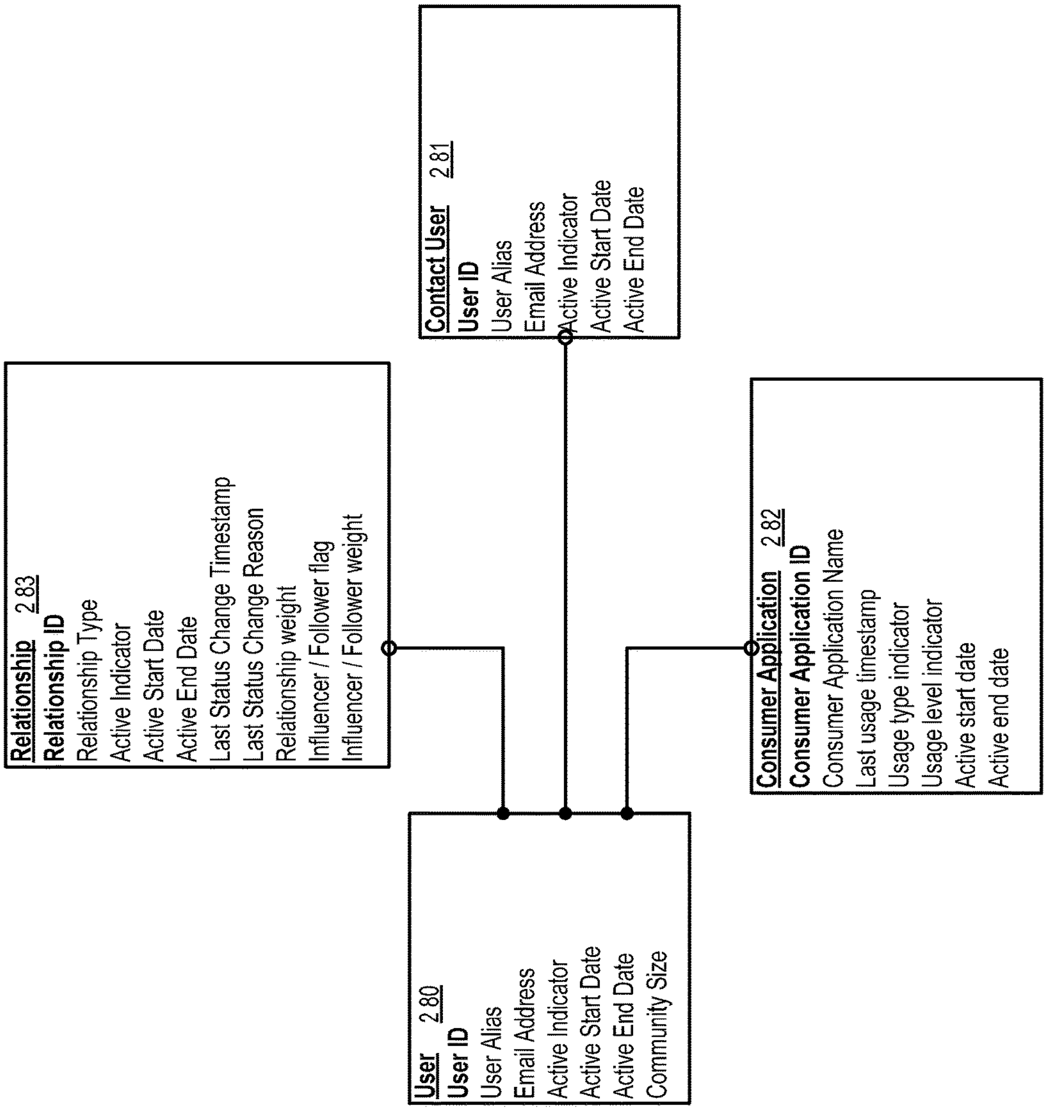

FIG. 1 shows a block diagram illustrating example aspects of a centralized personal information platform in some embodiments of the CPDB. In various scenarios, originators 111 such as merchants 111*b*, consumers 111*c* (including, e.g., social networking sites), account issuers, acquirers 111*a*, and/or the like, desire to utilize information from payment network systems for enabling various features for consumers, and may provide input for the generation of a centralized personal information platform.

For all of the input types (e.g., consumer transactions 111*b*, social network interactions 111*d* (e.g., emails, reviews, text posts, photos, audio/video/multimedia, conversations, chats, etc.), financial institution activity 111*a* (e.g., acquirers, authorizations, denials, issuers, fraud detection, etc.), merchant activities 111*b* (e.g., offers, coupons, redemptions, etc.), and/or the like, the mesh server 105 may aggregate and store such inputs in consolidated database 104*b*.

The mesh server aggregation may be achieved by obtaining a feed of financial transactions (e.g., if the mesh server is also a pay network server), by obtaining complete feed access (e.g., firehose feeds), from social networks (e.g., Facebook, Twitter, etc.), using publically available data API's (e.g., Google search API), and/or the like.

In one embodiment, the feeds may be obtained via high-bandwidth network connections. An example of the high-bandwidth network connections may include multiple optical fiber connections to an Internet backplane such as the multinational Equinix Exchange, New York International Internet eXchange (e.g., "NYIIX"), and/or the like.

The obtained feeds may be stored in fast storage array servers for processing or access by other processing servers. Examples of the fast storage array servers may include server blades such as those manufactured by Dell Computer (e.g., Dell model M820, M620, and/or the like), having multiple RAID fast SSD drives of type SAS with memory cache of type L1, L2, L3, and/or the like. In another embodiment, the feeds may be stored in a public cloud storage service (e.g., Amazon S3, and/or the like) or private cloud (e.g., OpenStack Storage object and/or OpenStack Storage block storage running on servers such as those described above).

In one embodiment, the fast storage servers may employ a distributed file system that provides high-throughput access to stored data. Example file systems suitable for this purpose may include the Hadoop Distributed File System (e.g., "HDFS"), Google BigTable, and/or the like. The file system may be implemented substantially as a key/value store or, in other embodiments, as a structured file system containing directories and files. In some embodiments, a hybrid key/value structured file system may be used in order to utilize the capabilities of both a key/value store and a structured file system. In one embodiment, the fast storage array servers may be connected to one or mesh servers (e.g., 105) for feed processing.

In one embodiment, the mesh servers (e.g., 105) may be server blades such as those described above. In another embodiment, the servers may be virtualized and running on a private virtualization platform such as VMWare ESXi, Xen, OpenStack Compute and/or the like. In still other embodiments, the servers may be virtualized using a publically available cloud service such as Amazon EC2 (e.g., via an Amazon Machine Image/"AMI", and/or the like) or Rackspace (e.g., by providing a machine image such as a VDI or OVA file suitable for creating a virtualized machine).

The mesh server may generate dictionary short code words for every type of input and associate with that short word with the input (e.g., a MD5 hash, etc. may generate a short word for every type of input, where the resulting short code is unique to each input). This short code to actual data input association, when aggregated, may form the basis of a mesh dictionary. An example of mesh dictionary entry substantially in the following form of XML is:

```
<dictionary_entry>
    {id: "1h65323765gtyuf#uy76355",
    type: email,
    category: {cat1: "food", cat2: "dinner"},
    from_addr: "john.doe@gmail.com",
    to_addr: "jane.doe@gmail.com",
    subject: "Korean BBQ this weekend?",
    dictionary_keywords: "Korean, dinner, nyc",
    content_hash: "7m865323476feeaniiji"}
</dictionary_entry>
```

Segmented portions, complete dictionaries, and/or updates thereto, may thus be sent en masse to mesh analytics clone servers; for example, such update may be done at off-network peak hours set to occur at dynamically and/or at set intervals. This allows the analytics servers to perform analytics operations, and it allows those analytics servers to operate on short codes even without the full underlying backend data being available. In so doing, dictionaries may be analyzed using less space than the full underlying raw data would require. Additionally, dictionaries may be distributed between multiple servers. In one embodiment, the dictionaries are replicated across multiple servers and, periodically, synchronized. In one embodiment, any inconstancies in distributed and/or separated dictionaries may be reconciled using demarcation protocol and/or controlled inconsistency reconciliation for replicated data (see D. Barbara H. Garcia-Molina, The case for controlled inconsistency in replicated data," Proc. of the Workshop on Management of Replicated Data, Houston, Tex., November 1990; D. Barbara H. Garcia-Molina, The demarcation protocol a technique for maintaining arithmetic constraints in distributed database systems, CS-TR-320-91, Princeton University, April 1991; the contents of both which are herein expressly incorporated by reference). In one embodiment, dictionaries may defer any analytic operations that require the backend data until when the caching of the dictionary is complete. It should be noted that throughout this disclosure, reference is made to "payment network server" or "pay network server." It should be understood that such server may incorporate mesh servers, and it also contemplates that such mesh servers may include a network of mesh analytics clone servers, clustering node servers, clustering servers, and/or the like.

Features that entities may desire include application services 112 such as alerts 112*a*, offers 112*c*, money transfers 112*n*, fraud detection 112*b*, and/or the like. In some embodiments of the CPDB, such originators may request data to enable application services from a common, secure, centralized information platform including a consolidated, cross-entity profile-graph database 101. For example, the originators may submit complex queries to the CPDB in a structure format, such as the example below. In this example, the query includes a query to determine a location (e.g., of a user), determine the weather associated with the location, perform analyses on the weather data, and provide an exploded graphical view of the results of the analysis:

```
<int
    Model_id ="1"
    environment_type="RT"
    meta_data="./fModels/robotExample.meta"
    tumblar_location="./fModels/robotExample.tumblar.location"
    input_format="JSON"
    pmmls="AUTONOMOUS_AGENTS.PMML"
    Model_type ="AUTONOMOUS_AGENTS"
>
<vault >
<door:LOCATION>
        <lock name="DETERMINE LOCATION"
            inkey="INPUT" inkeyname="lat"
            inkey2="INPUT" inkeyname2="long"
            function="ROUND"
            fnct1-prec="−2"
            function-1="JOIN"
            fnct2-delim=":"
            tumblar='LAT_LONG.key'
            outkey="TEMP" outkeyname="location"
            type="STRING"
        />
        <lock name="DETERMINE WEATHER"
            inkey="TEMP" inkeyname="location"
            mesh='MESHRT.RECENTWEATHER'
            mesh-query='HASH'
            outkey="TEMP" outkeyname="WEATHERDATA"
            type="ARRAY"
        />
        <lock name="EXPLODE DATA"
            inkey="TEMP" inkeyname="WEATHERDATA"
            function="EXPLODE"
            fnct-delim=":"
```

-continued

```
            outkey="MODELDATA" outkeystartindex=1
        />
        <lock name="USER SETTINGS"
            inkey="INPUT" inkeyname="USERID"
            mesh='MESHRT.AUTONOMOUSAGENT.SETTINGS'
            mesh-query='HASH'
            outkey="TEMP" outkeyname="USERSETTINGS"
            type="ARRAY"
        />
        <lock name="EXPLODE USER"
            inkey="TEMP" inkeyname="USERSETTINGS"
            function="EXPLODE"
            fnct-delim=":"
            outkey="USERDATA" outkeystartindex=1
        />
        <lock name="RUN MODEL"
            inkey="MODELDATA"
            inkey1="USERDATA"
            function="TREE"
            fnc-pmml="AUTONOMOUS_AGENTS.PMML"
            outkey="OUTPUT" outkeyname="WEATHER"
            type="NUMERIC"
        />
</door>
</vault>
```

A non-limiting, example listing of data that the CPDB may return based on a query is provided below. In this example, a user may log into a website via a computing device. The computing device may provide a IP address, and a timestamp to the CPDB. In response, the CPDB may identify a profile of the user from its database, and based on the profile, return potential merchants for offers or coupons:

```
--------------------------------------------------
------------------ Use Case 3 -------------------
-- User log into a website
-- Only IP address, GMT and day of week is passed to Mesh
-- Mesh matches profile based on Affinity Group
-- Mesh returns potential Merchants for offers or coupons based on tempory model using
suppression rules
--------------------------------------------------
-- Test case 1 IP:24:227:206 Hour:9 Day:3
-- Test case 2 IP:148:181:75 Hour:4 Day:5
--------------------------------------------------
------- AffinityGroup Lookup ------------------
--------------------------------------------------
Look up test case 1
```

[OrderedDict([('ISACTIVE', 'True'), ('ENTITYKEY', '24:227:206:3:1'), ('XML', None), ('AFFINITYGROUPNAME', '24:227:206:3:1'), ('DESCRIPTION', None), ('TYPEOF', None), ('UUID', '5f8df970b9ff11e09ab9270cf67eca90')]), OrderedDict([('ISACTIVE', 'True'), ('BASEUUID', '4fbea327b9ff11e094f433b5d7c45677'), ('TOKENENTITYKEY', '4fbea327b9ff11e094f433b5d7c45677:TOKEN:349:F'), ('BASETYPE', 'MODEL_002_001_00'), ('STATUS', 'ACTIVE'), ('ISSUEDDATE', None), ('WEIGHT', '349'), ('CATEGORY', 'F'), ('DOUBLELINKED', None), ('UUID', '6b6aab39b9ff11e08d850dc270e3ea06')]), OrderedDict([('ISACTIVE', 'True'), ('BASEUUID', '4fbea328b9ff11e0a5f833b5d7c45677'), ('TOKENENTITYKEY', '4fbea328b9ff11e0a5f833b5d7c45677:TOKEN:761:1'), ('BASETYPE', 'MODEL_003_001_00'), ('STATUS', 'ACTIVE'), ('ISSUEDDATE', None), ('WEIGHT', '761'), ('CATEGORY', '1'), ('DOUBLELINKED', None), ('UUID', '68aaca40b9ff11e0ac799fd4e415d9de')]), OrderedDict([('ISACTIVE', 'True'), ('BASEUUID', '4fbea328b9ff11e0a5f833b5d7c45677'), ('TOKENENTITYKEY', '4fbea328b9ff11e0a5f833b5d7c45677:TOKEN:637:2'), ('BASETYPE', 'MODEL_003_001_00'), ('STATUS', 'ACTIVE'), ('ISSUEDDATE', None), ('WEIGHT', '637'), ('CATEGORY', '2'), ('DOUBLELINKED', None), ('UUID', '6b6d1c38b9ff11e08ce10dc270e3ea06')]), OrderedDict([('ISACTIVE', 'True'), ('BASEUUID', '4fbea328b9ff11e0a5f833b5d7c45677'), ('TOKENENTITYKEY', '4fbea328b9ff11e0a5f833b5d7c45677:TOKEN:444:3'), ('BASETYPE', 'MODEL_003_001_00'), ('STATUS', 'ACTIVE'), ('ISSUEDDATE', None), ('WEIGHT', '444'), ('CATEGORY', '3'), ('DOUBLELINKED', None), ('UUID', '6342aa53b9ff11e0bcdb9fd4e415d9de')]), OrderedDict([('ISACTIVE', 'True'), ('BASEUUID', '4fbea328b9ff11e0a5f833b5d7c45677'), ('TOKENENTITYKEY', '4fbea328b9ff11e0a5f833b5d7c45677:TOKEN:333:4'), ('BASETYPE', 'MODEL_003_001_00'), ('STATUS', 'ACTIVE'), ('ISSUEDDATE', None), -continued

```
('WEIGHT', '333'), ('CATEGORY', '4'), ('DOUBLELINKED', None), ('UUID',
'62bd26a2b9ff11e0bc239fd4e415d9de')]), OrderedDict([('ISACTIVE', 'True'),
('BASEUUID', '4fbea328b9ff11e0a5f833b5d7c45677'), ('TOKENENTITYKEY',
'4fbea328b9ff11e0a5f833b5d7c45677:TOKEN:307:5'), ('BASETYPE',
'MODEL__003__001__00'), ('STATUS', 'ACTIVE'), ('ISSUEDDATE', None),
('WEIGHT', '307'), ('CATEGORY', '5'), ('DOUBLELINKED', None), ('UUID',
'6b6d1c39b9ff11e0986c0dc270e3ea06')]), OrderedDict([('ISACTIVE', 'True'),
('BASEUUID', '4fbea32db9ff11e09f3e33b5d7c45677'), ('TOKENENTITYKEY',
'4fbea32db9ff11e09f3e33b5d7c45677:TOKEN:801:Spend'), ('BASETYPE',
'MODEL__008__001__00'), ('STATUS', 'ACTIVE'), ('ISSUEDDATE', None),
('WEIGHT', '801'), ('CATEGORY', 'Spend'), ('DOUBLELINKED', None),
('UUID', '6b6d1c3ab9ff11e0a4ec0dc270e3ea06')]), OrderedDict([('ISACTIVE',
'True'), ('BASEUUID', '4fbea32eb9ff11e0b55133b5d7c45677'),
('TOKENENTITYKEY',
'4fbea32eb9ff11e0b55133b5d7c45677:TOKEN:1:Volume'), ('BASETYPE',
'MODEL__009__001__00'), ('STATUS', 'ACTIVE'), ('ISSUEDDATE', None),
('WEIGHT', '1'), ('CATEGORY', 'Volume'), ('DOUBLELINKED', None),
('UUID', '62a09df3b9ff11e090d79fd4e415d9de')])]
Found a direct match
148:181:75:1:2
-- Failed to find a direct match
-- Try again with only IP address and hour
[OrderedDict([('ISACTIVE', 'True'), ('ENTITYKEY', '148:181:75:1:1'), ('XML',
None), ('AFFINITYGROUPNAME', '148:181:75:1:1'), ('DESCRIPTION', None),
('TYPEOF', None)])]
-- Found match for case 2
------------------------------------------------------------
------------------ Temporary model rules-------------------
-----------------------------------------------------------
{1: {'LOWER': 10, 'BASETYPE': ['MODEL__002__001__00', 'MODEL__003__001__00'],
'attribute': 'WEIGHT', 'rule': 'NEAR', 'OP': 'PROX', 'type': 'TOKENENTITY',
'HIGHER': 10}, 2: {'type': ['MERCHANT'], 'rule': 'FOLLOW'}, 3: {'rule':
'RESTRICTSUBTYPE', 'BASETYPE': ['MODEL__002__001__00',
'MODEL__003__001__00']}}
------------------------------------------------------------
------------------ Temporary Model Output------------------
------------------- For Use Case 1 --------------------
------------------------------------------------------------
-- Number of Nodes:102
_____LIVRARIASICILIAN
_________GDPCOLTD
___GOODWILLINDUSTRIES
________DISCOUNTDE
_______BARELANCHOE
______BLOOMINGDALES
_____PARCWORLDTENNIS
_____STRIDERITEOUTLET
________PARCCEANOR
________PONTOFRIO
_______FNACPAULISTA
________FINISHLINE
______WALMARTCENTRAL
_____BESNIINTERLARGOS
_____PARCLOJASCOLOMBO
______SHOPTIMEINTER
______BEDBATHBEYOND
________MACYSWEST
__PARCRIACHUELOFILIAL
_____JCPENNEYCORPINC
____PARCLOJASRENNERFL
__PARCPAQUETAESPORTES
_________MARISALJ
___PARCLEADERMAGAZINE
________INTERFLORA
________DECATHLON
_____PERNAMBUCANASFL
________KARSTADTDE
________PARCCEAMCO
__________CHAMPS
_______ACCESSORIZE
____BLOOMINGDALESDVRS
__PARCLIVRARIACULTURA
_______PARCCEALOJA
_______ARQUIBANCADA
__________KITBAG
_____FREDERICKSOFHLWD
_________WALMART
__PARCLOJASINSINUANTE
_____WALMARTCONTAGEM
```

-continued

```
________________FOOTLOCKER
____________PARCSANTALOLLA
____________RICARDOELETRO
____________PARCPONTOFRIO
____________DOTPAYPLPOLSKA
__________________CAMICADO
__________________KARSTADT
______________PARCRAMSONS
______________PARCGREGORY
________________GREMIOFBPA
________________WALMARTSJC
______PRODIRECTSOCCERLTD
______________LAVIEENROSE
______________PARCMARISALJ
____________________ORDERS
________PARCNSNNATALNORTE
__________LOJASINSINUANTE
________________________B
________________CITYCOUNTY
__________WALMARTPACAEMBU
______________________SOHO
____________WALMARTOSASCO
__________FOSSILSTORESIINC
______________MENARDSCLIO
______________PARCPEQUENTE
____________________BEALLS
______________THEHOMEDEPOT
____________________VIAMIA
______PARCLOJASRIACHUELO
__________PARCLOJASMILANO
________________NORDSTROM
______WAILANACOFFEEHOUSE
______________LANCHOEBELLA
____________________PUKET
__________WALMARTSTORESINC
____PARCPERNAMBUCANASFL
______________SMARTSHOPPER
____PARCMAGAZINELUIZASP
__COLUMBIASPORTSWEARCO
____________BARELANCESTADA
________________DONATEEBAY
________PARCRICARDOELETRO
____________PARCDISANTINNI
________________SCHUHCOUK
____________________CEANOR
______________PARCCAMICADO
____________PARCCENTAUROCE
__________PARCMARLUIJOIAS
__________________ALBADAH
__________________MARTINEZ
__________MONEYBOOKERSLTD
____________________MACYS
____________PARCRIOCENTER
____________PARCCASASBAHIA
________PARCSUBMARINOLOJA
______________________INC
____________SUBMARINOLOJA
____________LOJASRENNERFL
__________RIACHUELOFILIAL
__________PARCSONHODOSPES
__________________PINKBIJU
________________PARCCEAMRB
-------------------------------------------------------------
------------------ Temporary model Output -----------------
------------------- For Use Case 2 ---------------------
-------------------------------------------------------------
-- Number of Nodes:3
____________________KITBAG
__COLUMBIASPORTSWEARCO
________________GREMIOFBPA
----------------------------------------------------------------
--------        End of Example Use Case        ---
----------------------------------------------------------------
```

In some embodiments, the CPDB may provide access to information on a need-to-know basis to ensure the security of data of entities on which the CPDB stores information. Thus, in some embodiments, access to information from the centralized platform may be restricted based on the originator as well as application services for which the data is requested. In some embodiments, the CPDB may thus allow a variety of flexible application services to be built on a common database infrastructure, while preserving the integrity, security, and accuracy of entity data. In some implementations, the CPDB may generate, update, maintain, store and/or provide profile information on entities, as well as a social graph that maintains and updates interrelationships between each of the entities stored within the CPDB. For example, the CPDB may store profile information on an issuer bank 102*a* (see profile 103*a*), a acquirer bank 102*b* (see profile 103*b*), a consumer 102*c* (see profile 103*c*), a user 102*d* (see profile 103*d*), a merchant 102*e* (see profile 103*e*), a second merchant 102*f* (see profile 103*f*). The CPDB may also store relationships between such entities. For example, the CPDB may store information on a relationship of the issuer bank 102*a* to the consumer 102*c* shopping at merchant 102*e*, who in turn may be related to user 102*d*, who might bank at the back 102*b* that serves as acquirer for merchant 102*f*.

FIGS. 2A-F show block diagrams illustrating example aspects of data models within a centralized personal information platform in some embodiments of the CPDB. In various embodiments, the CPDB may store a variety of attributes of entities according to various data models. A few non-limiting example data models are provided below. In some embodiments, the CPDB may store user profile attributes. For example, a user profile model may store user identifying information 201, user aliases 202, email addresses 203, phone numbers 204, addresses 205, email address types 206, address types 207, user alias types 208, notification statuses 209, ISO country 210, phone number types 211, contract information with the CPDB 212, user authorization status 213, user profile status 214, security answer 215, security questions 216, language 217, time zone 218, and/or the like, each of the above field types including one or more fields and field values. As another example, a user financial attributes model may store user identifying information 220, user financial account information 221, account contract information 222, user financial account role 223, financial account type 224, financial account identifying information 225, contract information 226, financial account validation 227, financial account validation type 228, and/or the like. As another example, a user payment card attributes data model may include field types such s, but not limited to: user identifying information 230, user financial account information 231, user financial account role 232, account consumer applications 233, user consumer application 234, financial account type 235, financial account validation type 236, financial account information 237, consumer application information 238, consumer application provider information 239, and/or the like. As another example, a user services attributes data model may include field types such as, but not limited to: user identifying information 240, user alias 241, consumer application user alias status 242, user alias status 243, status change reason code 244, user contract 245, contract information 246, user service attribute value 247, consumer application attributes 248, account service attribute value, account contract 250, user profile status 261, contract business role 252, contract business 253, client information 254, contract role 255, consumer application 256, user activity audit 257, login results 258, and/or the like. As another example, a user services usage attributes data model may include field types such as, but not limited to: user identifying information 260, user alias 261, consumer application user alias status 262, status change reason code 263, user alias status 264, user consumer application 265, user login audit 266, login result 267, account service attribute value 268, account consumer application 269, consumer application 270, consumer application provider 271, login result 272, and/or the like. As another example, a user graph attributes data model may include field types such as, but not limited to: user identifying information 280, user contact 281, consumer application user alias status 282, relationship 283, and/or the like. In some embodiments, the CPDB may store each object (e.g., user, merchant, issuer, acquirer, IP address, household, etc.) as a node in graph database, and store data with respect to each node in a format such as the example format provided below:

```
<Nodes Data>
ID,Nodes,Label
2fdc7e3fbd1c11e0be645528b00e8d0e,2fdc7e3fbd1c11e0be645528b00e8d0e,A
FFINITYGROUPNAME:49:95:0:3:1
32b1d53ebd1c11e094172557fb829fdf,32b1d53ebd1c11e094172557fb829fdf,TO
KENENTITYKEY:2b8494f0bd1c11e09c856d888c43f7c2:TOKEN:0:F
2e6381e4bd1c11e0b9ffc929a54bb0fd,2e6381e4bd1c11e0b9ffc929a54bb0fd,ME
RCHANTNAME:_______________MERCHANT__ABC
2fdc7e3dbd1c11e0a22d5528b00e8d0e,2fdc7e3dbd1c11e0a22d5528b00e8d0e,
AFFINITYGROUPNAME:49:95:0:1:1
2e6381e7bd1c11e091b7c929a54bb0fd,2e6381e7bd1c11e091b7c929a54bb0fd,
MERCHANTNAME:_______________MERCHANT__XYZ
2cf8cbabbd1c11e0894a5de4f9281135,2cf8cbabbd1c11e0894a5de4f9281135,U
SERNAME:000060FF6557F103
2e6381debd1c11e0b336c929a54bb0fd,2e6381debd1c11e0b336c929a54bb0fd,
MERCHANTNAME:_______________MERCHANT__123
2e6381e0bd1c11e0b4e8c929a54bb0fd,2e6381e0bd1c11e0b4e8c929a54bb0fd,
MERCHANTNAME:_______________MERCHANT__FGH
2cf681c1bd1c11e0b8815de4f9281135,2cf681c1bd1c11e0b8815de4f9281135,U
SERNAME:000030C57080FFE8
2b8494f1bd1c11e0acbd6d888c43f7c2,2b8494f1bd1c11e0acbd6d888c43f7c2,M
ODELNAME:MODEL__003__001__00
32b44638bd1c11e0b01c2557fb829fdf,32b44638bd1c11e0b01c2557fb829fdf,TO
KENENTITYKEY:2b8494f1bd1c11e0acbd6d888c43f7c2:TOKEN:1000:1
2fdc7e40bd1c11e094675528b00e8d0e,2fdc7e40bd1c11e094675528b00e8d0e,
AFFINITYGROUPNAME:49:95:0:4:1
2b8494f0bd1c11e09c856d888c43f7c2,2b8494f0bd1c11e09c856d888c43f7c2,M
ODELNAME:MODEL__002__001__00
32b44639bd1c11e0b15b2557fb829fdf,32b44639bd1c11e0b15b2557fb829fdf,TO
KENENTITYKEY:2b8494f1bd1c11e0acbd6d888c43f7c2:TOKEN:0:2
32ce84febd1c11e0b0112557fb829fdf,32ce84febd1c11e0b0112557fb829fdf,TOK
ENENTITYKEY:2b8494f1bd1c11e0acbd6d888c43f7c2:TOKEN:1000:4
```

-continued

2e6381e3bd1c11e095b1c929a54bb0fd,2e6381e3bd1c11e095b1c929a54bb0fd,
MERCHANTNAME:________________MERCHANT__789
34582a87bd1c11e080820167449bc60f,34582a87bd1c11e080820167449bc60f,T
OKENENTITYKEY:2b8494f1bd1c11e0acbd6d888c43f7c2:TOKEN:778:5
2e6381e5bd1c11e0b62cc929a54bb0fd,2e6381e5bd1c11e0b62cc929a54bb0fd,
MERCHANTNAME:________________MERCHANT__456
2fdc7e3ebd1c11e088b55528b00e8d0e,2fdc7e3ebd1c11e088b55528b00e8d0e,
AFFINITYGROUPNAME:49:95:0:2:1
32c4e80dbd1c11e09e442557fb829fdf,32c4e80dbd1c11e09e442557fb829fdf,TO
KENENTITYKEY:2b8494f1bd1c11e0acbd6d888c43f7c2:TOKEN:774:5
2e6381e1bd1c11e0bf28c929a54bb0fd,2e6381e1bd1c11e0bf28c929a54bb0fd,M
ERCHANTNAME:________________MERCHANT__WER
2cf681b8bd1c11e08be85de4f9281135,2cf681b8bd1c11e08be85de4f9281135,U
SERNAME:00002552FC930FF8
2cf8cba8bd1c11e09fbc5de4f9281135,2cf8cba8bd1c11e09fbc5de4f9281135,US
ERNAME:0000570FF1B46A24
32b4463abd1c11e0bdaa2557fb829fdf,32b4463abd1c11e0bdaa2557fb829fdf,TO
KENENTITYKEY:2b8494f1bd1c11e0acbd6d888c43f7c2:TOKEN:0:3
2cf8cbaebd1c11e0b6515de4f9281135,2cf8cbaebd1c11e0b6515de4f9281135,U
SERNAME:000064A20FF962D4
2e6381e6bd1c11e08087c929a54bb0fd,2e6381e6bd1c11e08087c929a54bb0fd,
MERCHANTNAME:________________MERCHANT__496
2e6381e2bd1c11e0941dc929a54bb0fd,2e6381e2bd1c11e0941dc929a54bb0fd,
MERCHANTNAME:________________MERCHANT__SDF
<Edge Data>Source,Target,Type,label, Weight
32ce84febd1c11e0b0112557fb829fdf,2e6381e6bd1c11e08087c929a54bb0fd,M
ODEL__003__001__00,2b8494f1bd1c11e0acbd6d888c43f7c2:TOKEN:1000:4,1000
2fdc7e3ebd1c11e088b55528b00e8d0e,32ce84febd1c11e0b0112557fb829fdf,M
ODEL__003__001__00,2b8494f1bd1c11e0acbd6d888c43f7c2:TOKEN:1000:4,1000
2e6381e2bd1c11e0941dc929a54bb0fd,34582a87bd1c11e080820167449bc60f,
MODEL__003__001__00,2b8494f1bd1c11e0acbd6d888c43f7c2:TOKEN:778:5,778
2b8494f1bd1c11e0acbd6d888c43f7c2,34582a87bd1c11e080820167449bc60f,M
ODEL__003__001__00,2b8494f1bd1c11e0acbd6d888c43f7c2:TOKEN:778:5,778
2e6381e1bd1c11e0bf28c929a54bb0fd,32b44639bd1c11e0b15b2557fb829fdf,M
ODEL__003__001__00,2b8494f1bd1c11e0acbd6d888c43f7c2:TOKEN:0:2,0
2e6381e0bd1c11e0b4e8c929a54bb0fd,32ce84febd1c11e0b0112557fb829fdf,M
ODEL__003__001__00,2b8494f1bd1c11e0acbd6d888c43f7c2:TOKEN:1000:4,1000
32b44639bd1c11e0b15b2557fb829fdf,2e6381e6bd1c11e08087c929a54bb0fd,M
ODEL__003__001__00,2b8494f1bd1c11e0acbd6d888c43f7c2:TOKEN:0:2,0
2e6381e1bd1c11e0bf28c929a54bb0fd,32ce84febd1c11e0b0112557fb829fdf,MO
DEL__003__001__00,2b8494f1bd1c11e0acbd6d888c43f7c2:TOKEN:1000:4,1000
2e6381debd1c11e0b336c929a54bb0fd,32ce84febd1c11e0b0112557fb829fdf,M
ODEL__003__001__00,2b8494f1bd1c11e0acbd6d888c43f7c2:TOKEN:1000:4,1000
2e6381e3bd1c11e095b1c929a54bb0fd,34582a87bd1c11e080820167449bc60f,
MODEL__003__001__00,2b8494f1bd1c11e0acbd6d888c43f7c2:TOKEN:778:5,778
2fdc7e40bd1c11e094675528b00e8d0e,32b44639bd1c11e0b15b2557fb829fdf,M
ODEL__003__001__00,2b8494f1bd1c11e0acbd6d888c43f7c2:TOKEN:0:2,0
2b8494f1bd1c11e0acbd6d888c43f7c2,32b4463abd1c11e0bdaa2557fb829fdf,M
ODEL__003__001__00,2b8494f1bd1c11e0acbd6d888c43f7c2:TOKEN:0:3,0
2e6381e3bd1c11e095b1c929a54bb0fd,32b4463abd1c11e0bdaa2557fb829fdf,M
ODEL__003__001__00,2b8494f1bd1c11e0acbd6d888c43f7c2:TOKEN:0:3,0
2e6381e3bd1c11e095b1c929a54bb0fd,32b1d53ebd1c11e094172557fb829fdf,M
ODEL__002__001__00,2b8494f0bd1c11e09c856d888c43f7c2:TOKEN:0:F,0
2e6381e5bd1c11e0b62cc929a54bb0fd,34582a87bd1c11e080820167449bc60f,
MODEL__003__001__00,2b8494f1bd1c11e0acbd6d888c43f7c2:TOKEN:778:5,778
2cf8cbabbd1c11e0894a5de4f9281135,32b44638bd1c11e0b01c2557fb829fdf,M
ODEL__003__001__00,2b8494f1bd1c11e0acbd6d888c43f7c2:TOKEN:1000:1,1000
2cf681b8bd1c11e08be85de4f9281135,32b1d53ebd1c11e094172557fb829fdf,M
ODEL__002__001__00,2b8494f0bd1c11e09c856d888c43f7c2:TOKEN:0:F,0
32b4463abd1c11e0bdaa2557fb829fdf,2e6381e6bd1c11e08087c929a54bb0fd,M
ODEL__003__001__00,2b8494f1bd1c11e0acbd6d888c43f7c2:TOKEN:0:3,0
2e6381debd1c11e0b336c929a54bb0fd,32b44639bd1c11e0b15b2557fb829fdf,M
ODEL__003__001__00,2b8494f1bd1c11e0acbd6d888c43f7c2:TOKEN:0:2,0
2e6381e1bd1c11e0bf28c929a54bb0fd,32b44638bd1c11e0b01c2557fb829fdf,M
ODEL__003__001__00,2b8494f1bd1c11e0acbd6d888c43f7c2:TOKEN:1000:1,1000
2e6381e5bd1c11e0b62cc929a54bb0fd,32ce84febd1c11e0b0112557fb829fdf,M
ODEL__003__001__00,2b8494f1bd1c11e0acbd6d888c43f7c2:TOKEN:1000:4,1000
2e6381e1bd1c11e0bf28c929a54bb0fd,32b4463abd1c11e0bdaa2557fb829fdf,M
ODEL__003__001__00,2b8494f1bd1c11e0acbd6d888c43f7c2:TOKEN:0:3,0
2e6381e2bd1c11e0941dc929a54bb0fd,32b44639bd1c11e0b15b2557fb829fdf,M
ODEL__003__001__00,2b8494f1bd1c11e0acbd6d888c43f7c2:TOKEN:0:2,0
2b8494f1bd1c11e0acbd6d888c43f7c2,32c4e80dbd1c11e09e442557fb829fdf,M
ODEL__003__001__00,2b8494f1bd1c11e0acbd6d888c43f7c2:TOKEN:774:5,774
2e6381e2bd1c11e0941dc929a54bb0fd,32b1d53ebd1c11e094172557fb829fdf,M
ODEL__002__001__00,2b8494f0bd1c11e09c856d888c43f7c2:TOKEN:0:F,0
2e6381e4bd1c11e0b9ffc929a54bb0fd,32b4463abd1c11e0bdaa2557fb829fdf,MO
DEL__003__001__00,2b8494f1bd1c11e0acbd6d888c43f7c2:TOKEN:0:3,0
2fdc7e3fbd1c11e0be645528b00e8d0e,32b4463abd1c11e0bdaa2557fb829fdf,M
ODEL__003__001__00,2b8494f1bd1c11e0acbd6d888c43f7c2:TOKEN:0:3,0

-continued

2e6381e1bd1c11e0bf28c929a54bb0fd,32b1d53ebd1c11e094172557fb829fdf,M
ODEL__002__001__00,2b8494f0bd1c11e09c856d888c43f7c2:TOKEN:0:F,0
2fdc7e40bd1c11e094675528b00e8d0e,32ce84febd1c11e0b0112557fb829fdf,M
ODEL__003__001__00,2b8494f1bd1c11e0acbd6d888c43f7c2:TOKEN:1000:4,1000
2cf8cba8bd1c11e09fbc5de4f9281135,32c4e80dbd1c11e09e442557fb829fdf,MO
DEL__003__001__00,2b8494f1bd1c11e0acbd6d888c43f7c2:TOKEN:774:5,774
2e6381e2bd1c11e0941dc929a54bb0fd,32b44638bd1c11e0b01c2557fb829fdf,M
ODEL__003__001__00,2b8494f1bd1c11e0acbd6d888c43f7c2:TOKEN:1000:1,1000
2e6381e4bd1c11e0b9ffc929a54bb0fd,32b1d53ebd1c11e094172557fb829fdf,MO
DEL__002__001__00,2b8494f0bd1c11e09c856d888c43f7c2:TOKEN:0:F,0
2e6381e5bd1c11e0b62cc929a54bb0fd,32b44639bd1c11e0b15b2557fb829fdf,M
ODEL__003__001__00,2b8494f1bd1c11e0acbd6d888c43f7c2:TOKEN:0:2,0
32b1d53ebd1c11e094172557fb829fdf,2e6381e6bd1c11e08087c929a54bb0fd,M
ODEL__002__001__00,2b8494f0bd1c11e09c856d888c43f7c2:TOKEN:0:F,0
2b8494f1bd1c11e0acbd6d888c43f7c2,32b44639bd1c11e0b15b2557fb829fdf,M
ODEL__003__001__00,2b8494f1bd1c11e0acbd6d888c43f7c2:TOKEN:0:2,0
2e6381e3bd1c11e095b1c929a54bb0fd,32b44638bd1c11e0b01c2557fb829fdf,M
ODEL__003__001__00,2b8494f1bd1c11e0acbd6d888c43f7c2:TOKEN:1000:1,1000
2fdc7e3dbd1c11e0a22d5528b00e8d0e,32ce84febd1c11e0b0112557fb829fdf,M
ODEL__003__001__00,2b8494f1bd1c11e0acbd6d888c43f7c2:TOKEN:1000:4,1000
2cf681c1bd1c11e0b8815de4f9281135,32b44638bd1c11e0b01c2557fb829fdf,M
ODEL__003__001__00,2b8494f1bd1c11e0acbd6d888c43f7c2:TOKEN:1000:1,1000
2cf681c1bd1c11e0b8815de4f9281135,32b1d53ebd1c11e094172557fb829fdf,M
ODEL__002__001__00,2b8494f0bd1c11e09c856d888c43f7c2:TOKEN:0:F,0
2e6381e3bd1c11e095b1c929a54bb0fd,32b44639bd1c11e0b15b2557fb829fdf,M
ODEL__003__001__00,2b8494f1bd1c11e0acbd6d888c43f7c2:TOKEN:0:2,0
2fdc7e3fbd1c11e0be645528b00e8d0e,32b1d53ebd1c11e094172557fb829fdf,M
ODEL__002__001__00,2b8494f0bd1c11e09c856d888c43f7c2:TOKEN:0:F,0
32b44638bd1c11e0b01c2557fb829fdf,2e6381e6bd1c11e08087c929a54bb0fd,M
ODEL__003__001__00,2b8494f1bd1c11e0acbd6d888c43f7c2:TOKEN:1000:1,1000
2cf8cbaebd1c11e0b6515de4f9281135,32ce84febd1c11e0b0112557fb829fdf,MO
DEL__003__001__00,2b8494f1bd1c11e0acbd6d888c43f7c2:TOKEN:1000:4,1000
2e6381e6bd1c11e08087c929a54bb0fd,32b1d53ebd1c11e094172557fb829fdf,M
ODEL__002__001__00,2b8494f0bd1c11e09c856d888c43f7c2:TOKEN:0:F,0
2e6381e7bd1c11e091b7c929a54bb0fd,34582a87bd1c11e080820167449bc60f,
MODEL__003__001__00,2b8494f1bd1c11e0acbd6d888c43f7c2:TOKEN:778:5,778
2e6381e1bd1c11e0bf28c929a54bb0fd,34582a87bd1c11e080820167449bc60f,M
ODEL__003__001__00,2b8494f1bd1c11e0acbd6d888c43f7c2:TOKEN:778:5,778
2e6381e5bd1c11e0b62cc929a54bb0fd,32b1d53ebd1c11e094172557fb829fdf,M
ODEL__002__001__00,2b8494f0bd1c11e09c856d888c43f7c2:TOKEN:0:F,0
2b8494f0bd1c11e09c856d888c43f7c2,32b1d53ebd1c11e094172557fb829fdf,M
ODEL__002__001__00,2b8494f0bd1c11e09c856d888c43f7c2:TOKEN:0:F,0
2b8494f1bd1c11e0acbd6d888c43f7c2,32b44638bd1c11e0b01c2557fb829fdf,M
ODEL__003__001__00,2b8494f1bd1c11e0acbd6d888c43f7c2:TOKEN:1000:1,1000
2e6381e6bd1c11e08087c929a54bb0fd,32b4463abd1c11e0bdaa2557fb829fdf,M
ODEL__003__001__00,2b8494f1bd1c11e0acbd6d888c43f7c2:TOKEN:0:3,0
2b8494f1bd1c11e0acbd6d888c43f7c2,32ce84febd1c11e0b0112557fb829fdf,MO
DEL__003__001__00,2b8494f1bd1c11e0acbd6d888c43f7c2:TOKEN:1000:4,1000
2cf681c1bd1c11e0b8815de4f9281135,32b44639bd1c11e0b15b2557fb829fdf,M
ODEL__003__001__00,2b8494f1bd1c11e0acbd6d888c43f7c2:TOKEN:0:2,0
2cf681c1bd1c11e0b8815de4f9281135,32b4463abd1c11e0bdaa2557fb829fdf,M
ODEL__003__001__00,2b8494f1bd1c11e0acbd6d888c43f7c2:TOKEN:0:3,0
2e6381e2bd1c11e0941dc929a54bb0fd,32b4463abd1c11e0bdaa2557fb829fdf,M
ODEL__003__001__00,2b8494f1bd1c11e0acbd6d888c43f7c2:TOKEN:0:3,0
2e6381e3bd1c11e095b1c929a54bb0fd,32ce84febd1c11e0b0112557fb829fdf,M
ODEL__003__001__00,2b8494f1bd1c11e0acbd6d888c43f7c2:TOKEN:1000:4,1000
2e6381e6bd1c11e08087c929a54bb0fd,32ce84febd1c11e0b0112557fb829fdf,M
ODEL__003__001__00,2b8494f1bd1c11e0acbd6d888c43f7c2:TOKEN:1000:4,1000
2e6381e6bd1c11e08087c929a54bb0fd,34582a87bd1c11e080820167449bc60f,
MODEL__003__001__00,2b8494f1bd1c11e0acbd6d888c43f7c2:TOKEN:778:5,778
2e6381e6bd1c11e08087c929a54bb0fd,32b44638bd1c11e0b01c2557fb829fdf,M
ODEL__003__001__00,2b8494f1bd1c11e0acbd6d888c43f7c2:TOKEN:1000:1,1000
2fdc7e3ebd1c11e088b55528b00e8d0e,32b44639bd1c11e0b15b2557fb829fdf,M
ODEL__003__001__00,2b8494f1bd1c11e0acbd6d888c43f7c2:TOKEN:0:2,0
2e6381e5bd1c11e0b62cc929a54bb0fd,32b4463abd1c11e0bdaa2557fb829fdf,M
ODEL__003__001__00,2b8494f1bd1c11e0acbd6d888c43f7c2:TOKEN:0:3,0
2e6381e4bd1c11e0b9ffc929a54bb0fd,34582a87bd1c11e080820167449bc60f,M
ODEL__003__001__00,2b8494f1bd1c11e0acbd6d888c43f7c2:TOKEN:778:5,778
2e6381e4bd1c11e0b9ffc929a54bb0fd,32b44638bd1c11e0b01c2557fb829fdf,MO
DEL__003__001__00,2b8494f1bd1c11e0acbd6d888c43f7c2:TOKEN:1000:1,1000
34582a87bd1c11e080820167449bc60f,2e6381e6bd1c11e08087c929a54bb0fd,
MODEL__003__001__00,2b8494f1bd1c11e0acbd6d888c43f7c2:TOKEN:778:5,778
2e6381e6bd1c11e08087c929a54bb0fd,32b44639bd1c11e0b15b2557fb829fdf,M
ODEL__003__001__00,2b8494f1bd1c11e0acbd6d888c43f7c2:TOKEN:0:2,0
2e6381e5bd1c11e0b62cc929a54bb0fd,32b44638bd1c11e0b01c2557fb829fdf,M
ODEL__003__001__00,2b8494f1bd1c11e0acbd6d888c43f7c2:TOKEN:1000:1,1000
2fdc7e3fbd1c11e0be645528b00e8d0e,32b44638bd1c11e0b01c2557fb829fdf,M
ODEL__003__001__00,2b8494f1bd1c11e0acbd6d888c43f7c2:TOKEN:1000:1,1000
2cf681b8bd1c11e08be85de4f9281135,32b44639bd1c11e0b15b2557fb829fdf,M -continued ODEL__003__001__00,2b8494f1bd1c11e0acbd6d888c43f7c2:TOKEN:0:2,0
2e6381e4bd1c11e0b9ffc929a54bb0fd,32b44639bd1c11e0b15b2557fb829fdf,MO
DEL__003__001__00,2b8494f1bd1c11e0acbd6d888c43f7c2:TOKEN:0:2,0
2cf681b8bd1c11e08be85de4f9281135,32b4463abd1c11e0bdaa2557fb829fdf,M
ODEL__003__001__00,2b8494f1bd1c11e0acbd6d888c43f7c2:TOKEN:0:3,0
2e6381e4bd1c11e0b9ffc929a54bb0fd,32ce84febd1c11e0b0112557fb829fdf,MO
DEL__003__001__00,2b8494f1bd1c11e0acbd6d888c43f7c2:TOKEN:1000:4,1000
2e6381e2bd1c11e0941dc929a54bb0fd,32ce84febd1c11e0b0112557fb829fdf,M
ODEL__003__001__00,2b8494f1bd1c11e0acbd6d888c43f7c2:TOKEN:1000:4,1000
2fdc7e3dbd1c11e0a22d5528b00e8d0e,32b44639bd1c11e0b15b2557fb829fdf,M
ODEL__003__001__00,2b8494f1bd1c11e0acbd6d888c43f7c2:TOKEN:0:2,0
2cf681b8bd1c11e08be85de4f9281135,32b44638bd1c11e0b01c2557fb829fdf,M
ODEL__003__001__00,2b8494f1bd1c11e0acbd6d888c43f7c2:TOKEN:1000:1,1000

In alternate examples, the CPDB may store data in a JavaScript Object Notation ("JSON") format. The stored information may include data regarding the object, such as, but not limited to: commands, attributes, group information, payment information, account information, etc., such as in the example below:

{'MERCHANT': {'TYPEOFTYPES': ['MERCHANTS', 'SYNTHETICNETWORKS'],
'FUNCTIONS': {'ENTITYCREATION': 'putNetwork'}
, 'UNIQUEATTIBUTES': ['MERCHANTNAME'],
'TOKENENTITIESRELATIONSHIPS': [ ], 'ATTRIBUTES': {'MERCHANT': (2,
'STRING', 0, 'VALUE'), 'MERCH_ZIP_CD': (7, 'STRING', 0, 'VALUE'),
'MERCH_NAME': (8, 'STRING', 0, 'VALUE'), 'MERCHANTNAME': (3,
'STRING', 0, 'VALUE'), 'ACQ_CTRY_NUM': (4, 'STRING', 0, 'VALUE'),
'ACQ_PCR': (6, 'STRING', 0, 'VALUE'), 'ACQ_REGION_NUM': (5, 'STRING',
0, 'VALUE'), 'ISACTIVE': (0, 'BOOL', 1, 'VALUE'), 'ENTITYKEY': (1,
'STRING', 0, 'VALUE')}
}
, 'AFFINITYGROUP': {'TYPEOFTYPES': ['AFFINITYGROUPS'], 'FUNCTIONS':
{'ENTITYCREATION': 'putNetwork'}
, 'UNIQUEATTIBUTES': ['AFFINITYGROUPNAME'],
'TOKENENTITIESRELATIONSHIPS': [ ], 'ATTRIBUTES': {'XML': (2,
'STRING', 0, 'VALUE'), 'DESCRIPTION': (4, 'STRING', 0, 'VALUE'),
'ENTITYKEY': (1, 'STRING', 0, 'VALUE'), 'TYPEOF': (5, 'STRING', 0,
'VALUE'), 'AFFINITYGROUPNAME': (3, 'STRING', 0, 'VALUE'), 'ISACTIVE':
(0, 'BOOL', 1, 'VALUE')}
}
, 'CASCADINGPAYMENT': {'TYPEOFTYPES': ['CASCADINGPAYMENT'],
'FUNCTIONS': {'ENTITYCREATION': 'putNetwork'}
, 'UNIQUEATTIBUTES': ['CASCADINGPAYMENTNAME'],
'TOKENENTITIESRELATIONSHIPS': ['GROUP'], 'ATTRIBUTES': {'STATUS':
(2, 'STRING', 0, 'VALUE'), 'EXPDT': (6, 'DATETIME', 0, 'VALUE'), 'GROUP':
(3, 'STRING', 0, 'VALUE'), 'RESTRICTIONS': (7, 'DICT', 0, 'VALUE'),
'CASCADINGPAYMENTNAME': (4, 'STRING', 0, 'VALUE'), 'STARTDT': (5,
'DATETIME', 0, 'VALUE'), 'ISACTIVE': (0, 'BOOL', 1, 'VALUE'),
'ENTITYKEY': (1, 'STRING', 0, 'VALUE')}
}
, 'GROUP': {'TYPEOFTYPES': [ ], 'FUNCTIONS': {'ENTITYCREATION':
'putNetwork'}
, 'UNIQUEATTIBUTES': ['GROUPNAME'], 'TOKENENTITIESRELATIONSHIPS':
{ }
, 'ATTRIBUTES': {'GROUPNAME': (2, 'STRING', 0, 'VALUE'), 'DESCRIPTION':
(2, 'STRING', 0, 'VALUE'), 'ISACTIVE': (0, 'BOOL', 1, 'VALUE'),
'ENTITYKEY': (1, 'STRING', 0, 'VALUE')}
}
, 'USERS': {'TYPEOFTYPES': [ ], 'FUNCTIONS': {'ENTITYCREATION':
'putNetwork'}
, 'UNIQUEATTIBUTES': ['USERSID'], 'TOKENENTITIESRELATIONSHIPS': { }
, 'ATTRIBUTES': {'USERSID': (2, 'STRING', 0, 'VALUE'), 'ISACTIVE': (0,
'BOOL', 1, 'VALUE'), 'ENTITYKEY': (1, 'STRING', 0, 'VALUE')}
}
, 'TWITTERUSER': {'TYPEOFTYPES': ['TOKENENTITY'], 'FUNCTIONS':
{'ENTITYCREATION': 'putWGTNetwork'}
, 'UNIQUEATTIBUTES': ['USERNAME'], 'TOKENENTITIESRELATIONSHIPS':
['USER'], 'ATTRIBUTES': {'USERNAME': (2, 'STRING', 0, 'VALUE'), 'CITY':
(5, 'STRING', 0, 'VALUE'), 'ENTITYKEY': (1, 'STRING', 0, 'VALUE'),
'USERLINK': (6, 'STRING', 0, 'VALUE'), 'FULLNAME': (4, 'STRING', 0,
'VALUE'), 'USERTAG': (3, 'STRING', 0, 'VALUE'), 'ISACTIVE': (0, 'BOOL', 1,
'VALUE')}
}
, 'COUPON': {'TYPEOFTYPES': ['COUPON'], 'FUNCTIONS':
{'ENTITYCREATION': 'putNetwork'}
, 'UNIQUEATTIBUTES': ['COUPONNAME'],
'TOKENENTITIESRELATIONSHIPS': ['MERCHANT'], 'ATTRIBUTES':
{'STATUS': (2, 'STRING', 0, 'VALUE'), 'MERCHANT': (3, 'STRING', 0, -continued 'VALUE'), 'TITLE': (5, 'STRING', 0, 'VALUE'), 'NOTES': (7, 'STRING', 0, 'VALUE'), 'UPDATEDBY': (11, 'STRING', 0, 'VALUE'), 'ENTITYKEY': (1, 'STRING', 0, 'VALUE'), 'DECRIPTION': (6, 'STRING', 0, 'VALUE'), 'CREATEDBY': (10, 'STRING', 0, 'VALUE'), 'LASTUPDATEDT': (9, 'DATETIME', 0, 'VALUE'), 'EXPDT': (13, 'DATETIME', 0, 'VALUE'), 'RESTRICTIONS': (14, 'DICT', 0, 'VALUE'), 'COUPONNAME': (4, 'STRING', 0, 'VALUE'), 'CREATIONDT': (8, 'DATETIME', 0, 'VALUE'), 'STARTDT': (12, 'DATETIME', 0, 'VALUE'), 'ISACTIVE': (0, 'BOOL', 1, 'VALUE')}
}
, 'MEMBERSHIP': {'TYPEOFTYPES': ['MEMBERSHIPS'], 'FUNCTIONS': {'ENTITYCREATION': 'putNetwork'}
, 'UNIQUEATTIBUTES': ['MEMBERSHIPNAME'], 'TOKENENTITIESRELATIONSHIPS': ['MERCHANT'], 'ATTRIBUTES': {'STATUS': (2, 'STRING', 0, 'VALUE'), 'MERCHANT': (3, 'STRING', 0, 'VALUE'), 'RESTRICTIONS': (7, 'DICT', 0, 'VALUE'), 'MEMBERSHIPNAME': (4, 'STRING', 0, 'VALUE'), 'STARTDT': (5, 'DATETIME', 0, 'VALUE'), 'EXPDT': (6, 'DATETIME', 0, 'VALUE'), 'ISACTIVE': (0, 'BOOL', 1, 'VALUE'), 'ENTITYKEY': (1, 'STRING', 0, 'VALUE')}
}
, 'USERSECURITY': {'TYPEOFTYPES': ['SECURITY'], 'FUNCTIONS': {'ENTITYCREATION': 'putNetwork'}
, 'UNIQUEATTIBUTES': ['USERSECURITYNAME'], 'TOKENENTITIESRELATIONSHIPS': ['USER'], 'ATTRIBUTES': {'STATUS': (2, 'STRING', 0, 'VALUE'), 'EXPDT': (6, 'DATETIME', 0, 'VALUE'), 'USERSECURITYNAME': (4, 'STRING', 0, 'VALUE'), 'USER': (3, 'STRING', 0, 'VALUE'), 'RESTRICTIONS': (7, 'DICT', 0, 'VALUE'), 'STARTDT': (5, 'DATETIME', 0, 'VALUE'), 'ISACTIVE': (0, 'BOOL', 1, 'VALUE'), 'ENTITYKEY': (1, 'STRING', 0, 'VALUE')}
}
, 'MCC': {'TYPEOFTYPES': ['MCC'], 'FUNCTIONS': {'ENTITYCREATION': 'putWGTNetwork'}
, 'UNIQUEATTIBUTES': ['MCCNAME', 'MCC'], 'TOKENENTITIESRELATIONSHIPS': ['MCCSEG'], 'ATTRIBUTES': {'MCCSEG': (4, 'STRING', 0, 'VALUE'), 'MCC': (2, 'STRING', 0, 'VALUE'), 'MCCNAME': (3, 'STRING', 0, 'VALUE'), 'ISACTIVE': (0, 'BOOL', 1, 'VALUE'), 'ENTITYKEY': (1, 'STRING', 0, 'VALUE')}
}
, 'ZIPCODE': {'TYPEOFTYPES': ['LOCATION'], 'FUNCTIONS': {'ENTITYCREATION': 'putNetwork'}
, 'UNIQUEATTIBUTES': ['ZIPCODE'], 'TOKENENTITIESRELATIONSHIPS': [ ], 'ATTRIBUTES': {'STATE': (4, 'STRING', 0, 'VALUE'), 'POPULATION': (3, 'STRING', 0, 'VALUE'), 'ZIPCODE': (2, 'STRING', 0, 'VALUE'), 'ISACTIVE': (0, 'BOOL', 1, 'VALUE'), 'ENTITYKEY': (1, 'STRING', 0, 'VALUE')}
}
, 'PAYMENTCARD': {'TYPEOFTYPES': ['PAYMENTCARDS'], 'FUNCTIONS': {'ENTITYCREATION': 'putNetwork'}
, 'UNIQUEATTIBUTES': ['CARDNUMBER'], 'TOKENENTITIESRELATIONSHIPS': ['USER'], 'ATTRIBUTES': {'EXPDATE': (5, 'DATETIME', 0, 'VALUE'), 'ENTITYKEY': (1, 'STRING', 0, 'VALUE'), 'CARDTYPE': (4, 'STRING', 0, 'VALUE'), 'CARDNUMBER': (2, 'STRING', 0, 'VALUE'), 'USER': (3, 'STRING', 0, 'VALUE'), 'ISACTIVE': (0, 'BOOL', 1, 'VALUE')}
}
, 'GENERICTOKEN': {'TYPEOFTYPES': ['COUPON'], 'FUNCTIONS': {'ENTITYCREATION': 'putNetwork'}
, 'UNIQUEATTIBUTES': ['GENERICTOKENNAME'], 'TOKENENTITIESRELATIONSHIPS': ['MERCHANT'], 'ATTRIBUTES': {'STATUS': (2, 'STRING', 0, 'VALUE'), 'MERCHANT': (3, 'STRING', 0, 'VALUE'), 'TITLE': (5, 'STRING', 0, 'VALUE'), 'NOTES': (7, 'STRING', 0, 'VALUE'), 'UPDATEDBY': (11, 'STRING', 0, 'VALUE'), 'ENTITYKEY': (1, "STRING', 0, 'VALUE'), 'DECRIPTION': (6, 'STRING', 0, 'VALUE'), 'CREATEDBY': (10, 'STRING', 0, 'VALUE'), 'LASTUPDATEDT': (9, 'DATETIME', 0, 'VALUE'), 'EXPDT': (13, 'DATETIME', 0, 'VALUE'), 'RESTRICTIONS': (14, 'DICT', 0, 'VALUE'), 'STARTDT': (12, 'DATETIME', 0, 'VALUE'), 'CREATIONDT': (8, 'DATETIME', 0, 'VALUE'), 'GENERICTOKENNAME': (4, 'STRING', 0, 'VALUE'), 'ISACTIVE': (0, 'BOOL', 1, 'VALUE')}
}
, 'USER': {'TYPEOFTYPES': ['USERS', 'SYNTHETICNETWORKS'], 'FUNCTIONS': {'ENTITYCREATION': 'putNetwork'}
, 'UNIQUEATTIBUTES': ['USERNAME'], 'TOKENENTITIESRELATIONSHIPS': ['USERS'], 'ATTRIBUTES': {'USERNAME': (5, 'STRING', 0, 'VALUE'), 'USERS': (2, 'STRING', 0, 'VALUE'), 'FIRSTNAME': (3, 'STRING', 0, 'VALUE'), 'LASTNAME': (4, 'STRING', 0, 'VALUE'), 'ENTITYKEY': (1, 'STRING', 0, 'VALUE'), 'ISACTIVE': (0, 'BOOL', 1, 'VALUE')}
}
, 'TWEETS': {'TYPEOFTYPES': ['TOKENENTITY'], 'FUNCTIONS': {'ENTITYCREATION': 'putWGTNetwork'}
, 'UNIQUEATTIBUTES': ['TWEETID'], 'TOKENENTITIESRELATIONSHIPS':

-continued

['TWITTERUSER'], 'ATTRIBUTES': {'Title': (4, 'STRING', 0, 'VALUE'), 'RawTweet': (5, 'STRING', 0, 'VALUE'), 'DATETIME': (3, 'STRING', 0, 'VALUE'), 'CLEANEDTWEET': (6, 'STRING', 0, 'VALUE'), 'ENTITYKEY': (1, 'STRING', 0, 'VALUE'), 'TWEETID': (2, 'STRING', 0, 'VALUE'), 'ISACTIVE': (0, 'BOOL', 1, 'VALUE')}
}
, 'MODEL': {'TYPEOFTYPES': ['MODELS'], 'FUNCTIONS': {'ENTITYCREATION': 'putNetwork'}
, 'UNIQUEATTIBUTES': ['MODELNAME'], 'TOKENENTITIESRELATIONSHIPS': ['USER', 'MERCHANT', 'PAYMENTCARD'], 'ATTRIBUTES': {'XML': (2, 'STRING', 0, 'VALUE'), 'MODELNAME': (3, 'STRING', 0, 'VALUE'), 'DESCRIPTION': (4, 'STRING', 0, 'VALUE'), 'ENTITYKEY': (1, 'STRING', 0, 'VALUE'), 'TYPEOF': (5, 'STRING', 0, 'VALUE'), 'ISACTIVE': (0, 'BOOL', 1, 'VALUE')}
}
, 'MCCSEG': {'TYPEOFTYPES': ['MCCSEG'], 'FUNCTIONS': {'ENTITYCREATION': 'putWGTNetwork'}
, 'UNIQUEATTIBUTES': ['MCCSEGID'], 'TOKENENTITIESRELATIONSHIPS': { }
, 'ATTRIBUTES': {'MCCSEGID': (2, 'STRING', 0, 'VALUE'), 'MCCSEGNAME': (3, 'STRING', 0, 'VALUE'), 'ISACTIVE': (0, 'BOOL', 1, 'VALUE'), 'ENTITYKEY': (1, 'STRING', 0, 'VALUE')}
}
, 'TOKENENTITY': {'TYPEOFTYPES': ['TOKENENTITY'], 'FUNCTIONS': {'ENTITYCREATION': 'putWGTNetwork'}
, 'UNIQUEATTIBUTES': ['TOKENENTITYKEY'], 'TOKENENTITIESRELATIONSHIPS': { }
, 'ATTRIBUTES': {'STATUS': (4, 'STRING', 0, 'VALUE'), 'ISSUEDDATE': (5, 'STRING', 0, 'VALUE'), 'DOUBLELINKED': (8, 'BOOL', 1, 'VALUE'), 'BASEUUID': (1, 'STRING', 0, 'VALUE'), 'WEIGHT': (6, 'STRING', 0, 'VALUE'), 'BASETYPE': (3, 'STRING', 0, 'VALUE'), 'CATEGORY': (7, 'STRING', 0, 'VALUE'), 'ISACTIVE': (0, 'BOOL', 1, 'VALUE'), 'TOKENENTITYKEY': (2, 'STRING', 0, 'VALUE')}
}
}

Figure 3:
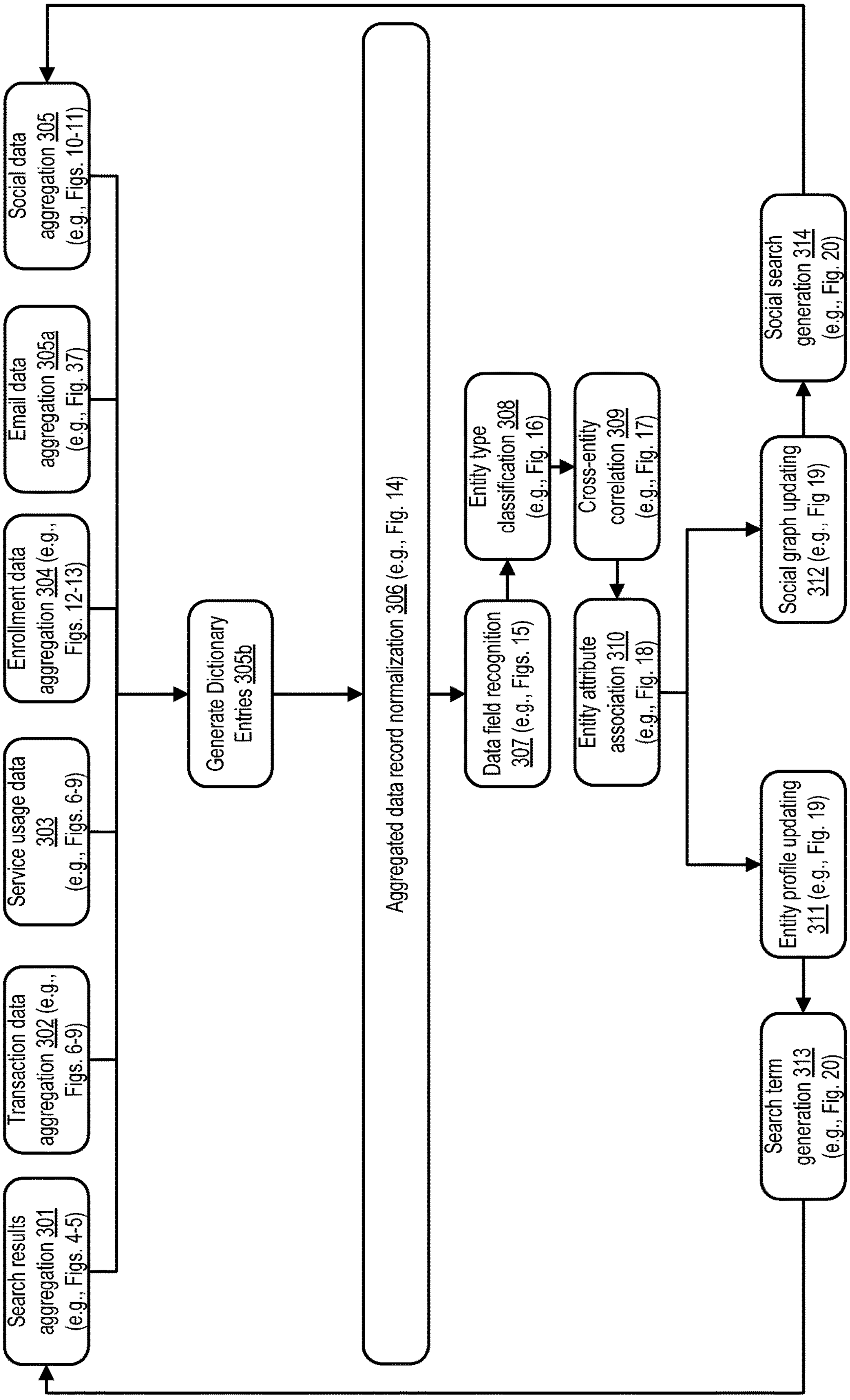
FIG. 3 shows a block diagram illustrating example CPDB component configurations in some embodiments of the CPDB.

FIG. 3 shows a block diagram illustrating example CPDB component configurations in some embodiments of the CPDB. In some embodiments, the CPDB may aggregate data from a variety of sources to generate centralized personal information. The may also aggregate various types of data in order to generate the centralized personal information. For example, the CPDB may utilize search results aggregation component(s) 301 (e.g., such as described in FIGS. 4-5) to aggregate search results from across a wide range of computer networked systems, e.g., the Internet. As another example, the CPDB may utilize transaction data aggregation component(s) 302 (e.g., such as described in FIGS. 6-9) to aggregate transaction data, e.g., from transaction processing procedure by a payment network. As another example, the CPDB may utilize service usage data aggregation component(s) 303 (e.g., such as described in FIGS. 6-9) to aggregate data on user's usage of various services associated with the CPDB. As another example, the CPDB may utilize enrollment data component(s) 304 (e.g., such as described in FIGS. 12-13) to aggregate data on user's enrollment into various services associated with the CPDB. As another example, the CPDB may utilize email data component(s) 305*a* (e.g., such as described in FIG. 37) to aggregate data regarding the user's email correspondence history into various services associated with the CPDB. As another example, the CPDB may utilize social data aggregation component(s) 305 (e.g., such as described in FIGS. 10-11) to aggregate data on user's usage of various social networking services accessible by the CPDB. In one embodiment, the aggregated data may be used to generate dictionary entries. Further detail regarding the generation of dictionary entries may be found throughout this specification, drawings, and claims and particularly with reference to FIG. 1 and FIG. 46.

Figure 14A:
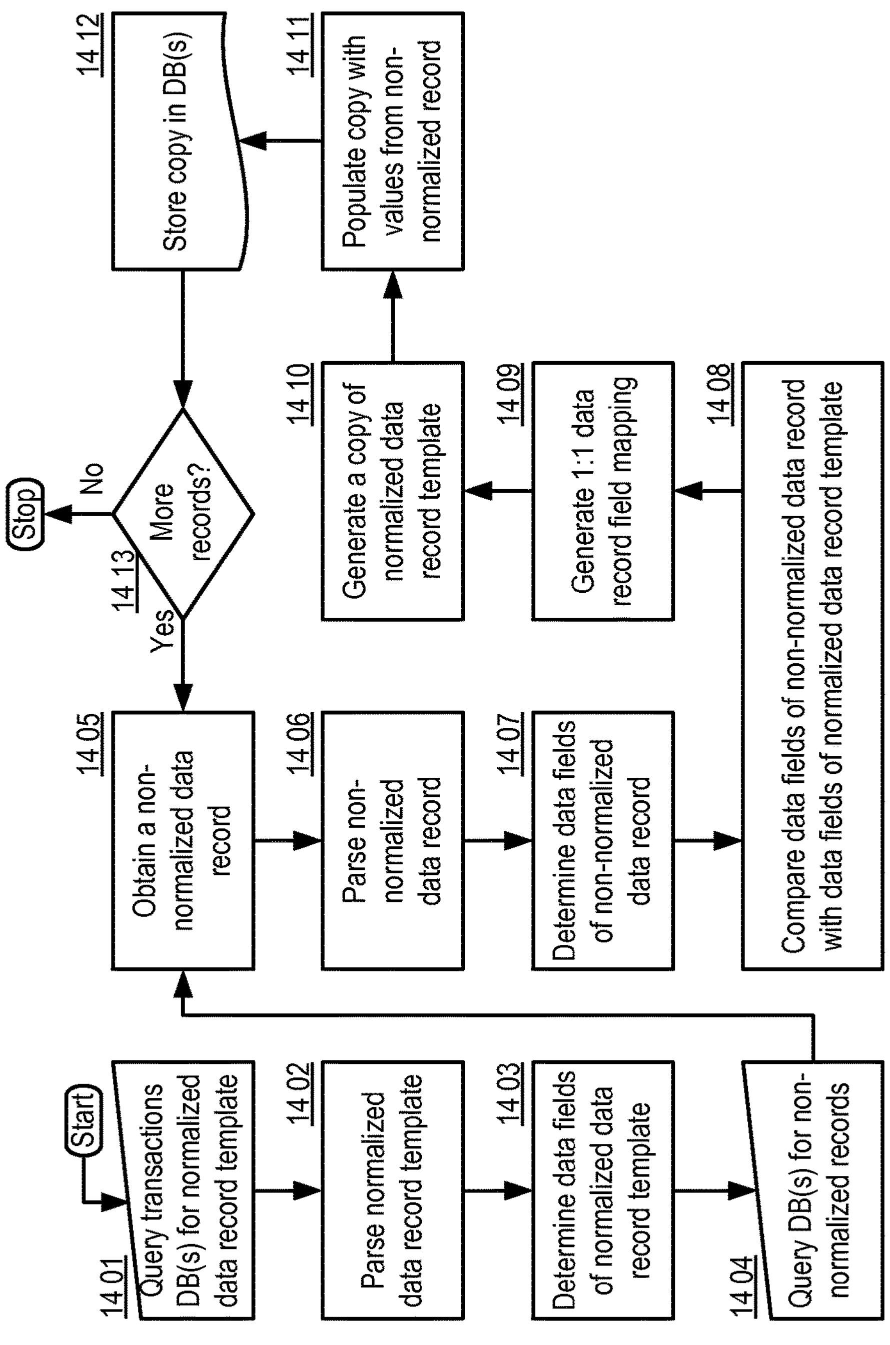
FIGS. 14A-B show flow diagrams illustrating example aspects of normalizing aggregated search, enrolled, service usage, transaction and/or other aggregated data into a standardized data format in some embodiments of the CPDB, e.g., a Aggregated Data Record Normalization ("ADRN") component 1400.
Figure 14B:
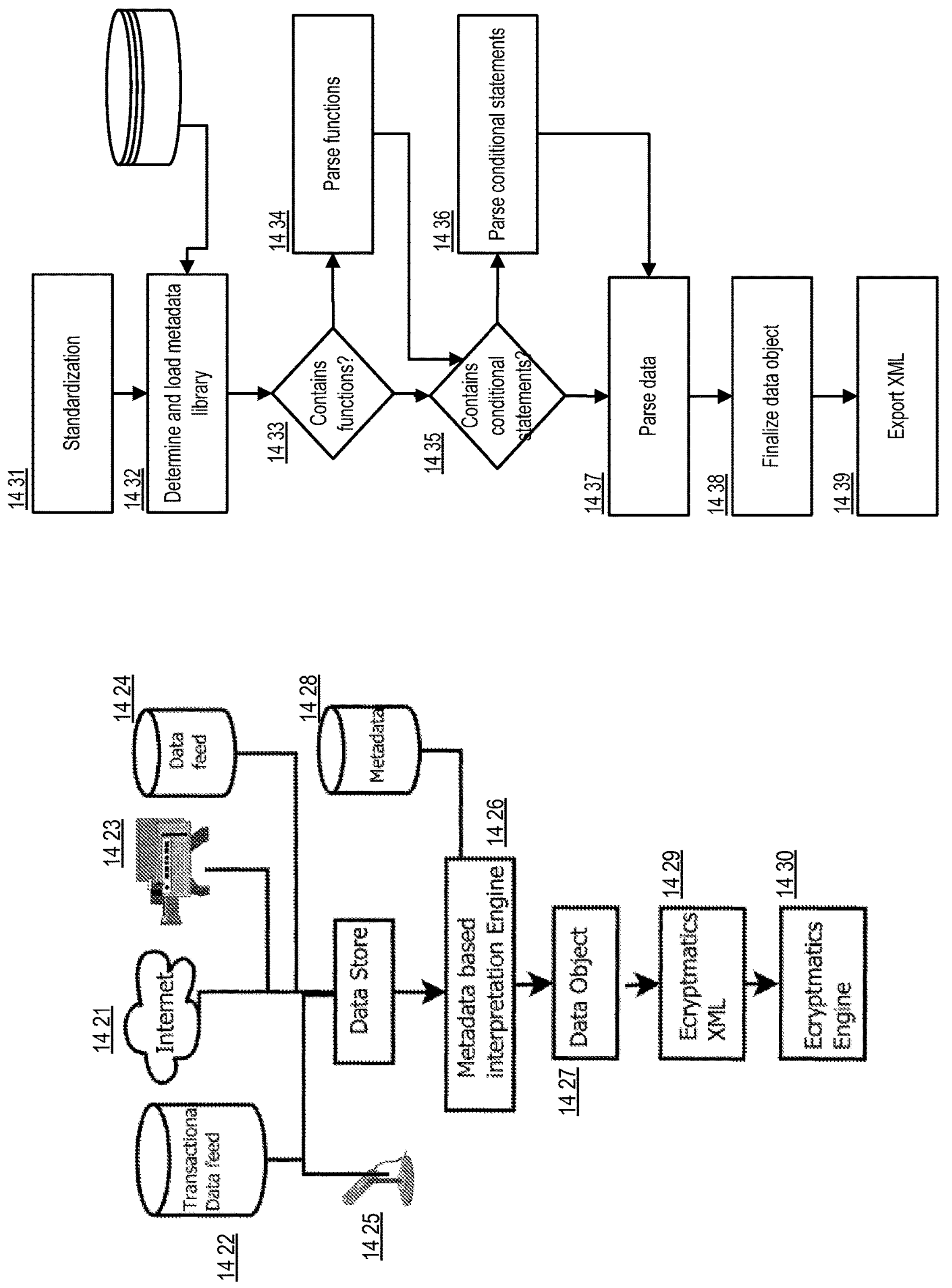

In some embodiments, the CPDB may acquire the aggregated data, and normalize the data into formats that are suitable for uniform storage, indexing, maintenance, and/or further processing via data record normalization component (s) 306 (e.g., such as described in FIGS. 14A-B). The CPDB may extract data from the normalized data records, and recognize data fields, e.g., the CPDB may identify the attributes of each field of data included in the normalized data records via data field recognition component(s) 307 (e.g., such as described in FIG. 15). For example, the CPDB may identify names, user_ID(s), addresses, network addresses, comments and/or specific words within the comments, images, blog posts, video, content within the video, and/or the like from the aggregated data. In some embodiments, for each field of data, the CPDB may classify entity types associated with the field of data, as well as entity identifiers associated with the field of data, e.g., via component(s) 308 (e.g., such as described in FIG. 16). For example, the CPDB may identify an Internet Protocol (IP) address data field to be associated with a user_ID john.q.public (consumer entity type), a user John Q. Public (consumer entity type), a household (the Public household—a multi-consumer entity type/household entity type), a merchant entity type with identifier Acme Merchant Store, Inc. from which purchases are made from the IP address, an Issuer Bank type with identifier First National Bank associated with the purchases made from the IP address, and/or the like. In some embodiments, the CPDB may utilize the entity types and entity identifiers to correlate entities across each other, e.g., via cross-entity correlation component(s) 309 (e.g., such as described in FIG. 17). For example, the CPDB may identify, from the aggregated data, that a household entity with identifier H123 may include a user entity with identifier John Q. Public and social identifier john.q.public@facebook.com, a second user entity with identifier Jane P. Doe with social identifier jpdoe@twitter.com, a computer entity with identifier IP address 192.168.4.5, a card account entity with identifier **1234, a bank issuer entity with identifier AB23145, a merchant entity with identifier Acme Stores, Inc. where the household sub-entities make purchases, and/or the like. In some embodiments, the CPDB may utilize the entity identifiers, data associated with each entity and/or correlated entities to identify associations to other entities, e.g., via entity attribute association component(s) 310 (e.g., such as described in FIG. 18). For example, the CPDB may identify specific purchases made via purchase transactions by members of the household, and thereby identify attributes of members of the household on the basis of the purchases in the purchase transactions made by members of the household. Based on such correlations and associations, the CPDB may update a profile for each entity identified from the aggregated data, as well as a social graph interrelating the entities identified in the aggregated data, e.g., via entity profile-graph updating component(s) 311 (e.g., such as described in FIGS. 19, 40, 41A-E and 42A-C). In some embodiments, the updating of profile and/or social graphs for an entity may trigger a search for additional data that may be relevant to the newly identified correlations and associations for each entity, e.g., via search term generation component(s) 313-314 (e.g., such as described in FIG. 20**). For example, the updating of a profile and/or social graph may trigger searches across the Internet, social networking websites, transaction data from payment networks, services enrolled into and/or utilized by the entities, and/or the like. In some embodiments, such updating of entity profiles and/or social graphs may be performed continuously, periodically, on-demand, and/or the like.

Figure 4:
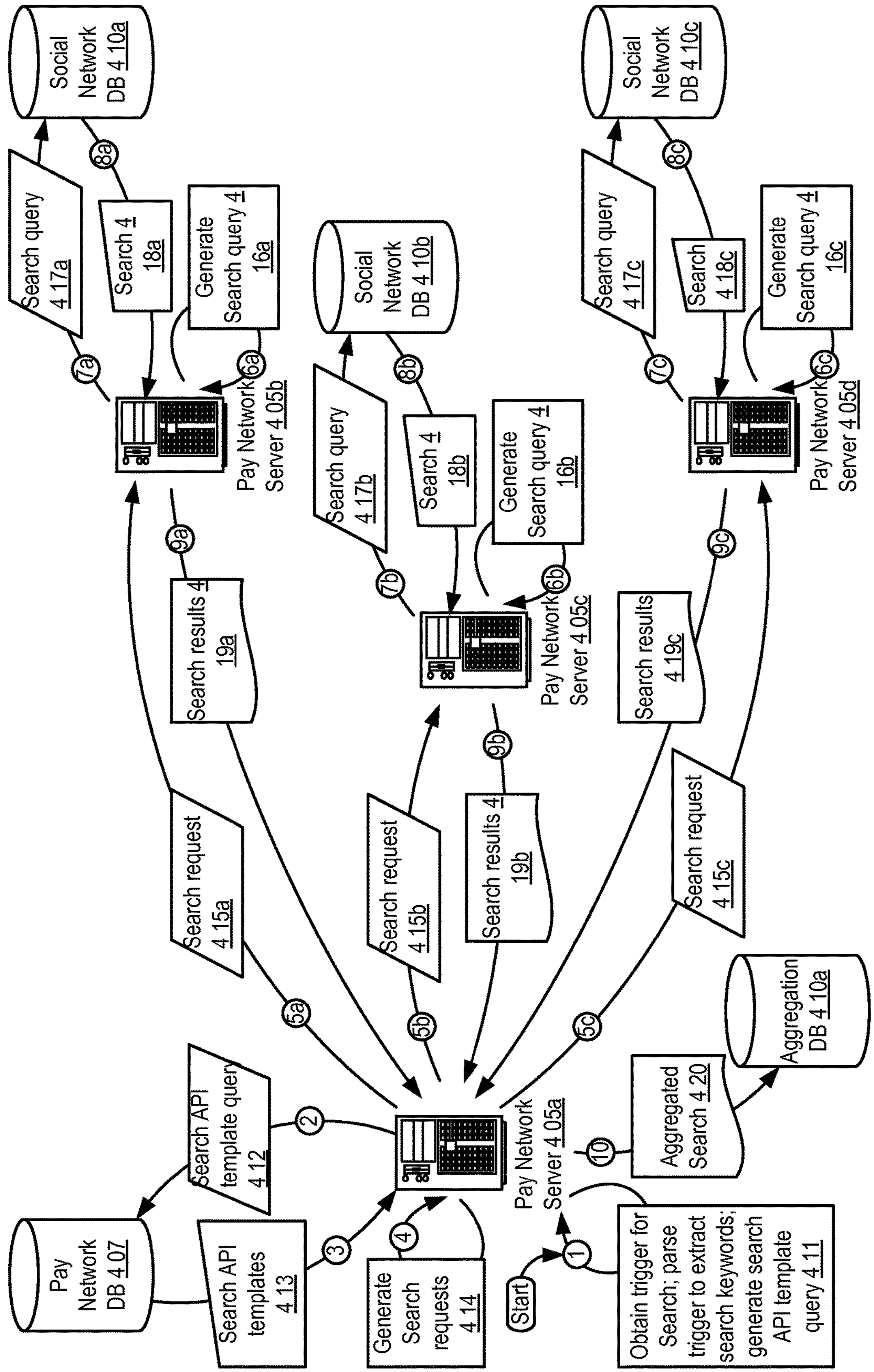
FIG. 4 shows a data flow diagram illustrating an example search result aggregation procedure in some embodiments of the CPDB.

FIG. 4 shows a data flow diagram illustrating an example search result aggregation procedure in some embodiments of the CPDB. In some implementations, the pay network server may obtain a trigger to perform a search. For example, the pay network server may periodically perform a search update of its aggregated search database, e.g., 410, with new information available from a variety of sources, such as the Internet. As another example, a request for on-demand search update may be obtained as a result of a user wishing to enroll in a service, for which the pay network server may facilitate data entry by providing an automated web form filling system using information about the user obtained from the search update. In some implementations, the pay network server may parse the trigger to extract keywords using which to perform an aggregated search. The pay network server may generate a query for application programming interface (API) templates for various search engines (e.g., Google™, Bing®, AskJeeves, market data search engines, etc.) from which to collect data for aggregation. The pay network server may query, e.g., 412, a pay network database, e.g., 407, for search API templates for the search engines. For example, the pay network server may utilize PHP/SQL commands similar to the examples provided above. The database may provide, e.g., 413, a list of API templates in response. Based on the list of API templates, the pay network server may generate search requests, e.g., 414. The pay network server may issue the generated search requests, e.g., 415*a*-*c*, to the search engine servers, e.g., 401*a*-*c*. For example, the pay network server may issue PHP commands to request the search engine for search results. An example listing of commands to issue search requests 415*a*-*c*, substantially in the form of PHP commands, is provided below:

```
<?PHP
// API URL with access key
$url = ["https://ajax.googleapis.com/ajax/services/search/web?v=1.0&"
    . "q=" $keywords
    "&key=1234567890987654&userip=datagraph.cpip.com"];
// Send Search Request
$ch = curl_init( );
curl_setopt($ch, CURLOPT_URL, $url);
curl_setopt($ch, CURLOPT_RETURNTRANSFER, 1);
curl_setopt($ch, CURLOPT_REFERER, "datagraph.cpip.com");
$body = curl_exec($ch);
curl_close($ch);
// Obtain, parse search results
$json = json_decode($body);
?>
```

In some embodiments, the search engine servers may query, e.g., 417*a*-*c*, their search databases, e.g., 402*a*-*c*, for search results falling within the scope of the search keywords. In response to the search queries, the search databases may provide search results, e.g., 418*a*-*c*, to the search engine servers. The search engine servers may return the search results obtained from the search databases, e.g., 419*a*-*c*, to the pay network server making the search requests. An example listing of search results 419*a*-*c*, substantially in the form of JavaScript Object Notation (JSON)-formatted data, is provided below:

```
{"responseData": {
"results": [
    {
    "GsearchResultClass": "GwebSearch",
    "unescapedUrl": "http://en.wikipedia.org/wiki/John_Q_Public",
    "url": "http://en.wikipedia.org/wiki/John_Q_Public",
    "visibleUrl": "en.wikipedia.org",
    "cacheUrl":
"http://www.google.com/search?q\u003dcache:TwrPfhd22hYJ:en.wikipedia.org",
    "title": "\u003cb\u003eJohn Q. Public\u003c/b\u003e - Wikipedia, the free
encyclopedia",
    "titleNoFormatting": "John Q. Public - Wikipedia, the free encyclopedia",
    "content": "\[1\] In 2006, he served as Chief Technology Officer..."
    },
    {
    "GsearchResultClass": "GwebSearch",
    "unescapedUrl": "http://www.imdb.com/name/nm0385296/",
    "url": "http://www.imdb.com/name/nm0385296/",
    "visibleUrl": "www.imdb.com",
    "cacheUrl":
"http://www.google.com/search?q\u003dcache:1i34KkqnsooJ:www.imdb.com",
```

-continued

"title": "\u003cb\u003eJohn Q. Public\u003c/b\u003e",
"titleNoFormatting": "John Q. Public",
"content": "Self: Zoolander. Socialite \u003cb\u003eJohn Q.
Public\u003c/b\u003e..."
},
...
],
"cursor": {
"pages": [
{ "start": "0", "label": 1 },
{ "start": "4", "label": 2 },
{ "start": "8", "label": 3 },
{ "start": "12","label": 4 }
],
"estimatedResultCount": "59600000",
"currentPageIndex": 0,
"moreResultsUrl":
"http://www.google.com/search?oe\u003dutf8\u0026ie\u003dutf8..."
}
}
, "responseDetails": null, "responseStatus": 200}

In some embodiments, the pay network server may store the aggregated search results, e.g., 420, in an aggregated search database, e.g., 410*a*.

Figure 5:
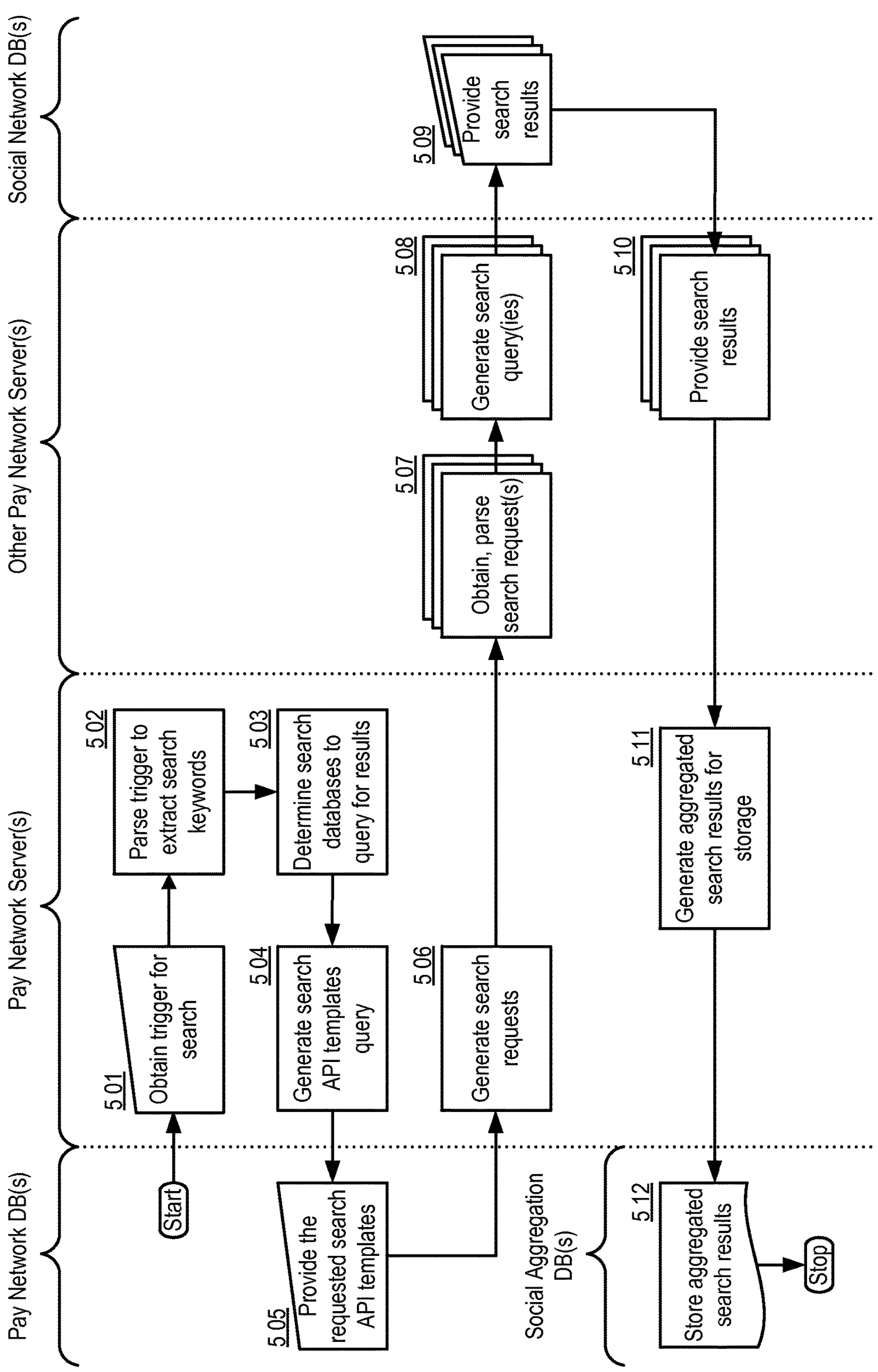
FIG. 5 shows a logic flow diagram illustrating example aspects of aggregating search results in some embodiments of the CPDB, e.g., a Search Results Aggregation ("SRA") component 500.

FIG. 5 shows a logic flow diagram illustrating example aspects of aggregating search results in some embodiments of the CPDB, e.g., a Search Results Aggregation ("SRA") component 500. In some implementations, the pay network server may obtain a trigger to perform a search, e.g., 501. For example, the pay network server may periodically perform a search update of its aggregated search database with new information available from a variety of sources, such as the Internet. As another example, a request for on-demand search update may be obtained as a result of a user wishing to enroll in a service, for which the pay network server may facilitate data entry by providing an automated web form filling system using information about the user obtained from the search update. In some implementations, the pay network server may parse the trigger, e.g., 502, to extract keywords using which to perform an aggregated search. The pay network server may determine the search engines to search, e.g., 503, using the extracted keywords. Then, the pay network server may generate a query for application programming interface (API) templates for the various search engines (e.g., Google™, Bing®, AskJeeves, market data search engines, etc.) from which to collect data for aggregation, e.g., 504. The pay network server may query, e.g., 505, a pay network database for search API templates for the search engines. For example, the pay network server may utilize PHP/SQL commands similar to the examples provided above. The database may provide, e.g., 505, a list of API templates in response. Based on the list of API templates, the pay network server may generate search requests, e.g., 506. The pay network server may issue the generated search requests to the search engine servers. The search engine servers may parse the obtained search results(s), e.g., 507, and query, e.g., 508, their search databases for search results falling within the scope of the search keywords. In response to the search queries, the search databases may provide search results, e.g., 509, to the search engine servers. The search engine servers may return the search results obtained from the search databases, e.g., 510, to the pay network server making the search requests. The pay network server may generate, e.g., 511, and store the aggregated search results, e.g., 512, in an aggregated search database.

FIGS. 6A-D show data flow diagrams illustrating an example card-based transaction execution procedure in some embodiments of the CPDB. In some implementations, a user, e.g., 601, may desire to purchase a product, service, offering, and/or the like ("product"), from a merchant. The user may communicate with a merchant server, e.g., 603, via a client such as, but not limited to: a personal computer, mobile device, television, point-of-sale terminal, kiosk, ATM, and/or the like (e.g., 602). For example, the user may provide user input, e.g., purchase input 611, into the client indicating the user's desire to purchase the product. In various implementations, the user input may include, but not be limited to: keyboard entry, card swipe, activating a RFID/NFC enabled hardware device (e.g., electronic card having multiple accounts, smartphone, tablet, etc.), mouse clicks, depressing buttons on a joystick/game console, voice commands, single/multi-touch gestures on a touch-sensitive interface, touching user interface elements on a touch-sensitive display, and/or the like. For example, the user may direct a browser application executing on the client device to a website of the merchant, and may select a product from the website via clicking on a hyperlink presented to the user via the website. As another example, the client may obtain track 1 data from the user's card (e.g., credit card, debit card, prepaid card, charge card, etc.), such as the example track 1 data provided below:

%B123456789012345^PUBLIC/J.Q.^99011200000000000000901****?*

(wherein '123456789012345' is the card number of 'J.Q. Public' and has a CVV number of 901. '990112' is a service code, and *** represents decimal digits which change randomly each time the card is used.)

In some implementations, the client may generate a purchase order message, e.g., 612, and provide, e.g., 613, the generated purchase order message to the merchant server. For example, a browser application executing on the client may provide, on behalf of the user, a (Secure) Hypertext Transfer Protocol ("HTTP(S)") GET message including the product order details for the merchant server in the form of data formatted according to the eXtensible Markup Language ("XML"). Below is an example HTTP(S) GET message including an XML-formatted purchase order message for the merchant server:

```
GET /purchase.php HTTP/1.1
Host: www.merchant.com
Content-Type: Application/XML
Content-Length: 1306
<?XML version = "1.0" encoding = "UTF-8"?>
<purchase_order>
    <order_ID>4NFU4RG94</order_ID>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <purchase_details>
        <num_products>1</num_products>
        <product>
            <product_type>book</product_type>
            <product_params>
                <product_title>XML for
                dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </purchase_details>
    <account_params>
        <account_name>John Q. Public</account_name>
        <account_type>credit</account_type>
        <account_num>123456789012345</account_num>
        <billing_address>123 Green St., Norman, OK
98765</billing_address>
        <phone>123-456-7809</phone>
        <sign>/jqp/</sign>
        <confirm_type>email</confirm_type>
        <contact_info>john.q.public@gmail.com</contact_info>
    </account_params>
    <shipping_info>
        <shipping_adress>same as billing</shipping_address>
        <ship_type>expedited</ship_type>
        <ship_carrier>FedEx</ship_carrier>
        <ship_account>123-45-678</ship_account>
        <tracking_flag>true</tracking_flag>
        <sign_flag>false</sign_flag>
    </shipping_info>
</purchase_order>
```

In some implementations, the merchant server may obtain the purchase order message from the client, and may parse the purchase order message to extract details of the purchase order from the user. The merchant server may generate a card query request, e.g., 614 to determine whether the transaction can be processed. For example, the merchant server may attempt to determine whether the user has sufficient funds to pay for the purchase in a card account provided with the purchase order. The merchant server may provide the generated card query request, e.g., 615, to an acquirer server, e.g., 604. For example, the acquirer server may be a server of an acquirer financial institution ("acquirer") maintaining an account of the merchant. For example, the proceeds of transactions processed by the merchant may be deposited into an account maintained by the acquirer. In some implementations, the card query request may include details such as, but not limited to: the costs to the user involved in the transaction, card account details of the user, user billing and/or shipping information, and/or the like. For example, the merchant server may provide a HTTP(S) POST message including an XML-formatted card query request similar to the example listing provided below:

```
POST /cardquery.php HTTP/1.1
Host: www.acquirer.com
Content-Type: Application/XML
Content-Length: 624
<?XML version = "1.0" encoding = "UTF-8"?>
<card_query_request>
        <query_ID>VNEI39FK</query_ID>
        <timestamp>2011-02-22 15:22:44</timestamp>
        <purchase_summary>
        <num_products>1</num_products>
        <product>
        <product_summary>Book - XML for
dummies</product_summary>
        <product_quantity>1</product_quantity?
        </product>
        </purchase_summary>
        <transaction_cost>$34.78</transaction_cost>
        <account_params>
        <account_name>John Q. Public</account_name>
        <account_type>credit</account_type>
        <account_num>123456789012345</account_num>
        <billing_address>123 Green St., Norman, OK
98765</billing_address>
        <phone>123-456-7809</phone>
        <sign>/jqp/</sign>
        </account_params>
        <merchant_params>
        <merchant_id>3FBCR4INC</merchant_id>
        <merchant_name>Books & Things, Inc.</merchant_name>
        <merchant_auth_key>1NNF484MCP59CHB27365
</merchant_auth_key>
        </merchant_params>
</card_query_request>
```

In some implementations, the acquirer server may generate a card authorization request, e.g., 616, using the obtained card query request, and provide the card authorization request, e.g., 617, to a pay network server, e.g., 605. For example, the acquirer server may redirect the HTTP(S) POST message in the example above from the merchant server to the pay network server.

In some implementations, the pay network server may determine whether the user has enrolled in value-added user services. For example, the pay network server may query 618 a database, e.g., pay network database 407, for user service enrollment data. For example, the server may utilize PHP/SQL commands similar to the example provided above to query the pay network database. In some implementations, the database may provide the user service enrollment data, e.g., 619. The user enrollment data may include a flag indicating whether the user is enrolled or not, as well as instructions, data, login URL, login API call template and/or the like for facilitating access of the user-enrolled services. For example, in some implementations, the pay network server may redirect the client to a value-add server (e.g., such as a social network server where the value-add service is related to social networking) by providing a HTTP(S) REDIRECT 300 message, similar to the example below:

```
HTTP/1.1 300 Multiple Choices
Location:
https://www.facebook.com/dialog/oauth?client_id=
snpa_app_ID&redirect_uri=www.paynetwork.com/purchase.php
<html>
    <head><title>300 Multiple Choices</title></head>
    <body><h1>Multiple Choices</h1></body>
</html>
```

In some implementations, the pay network server may provide payment information extracted from the card authorization request to the value-add server as part of a value add service request, e.g., 620. For example, the pay network server may provide a HTTP(S) POST message to the value-add server, similar to the example below:

```
POST /valueservices.php HTTP/1.1
Host: www.valueadd.com
Content-Type: Application/XML
Content-Length: 1306
<?XML version = "1.0" encoding = "UTF-8"?>
<service_request>
   <request_ID>4NFU4RG94</order_ID>
   <timestamp>2011-02-22 15:22:43</timestamp>
   <user_ID>john.q.public@gmail.com</user_ID>
   <client_details>
      <client_IP>192.168.23.126</client_IP>
      <client_type>smartphone</client_type>
      <client_model>HTC Hero</client_model>
      <OS>Android 2.2</OS>
      <app_installed_flag>true</app_installed_flag>
   </client_details>
   <account_params>
      <account_name>John Q. Public</account_name>
      <account_type>credit</account_type>
      <account_num>123456789012345</account_num>
      <billing_address>123 Green St., Norman, OK
98765</billing_address>
      <phone>123-456-7809</phone>
      <sign>/jqp/</sign>
      <confirm_type>email</confirm_type>
      <contact_info>john.q.public@gmail.com</contact_info>
   </account_params>
   <!--optional-->
   <merchant>
      <merchant_id>CQN3Y42N</merchant_id>
      <merchant_name>Acme Tech, Inc.</merchant_name>
      <user_name>john.q.public</user_name>
      <cardlist>
      www.acme.com/user/john.q.public/cclist.xml<cardlist>
      <user_account_preference>1 3 2 4 7 6
5<user_account_preference>
   </merchant>
</service_request>
```

In some implementations, the value-add server may provide a service input request, e.g., 621, to the client. For example, the value-add server may provide a HTML input/login form to the client. The client may display, e.g., 622, the login form for the user. In some implementations, the user may provide login input into the client, e.g., 623, and the client may generate a service input response, e.g., 624, for the value-add server. In some implementations, the value-add server may provide value-add services according to user value-add service enrollment data, user profile, etc., stored on the value-add server, and based on the user service input. Based on the provision of value-add services, the value-add server may generate a value-add service response, e.g., 626, and provide the response to the pay network server. For example, the value-add server may provide a HTTP(S) POST message similar to the example below:

```
POST /serviceresponse.php HTTP/1.1
Host: www.paynet.com
Content-Type: Application/XML
Content-Length: 1306
<?XML version = "1.0" encoding = "UTF-8"?>
<service_response>
      <request_ID>4NFU4RG94</order_ID>
      <timestamp>2011-02-22 15:22:43</timestamp>
      <result>serviced</result>
      <servcode>943528976302-45569-003829-04</servcode>
</service_response>
```

In some implementations, upon receiving the value-add service response from the value-add server, the pay network server may extract the enrollment service data from the response for addition to a transaction data record. In some implementations, the pay network server may forward the card authorization request to an appropriate pay network server, e.g., 628, which may parse the card authorization request to extract details of the request. Using the extracted fields and field values, the pay network server may generate a query, e.g., 629, for an issuer server corresponding to the user's card account. For example, the user's card account, the details of which the user may have provided via the client-generated purchase order message, may be linked to an issuer financial institution ("issuer"), such as a banking institution, which issued the card account for the user. An issuer server, e.g., 608*a-n*, of the issuer may maintain details of the user's card account. In some implementations, a database, e.g., pay network database 607, may store details of the issuer servers and card account numbers associated with the issuer servers. For example, the database may be a relational database responsive to Structured Query Language ("SQL") commands. The pay network server may execute a hypertext preprocessor ("PHP") script including SQL commands to query the database for details of the issuer server. An example PHP/SQL command listing, illustrating substantive aspects of querying the database, is provided below:

```
<?PHP
header('Content-Type: text/plain');
mysql_connect("254.93.179.112",$DBserver,$password); // access
database server
mysql_select_db("ISSUERS.SQL"); // select database table to
search
//create query for issuer server data
$query = "SELECT issuer_name issuer_address issuer_id ip_address
mac_address auth_key port_num security_settings_list FROM
IssuerTable
WHERE account_num LIKE '%' $accountnum";
$result = mysql_query($query); // perform the search query
mysql_close("ISSUERS.SQL"); // close database access
?>
```

In response to obtaining the issuer server query, e.g., 629, the pay network database may provide, e.g., 630, the requested issuer server data to the pay network server. In some implementations, the pay network server may utilize the issuer server data to generate a forwarding card authorization request, e.g., 631, to redirect the card authorization request from the acquirer server to the issuer server. The pay network server may provide the card authorization request, e.g., 632, to the issuer server. In some implementations, the issuer server, e.g., 608, may parse the card authorization request, and based on the request details may query 633 a database, e.g., user profile database 609, for data of the user's card account. For example, the issuer server may issue PHP/SQL commands similar to the example provided below:

```
<?PHP
header('Content-Type: text/plain');
mysql_connect("254.93.179.112",$DBserver,$password); // access
database server
mysql_select_db("USERS.SQL"); // select database table to search
//create query for user data
$query = "SELECT user_id user_name user_balance account_type
FROM UserTable WHERE account_num LIKE '%' $accountnum";
$result = mysql_query($query); // perform the search query
mysql_close("USERS.SQL"); // close database access
?>
```

In some implementations, on obtaining the user data, e.g., 634, the issuer server may determine whether the user can pay for the transaction using funds available in the account, e.g., 635. For example, the issuer server may determine whether the user has a sufficient balance remaining in the account, sufficient credit associated with the account, and/or the like. If the issuer server determines that the user can pay for the transaction using the funds available in the account, the server may provide an authorization message, e.g., 636, to the pay network server. For example, the server may provide a HTTP(S) POST message similar to the examples above.

In some implementations, the pay network server may obtain the authorization message, and parse the message to extract authorization details. Upon determining that the user possesses sufficient funds for the transaction, the pay network server may generate a transaction data record from the card authorization request it received, and store, e.g., 639, the details of the transaction and authorization relating to the transaction in a database, e.g., pay network database 607. For example, the pay network server may issue PHP/SQL commands similar to the example listing below to store the transaction data in a database:

```
<?PHP
header('Content-Type: text/plain');
mysql_connect("254.92.185.103",$DBserver,$password); // access
database server
mysql_select("TRANSACTIONS.SQL"); // select database to append
mysql_query("INSERT INTO PurchasesTable (timestamp,
purchase_summary_list, num_products, product_summary,
product_quantity, transaction_cost, account_params_list,
account_name, account_type, account_num, billing_addres, zipcode,
phone, sign, merchant_params_list, merchant_id, merchant_name,
merchant_auth_key)
VALUES (time( ), $purchase_summary_list, $num_products,
$product_summary, $product_quantity, $transaction_cost,
$account_params_list, $account_name, $account_type, $account_num,
$billing_addres, $zipcode, $phone, $sign, $merchant_params_list,
$merchant_id, $merchant_name, $merchant_auth_key)"); // add data
to table in database
mysql_close("TRANSACTIONS.SQL"); // close connection to database
?>
```

In some implementations, the pay network server may forward the authorization message, e.g., 640, to the acquirer server, which may in turn forward the authorization message, e.g., 640, to the merchant server. The merchant may obtain the authorization message, and determine from it that the user possesses sufficient funds in the card account to conduct the transaction. The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 641, and store the XML data file, e.g., 642, in a database, e.g., merchant database 604. For example, a batch XML data file may be structured similar to the example XML data structure template provided below:

```
<?XML version = "1.0" encoding = "UTF-8"?>
<merchant_data>
        <merchant_id>3FBCR4INC</merchant_id>
        <merchant_name>Books & Things, Inc.</merchant_name>
        <merchant_auth_key>1NNF484MCP59CHB27365
</merchant_auth_key>
        <account_number>123456789</account_number>
</merchant_data>
```

-continued

```
<transaction_data>
        <transaction 1>
        . . .
        </transaction 1>
        <transaction 2>
        . . .
        </transaction 2>
        .
        .
        .
        <transaction n>
        . . .
        </transaction n>
</transaction_data>
```

In some implementations, the server may also generate a purchase receipt, e.g., 643, and provide the purchase receipt to the client. The client may render and display, e.g., 644, the purchase receipt for the user. For example, the client may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 6A:
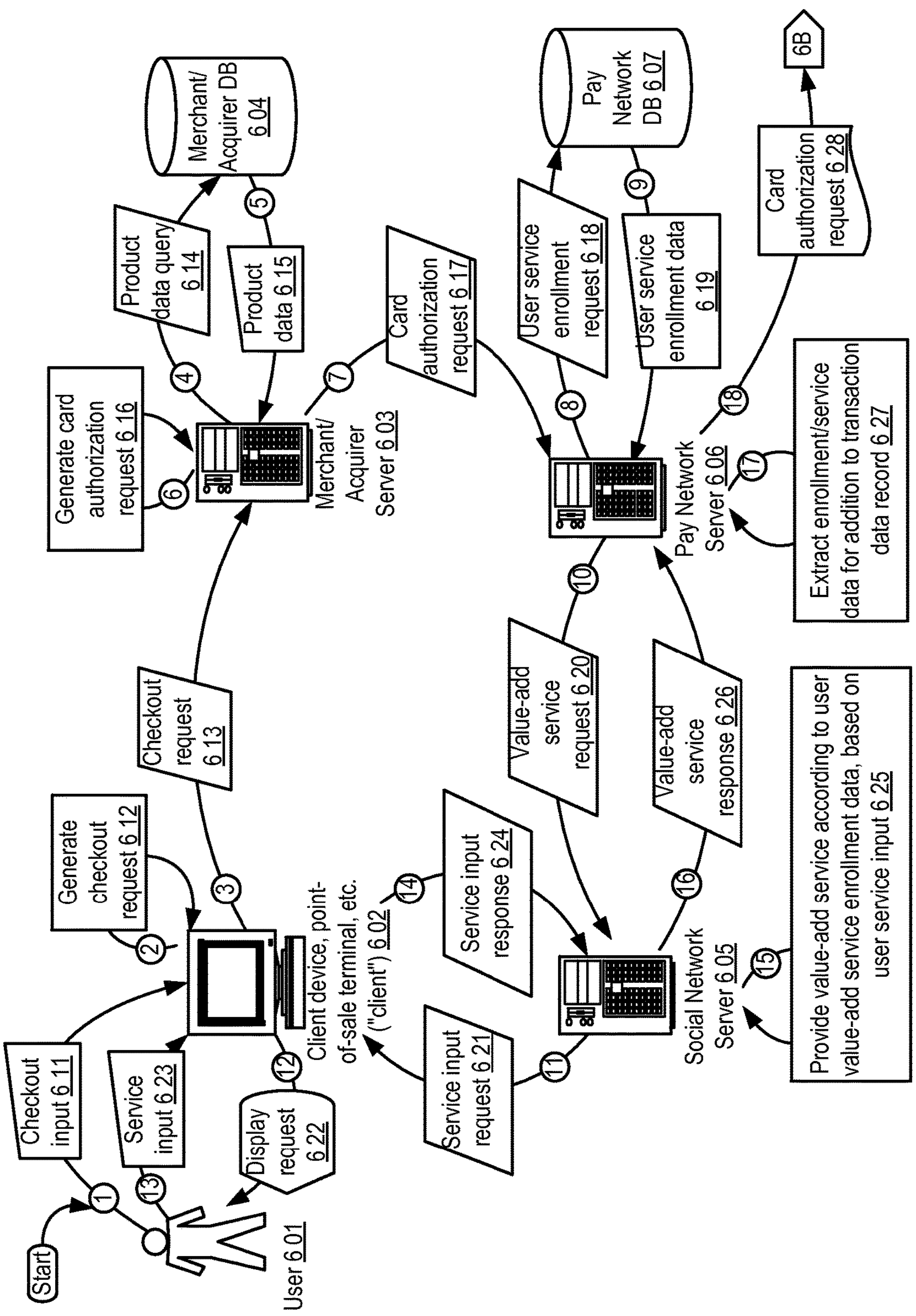
FIGS. 6A-D show data flow diagrams illustrating an example card-based transaction execution procedure in some embodiments of the CPDB.
Figure 6B:
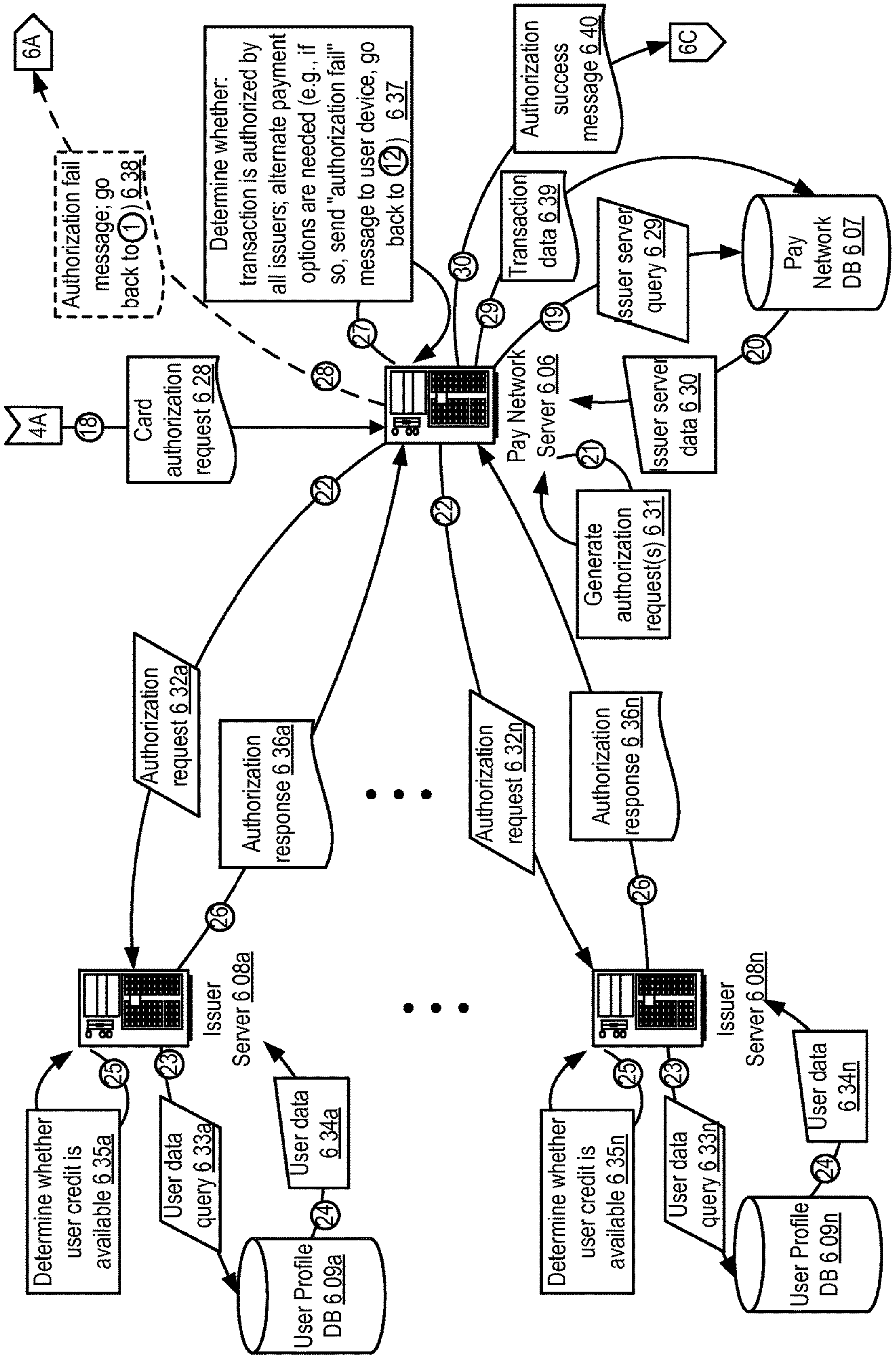
Figure 6C:
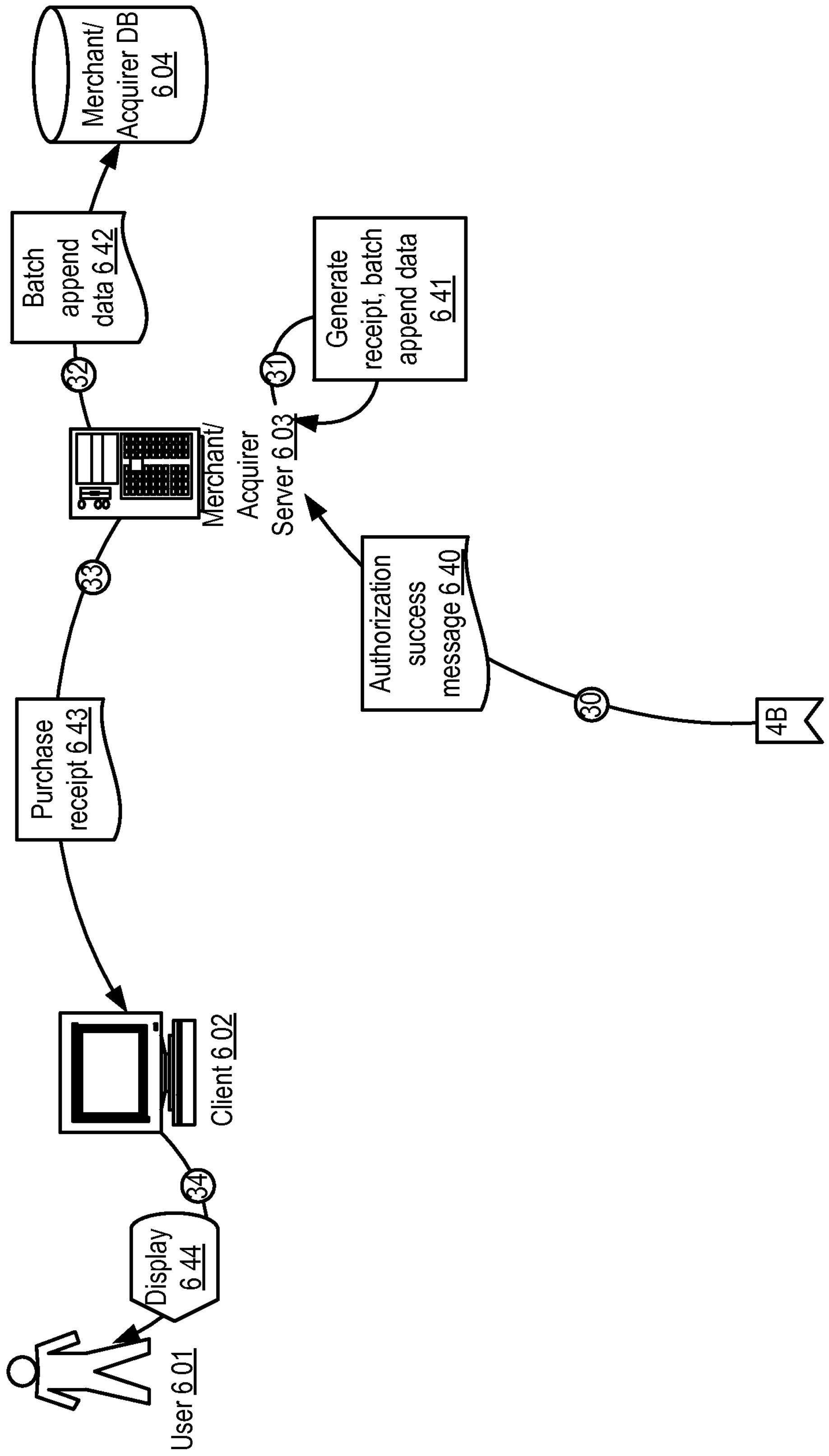
Figure 6D:
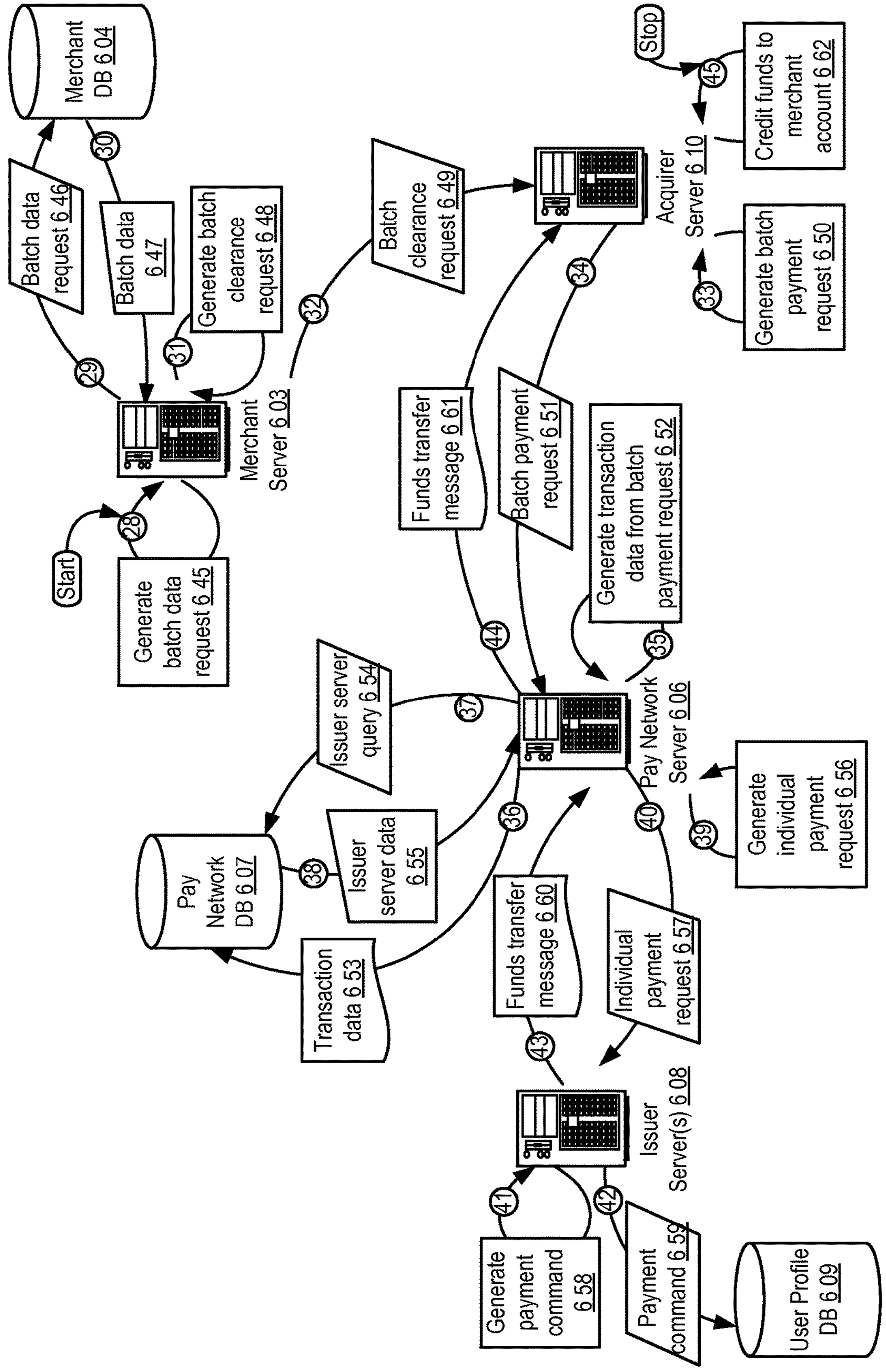

With reference to FIG. 6C, in some implementations, the merchant server may initiate clearance of a batch of authorized transactions. For example, the merchant server may generate a batch data request, e.g., 645, and provide the request, e.g., 646, to a database, e.g., merchant database 604. For example, the merchant server may utilize PHP/SQL commands similar to the examples provided above to query a relational database. In response to the batch data request, the database may provide the requested batch data, e.g., 647. The server may generate a batch clearance request, e.g., 648, using the batch data obtained from the database, and provide, e.g., 641, the batch clearance request to an acquirer server, e.g., 610. For example, the merchant server may provide a HTTP(S) POST message including XML-formatted batch data in the message body for the acquirer server. The acquirer server may generate, e.g., 650, a batch payment request using the obtained batch clearance request, and provide the batch payment request to the pay network server, e.g., 651. The pay network server may parse the batch payment request, and extract the transaction data for each transaction stored in the batch payment request, e.g., 652. The pay network server may store the transaction data, e.g., 653, for each transaction in a database, e.g., pay network database 607. For each extracted transaction, the pay network server may query, e.g., 654-655, a database, e.g., pay network database 607, for an address of an issuer server. For example, the pay network server may utilize PHP/SQL commands similar to the examples provided above. The pay network server may generate an individual payment request, e.g., 656, for each transaction for which it has extracted transaction data, and provide the individual payment request, e.g., 657, to the issuer server, e.g., 608. For example, the pay network server may provide a HTTP(S) POST request similar to the example below:

```
POST /requestpay.php HTTP/1.1
Host: www.issuer.com
Content-Type: Application/XML
Content-Length: 788
<?XML version = "1.0" encoding = "UTF-8"?>
<pay_request>
```

-continued

```
  <request_ID>CNI4ICNW2</request_ID>
  <timestamp>2011-02-22 17:00:01</timestamp>
  <pay_amount>$34.78</pay_amount>
  <account_params>
    <account_name>John Q. Public</account_name>
    <account_type>credit</account_type>
    <account_num>123456789012345</account_num>
    <billing_address>123 Green St., Norman, OK
98765</billing_address>
    <phone>123-456-7809</phone>
    <sign>/jqp/</sign>
  </account_params>
  <merchant_params>
    <merchant_id>3FBCR4INC</merchant_id>
    <merchant_name>Books & Things, Inc.</merchant_name>
  <merchant_auth_key>1NNF484MCP59CHB27365
</merchant_auth_key>
  </merchant_params>
  <purchase_summary>
    <num_products>1</num_products>
    <product>
      <product_summary>Book - XML for
dummies</product_summary>
      <product_quantity>1</product_quantity?
    </product>
  </purchase_summary>
</pay_request>
```

In some implementations, the issuer server may generate a payment command, e.g., 658. For example, the issuer server may issue a command to deduct funds from the user's account (or add a charge to the user's credit card account). The issuer server may issue a payment command, e.g., 659, to a database storing the user's account information, e.g., user profile database 608. The issuer server may provide a funds transfer message, e.g., 660, to the pay network server, which may forward, e.g., 661, the funds transfer message to the acquirer server. An example HTTP(S) POST funds transfer message is provided below:

```
POST /clearance.php HTTP/1.1
Host: www.acquirer.com
Content-Type: Application/XML
Content-Length: 206
<?XML version = "1.0" encoding = "UTF-8"?>
<deposit_ack>
    <request_ID>CNI4ICNW2</request_ID>
    <clear_flag>true</clear_flag>
    <timestamp>2011-02-22 17:00:02</timestamp>
    <deposit_amount>$34.78</deposit_amount>
</deposit_ack>
```

In some implementations, the acquirer server may parse the funds transfer message, and correlate the transaction (e.g., using the request_ID field in the example above) to the merchant. The acquirer server may then transfer the funds specified in the funds transfer message to an account of the merchant, e.g., 662.

FIGS. 7A-E show logic flow diagrams illustrating example aspects of card-based transaction execution, resulting in generation of card-based transaction data and service usage data, in some embodiments of the CPDB, e.g., a Card-Based Transaction Execution ("CTE") component 700. In some implementations, a user may provide user input, e.g., 701, into a client indicating the user's desire to purchase a product from a merchant. The client may generate a purchase order message, e.g., 702, and provide the generated purchase order message to the merchant server. In some implementations, the merchant server may obtain, e.g., 703, the purchase order message from the client, and may parse the purchase order message to extract details of the purchase order from the user. Example parsers that the merchant client may utilize are discussed further below with reference to FIG. 49. The merchant may generate a product data query, e.g., 704, for a merchant database, which may in response provide the requested product data, e.g., 705. The merchant server may generate a card query request using the product data, e.g., 704, to determine whether the transaction can be processed. For example, the merchant server may process the transaction only if the user has sufficient funds to pay for the purchase in a card account provided with the purchase order. The merchant server may optionally provide the generated card query request to an acquirer server. The acquirer server may generate a card authorization request using the obtained card query request, and provide the card authorization request to a pay network server.

In some implementations, the pay network server may determine whether the user has enrolled in value-added user services. For example, the pay network server may query a database, e.g., 707, for user service enrollment data. For example, the server may utilize PHP/SQL commands similar to the example provided above to query the pay network database. In some implementations, the database may provide the user service enrollment data, e.g., 708. The user enrollment data may include a flag indicating whether the user is enrolled or not, as well as instructions, data, login URL, login API call template and/or the like for facilitating access of the user-enrolled services. For example, in some implementations, the pay network server may redirect the client to a value-add server (e.g., such as a social network server where the value-add service is related to social networking) by providing a HTTP(S) REDIRECT 300 message. In some implementations, the pay network server may provide payment information extracted from the card authorization request to the value-add server as part of a value add service request, e.g., 710.

In some implementations, the value-add server may provide a service input request, e.g., 711, to the client. The client may display, e.g., 712, the input request for the user. In some implementations, the user may provide input into the client, e.g., 713, and the client may generate a service input response for the value-add server. In some implementations, the value-add server may provide value-add services according to user value-add service enrollment data, user profile, etc., stored on the value-add server, and based on the user service input. Based on the provision of value-add services, the value-add server may generate a value-add service response, e.g., 717, and provide the response to the pay network server. In some implementations, upon receiving the value-add service response from the value-add server, the pay network server may extract the enrollment service data from the response for addition to a transaction data record, e.g., 719-720.

Figure 7A:
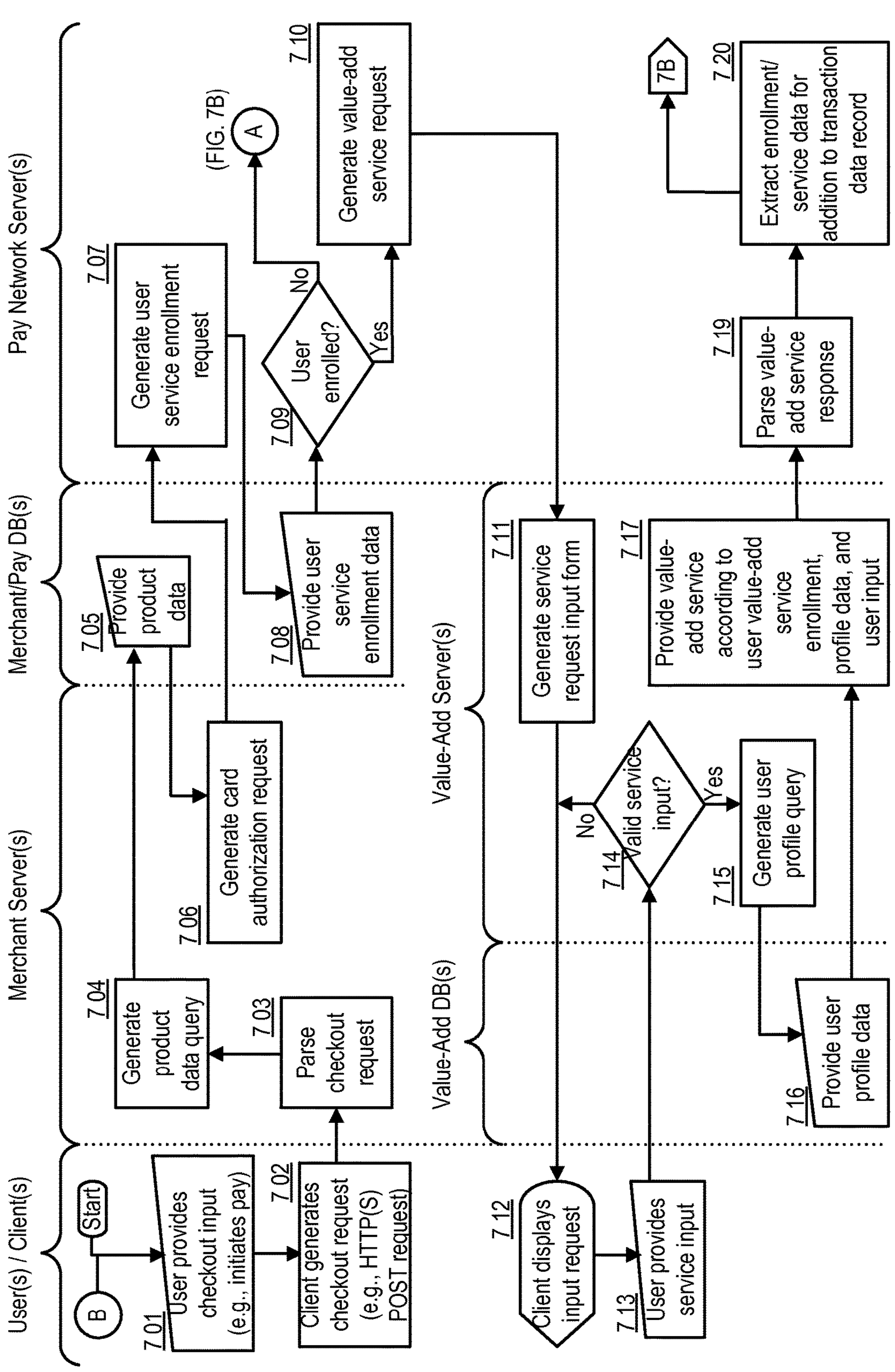
FIGS. 7A-E show logic flow diagrams illustrating example aspects of card-based transaction execution, resulting in generation of card-based transaction data and service usage data, in some embodiments of the CPDB, e.g., a Card-Based Transaction Execution ("CTE") component 700.
Figure 7B:
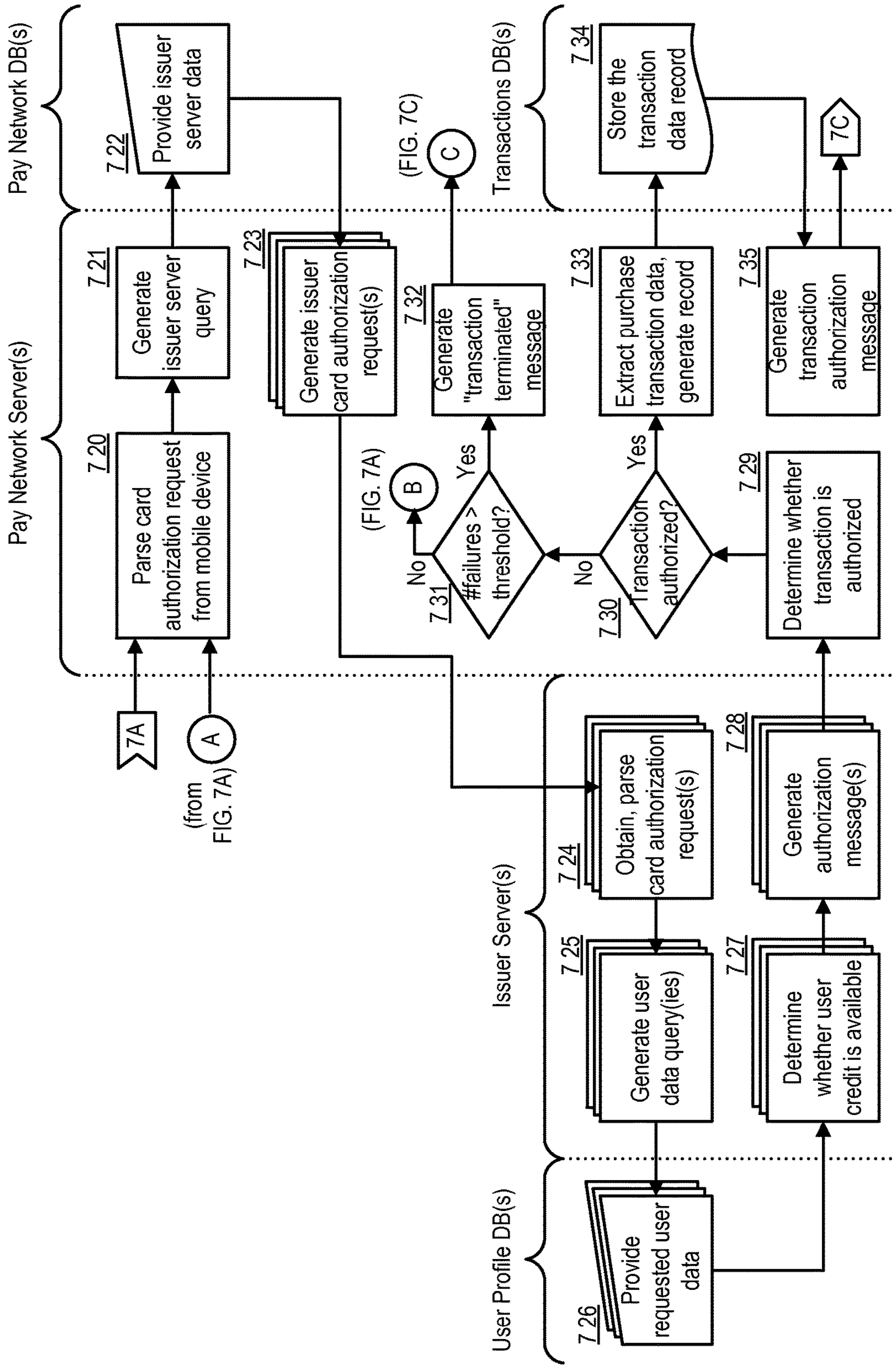
Figure 7C:
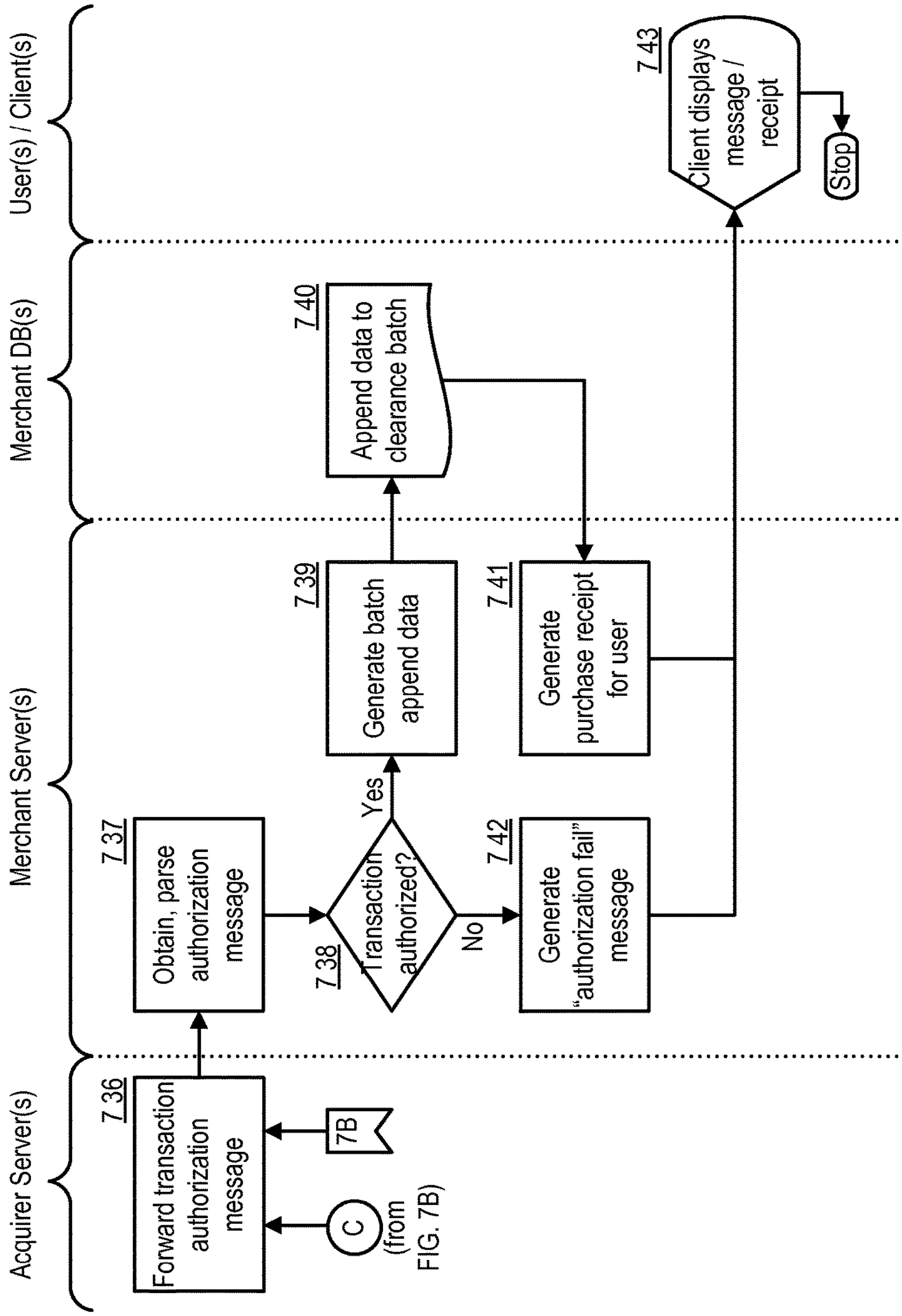
Figure 7D:
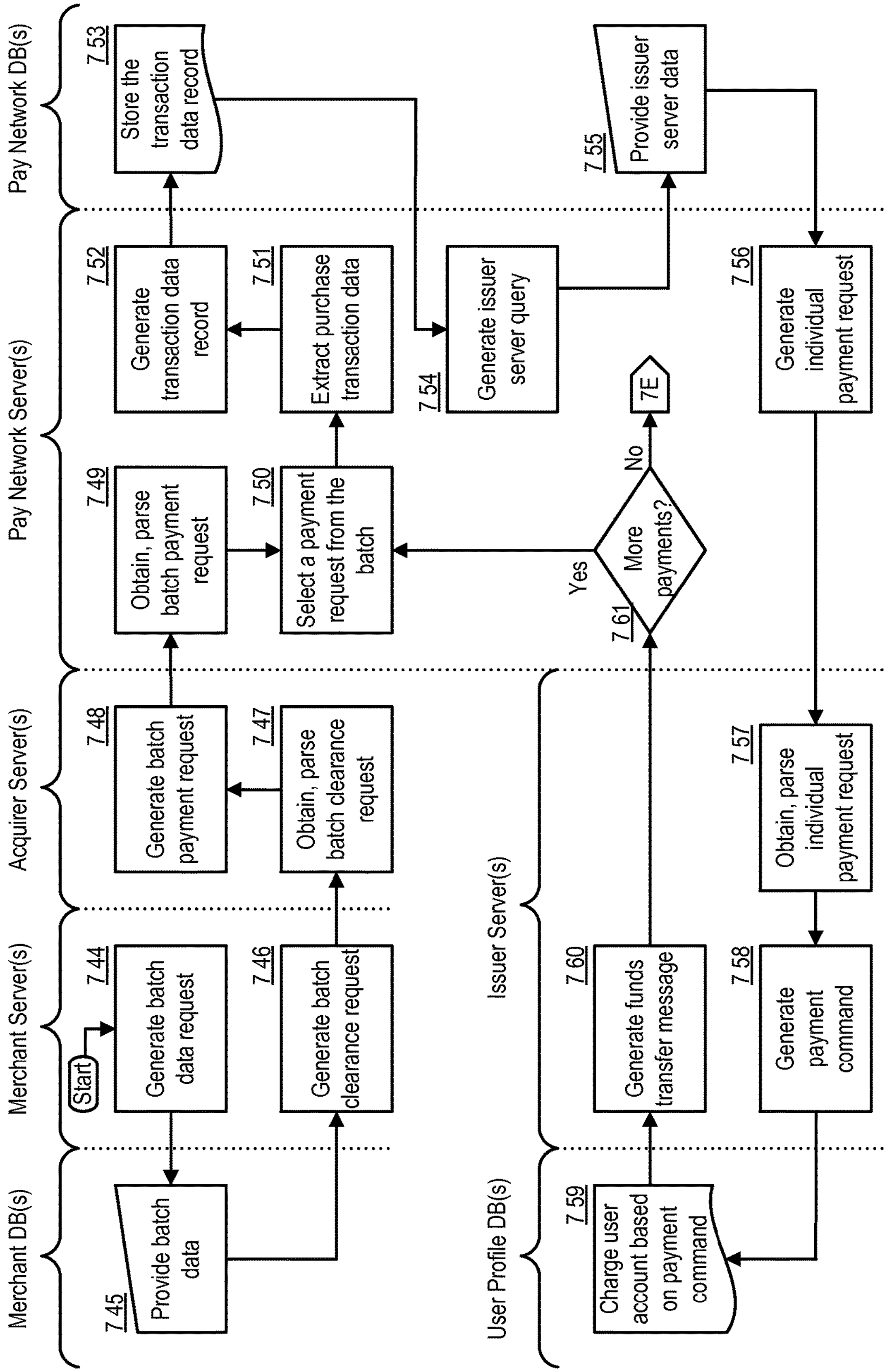
Figure 7E:
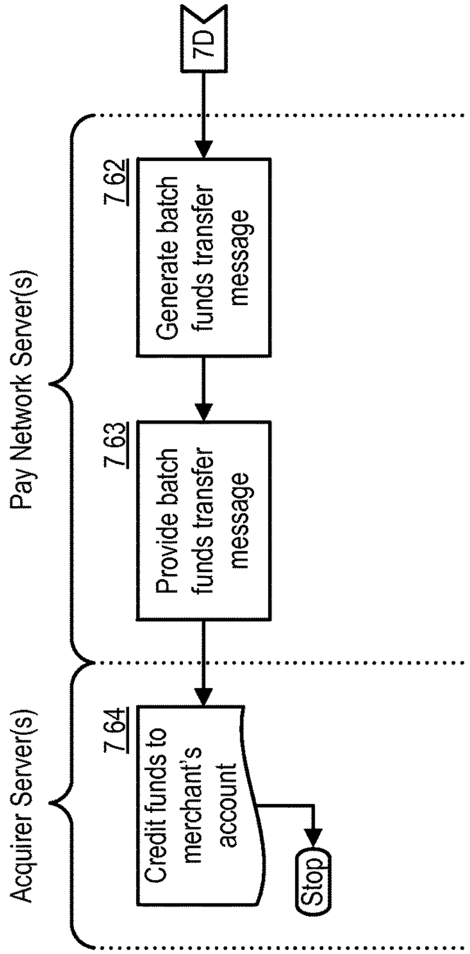

With reference to FIG. 7B, in some implementations, the pay network server may obtain the card authorization request from the acquirer server, and may parse the card authorization request to extract details of the request, e.g., 720. Using the extracted fields and field values, the pay network server may generate a query, e.g., 721-722, for an issuer server corresponding to the user's card account. In response to obtaining the issuer server query the pay network database may provide, e.g., 722, the requested issuer server data to the pay network server. In some implementations, the pay network server may utilize the issuer server data to generate a forwarding card authorization request, e.g., 723, to redirect the card authorization request from the acquirer server to the issuer server. The pay network server may provide the card authorization request to the issuer server. In some implementations, the issuer server may parse, e.g., 724, the card authorization request, and based on the request details may query a database, e.g., 725, for data of the user's card account. In response, the database may provide the requested user data. On obtaining the user data, the issuer server may determine whether the user can pay for the transaction using funds available in the account, e.g., 726. For example, the issuer server may determine whether the user has a sufficient balance remaining in the account, sufficient credit associated with the account, and/or the like, but comparing the data from the database with the transaction cost obtained from the card authorization request. If the issuer server determines that the user can pay for the transaction using the funds available in the account, the server may provide an authorization message, e.g., 727, to the pay network server.

In some implementations, the pay network server may obtain the authorization message, and parse the message to extract authorization details. Upon determining that the user possesses sufficient funds for the transaction (e.g., 730, option "Yes"), the pay network server may extract the transaction card from the authorization message and/or card authorization request, e.g., 733, and generate a transaction data record using the card transaction details. The pay network server may provide the transaction data record for storage, e.g., 734, to a database. In some implementations, the pay network server may forward the authorization message, e.g., 735, to the acquirer server, which may in turn forward the authorization message, e.g., 736, to the merchant server. The merchant may obtain the authorization message, and parse the authorization message to extract its contents, e.g., 737. The merchant server may determine whether the user possesses sufficient funds in the card account to conduct the transaction. If the merchant server determines that the user possess sufficient funds, e.g., 738, option "Yes," the merchant server may add the record of the transaction for the user to a batch of transaction data relating to authorized transactions, e.g., 739-740. The merchant server may also generate a purchase receipt, e.g., 741, for the user. If the merchant server determines that the user does not possess sufficient funds, e.g., 738, option "No," the merchant server may generate an "authorization fail" message, e.g., 742. The merchant server may provide the purchase receipt or the "authorization fail" message to the client. The client may render and display, e.g., 743, the purchase receipt for the user.

In some implementations, the merchant server may initiate clearance of a batch of authorized transactions by generating a batch data request, e.g., 744, and providing the request to a database. In response to the batch data request, the database may provide the requested batch data, e.g., 745, to the merchant server. The server may generate a batch clearance request, e.g., 746, using the batch data obtained from the database, and provide the batch clearance request to an acquirer server. The acquirer server may generate, e.g., 748, a batch payment request using the obtained batch clearance request, and provide the batch payment request to a pay network server. The pay network server may parse, e.g., 749, the batch payment request, select a transaction stored within the batch data, e.g., 750, and extract the transaction data for the transaction stored in the batch payment request, e.g., 751. The pay network server may generate a transaction data record, e.g., 752, and store the transaction data, e.g., 753, the transaction in a database. For the extracted transaction, the pay network server may generate an issuer server query, e.g., 754, for an address of an issuer server maintaining the account of the user requesting the transaction. The pay network server may provide the query to a database. In response, the database may provide the issuer server data requested by the pay network server, e.g., 755. The pay network server may generate an individual payment request, e.g., 756, for the transaction for which it has extracted transaction data, and provide the individual payment request to the issuer server using the issuer server data from the database.

In some implementations, the issuer server may obtain the individual payment request, and parse, e.g., 757, the individual payment request to extract details of the request. Based on the extracted data, the issuer server may generate a payment command, e.g., 758. For example, the issuer server may issue a command to deduct funds from the user's account (or add a charge to the user's credit card account). The issuer server may issue a payment command, e.g., 759, to a database storing the user's account information. In response, the database may update a data record corresponding to the user's account to reflect the debit/charge made to the user's account. The issuer server may provide a funds transfer message, e.g., 760, to the pay network server after the payment command has been executed by the database.

In some implementations, the pay network server may check whether there are additional transactions in the batch that need to be cleared and funded. If there are additional transactions, e.g., 761, option "Yes," the pay network server may process each transaction according to the procedure described above. The pay network server may generate, e.g., 762, an aggregated funds transfer message reflecting transfer of all transactions in the batch, and provide, e.g., 763, the funds transfer message to the acquirer server. The acquirer server may, in response, transfer the funds specified in the funds transfer message to an account of the merchant, e.g., 764.

Figure 8:
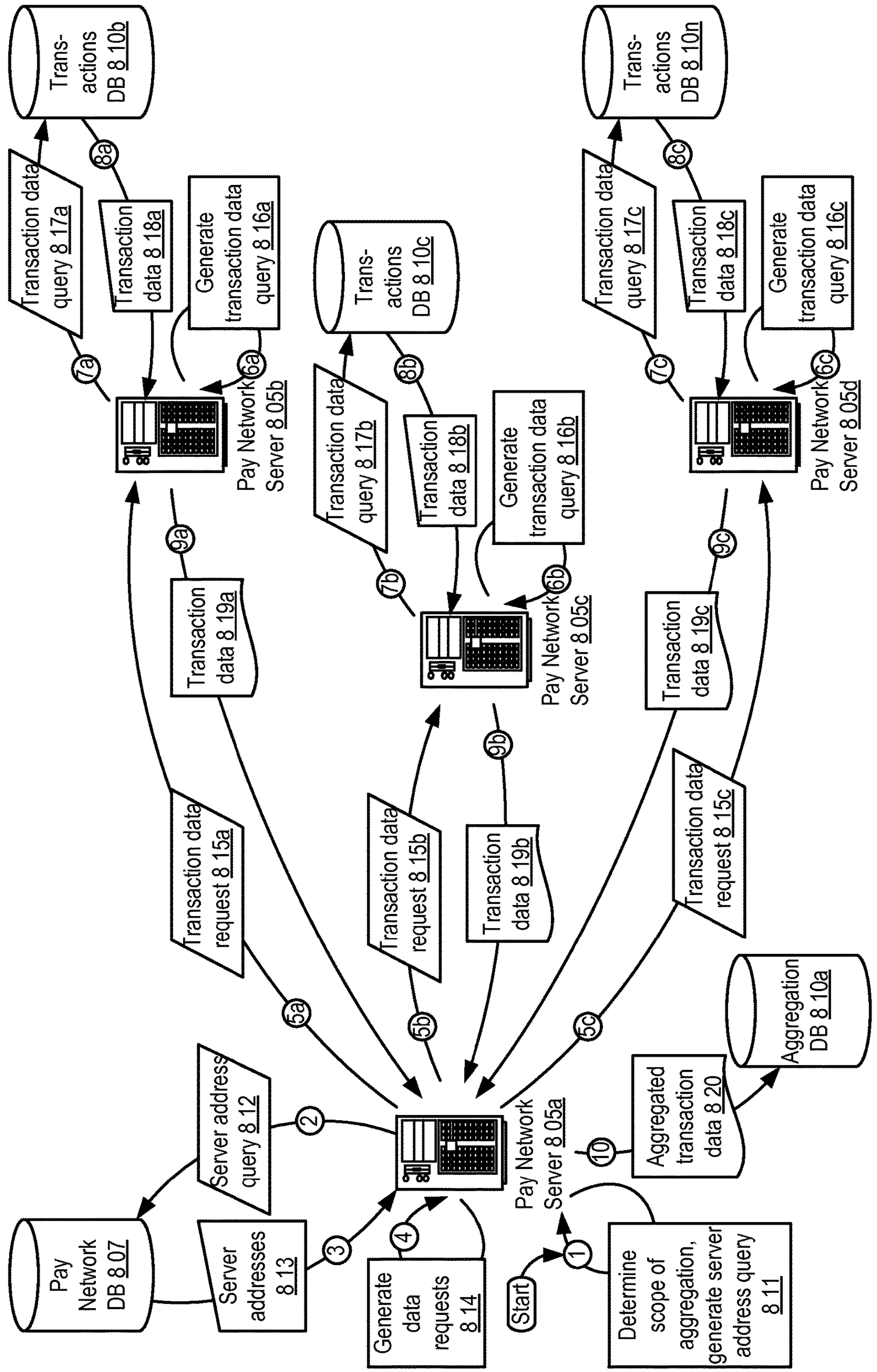
FIG. 8 shows a data flow diagram illustrating an example procedure to aggregate card-based transaction data in some embodiments of the CPDB.

FIG. 8 shows a data flow diagram illustrating an example procedure to aggregate card-based transaction data in some embodiments of the CPDB. In some implementations, the pay network server may determine a scope of data aggregation required to perform the analysis, e.g., 811. The pay network server may initiate data aggregation based on the determined scope. The pay network server may generate a query for addresses of server storing transaction data within the determined scope. The pay network server may query, e.g., 812, a pay network database, e.g., 807*a*, for addresses of pay network servers that may have stored transaction data within the determined scope of the data aggregation. For example, the pay network server may utilize PHP/SQL commands similar to the examples provided above. The database may provide, e.g., 813, a list of server addresses in response to the pay network server's query. Based on the list of server addresses, the pay network server may generate transaction data requests, e.g., 814. The pay network server may issue the generated transaction data requests, e.g., 815*a-c*, to the other pay network servers, e.g., 805*b-d*. The other pay network servers may query, e.g., 817*a-c*, their pay network database, e.g., 807*a-d*, for transaction data falling within the scope of the transaction data requests. In response to the transaction data queries, the pay network databases may provide transaction data, e.g., 818*a-c*, to the other pay network servers. The other pay network servers may return the transaction data obtained from the pay network databases, e.g., 819*a-c*, to the pay network server making the transaction data requests, e.g., 805*a*. The pay network server, e.g., 805*a*, may store the aggregated transaction data, e.g., 820, in an aggregated transactions database, e.g., 810*a*.

Figure 9:
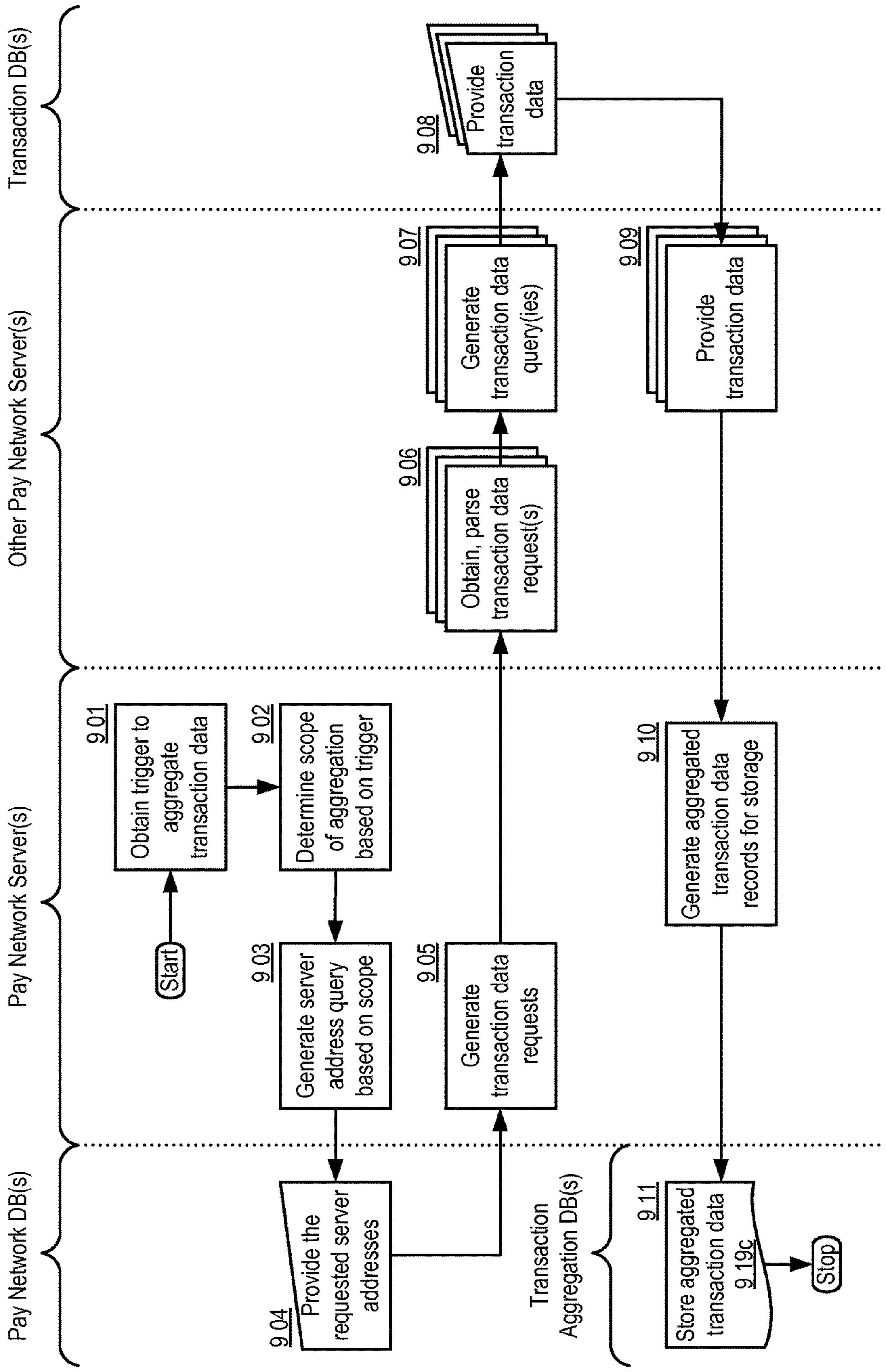
FIG. 9 shows a logic flow diagram illustrating example aspects of aggregating card-based transaction data in some embodiments of the CPDB, e.g., a Transaction Data Aggregation ("TDA") component 900.

FIG. 9 shows a logic flow diagram illustrating example aspects of aggregating card-based transaction data in some embodiments of the CPDB, e.g., a Transaction Data Aggregation ("TDA") component 900. In some implementations, a pay network server may obtain a trigger to aggregate transaction data, e.g., 901. For example, the server may be configured to initiate transaction data aggregation on a regular, periodic, basis (e.g., hourly, daily, weekly, monthly, quarterly, semi-annually, annually, etc.). As another example, the server may be configured to initiate transaction data aggregation on obtaining information that the U.S. Government (e.g., Department of Commerce, Office of Management and Budget, etc.) has released new statistical data related to the U.S. business economy. As another example, the server may be configured to initiate transaction data aggregation on-demand, upon obtaining a user investment strategy analysis request for processing. The pay network server may determine a scope of data aggregation required to perform the analysis, e.g., 902. For example, the scope of data aggregation may be pre-determined. As another example, the scope of data aggregation may be determined based on a received user investment strategy analysis request. The pay network server may initiate data aggregation based on the determined scope. The pay network server may generate a query for addresses of server storing transaction data within the determined scope, e.g., 903. The pay network server may query a database for addresses of pay network servers that may have stored transaction data within the determined scope of the data aggregation. The database may provide, e.g., 904, a list of server addresses in response to the pay network server's query. Based on the list of server addresses, the pay network server may generate transaction data requests, e.g., 905. The pay network server may issue the generated transaction data requests to the other pay network servers. The other pay network servers may obtain and parse the transaction data requests, e.g., 906. Based on parsing the data requests, the other pay network servers may generate transaction data queries, e.g., 907, and provide the transaction data queries to their pay network databases. In response to the transaction data queries, the pay network databases may provide transaction data, e.g., 908, to the other pay network servers. The other pay network servers may return, e.g., 909, the transaction data obtained from the pay network databases to the pay network server making the transaction data requests. The pay network server may generate aggregated transaction data records from the transaction data received from the other pay network servers, e.g., 910, and store the aggregated transaction data in a database, e.g., 911.

Figure 10:
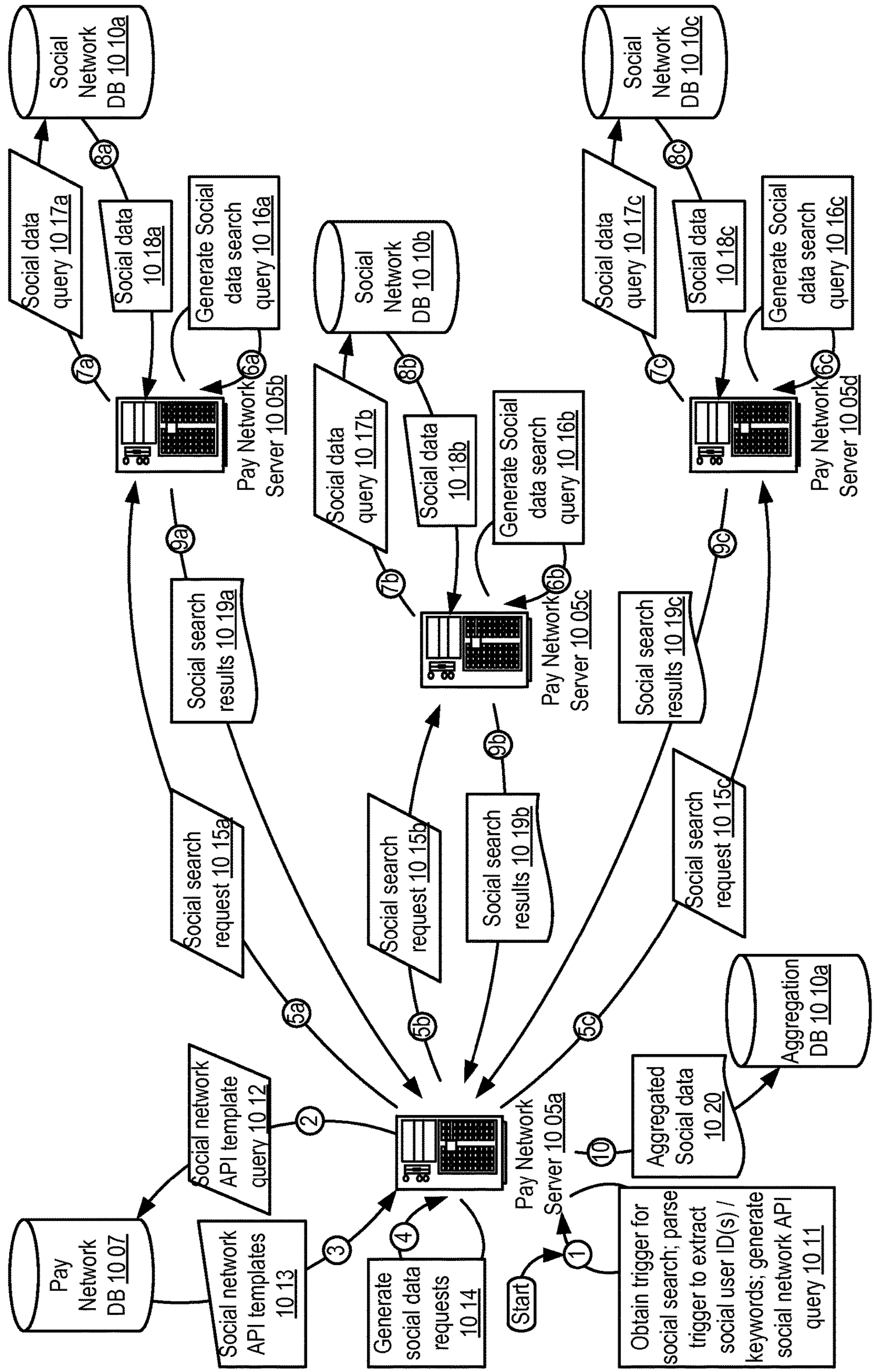
FIG. 10 shows a data flow diagram illustrating an example social data aggregation procedure in some embodiments of the CPDB.

FIG. 10 shows a data flow diagram illustrating an example social data aggregation procedure in some embodiments of the CPDB. In some implementations, the pay network server may obtain a trigger to perform a social data search. For example, the pay network server may periodically perform an update of its aggregated social database, e.g., 1010, with new information available from a variety of sources, such as the social networking services operating on the Internet. As another example, a request for on-demand social data update may be obtained as a result of a user wishing to enroll in a service, for which the pay network server may facilitate data entry by providing an automated web form filling system using information about the user obtained from the social data update. In some implementations, the pay network server may parse the trigger to extract keywords using which to perform an aggregated social data update. The pay network server may generate a query for application programming interface (API) templates for various social networking services (e.g., Facebook®, Twitter™, etc.) from which to collect social data for aggregation. The pay network server may query, e.g., 1012, a pay network database, e.g., 1007, for social network API templates for the social networking services. For example, the pay network server may utilize PHP/SQL commands similar to the examples provided above. The database may provide, e.g., 1013, a list of API templates in response. Based on the list of API templates, the pay network server may generate social data requests, e.g., 1014. The pay network server may issue the generated social data requests, e.g., 1015*a-c*, to the social network servers, e.g., 1001*a-c*. For example, the pay network server may issue PHP commands to request the social network servers for social data. An example listing of commands to issue social data requests 1015*a-c*, substantially in the form of PHP commands, is provided below:

```
<?PHP
header('Content-Type: text/plain');
// Obtain user ID(s) of friends of the logged-in user
$friends = json_decode(file_get_contents
('https://graph.facebook.com/me/friends?access
token='$cookie['oauth_access_token']), true);
$friend_ids = array_keys($friends);
// Obtain message feed associated with the profile of the logged-in user
$feed =
json_decode(file_get_contents('https:llgraph.facebook.com/me/feed?
access_token='$cookie['oauth_access_token']), true);
// Obtain messages by the user's friends
$result = mysql_query('SELECT * FROM content WHERE uid IN ('
.implode($friend_ids, ',') . ')');
$friend_content = array( );
while ($row = mysql_fetch_assoc($result))
$friend_content [ ] $row;
?>
```

In some embodiments, the social network servers may query, e.g., 1017*a-c*, their databases, e.g., 1002*a-c*, for social data results falling within the scope of the social keywords. In response to the queries, the databases may provide social data, e.g., 1018*a-c*, to the search engine servers. The social network servers may return the social data obtained from the databases, e.g., 1019*a-c*, to the pay network server making the social data requests. An example listing of social data 1019*a-c*, substantially in the form of JavaScript Object Notation (JSON)-formatted data, is provided below:

```
[ "data": [
    {  "name": "Tabatha Orloff",
       "id": "483722"},
    {  "name": "Darren Kinnaman",
       "id": "86S743"},
    {  "name": "Sharron Jutras",
       "id": "O91274"}
] }
```

In some embodiments, the pay network server may store the aggregated search results, e.g., 1020, in an aggregated search database, e.g., 1010*a*.

Figure 11:
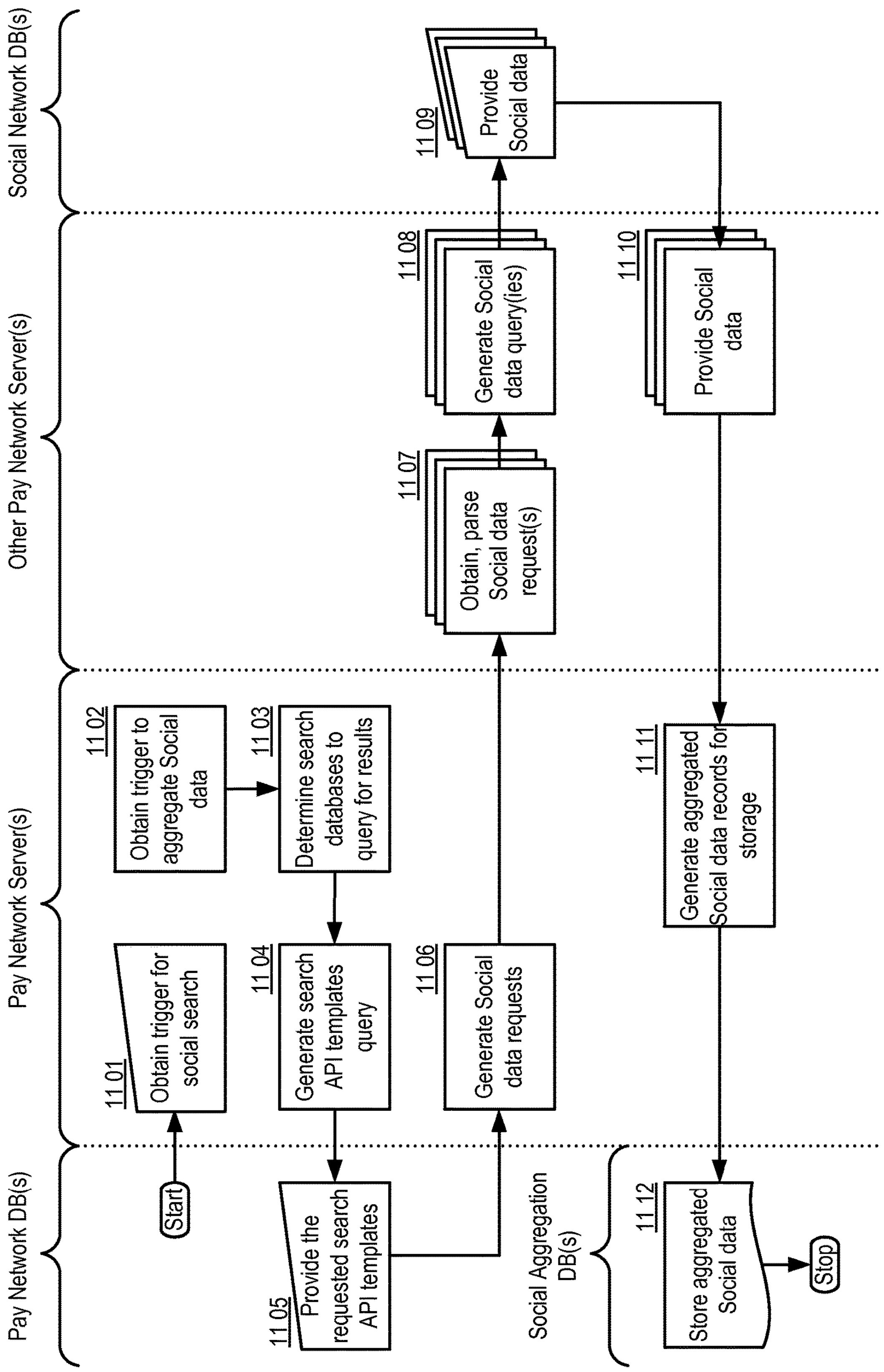
FIG. 11 shows a logic flow diagram illustrating example aspects of aggregating social data in some embodiments of the CPDB, e.g., a Social Data Aggregation ("SDA") component 1100.

FIG. 11 shows a logic flow diagram illustrating example aspects of aggregating social data in some embodiments of the CPDB, e.g., a Social Data Aggregation ("SDA") component 1100. In some implementations, the pay network server may obtain a trigger to perform a social search, e.g., 1101. For example, the pay network server may periodically perform an update of its aggregated social database with new information available from a variety of sources, such as the Internet. As another example, a request for on-demand social data update may be obtained as a result of a user wishing to enroll in a service, for which the pay network server may facilitate data entry by providing an automated web form filling system using information about the user obtained from the social data update. In some implementations, the pay network server may parse the trigger, e.g., 1102, to extract keywords and/or user_ID(s) using which to perform an aggregated search for social data. The pay network server may determine the social networking services to search, e.g., 1103, using the extracted keywords and/or user_ID(s). Then, the pay network server may generate a query for application programming interface (API) templates for the various social networking services (e.g., Facebook®, Twitter™, etc.) from which to collect social data for aggregation, e.g., 1104. The pay network server may query, e.g., 1105, a pay network database for search API templates for the social networking services. For example, the pay network server may utilize PHP/SQL commands similar to the examples provided above. The database may provide, e.g., 1105, a list of API templates in response. Based on the list of API templates, the pay network server may generate social data requests, e.g., 1106. The pay network server may issue the generated social data requests to the social networking services. The social network servers may parse the obtained search results(s), e.g., 1107, and query, e.g., 1108, their databases for social data falling within the scope of the search keywords. In response to the social data queries, the databases may provide social data, e.g., 1109, to the social networking servers. The social networking servers may return the social data obtained from the databases, e.g., 1110, to the pay network server making the social data requests. The pay network server may generate, e.g., 1111, and store the aggregated social data, e.g., 1112, in an aggregated social database.

Figure 12:
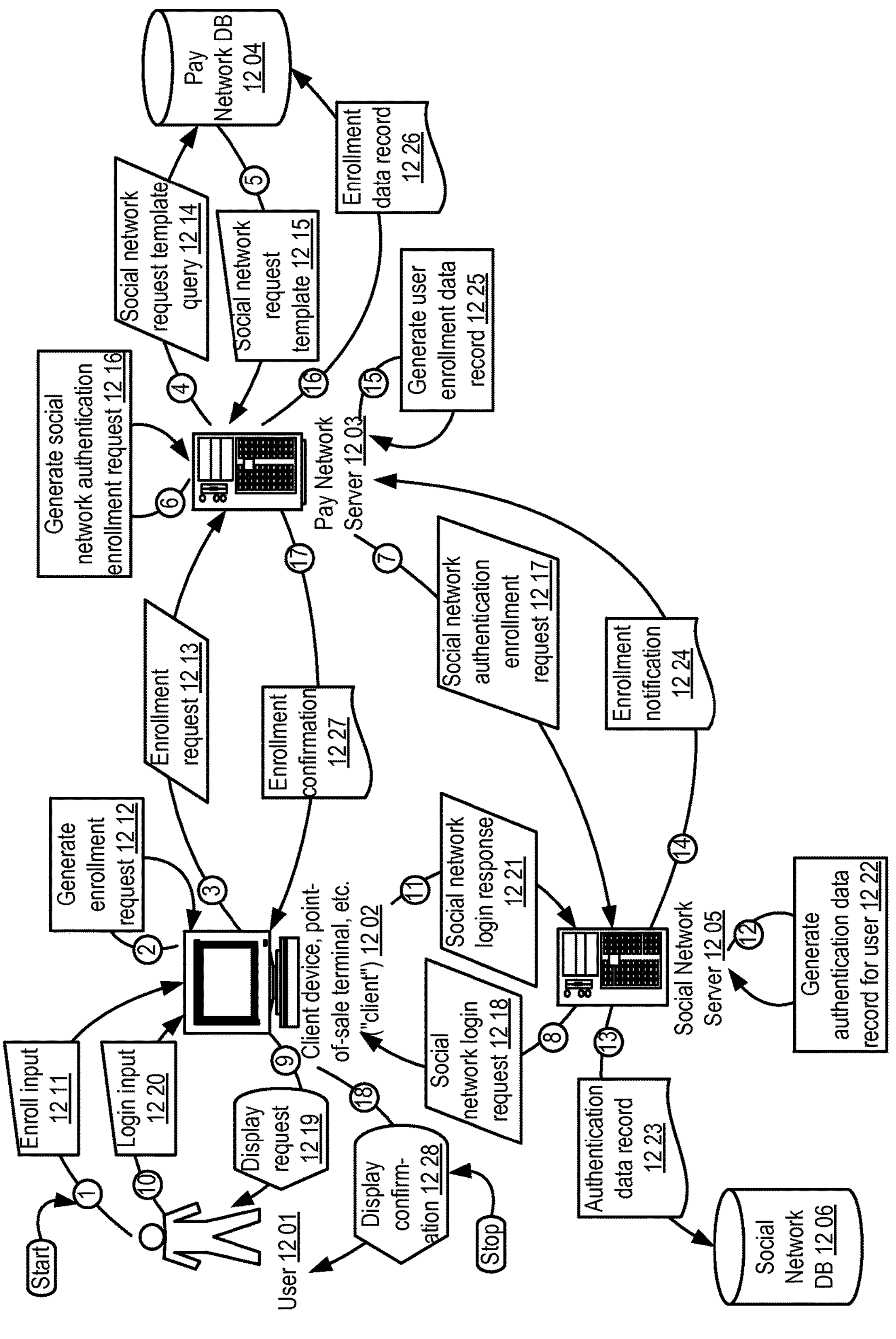
FIG. 12 shows a data flow diagram illustrating an example procedure for enrollment in value-add services in some embodiments of the CPDB.

FIG. 12 shows a data flow diagram illustrating an example procedure for enrollment in value-add services in some embodiments of the CPDB. In some implementations, a user, e.g., 1201, may desire to enroll in a value-added service. Let us consider an example wherein the user desires to enroll in social network authenticated purchase payment as a value-added service. It is to be understood that any other value-added service may take the place of the below-described value-added service. The user may communicate with a pay network server, e.g., 1203, via a client such as, but not limited to: a personal computer, mobile device, television, point-of-sale terminal, kiosk, ATM, and/or the like (e.g., 1202). For example, the user may provide user input, e.g., enroll input 1211, into the client indicating the user's desire to enroll in social network authenticated purchase payment. In various implementations, the user input may include, but not be limited to: a single tap (e.g., a one-tap mobile app purchasing embodiment) of a touch-screen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. For example, the user may swipe a payment card at the client 1202. In some implementations, the client may obtain track 1 data from the user's card as enroll input 1211 (e.g., credit card, debit card, prepaid card, charge card, etc.), such as the example track 1 data provided below:

% B123456789012345^PUBLIC/J.Q.^99011200000000000000901****?*

(wherein '123456789012345' is the card number of 'J.Q. Public' and has a CVV number of 901. '990112' is a service code, and *** represents decimal digits which change randomly each time the card is used.)

In some implementations, using the user's input, the client may generate an enrollment request, e.g., 1212, and provide the enrollment request, e.g., 1213, to the pay network server. For example, the client may provide a (Secure) Hypertext Transfer Protocol ("HTTP(S)") POST message including data formatted according to the eXtensible Markup Language ("XML"). Below is an example HTTP(S) POST message including an XML-formatted enrollment request for the pay network server:

```
POST /enroll.php HTTP/1.1
Host: www.merchant.com
Content-Type: Application/XML
Content-Length: 718
<?XML version = "1.0" encoding = "UTF-8"?>
<enrollment_request>
    <cart_ID>4NFU4RG94</order_ID>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <!--account_params> <optional>
        <account_name>John Q. Public</account_name>
        <account_type>credit</account_type>
        <account_num>123456789012345</account_num>
        <billing_address>123 Green St., Norman, OK
98765</billing_address>
        <phone>123-456-7809</phone>
        <sign>/jqp/</sign>
        <confirm_type>email</confirm_type>
        <contact_info>john.q.public@gmail.com</contact_info>
    </account_params-->
    <checkout_purchase_details>
        <num_products>1</num_products>
        <product>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </checkout_purchase_details>
</enrollment_request>
```

In some implementations, the pay network server may obtain the enrollment request from the client, and extract the user's payment detail (e.g., XML data) from the enrollment request. For example, the pay network server may utilize a parser such as the example parsers described below in the discussion with reference to FIG. 49. In some implementations, the pay network server may query, e.g., 1214, a pay network database, e.g., 1204, to obtain a social network request template, e.g., 1215, to process the enrollment request. The social network request template may include instructions, data, login URL, login API call template and/or the like for facilitating social network authentication. For example, the database may be a relational database responsive to Structured Query Language ("SQL") commands. The merchant server may execute a hypertext preprocessor ("PHP") script including SQL commands to query the database for product data. An example PHP/SQL command listing, illustrating substantive aspects of querying the database, e.g., 1214-1215, is provided below:

```
<?PHP
header('Content-Type: text/plain');
mysql_connect("254.93.179.112",$DBserver,$password); // access
database server
mysql_select_db("SOCIALAUTH.SQL"); // select database table to
search
//create query
$query = "SELECT template FROM EnrollTable WHERE network
LIKE '%'
$socialnet";
$result = mysql_query($query); // perform the search query
mysql_close("SOCIALAUTH.SQL"); // close database access
?>
```

In some implementations, the pay network server may redirect the client to a social network server by providing a HTTP(S) REDIRECT 300 message, similar to the example below:

```
HTTP/1.1 300 Multiple Choices
Location:
https://www.facebook.com/dialog/oauth?client_id=snpa_app_ID&
redirect_uri=www.paynetwork.com/enroll.php
<html>
    <head><title>300 Multiple Choices</title></head>
    <body><h1>Multiple Choices</h1></body>
</html>
```

In some implementations, the pay network server may provide payment information extracted from the card authorization request to the social network server as part of a social network authentication enrollment request, e.g., 1217. For example, the pay network server may provide a HTTP(S) POST message to the social network server, similar to the example below:

```
POST /authenticate_enroll.php HTTP/1.1
Host: www.socialnet.com
Content-Type: Application/XML
Content-Length: 1306
<?XML version = "1.0" encoding = "UTF-8"?>
<authenticate_enrollment_request>
    <request_ID>4NFU4RG94</order_ID>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <account_params>
        <account_name>John Q. Public</account_name>
        <account_type>credit</account_type>
        <account_num>123456789012345</account_num>
        <billing_address>123 Green St., Norman, OK
98765</billing_address>
        <phone>123-456-7809</phone>
        <sign>/jqp/</sign>
        <confirm_type>email</confirm_type>
    <contact_info>john.q.public@gmail.com</contact_info>
    </account_params>
</authenticate_enrollment_request>
```

In some implementations, the social network server may provide a social network login request, e.g., 1218, to the client. For example, the social network server may provide a HTML input form to the client. The client may display, e.g., 1219, the login form for the user. In some implementations, the user may provide login input into the client, e.g., 1220, and the client may generate a social network login response, e.g., 1221, for the social network server. In some implementations, the social network server may authenticate the login credentials of the user, and access payment account information of the user stored within the social network, e.g., in a social network database. Upon authentication, the social network server may generate an authentication data record for the user, e.g., 1222, and provide an enrollment notification, e.g., 1224, to the pay network server. For example, the social network server may provide a HTTP(S) POST message similar to the example below:

```
POST /enrollnotification.php HTTP/1.1
Host: www.paynet.com
Content-Type: Application/XML
Content-Length: 1306
<?XML version = "1.0" encoding = "UTF-8"?>
<enroll_notification>
    <request_ID>4NFU4RG94</order_ID>
    <timestamp>2011-02-22 15:22:43</timestamp>
    <result>enrolled</result>
</enroll_notification>
```

Upon receiving notification of enrollment from the social network server, the pay network server may generate, e.g., 1225, a user enrollment data record, and store the enrollment data record in a pay network database, e.g., 1226, to complete enrollment. In some implementations, the enrollment data record may include the information from the enrollment notification 1224.

Figure 13:
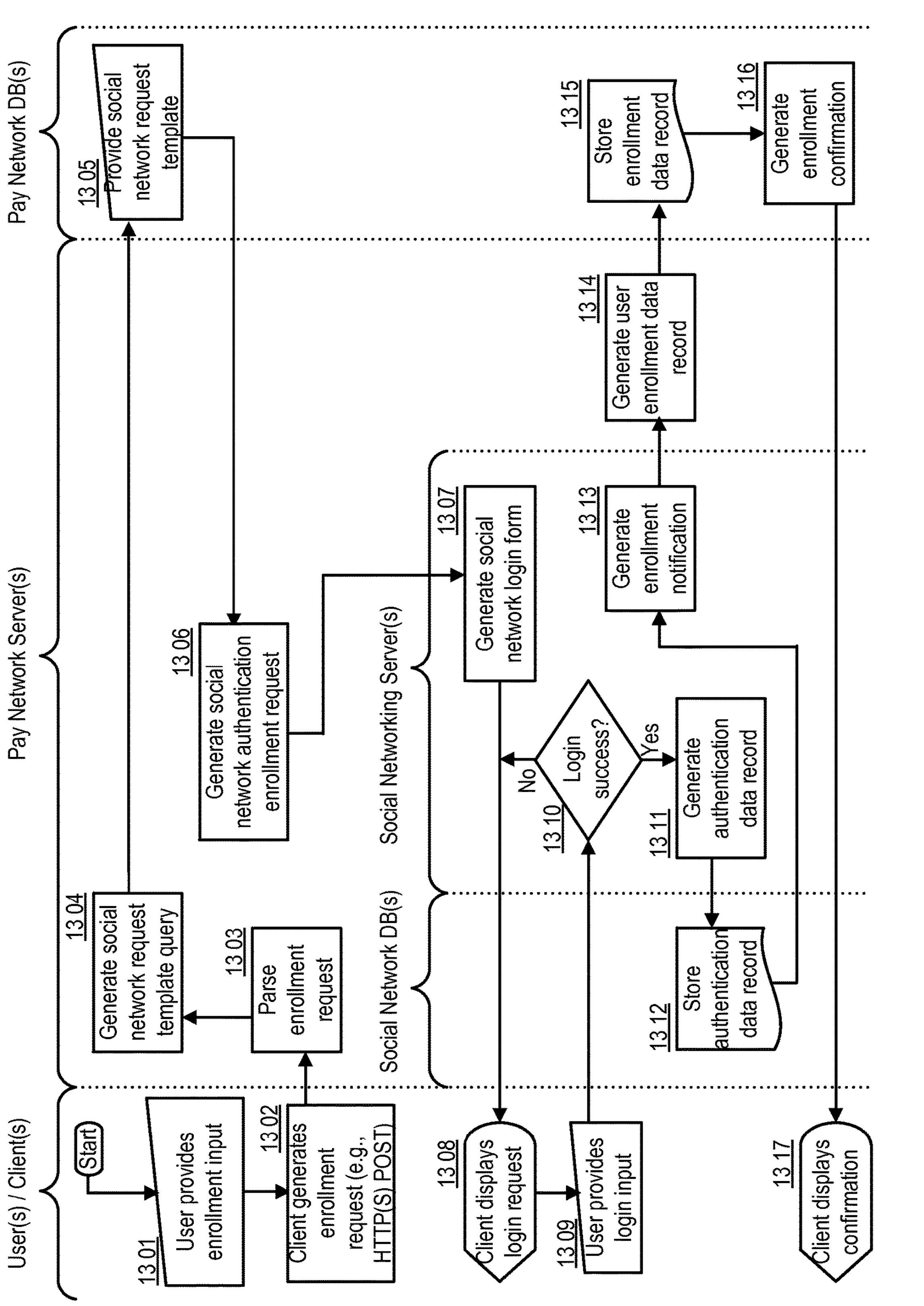
FIG. 13 shows a logic flow diagram illustrating example aspects of social network payment authentication enrollment in some embodiments of the CPDB, e.g., a Value-Add Service Enrollment ("VASE") component 1300.

FIG. 13 shows a logic flow diagram illustrating example aspects of enrollment in a value-added service in some embodiments of the CPDB, e.g., a Value-Add Service Enrollment ("VASE") component 1300. In some implementations, a user, e.g., 1201, may desire to enroll in a value-added service. Let us consider an example wherein the user desires to enroll in social network authenticated purchase payment as a value-added service. It is to be understood that any other value-added service may take the place of the below-described value-added service. The user may communicate with a pay network server via a client. For example, the user may provide user input, e.g., 1301, into the client indicating the user's desire to enroll in social network authenticated purchase payment. In various implementations, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some implementations, using the user's input, the client may generate an enrollment request, e.g., 1302, and provide the enrollment request to the pay network server. In some implementations, the CPDB may provide an enrollment button which may take the user to an enrollment webpage where account info may be entered into web form fields. In some implementations, the pay network server may obtain the enrollment request from the client, and extract the user's payment detail from the enrollment request. For example, the pay network server may utilize a parser such as the example parsers described below in the discussion with reference to FIG. 49. In some implementations, the pay network server may query, e.g., 1304, a pay network database to obtain a social network request template, e.g., 1305, to process the enrollment request. The social network request template may include instructions, data, login URL, login API call template and/or the like for facilitating social network authentication. In some implementations, the pay network server may provide payment information extracted from the card authorization request to the social network server as part of a social network authentication enrollment request, e.g., 1306. In some implementations, the social network server may provide a social network login request, e.g., 1307, to the client. For example, the social network server may provide a HTML input form to the client. The client may display, e.g., 1308, the login form for the user. In some implementations, the user may provide login input into the client, e.g., 1309, and the client may generate a social network login response for the social network server. In some implementations, the social network server may authenticate the login credentials of the user, and access payment account information of the user stored within the social network, e.g., in a social network database. Upon authentication, the social network server may generate an authentication data record for the user, e.g., 1311, and provide an enrollment notification to the pay network server, e.g., 1313. Upon receiving notification of enrollment from the social network server, the pay network server may generate, e.g., 1314, a user enrollment data record, and store the enrollment data record in a pay network database, e.g., 1315, to complete enrollment. The pay network server may provide an enrollment confirmation, and provide the enrollment confirmation to the client, which may display, e.g., 1317, the confirmation for the user.

FIGS. 14A-B show flow diagrams illustrating example aspects of normalizing aggregated search, enrolled, service usage, transaction and/or other aggregated data into a standardized data format in some embodiments of the CPDB, e.g., a Aggregated Data Record Normalization ("ADRN") component 1400. With reference to FIG. 14A, in some implementations, a pay network server ("server") may attempt to convert any aggregated data records stored in an aggregated records database it has access to in a normalized data format. For example, the database may have a transaction data record template with predetermined, standard fields that may store data in pre-defined formats (e.g., long integer/double float/4 digits of precision, etc.) in a predetermined data structure. A sample XML transaction data record template is provided below:

```
<?XML version = "1.0" encoding = "UTF-8"?>
<transaction_record>
        <record_ID>00000000</record_ID>
        <norm_flag>false</norm_flag>
        <timestamp>yyyy-mm-dd hh:mm:ss</timestamp>
        <transaction_cost>$0,000,000,00</transaction_cost>
        <merchant_params>
            <merchant_id>00000000</merchant_id>
            <merchant_name>TBD</merchant_name>
        <merchant_auth_key>0000000000000000
        </merchant_auth_key>
        </merchant_params>
        <merchant_products>
            <num_products>000</num_products>
            <product>
                <product_type>TBD</product_type>
                <product_name>TBD</product_name>
                <class_labels_list>TBD<class_labels_list>
                <product_quantity>000</product_quantity>
                <unit_value>$0,000,000.00</unit_value>
                <sub_total>$0,000,000.00</sub_total>
                <comment>normalized transaction data record
template</comment>
            </product>
        </merchant_products>
```

-continued

```
        <user_account_params>
            <account_name>JTBD</account_name>
            <account_type>TBD</account_type>
            <account_num>0000000000000000</account_num>
            <billing_line1>TBD</billing_line1>
            <billing_line2>TBD</billing_line2>
            <zipcode>TBD</zipcode>
            <state>TBD</state>
            <country>TBD</country>
            <phone>00-00-000-000-0000</phone>
            <sign>TBD</sign>
        </user_account_params>
    </transaction_record>
```

In other embodiments, the transaction data record template may contain integrated logic, regular expressions, executable meta-commands, language commands and/or the like in order to facilitate properly matching aggregated data with the location and format of the data in the template. In some embodiments, the template may contain logic in a non-template language, such as PHP commands being included in an XML file. As such, in one example, a language key may be used by the template (e.g., "php: <command>", "java:<function>", and/or the like). In so doing, the matching template may match a vast array of disparate data formats down into a normalized and standardized format. An example transaction data template record substantially in the form of XML is as follows:

```
<?XML version = "1.0" encoding = "UTF-8"?>
<transaction_record>
    <record_ID
  default_value=false_return_error
  match_length=8
  format=integer
  regex_search="(?<=\s|^)\d+(?=\s|$)"
  start_search_offset="50bytes">00000000</record_ID>
    <norm_flag>false</norm_flag>
    <timestamp
  default_value="MySQL:'NOW( )'"
  format_after_matching="php:mktime($value);">
    yyyy-mm-dd hh:mm:ss</timestamp>
    <transaction_cost>$0,000,000,00</transaction_cost>
    <merchant_params>
        <merch_id>00000000</merch_id>
        <merch_name>TBD</merch_name>
        <merch_auth_key>0000000000000000</merch_auth_key>
    </merchant_params>
    <merchant_products>
        <num_products
    min_quantity=1
    max_quantity=30>000</num_products>
        <product>
        <product_type
 from_group="array('BOOK','CD','DVD')">
  TBD</product_type>
        <product_name>TBD</product_name>
        <class_labels_list>TBD<class_labels_list>
        <product_quantity>000</product_quantity>
        <unit_value>$0,000,000.00</unit_value>
        <sub_total>$0,000,000.00</sub_total>
        <comment>normalized transaction data record
template</comment>
    </product>
  </merchant_products>
  <user_account_params>
    <account_name>JTBD</account_name>
    <account_type>TBD</account_type>
    <account_num>0000000000000000</account_num>
    <billing_line1>TBD</billing_line1>
    <billing_line2>TBD</billing_line2>
    <zipcode>TBD</zipcode>
    <state>TBD</state>
    <country>TBD</country>
```

-continued

```
        <phone>00-00-000-000-0000</phone>
        <sign>TBD</sign>
    </user_account_params>
</transaction_record>
```

In some implementations, the server may query a database for a normalized data record template, e.g., 1401. The server may parse the normalized data record template, e.g., 1402. In some embodiments, the parsing may parse the raw data record (such as using a parser as described herein and with respect to FIG. 49). In other embodiments, the parser may parse a dictionary entry containing a subset of the complete data. Based on parsing the normalized data record template, the server may determine the data fields included in the normalized data record template, and the format of the data stored in the fields of the data record template, e.g., 1403. The server may obtain transaction data records for normalization. The server may query a database, e.g., 1404, for non-normalized records. In one embodiment, no querying is required as the normalization of records may occur in flight (e.g., in real time as data is received). For example, the server may issue PHP/SQL commands to retrieve records that do not have the 'norm_flag' field from the example template above, or those where the value of the 'norm flag' field is 'false'. Upon obtaining the non-normalized transaction data records, the server may select one of the non-normalized transaction data records, e.g., 1405. The server may parse the non-normalized transaction data record, e.g., 1406, and determine the fields present in the non-normalized transaction data record, e.g., 1407. For example, the server may utilize a procedure similar to one described below with reference to FIG. 15 The server may compare the fields from the non-normalized transaction data record with the fields extracted from the normalized transaction data record template. For example, the server may determine whether the field identifiers of fields in the non-normalized transaction data record match those of the normalized transaction data record template, (e.g., via a dictionary, thesaurus, etc.), are identical, are synonymous, are related, and/or the like. Based on the comparison, the server may generate a 1:1 mapping between fields of the non-normalized transaction data record match those of the normalized transaction data record template, e.g., 1409. The server may generate a copy of the normalized transaction data record template, e.g., 1410, and populate the fields of the template using values from the non-normalized transaction data record, e.g., 1411. The server may also change the value of the 'norm_flag' field to 'true' in the example above. The server may store the populated record in a database (for example, replacing the original version), e.g., 1412. The server may repeat the above procedure for each non-normalized transaction data record (see e.g., 1413), until all the non-normalized transaction data records have been normalized.

With reference to FIG. 14B, in some embodiments, the server may utilize metadata (e.g., easily configurable data) to drive an analytics and rule engine that may convert any structured data into a standardized XML format ("encryptmatics" XML). The encryptmatics XML may then be processed by an encryptmatics engine that is capable of parsing, transforming and analyzing data to generate decisions based on the results of the analysis. Accordingly, in some embodiments, the server may implement a metadata-based interpretation engine that parses structured data, including, but not limited to: web content (see e.g., 1421), graph databases (see e.g., 1422), micro blogs, images or software code (see e.g., 1424), and converts the structured data into commands in the encryptmatics XML file format. For example, the structured data may include, without limitation, software code, images, free text, relational database queries, graph queries, sensory inputs (see e.g., 1423, 1425), and/or the like. A metadata based interpretation engine, e.g., 1426, may populate a data/command object, e.g., 1427, based on a given record using configurable metadata, e.g., 1428. The configurable metadata may define an action for a given glyph or keyword contained within a data record. The engine may then process the object to export its data structure as a collection of encryptmatics vaults in a standard encryptmatics XML file format, e.g., 1429. The encryptmatics XML file may then be processed to provide various features by an encryptmatics engine, e.g., 1430.

In some embodiments, the server may obtain the structured data, and perform a standardization routine using the structured data as input (e.g., including script commands, for illustration). For example, the server may remove extra line breaks, spaces, tab spaces, etc. from the structured data, e.g. 1431. The server may determine and load a metadata library, e.g., 1432, using which the server may parse subroutines or functions within the script, based on the metadata, e.g., 1433-1434. In some embodiments, the server may pre-parse conditional statements based on the metadata, e.g., 1435-1436. The server may also parse data 1437 to populate a data/command object based on the metadata and prior parsing, e.g., 1438. Upon finalizing the data/command object, the server may export 1439 the data/command object as XML in standardized encryptmatics format.

Figure 15:
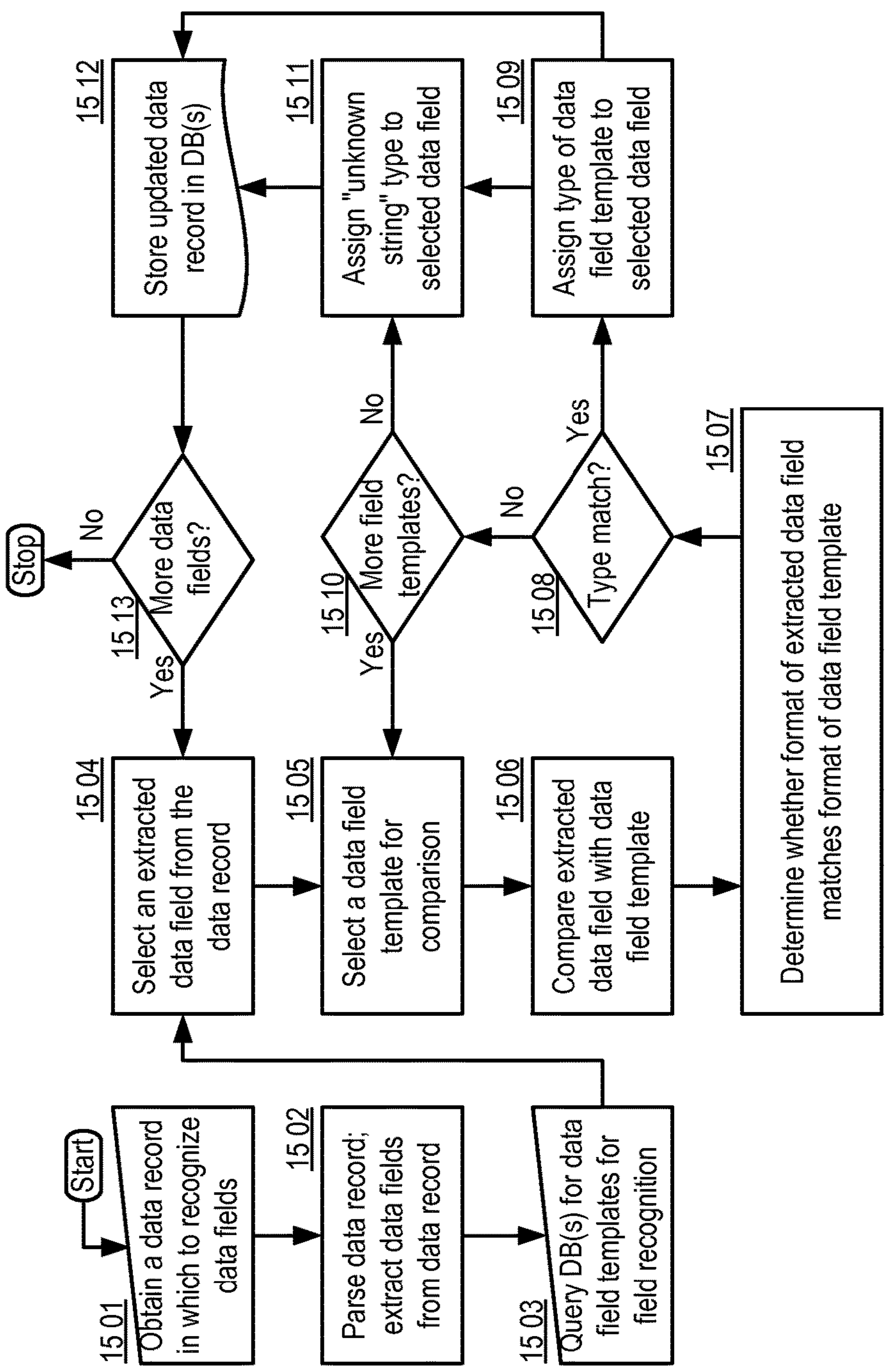
FIG. 15 shows a logic flow diagram illustrating example aspects of recognizing data fields in normalized aggregated data records in some embodiments of the CPDB, e.g., a Data Field Recognition ("DFR") component 1500.

FIG. 15 shows a logic flow diagram illustrating example aspects of recognizing data fields in normalized aggregated data records in some embodiments of the CPDB, e.g., a Data Field Recognition ("DFR") component 1500. In some implementations, a server may recognize the type of data fields included in a data record, e.g., date, address, zipcode, name, user_ID, email address, payment account number (PAN), CVV2 numbers, and/or the like. The server may select an unprocessed data record for processing, e.g., 1501. The server may parse the data record rule, and extract data fields from the data record, e.g., 1502. The server may query a database for data field templates, e.g., 1503. For example, the server may compare the format of the fields from the data record to the data record templates to identify a match between one of the data field templates and each field within the data record, thus identifying the type of each field within the data record. In one embodiment, the data field templates may be implemented as a collection of regular expressions, a set of interpreted or compiled language commands that when run against the candidate match return boolean true or false if the candidate matches, and/or the like. The server may thus select an extracted data field from the data record, e.g., 1504. The server may select a data field template for comparison with the selected data field, e.g., 1505, and compare the data field template with the selected data field, e.g., 1506, to determine whether format of extracted data field matches format of data field template, e.g., 1507. If the format of the selected extracted data field matches the format of the data field template, e.g., 1508, option "Yes," the server may assign the type of data field template to the selected data field, e.g., 1509. If the format of the extracted data field does not match the format of the data field template, e.g., 1508, option "No," the server may try another data field template until no more data field templates are available for comparison, see e.g., 1510. If no match is found, the server may assign "unknown" string as the type of the data field, e.g., 1511. The server may store the updated data record in the database, e.g., 1512. The server may perform such data field recognition for each data field in the data record (and also for each data record in the database), see e.g., 1513.

Figure 16:
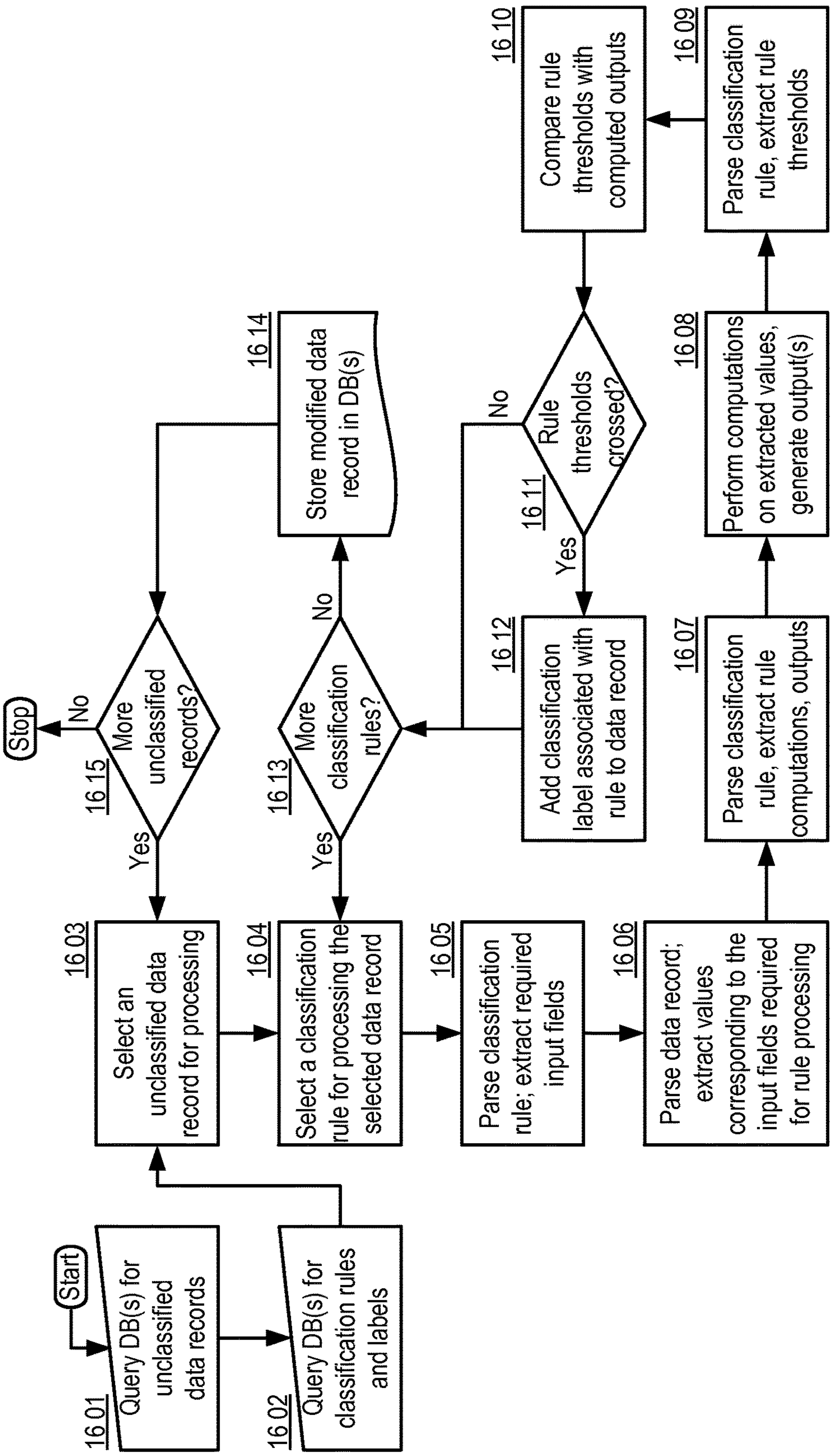
FIG. 16 shows a logic flow diagram illustrating example aspects of classifying entity types in some embodiments of the CPDB, e.g., an Entity Type Classification ("ETC") component 1600.

FIG. 16 shows a logic flow diagram illustrating example aspects of classifying entity types in some embodiments of the CPDB, e.g., an Entity Type Classification ("ETC") component 1600. In some implementations, a server may apply one or more classification labels to each of the data records. For example, the server may classify the data records according to entity type, according to criteria such as, but not limited to: geo-political area, number of items purchased, and/or the like. The server may obtain transactions from a database that are unclassified, e.g., 1601, and obtain rules and labels for classifying the records, e.g., 1602. For example, the database may store classification rules, such as the exemplary illustrative XML-encoded classification rule provided below:

```
<rule>
        <id>PURCHASE_44_45</id>
        <name>Number of purchasers</name>
        <inputs>num_purchasers</inputs>
        <operations>
            <1>label = 'null'</1>
            <2>IF (num_purchasers > 1) label = 'household'</2>
        </operations>
        <outputs>label</outputs>
</rule>
```

The server may select an unclassified data record for processing, e.g., 1603. The server may also select a classification rule for processing the unclassified data record, e.g., 1604. The server may parse the classification rule, and determine the inputs required for the rule, e.g., 1605. Based on parsing the classification rule, the server may parse the normalized data record template, e.g., 1606, and extract the values for the fields required to be provided as inputs to the classification rule. The server may parse the classification rule, and extract the operations to be performed on the inputs provided for the rule processing, e.g., 1607. Upon determining the operations to be performed, the server may perform the rule-specified operations on the inputs provided for the classification rule, e.g., 1608. In some implementations, the rule may provide threshold values. For example, the rule may specify that if the number of products in the transaction, total value of the transaction, average luxury rating of the products sold in the transaction, etc. may need to cross a threshold in order for the label(s) associated with the rule to be applied to the transaction data record. The server may parse the classification rule to extract any threshold values required for the rule to apply, e.g., 1609. The server may compare the computed values with the rule thresholds, e.g., 1610. If the rule threshold(s) is crossed, e.g., 1611, option "Yes," the server may apply one or more labels to the transaction data record as specified by the classification rule, e.g., 1612. For example, the server may apply a classification rule to an individual product within the transaction, and/or to the transaction as a whole. In other embodiments, the rule may specify criteria that may be present in the mesh in order to generate a new entity (e.g., to create a deduced concept or deduced entity). For example, if a given set of mesh aggregated data contain references the a keyword iPhone, a rule may specify that "iPhone" is to be created as a deduced node within the mesh. This may be done in a recursive manner, such as when the creation of the meta-concept of an "iPhone" may subsequently be combined with created meta-concepts of "iMac" and "iPod" in order to create a master deduced concept of "Apple Computer", which is thereafter associated with "iPhone," "iMac," and "iPod". In so doing, the rules may allow the mesh, given the aggregated content available as well as inputs (such as category inputs) to automatically create meta-concepts based on rules that are themselves unaware of the concepts. In one embodiment, a rule for the creation of a meta-concept, substantially in the form of XML is:

```
<rule id="create_deduced_concept_5" type="deduced_concept">
  <criteria>
    <number_keyword_references>
      <is type="greater_than" value="50" />
      <isnot type="greater_than" value="500" />
    </number_keyword_references>
  </criteria>
  <if_criteria_met value="create_entity' />
</rule>
```

In the example above, a new deduced entity may be added to the mesh if the number of other entities referencing a given keyword is greater than 50 but less than 500. In one embodiment, the criteria may be specified as a scalar value as shown above. In other embodiments, the criteria may reference a percentage size of the mesh references (such as greater than 5% but less than 10%). In so doing, entities may be added only when they reach a certain absolute threshold, or alternatively when they reach a threshold with respect to the mesh itself. In other embodiments, the criteria may be a function (such as a Python procedure) that may be performed in order to determine if a new meta-entity should be created. In such an embodiment, the rule may take advantage of any language features available (e.g., language method/functions) as well as external data sources (such as by querying Wikipedia for the presence of a page describing the candidate meta-concept, performing a Google Search and only creating the meta concept if greater than a given number of results are returned, and/or the like). In one embodiment, deduced entries may be created based on a specified or relative frequency of occurrence matches (e.g., keyword matches, transaction occurrences, and/or the like) within a certain time quantum (e.g., 5 orders for an item within a day/week/month, 100 weeks a minute about a topic, and/or the like). Deduced entities may become actual mesh entities (and actual mesh entities may be come deduced entities) through the application of similar rules. For example, if an entity is deduced but subsequently the data aggregation shows a sufficient social media discussion regarding a deduced concept, the concept may be changed from a deduced concept to a mesh concept. In so doing, the mesh can adapt to evolving entities that may initially exist only by virtue of their relationship to other nodes, but may ultimately become concepts that the mesh may assign to actual entities.

In some implementations, the server may process the transaction data record using each rule (see, e.g., 1613). Once all classification rules have been processed for the transaction record, e.g., 1613, option "No," the server may store the transaction data record in a database, e.g., 1614. The server may perform such processing for each transaction data record until all transaction data records have been classified (see, e.g., 1615).

Figure 17:
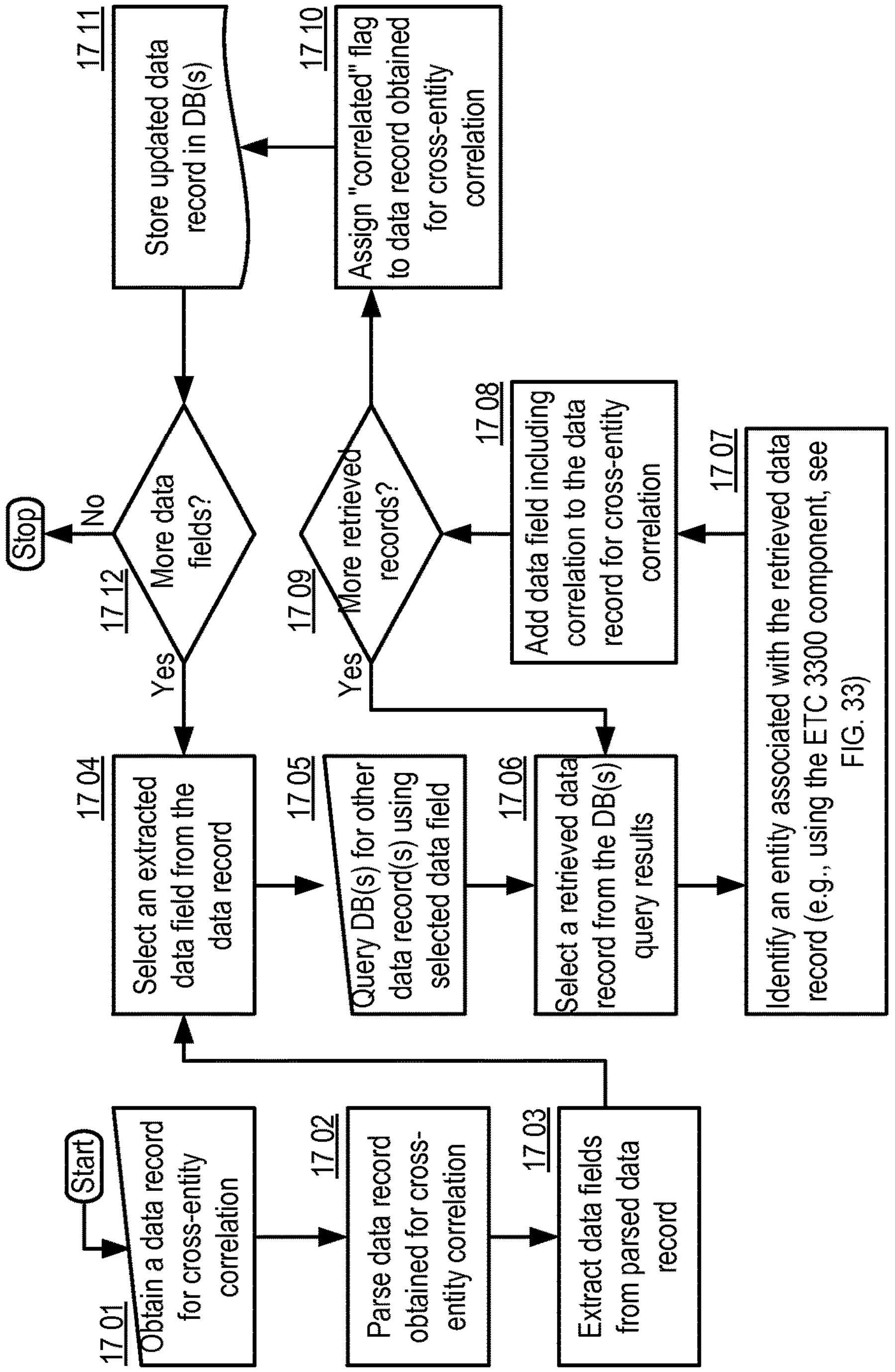
FIG. 17 shows a logic flow diagram illustrating example aspects of identifying cross-entity correlation in some embodiments of the CPDB, e.g., a Cross-Entity Correlation ("CEC") component 1700.

FIG. 17 shows a logic flow diagram illustrating example aspects of identifying cross-entity correlation in some embodiments of the CPDB, e.g., a Cross-Entity Correlation ("CEC") component 1700. In some implementations, a server may recognize that two entities in the CPDB share common or related data fields, e.g., date, address, zipcode, name, user_ID, email address, payment account number (PAN), CVV2 numbers, and/or the like, and thus identify the entities as being correlated. The server may select a data record for cross-entity correlation, e.g., 1701. The server may parse the data record rule, and extract data fields from the data record, e.g., 1702-1703. The server may select an extracted data field from the data record, e.g., 1704, and query a database for other data records having the same data field as the extracted data field, e.g., 1705. From the list of retrieved data records from the database query, the server may select a record for further analysis. The server may identify, e.g., 1707, an entity associated with the retrieved data record, e.g., using the ETC 1600 component discussed above in the description with reference to FIG. 16. The server may add a data field to the data record obtained for cross-entity correlation specifying the correlation to the retrieved selected data record, e.g., 1708. In some embodiments, the server may utilize each data field in the data record obtained for cross-entity correlation to identify correlated entities, see e.g., 1709. The server may add, once complete, a "correlated" flag to the data record obtained for cross-entity correlation, e.g., 1710, e.g., along with as timestamp specifying the time at which the cross-entity correlation was performed. For example, such a timestamp may be used to determine at a later time whether the data record should be processed again for cross-entity correlation. The server may store the updated data record in a database.

Figure 18:
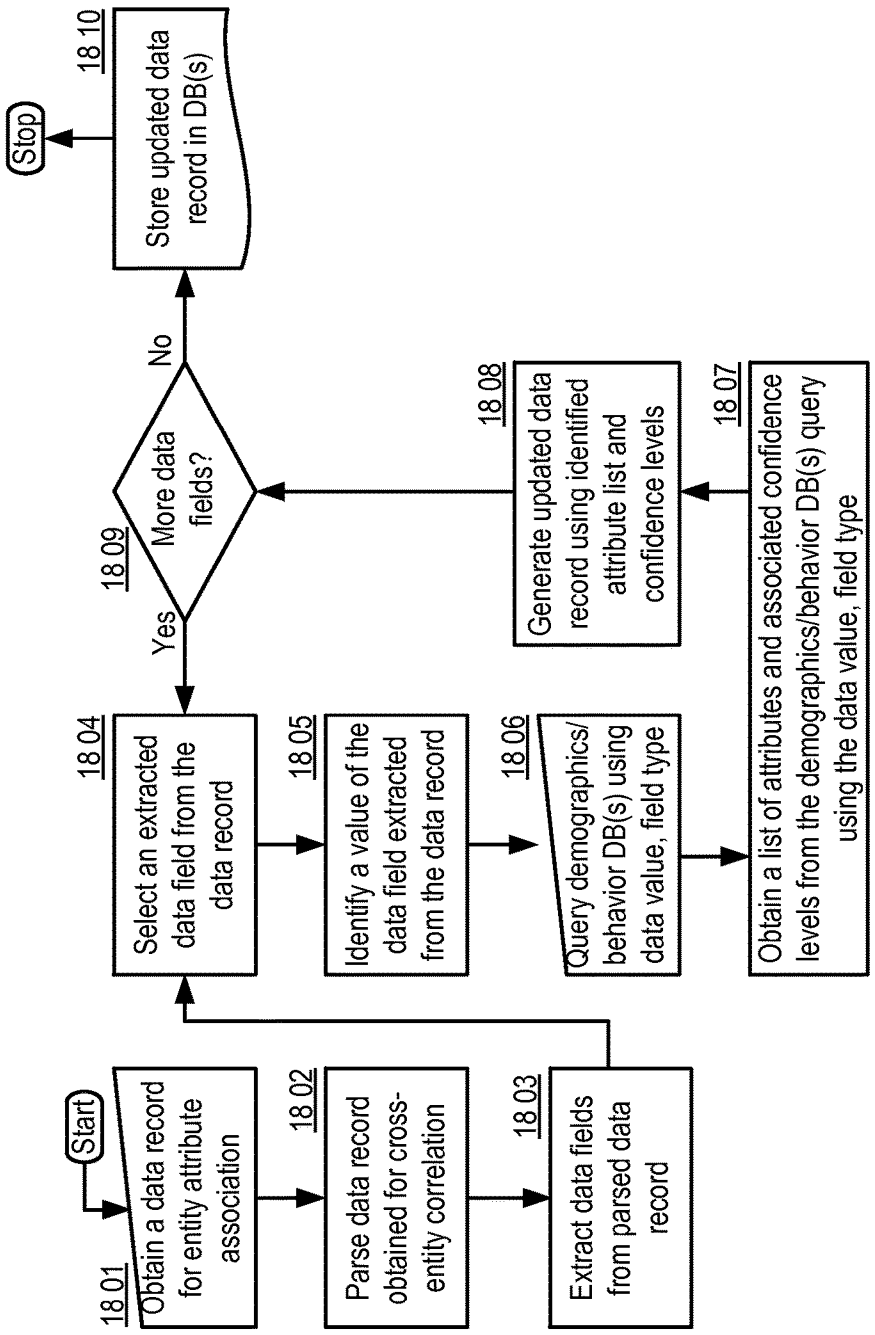
FIG. 18 shows a logic flow diagram illustrating example aspects of associating attributes to entities in some embodiments of the CPDB, e.g., an Entity Attribute Association ("EAA") component 1800.

FIG. 18 shows a logic flow diagram illustrating example aspects of associating attributes to entities in some embodiments of the CPDB, e.g., an Entity Attribute Association ("EAA") component 1800. In some implementations, a server may associate attributes to an entity, e.g., if the entity id a person, the server may identify a demographic (e.g., male/female), a spend character, a purchase preferences list, a merchants preference list, and/or the like, based on field values of data fields in data records that are related to the entity. In some implementations, a server may obtain a data record for entity attribute association, e.g., 1801. The server may parse the data record rule, and extract data fields from the data record, e.g., 1802-1803. The server may select an extracted data field from the data record, e.g., 1804, and identify a field value for the selected extracted data field from the data record, e.g., 1805. The server may query a database for demographic data, behavioral data, and/or the like, e.g., 1806, using the field value and field type. In response, the database may provide a list of potential attributes, as well as a confidence level in those attribute associations to the entity, see e.g., 1807. The server may add data fields to the data record obtained for entity attribute association specifying the potentially associated attributes and their associated confidence levels, e.g., 1808. In some embodiments, the server may utilize each data field in the data record obtained for cross-entity correlation to identify correlated entities, see e.g., 1809. The server may store the updated data record in a database, e.g., 1810.

Figure 19:
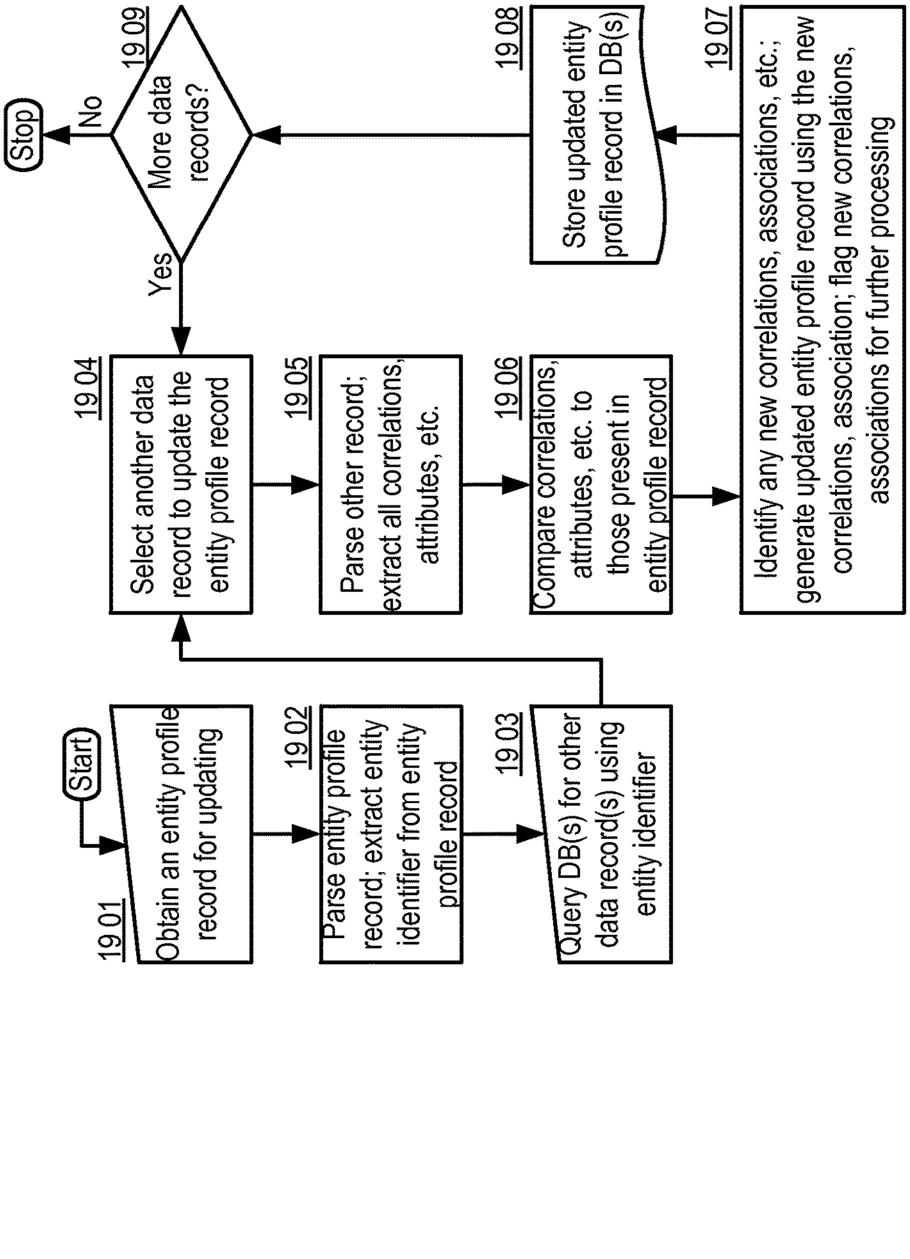
FIG. 19 shows a logic flow diagram illustrating example aspects of updating entity profile-graphs in some embodiments of the CPDB, e.g., an Entity Profile-Graph Updating ("EPGU") component 1900.

FIG. 19 shows a logic flow diagram illustrating example aspects of updating entity profile-graphs in some embodiments of the CPDB, e.g., an Entity Profile-Graph Updating ("EPGU") component 1900. In some implementations, a server may generate/update a profile for an entity whose data is stored within the CPDB. The server may obtain an entity profile record for updating, e.g., 1901. The server may parse the entity profile record, and extract an entity identifier data field from the data record, e.g., 1902. The server may query a database for other data records that are related to the same entity, e.g., 1903, using the value for the entity identifier data field. In response, the database may provide a list of other data records for further processing. The server may select one of the other data records to update the entity profile record, e.g., 1904. The server may parse the data record, and extract all correlations, associations, and new data from the other record, e.g., 1905. The server may compare the correlations, attributes, associations, etc., from the other data record with the correlations, associations and attributes from the entity profile. Based on this comparison, the server may identify any new correlations, associations, etc., and generate an updated entity profile record using the new correlations, associations; flag new correlations, associations for further processing, e.g., 1907. In some embodiments, the server may utilize each data record obtained for updating the entity profile record as well as its social graph (e.g., as given by the correlations and associations for the entity), see e.g., 1909. The server may store the updated entity profile record in a database, e.g., 1908.

Figure 20:
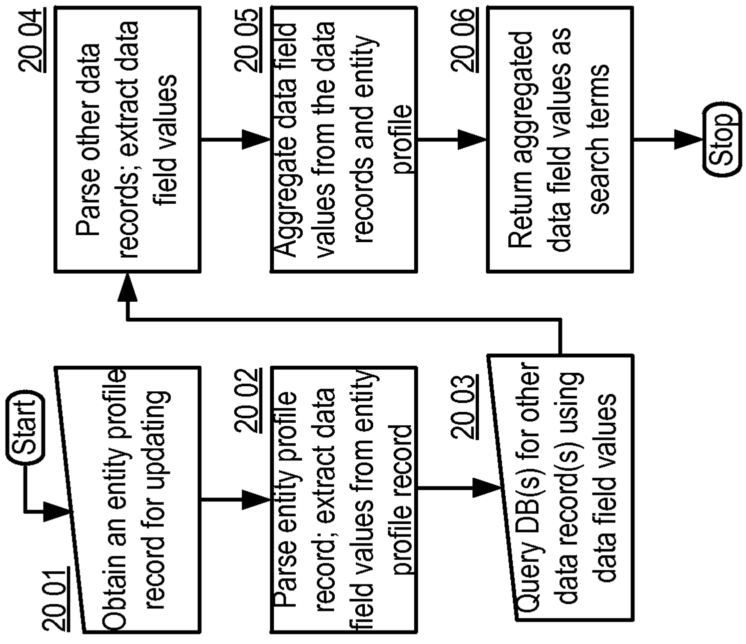
FIG. 20 shows a logic flow diagram illustrating example aspects of generating search terms for profile-graph updating in some embodiments of the CPDB, e.g., a Search Term Generation ("STG") component 2000.

FIG. 20 shows a logic flow diagram illustrating example aspects of generating search terms for profile-graph updating in some embodiments of the CPDB, e.g., a Search Term Generation ("STG") component 2000. In some implementations, a server may generate/update a profile for an entity whose data is stored within the CPDB, by performing search for new data, e.g., across the Internet and social networking services. The server may obtain an entity profile record for updating, e.g., 2001. The server may parse the entity profile record, and extract data field types and field values from the entity profile record, e.g., 2002. The server may query a database for other data records that are related to the same entity, e.g., 2003, using the values for the extracted data fields. In response, the database may provide a list of other data records for further processing. The server may parse the data records, and extract all correlations, associations, and data from the data records, e.g., 2004. The server may aggregate all the data values from all the records and the entity profile record, e.g., 2005. Based on this, the server may return the aggregated data values as search terms to trigger search processes (see e.g., FIG. 3, 301-305), e.g., 2006.

Electronic Virtual Wallet User Interface

Figure 21A:
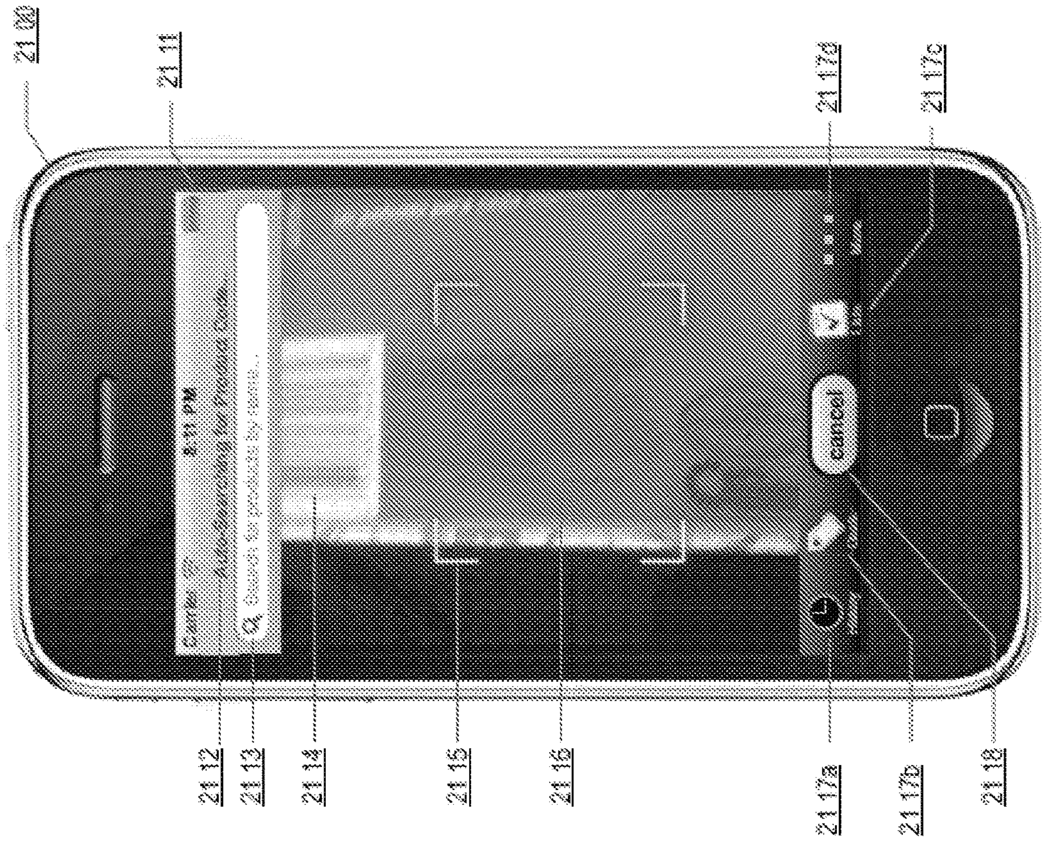
FIGS. 21A-E show user interface diagrams illustrating example features of user interfaces for an electronic virtual wallet in some embodiments of the CPDB.

FIGS. 21A-E show user interface diagrams illustrating example features of user interfaces for an electronic virtual wallet in some embodiments of the CPDB. With reference to FIG. 21A, in some embodiments, a virtual wallet mobile app, e.g., 2111, executing on a device, e.g., 2100, of a user may include an app interface providing various features for the user. For example, the device may include a camera via which the app may acquire image frames, video data, live video, and/or the like, e.g., 2116. The app may be configured to analyze the incoming data, and search, e.g., 2112, for a product identifier, e.g., 2114, such as barcodes, QR codes and/or the like.

In some embodiments, the app may be configured to automatically detect, e.g., 2112, the presence of a product identifier within an image or video frame grabbed by the device (e.g., via a webcam, in-built camera, etc.). For example, the app may provide a "hands-free" mode of operation wherein the user may move the device to bring product identifiers within the field of view of the image/video capture mechanism of the device, and the app may perform image/video processing operations to automatically detect the product identifier within the field of view. In some embodiments, the app may overlay cross-hairs, target box, and/or like alignment reference markers, e.g., 2115, so that a user may align the product identifier using the reference markers to facilitate product identifier recognition and interpretation.

In some embodiments, the detection of a product identifier may trigger various operations to provide products, services, information, etc. for the user. For example, the app may be configured to detect and capture a QR code having embedded merchant and/or product information, and utilize the information extracted from the QR code to process a transaction for purchasing a product from a merchant. As other examples, the app may be configured to provide information on related products, quotes, pricing information, related offers, (other) merchants related to the product identifier, rewards/loyalty points associated with purchasing the product related to the product identifier, analytics on purchasing behavior, alerts on spend tracking, and/or the like.

In some embodiments, the app may include user interface elements to allow the user to manually search, e.g., 2113, for products (e.g., by name, brand, identifier, etc.). In some embodiments, the app may provide the user with the ability to view prior product identifier captures (see, e.g., 2117*a*) so that the user may be able to better decide which product identifier the user desires to capture. In some embodiments, the app may include interface elements to allow the user to switch back and forth between the product identification mode and product offer interface display screens (see, e.g., 2117*b*), so that a user may accurately study deals available to the user before capturing a product identifier. In some embodiments, the user may be provided with information about products, user settings, merchants, offers, etc. in list form (see, e.g., 2117*c*) so that the user may better understand the user's purchasing options. Various other features may be provided for in the app (see, e.g., 2117*d*). In some embodiments, the user may desire to cancel product purchasing; the app may provide the user with a user interface element (e.g., 2118) to cancel the product identifier recognition procedure and return to the prior interface screen the user was utilizing.

Figure 21B:
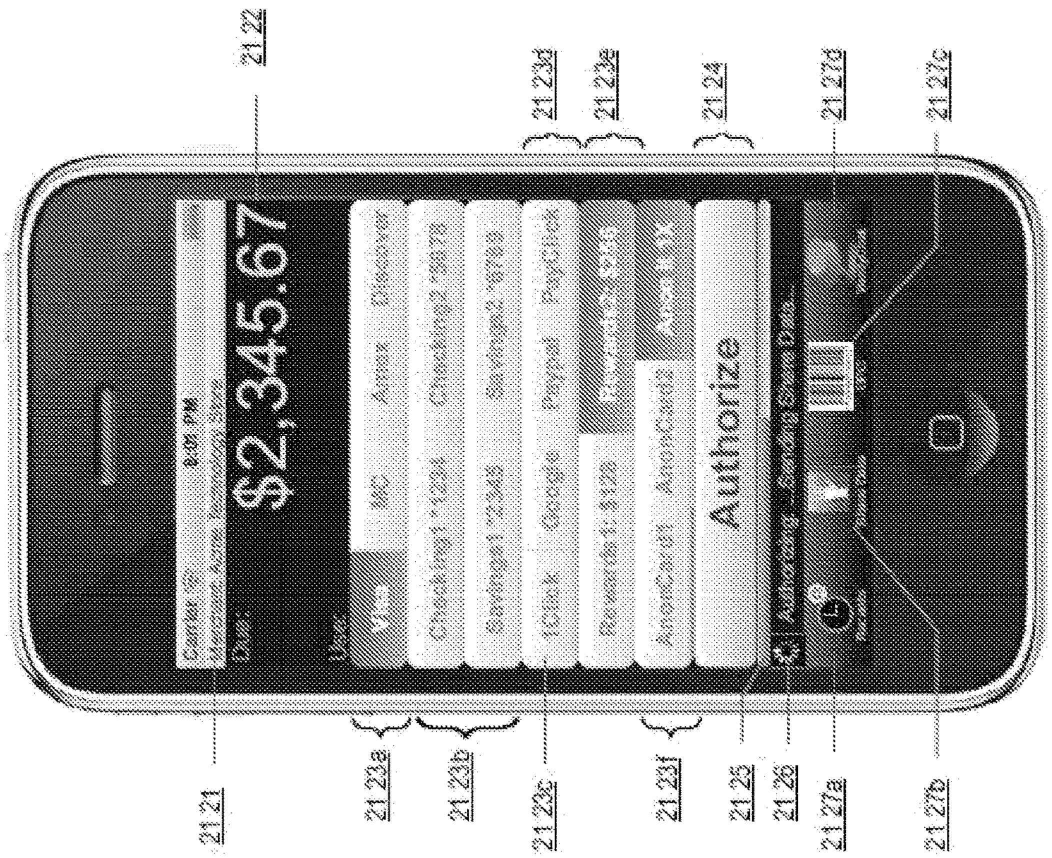

With reference to FIG. 21B, in some embodiments, the app may include an indication of the location (e.g., name of the merchant store, geographical location, information about the aisle within the merchant store, etc.) of the user, e.g., 2121. The app may provide an indication of a pay amount due for the purchase of the product, e.g., 2122. In some embodiments, the app may provide various options for the user to pay the amount for purchasing the product(s). For example, the app may utilize GPS coordinates associated with the device to determine the merchant store within which the user is present, and direct the user to a website of the merchant. In some embodiments, the app may be configured to make an application programming interface ("API") call to participating merchants to directly facilitate transaction processing for purchases. In some embodiments, a merchant-branded app may be developed with an in-app purchasing mode, which may directly connect the user into the merchant's transaction processing system. For example, the user may choose from a number of cards (e.g., credit cards, debit cards, prepaid cards, etc.) from various card providers, e.g., 2123*a*. In some embodiments, the app may provide the user the option to pay the purchase amount using funds included in a bank account of the user, e.g., a checking, savings, money market, current account, etc., e.g., 2123*b*. In some embodiments, the user may have set default options for which card, bank account, etc. to use for the purchase transactions via the app. In some embodiments, such setting of default options may allow the user to initiate the purchase transaction via a single click, tap, swipe, and/or other remedial user input action, e.g., 2123*c*. In some embodiments, when the user utilizes such an option, the app may utilize the default settings of the user to initiate the purchase transaction. In some embodiments, the app may allow the user to utilize other accounts (e.g., Google™ Checkout, Paypal™ account, etc.) to pay for the purchase transaction, e.g., 2123*d*. In some embodiments, the app may allow the user to utilize rewards points, airline miles, hotel points, electronic coupons, printed coupons (e.g., by capturing the printed coupons similar to the product identifier) etc., to pay for the purchase transaction, e.g., 2123*e*. In some embodiments, the app may provide an option to provide express authorization before initiating the purchase transaction, e.g., 2124. In some embodiments, the app may provide a progress indicator provide indication on the progress of the transaction after the user has selected an option to initiate the purchase transaction, e.g., 2125. In some embodiments, the app may provide the user with historical information on the user's prior purchases via the app, e.g., 2127*a*. In some embodiments, the app may provide the user with an option to share information about the purchase (e.g., via email, SMS, wall posting on Facebook®, tweet on Twitter™, etc.) with other users and/or control information shared with the merchant, acquirer, payment network etc., to process the purchase transaction, e.g., 2127*b*. In some embodiments, the app may provide the user an option to display the product identification information captured by the client device (e.g., in order to show a customer service representative at the exit of a store the product information), e.g., 2127*c*. In some embodiments, the user, app, device and or purchase processing system may encounter an error in the processing. In such scenarios, the user may be able to chat with a customer service representative (e.g., VerifyChat 2127*d*) to resolve the difficulties in the purchase transaction procedure.

In some embodiments, the user may select to conduct the transaction using a one-time anonymized credit card number, see e.g., 2123*f*. For example, the app may utilize a pre-designated anonymized set of card details (see, e.g., "AnonCard1," "AnonCard2"). As another example, the app may generate, e.g., in real-time, a one-time anonymous set of card details to securely complete the purchase transaction (e.g., "Anon It 1×"). In such embodiments, the app may automatically set the user profile settings such that the any personal identifying information of the user will not be provided to the merchant and/or other entities. In some embodiments, the user may be required to enter a user name and password to enable the anonymization features.

Figure 21C:

With reference to FIG. 21C, in some embodiments, the user interface elements of the app may be advantageously arranged to provide the user the ability to process a purchase with customized payment parameters with a minimum number of user inputs applied to the user's device. For example, if the user has a QR pay code, e.g., 2132, within the viewing angle of a camera included in the user's mobile device, the user may activate a user interface element to snap the QR code. In some embodiments, the user may control the field of view of the camera using a user interface zoom element, e.g., 2133. In some embodiments, the user interface may be designed such that the user may touch an image of a QR code displayed on the screen to capture the QR code (see e.g., 2134). For example, the position of the user's touch may be utilized as an input by an image processing module executing on the user's device to process the displayed video frame (and/or adjacent video frames), and extract the QR code from the frame(s) based on the user's input. For example, the user's touch may provide an approximate center point of the QR code. Using this information, the image processing module may be able to better perform an automated QR code image recognition, and accordingly capture the correct QR code (e.g., if portions of many QR codes are displayed within the video frame(s)) selected by the user for capture and processing.

In some embodiments, the app may utilize predetermined default settings for a particular merchant, e.g., 2131, to process the purchase based on the QR code (e.g., in response to the user touching an image of a QR code displayed on the screen of the user device). However, if the user wishes to customize the payment parameters, the user may activate a user interface element 2135 (or e.g., press and continue to hold the image of the QR code 2132). Upon doing so, the app may provide a pop-up menu, e.g., 2137, providing a variety of payment customization choices, such as those described with reference to FIG. 21B. The user may, e.g., drag the user's finger to the appropriate settings the user prefers, and release the user's finger from the touchscreen of the user's mobile device to select the setting for payment processing. In alternate embodiments, the payment settings options, e.g., 2137, and QR capture activation button, e.g., 2136 may be included in the user interface along with a window for capturing the QR code via the mobile device's camera. In alternate embodiments, the user's mobile device may generate a hybrid QR code-payment settings graphic, and the POS terminal (or user's trusted computing device) may capture the entire graphic for payment processing. In some embodiments, the app may provide a user interface element 2138 for the user to minimize the payment options settings user interface elements. In some embodiments, the app may provide additional user interface elements, e.g., 2139, to display previous purchases, data shared about those purchases, purchase receipts (e.g., via barcodes) and customer support options (e.g., VerifyChat).

Figure 21D:
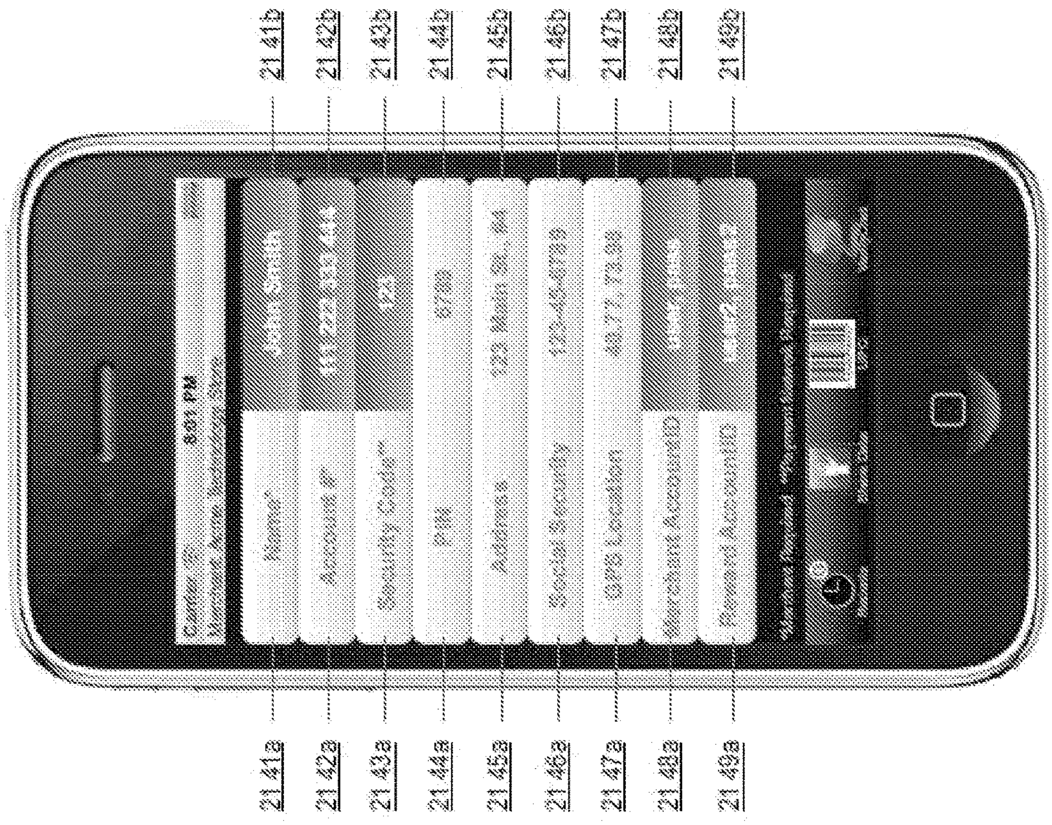

With reference to FIG. 21D, in some embodiments, the user may be able to view and/or modify the user profile and/or settings of the user, e.g., by activating user interface element 2122 (of FIG. 21B). For example, the user may be able to view/modify a user name (e.g., 2141*a-b*), account number (e.g., 2142*a-b*), user security access code (e.g., 2143*a-b*), user pin (e.g., 2144*a-b*), user address (e.g., 2145*a-b*), social security number associated with the user (e.g., 2146*a-b*), current device GPS location (e.g., 2147*a-b*), user account of the merchant in whose store the user currently is (e.g., 2148*a-b*), the user's rewards accounts (e.g., 2149*a-b*), and/or the like. In some embodiments, the user may be able to select which of the data fields and their associated values should be transmitted to facilitate the purchase transaction, thus providing enhanced data security for the user. For example, in the example illustration in FIG. 21D, the user has selected the name 2141*a*, account number 2142*a*, security code 2143*a*, merchant account ID 2148*a* and rewards account ID 2149*a* as the fields to be sent as part of the notification to process the purchase transaction. In some embodiments, the user may toggle the fields and/or data values that are sent as part of the notification to process the purchase transactions. In some embodiments, the app may provide multiple screens of data fields and/or associated values stored for the user to select as part of the purchase order transmission. In some embodiments, the app may obtain the GPS location of the user. Based on the GPS location of the user, the app may determine the context of the user (e.g., whether the user is in a store, doctor's office, hospital, postal service office, etc.). Based on the context, the app may present the appropriate fields to the user, from which the user may select fields and/or field values to send as part of the purchase order transmission.

For example, a user may go to doctor's office and desire to pay the co-pay for doctor's appointment. In addition to basic transactional information such as account number and name, the app may provide the user the ability to select to transfer medical records, health information, which may be provided to the medical provider, insurance company, as well as the transaction processor to reconcile payments between the parties. In some embodiments, the records may be sent in a Health Insurance Portability and Accountability Act (HIPAA)-compliant data format and encrypted, and only the recipients who are authorized to view such records may have appropriate decryption keys to decrypt and view the private user information.

Figure 21E:

With reference to FIG. 21E, in some embodiments, the app executing on the user's device may provide a "VerifyChat" feature for fraud prevention (e.g., by activating UI element 2127*d* in FIG. 21B). For example, the CPDB may detect an unusual and/or suspicious transaction. The CPDB may utilize the VerifyChat feature to communicate with the user, and verify the authenticity of the originator of the purchase transaction. In various embodiments, the CPDB may send electronic mail message, text (SMS) messages, Facebook® messages, Twitter™ tweets, text chat, voice chat, video chat (e.g., Apple FaceTime), and/or the like to communicate with the user. For example, the CPDB may initiate a video challenge for the user, e.g., 2151*a*. For example, the user may need to present him/her-self via a video chat, e.g., 2152*a*. In some embodiments, a customer service representative, e.g., agent 2155*a*, may manually determine the authenticity of the user using the video of the user. In some embodiments, the CPDB may utilize face, biometric and/or like recognition (e.g., using pattern classification techniques) to determine the identity of the user, e.g., 2154*a*. In some embodiments, the app may provide reference marker (e.g., cross-hairs, target box, etc.), e.g., 2153*a*, so that the user may the video to facilitate the CPDB's automated recognition of the user. In some embodiments, the user may not have initiated the transaction, e.g., the transaction is fraudulent. In such embodiments, the user may cancel, e.g., 2158*a*, the challenge. The CPDB may then cancel the transaction, and/or initiate fraud investigation procedures on behalf of the user. In some embodiments, the app may provide additional user interface elements, e.g., to display previous session 2156*a*, and provide additional customer support options (e.g., VerifyChat 2157*a*).

In some embodiments, the CPDB may utilize a text challenge procedure to verify the authenticity of the user, e.g., 2151*b*. For example, the CPDB may communicate with the user via text chat, SMS messages, electronic mail, Facebook® messages, Twitter™ tweets, and/or the like. The CPDB may pose a challenge question, e.g., 2152*b*, for the user. The app may provide a user input interface element(s) (e.g., virtual keyboard 2153*b*) to answer the challenge question posed by the CPDB. In some embodiments, the challenge question may randomly selected by the CPDB automatically; in some embodiments, a customer service representative 2155*b* may manually communicate with the user. In some embodiments, the user may not have initiated the transaction, e.g., the transaction is fraudulent. In such embodiments, the user may cancel, e.g., 2158*b*, the text challenge. The CPDB may then cancel the transaction, and/or initiate fraud investigation procedures on behalf of the user. In some embodiments, the app may provide additional user interface elements, e.g., to display previous session 2156*b*, and provide additional customer support options (e.g., VerifyChat 2157*b*).

Merchant Analytics Platform

Figure 22:
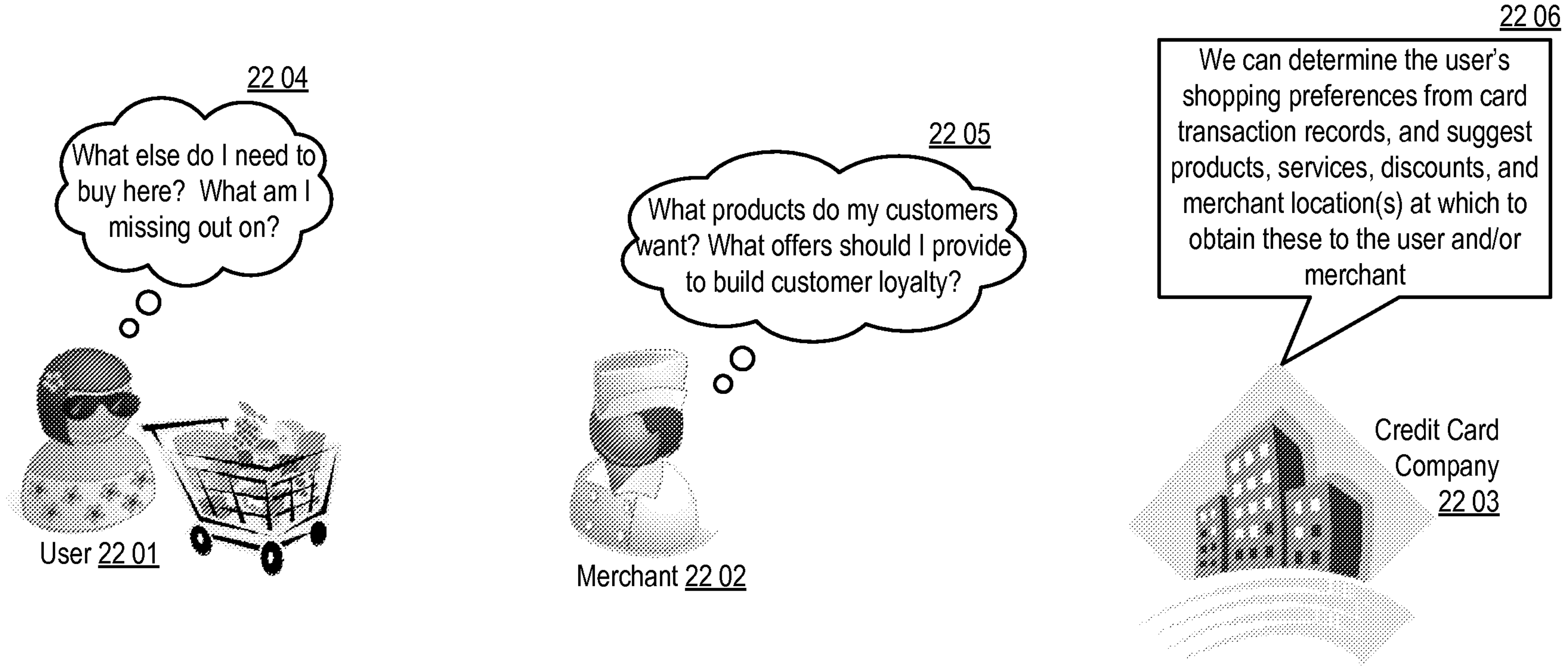
FIG. 22 shows a block diagram illustrating example aspects of a merchant analytics platform in some embodiments of the CPDB.

FIG. 22 shows a block diagram illustrating example aspects of a merchant analytics platform in first set of embodiments of the CPDB. In some implementations, a user, e.g., 2201, may desire to purchase products from a merchant. For example, the user may utilize a card (e.g., a credit card, debit, card, prepaid card, charge card, etc.) to purchase products, services, and/or other offerings ("products") from a merchant 2202. In some implementations, the user may exhibit consumption patterns. For example, the user may often buy a similar set of products simultaneously each time the user shops. In some implementations, the purchasing patterns of the user may be reflected in the card transactions conducted by the user. For example, the consumption patterns may reflect in card transaction records of the transactions conducted by the user, which may be mined by a card company, e.g., 2203. In some implementations, information as to the general preferences of the user, purchasing preferences of the user, cost-sensitivities of the user, etc. may be gleaned from studying the aggregated card transaction records pertaining to the user. For example, analysis of the aggregated user card transaction records may indicate a preference for shopping within a particular geographical area, at particular times, with particular merchants, for particular products types, categories, brand names, quantities, and/or the like. As another example, analysis of the aggregated card transaction records may indicate correlations between purchases of the user. For example, the analysis may provide the ability to predict (with a known confidence level) that a user may purchase product B given that the user has purchased (or intends to purchase) product A (or products A, and/or C, and/or D, etc.). Thus, in some implementations, analysis of the aggregated card transaction records of a user may allow the CPDB to provide suggestions to the merchant and/or user as to products that the user is likely to be interested in purchasing. For example, a user may desire suggestions as to what products, services, offerings, deals that user may be interested in, e.g., 2204. In some implementations, the CPDB may provide such suggestions, e.g., 106, to the user on a real-time basis (e.g., as the user is scanning products at a point-of-sale terminal, as the user is performing a price check, as the user is paying for a purchase, etc., as the user walks by a merchant where the CPDB determines that products of interest to the user are available, etc.). In some implementations, a merchant, e.g., 2202, may desire to understand customer behavior better so that the merchant may determine which products to provide for customers to generate maximum retail sales, generate customer loyalty, etc, e.g., 2205. In some implementations, the CPDB may provide merchant analytics reports to the merchant including recommendations of product, service, discount, Groupon® offers, and/or other offers that the merchant can make to the user based on the user's behavioral patterns, e.g., 2206.

Figure 23A:
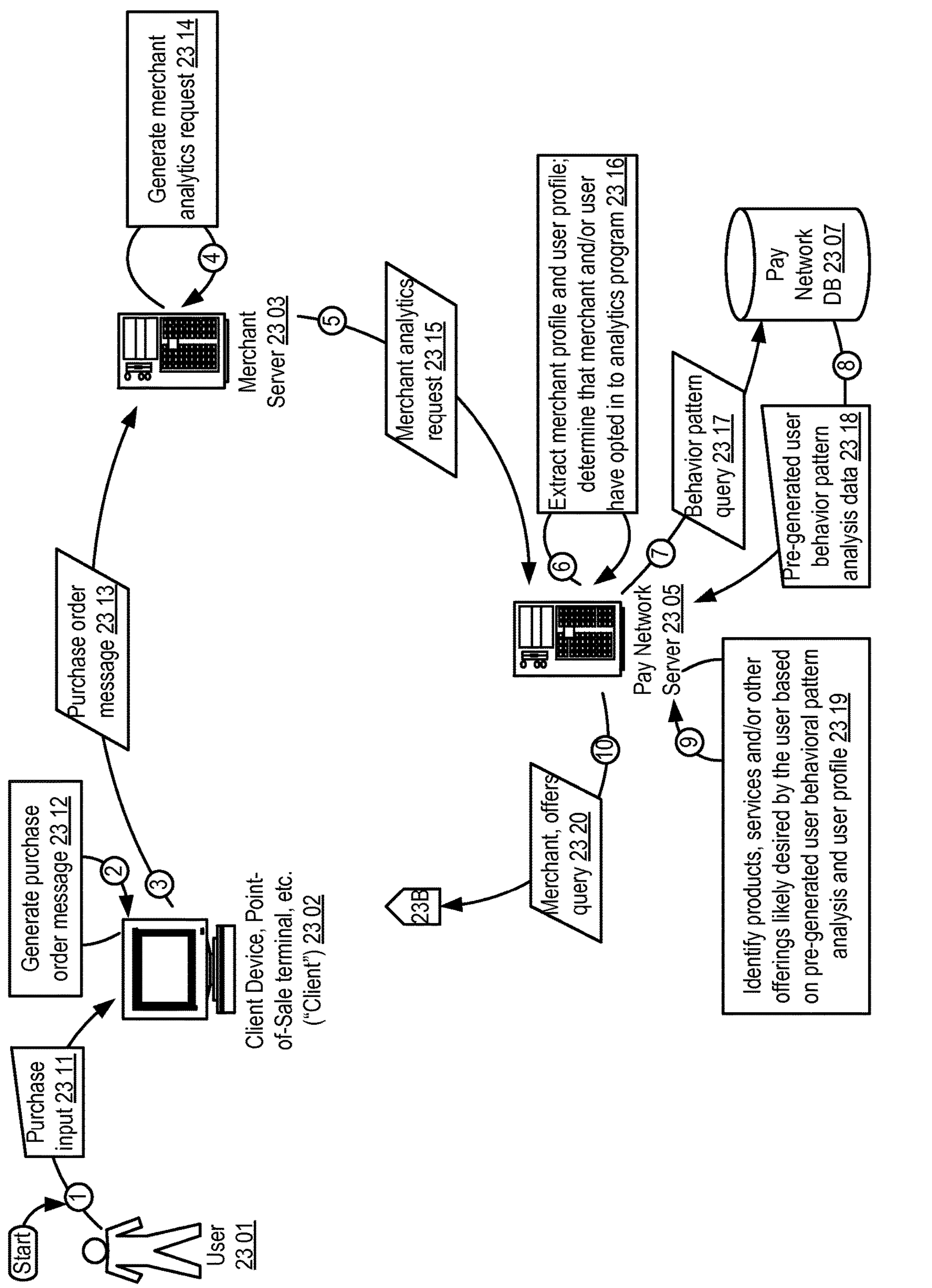
FIGS. 23A-B show data flow diagrams illustrating an example procedure to provide a user and/or merchant offers for products, services and/or the like, using user behavior patterns derived from card-based transaction data in some embodiments of the CPDB.
Figure 23B:
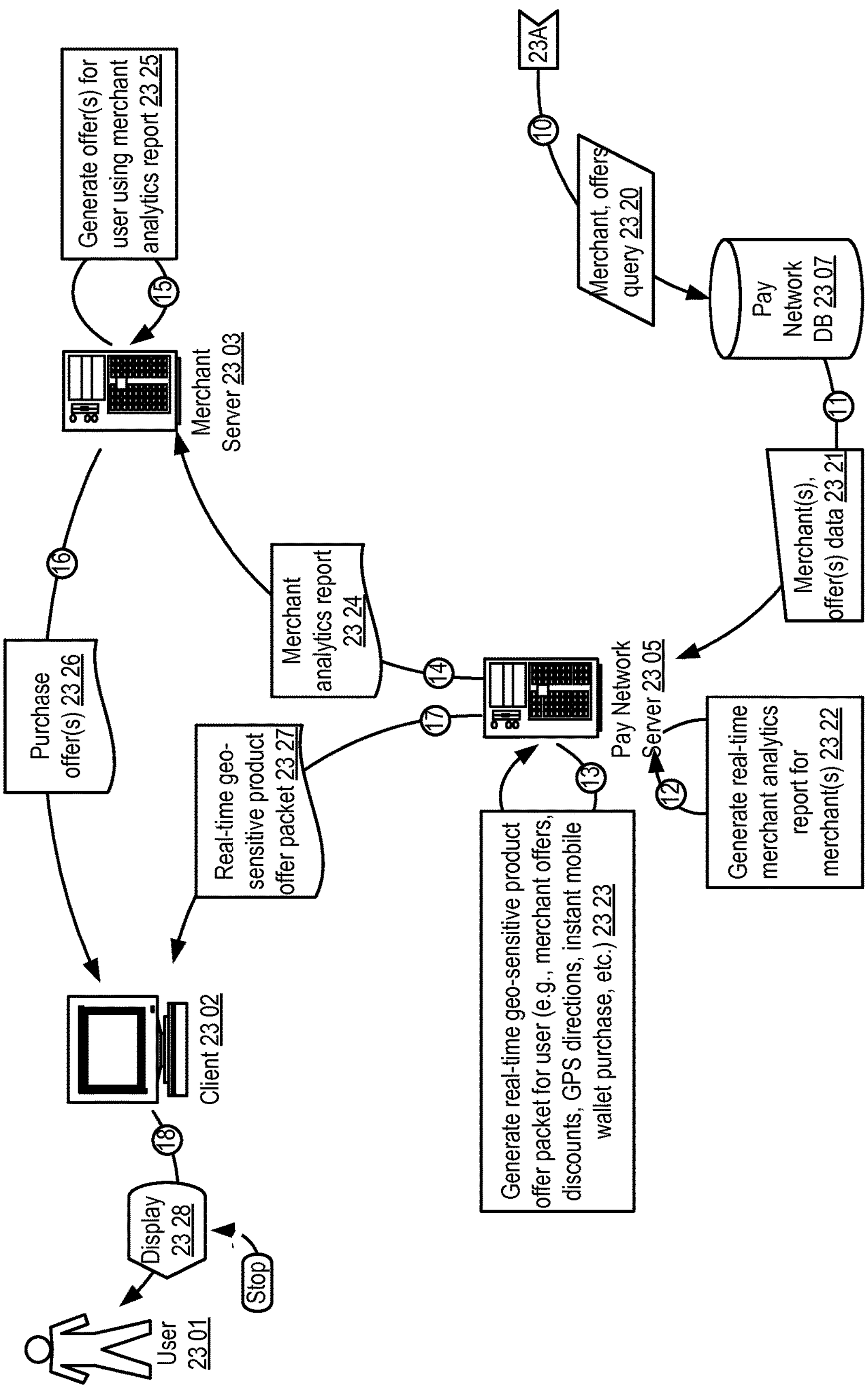

FIGS. 23A-B show data flow diagrams illustrating an example procedure to provide a user and/or merchant offers for products, services and/or the like, using user behavior patterns derived from card-based transaction data in some embodiments of the CPDB. In some implementations, a user, e.g., 2301, may desire to purchase a product, service, offering, and/or the like ("product"), from a merchant. The user may communicate with a merchant server, e.g., 2303, via a client such as, but not limited to: a personal computer, mobile device, television, point-of-sale terminal, kiosk, ATM, pharmacy store, store counter, and/or the like (e.g., client 2302). For example, the user may provide user input, e.g., purchase input 2311, into the client indicating the user's desire to purchase the product. In various implementations, the user input may include, but not be limited to: keyboard entry, card swipe, activating a RFID/NFC enabled hardware device (e.g., electronic card having multiple accounts, smartphone, tablet, etc.), mouse clicks, depressing buttons on a joystick/game console, voice commands, single/multi-touch gestures on a touch-sensitive interface, touching user interface elements on a touch-sensitive display, and/or the like. For example, the user may direct a browser application executing on the client device to a website of the merchant, and may select a product from the website via clicking on a hyperlink presented to the user via the website. As another example, the client may obtain track 1 data from the user's card (e.g., credit card, debit card, prepaid card, charge card, etc.), such as the example track 1 data provided below:

% B123456789012345^PUBLIC/J.Q.^99011200000000000000901****?*

(wherein '123456789012345' is the card number of 'J.Q. Public' and has a CVV number of 901. '990112' is a service code, and *** represents decimal digits which change randomly each time the card is used.)

In some implementations, the client may generate a purchase order message, e.g., 2312, and provide, e.g., 2313, the generated purchase order message to the merchant server, e.g., 2303. For example, a browser application executing on the client may provide, on behalf of the user, a (Secure) Hypertext Transfer Protocol ("HTTP(S)") GET message including the product order details for the merchant server in the form of data formatted according to the eXtensible Markup Language ("XML"). Below is an example HTTP(S) GET message including an XML-formatted purchase order message for the merchant server:

```
GET /purchase.php HTTP/1.1
Host: www.merchant.com
Content-Type: Application/XML
Content-Length: 1306
<?XML version = "1.0" encoding = "UTF-8"?>
<purchase_order>
    <order_ID>4NFU4RG94</order_ID>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <purchase_details>
        <num_products>1</num_products>
        <product>
            <product_type>book</product_type>
            <product_params>
                <product_title>XML for dummies
                </product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </purchase_details>
    <account_params>
        <account_name>John Q. Public</account_name>
        <account_type>credit</account_type>
        <account_num>123456789012345</account_num>
        <billing_address>123 Green St., Norman, OK
98765</billing_address>
        <phone>123-456-7809</phone>
        <sign>/jqp/</sign>
        <confirm_type>email</confirm_type>
```

-continued

```
            <contact_info>john.q.public@gmail.com</contact_info>
        </account_params>
        <shipping_info>
            <shipping_adress>same as billing</shipping_address>
            <ship_type>expedited</ship_type>
            <ship_carrier>FedEx</ship_carrier>
            <ship_account>123-45-678</ship_account>
            <tracking_flag>true</tracking_flag>
            <sign_flag>false</sign_flag>
        </shipping_info>
</purchase_order>
```

In some implementations, the merchant server may, in response to receiving the purchase order message from the client, generate, e.g., 2314, a request for merchant analytics from a pay network server, e.g., 2305, so that the merchant may provide product offerings for the user. For illustration, in the example above, the merchant server may add an XML-encoded data structure to the body of the purchase order message, and forward the message to the pay network server. An example XML-encoded data snippet that the merchant server may add to the body of the purchase order message before forwarding to the pay network server is provided below:

```
<analytics_request>
    <request_ID>NEUI4BGF9</request_ID>
    <details>
        <type>products OR services OR discounts</type>
        <deliver_to>user AND merchant</deliver_to>
        <timeframe>realtime</timeframe>
        <user_priority>high</user_priority>
        <data_source>appended</data_source>
    </details>
    <merchant_params>
        <merchant_ID>3FBCR4INC</merchant_id>
        <merchant_name>Books & Things, Inc.</merchant_name>
    <merchant_auth_key>1NNF484MCP59CHB27365
    </merchant_auth_key>
    </merchant_params>
</analytics_request>
```

The merchant server may provide the merchant analytics request, e.g., 2315, to the pay network server. In some implementations, the pay network server may extract the merchant and user profile information from the merchant analytics request. For illustration, the pay network server may extract values of the 'merchant_ID' and 'user_ID' fields from the merchant analytics request in the examples above. Using the merchant and user profile information, the pay network server may determine whether the merchant and/or user are enrolled in the merchant analytics program. In some implementations, the pay network server may provide the results of merchant analytics only to those entities that are enrolled in the merchant analytics program. For example, the server may query a database, e.g., pay network database 2307, to determine whether the user and/or merchant are enrolled in the merchant analytics program. In some implementations, the pay network server may generate a query the database for user behavior patterns of the user for merchant analytics, e.g., 2317. For example, the database may be a relational database responsive to Structured Query Language ("SQL") commands. The pay network server may execute a hypertext preprocessor ("PHP") script including SQL commands to query the database for user behavior patterns of the user. An example PHP/SQL command listing, illustrating substantive aspects of querying the database, is provided below:

```
<?PHP
header('Content-Type: text/plain');
mysql_connect("254.93.179.112",$DBserver,$password); // access
database server
mysql_select_db("USERS.SQL"); // select database table to search
//create query for issuer server data
$query = "SELECT behavior_profile_XML FROM UserBehaviorTable
WHERE userid LIKE '%' $user_id";
$result = mysql_query($query); // perform the search query
mysql_close("USERS.SQL"); // close database access
?>
```

In response to obtaining the issuer server query, e.g., 2317, the pay network database may provide, e.g., 2318, the requested behavior patterns data to the pay network server. For example, the user behavior patterns data may comprise pair-wise correlations of various variables to each other, and/or raw user transaction patterns. An example XML-encoded user behavior pattern data file is provided below:

```
<?XML version = "1.0" encoding = "UTF-8"?>
<last_updated>2011-02-22 15:22:43</timestamp>
<user_ID>john.q.public@gmail.com</user_ID>
<pair_correlation_data>
        <pair><time>AM</time><pdt>A</pdt><confidence>0.65
</confidence></pair>
        <pair><pdt>B</pdt><pdt>A</pdt><confidence>0.95
</confidence></pair>
        <pair><zip>98456</zip><pdt>A</pdt><confidence>0.25
</confidence></pair>
        <pair><time>PM</time><zip>98465</zip><confidence>0.45
</confidence></pair>
</pair_correlation_data>
<raw_data>
        <transaction>
        <timestamp>2011-02-21 15:32:01</timestamp>
        <product>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </transaction>
        .
        .
        .
        <transaction>
            . . .
        </transaction>
</raw_data>
```

In some implementations, the pay network server may identify products, services and/or other offerings likely desired by the user based on pre-generated user behavioral pattern analysis and user profile, e.g., 2319. The pay network server may generate a query, e.g., 2320, for merchants that may be able to provide the identified products, services, and/or offerings for the user. For example, the pay network server may generate a query based on the GPS coordinates of the user (e.g., obtained from the user's smartphone), the merchant store in which the user currently is present, etc., for merchants in the vicinity of the user who may have products included within the identified products likely desired by the user. In some implementations, the pay network server may also generate a query for offers (e.g., discount offers, Groupon® offers, etc.) that the merchant may be able to offer for the users. For example, the pay network server may utilize PHP/SQL commands similar to those provided above to query a database. In response, the database may provide, e.g., 2321, the requested merchant and/or offer data to the pay network server. In some implementations, the pay network server may generate a real-time merchant analytics report for the merchant, e.g., 2322. In some implementations, the pay network server may generate a real-time geo-sensitive product offer packet for the user, e.g., including such items as (but not limited to): merchant names, location, directions, offers, discounts, interactive online purchase options, instant mobile wallet purchase ability, order hold placing features (e.g., to hold the items for pick up so as to prevent the items going out of stock, e.g., during seasonal shopping times), and/or the like. In some implementations, the pay network server may provide the merchant analytics report, e.g., 2324, to the merchant server, and may provide the real-time geo-sensitive product offer packet, e.g., 2327, to the client. In some implementations, the merchant server may utilize the pay network server's merchant analytics report to generate, e.g., 2325, offer(s) for the user. The merchant server may provide the generated offer(s), e.g., 2326, to the user. In some implementations, the client may render and display, e.g., 2328, the real-time geo-sensitive product offer packet from the pay network server and/or purchase offer(s) from the merchant to the user.

Figure 24:
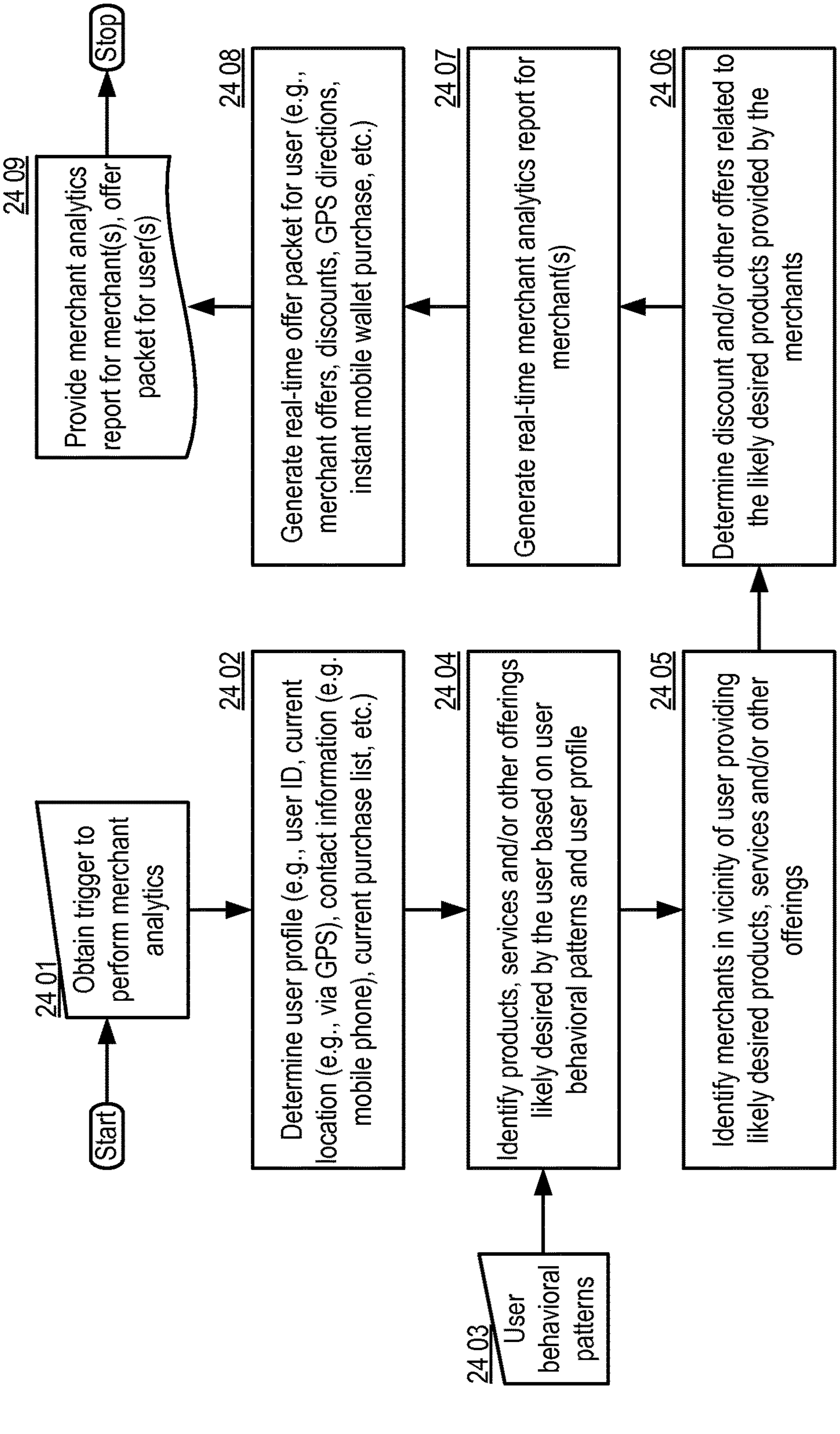
FIG. 24 shows a logic flow diagram illustrating example aspects of providing a user and/or merchant offers for products, services and/or the like, using user behavior patterns derived from card-based transaction data in some embodiments of the CPDB, e.g., a Merchant Analytics ("MA") component.

FIG. 24 shows a logic flow diagram illustrating example aspects of providing a user and/or merchant offers for products, services and/or the like, using user behavior patterns derived from card-based transaction data in some embodiments of the CPDB, e.g., a Merchant Analytics ("MA") component. In some implementations, the CPDB may obtain a trigger to perform merchant analytics. For example a user may desire to purchase a product, service, offering, and/or the like ("product"), from a merchant (e.g., start scanning products in the checkout counter of the merchant's store), or may initiate a purchase transaction (e.g., attempt to pay for products purchased at the merchant store). In some implementations, the CPDB may extract, e.g., 2402, the merchant and user profile information from the merchant analytics request. For example, the CPDB may extract fields such as, but not limited to: user_ID, user name, timestamp, merchant_ID, merchant_name, merchant_type, and/or the like. Using the merchant and/or user profile information, the CPDB may generate a query the database for user behavior patterns, e.g., 2403, of the user for merchant analytics. In some implementations, the CPDB may identify products, services and/or other offerings likely desired by the user based on pre-generated user behavioral pattern analysis and user profile, e.g., 2404. The CPDB may identify, e.g., 2405, merchants that may be able to provide the identified products, services, and/or offerings for the user. For example, the CPDB may generate a query based on the GPS coordinates of the user (e.g., obtained from the user's smartphone), the merchant store in which the user currently is present, etc., for merchants in the vicinity of the user who may have products included within the identified products likely desired by the user. In some implementations, the pay network server may also determine offers (e.g., discount offers, Groupon® offers, etc.), e.g., 2406, that the merchant may be able to offer for the users. In some implementations, the CPDB may generate a real-time merchant analytics report for the merchant, e.g., 2407. In some implementations, the CPDB may generate, e.g., 2408, a real-time geo-sensitive product offer packet for the user, e.g., including such items as (but not limited to): merchant names, location, directions, offers, discounts, interactive online purchase options, instant mobile wallet purchase ability, order hold placing features (e.g., to hold the items for pick up so as to prevent the items going out of stock, e.g., during seasonal shopping times), and/or the like. In some implementations, the CPDB may provide the merchant analytics report to the merchant server, and may provide the real-time geo-sensitive product offer packet to the client, e.g., 2409.

Figure 25:
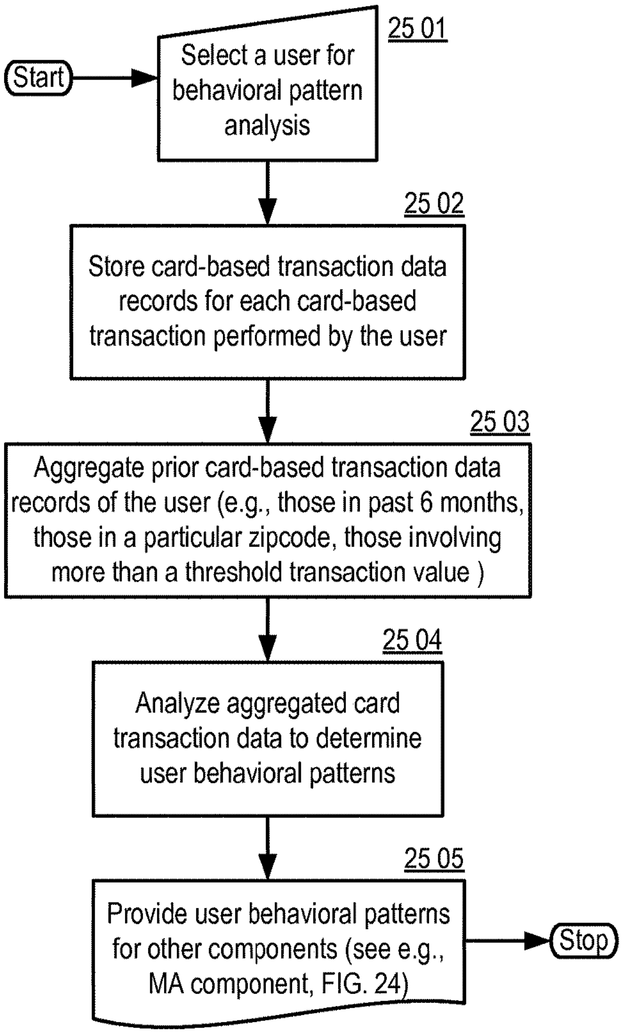
FIG. 25 shows a logic flow diagram illustrating example aspects of generating a user behavior pattern analysis in some embodiments of the CPDB, e.g., a User Behavioral Pattern Analytics ("UBPA") component.

FIG. 25 shows a logic flow diagram illustrating example aspects of generating a user behavior pattern analysis in some embodiments of the CPDB, e.g., a User Behavioral Pattern Analytics ("UBPA") component. In some implementations, the CPDB may select, e.g., 2501, a user (e.g., via user ID) for behavioral pattern analysis. The CPDB may store, e.g., 2502, card-based transaction data records for each card-based transaction performed by the user, e.g., via a Card-Based Transaction Execution component. The CPDB may aggregate such card-based transaction data records of the user, e.g., 2503. For example, the CPDB may utilize a Transaction Data Aggregation component such as that described above with reference to FIGS. 8-9. In various implementations, the CPDB may aggregate card transaction records of the user according to criteria including, but not limited to: geographical location of card use, time of card use, type of purchase, quantity of purchase, transaction value, merchant type, merchant name, spending category (e.g., such as the North American Industry Classification System (NAICS) codes for spending categories), and/or the like. The CPDB may analyze the aggregated card transaction data, e.g., 2504, to determine user behavioral patterns, e.g., via a User Pattern Identification ("UPI") component such as described below with reference to FIG. 26. In some implementations, the CPDB may provide user behavioral patterns obtained from the analysis for use by other CPDB components and/or affiliated entities, e.g., 2505.

Figure 26:
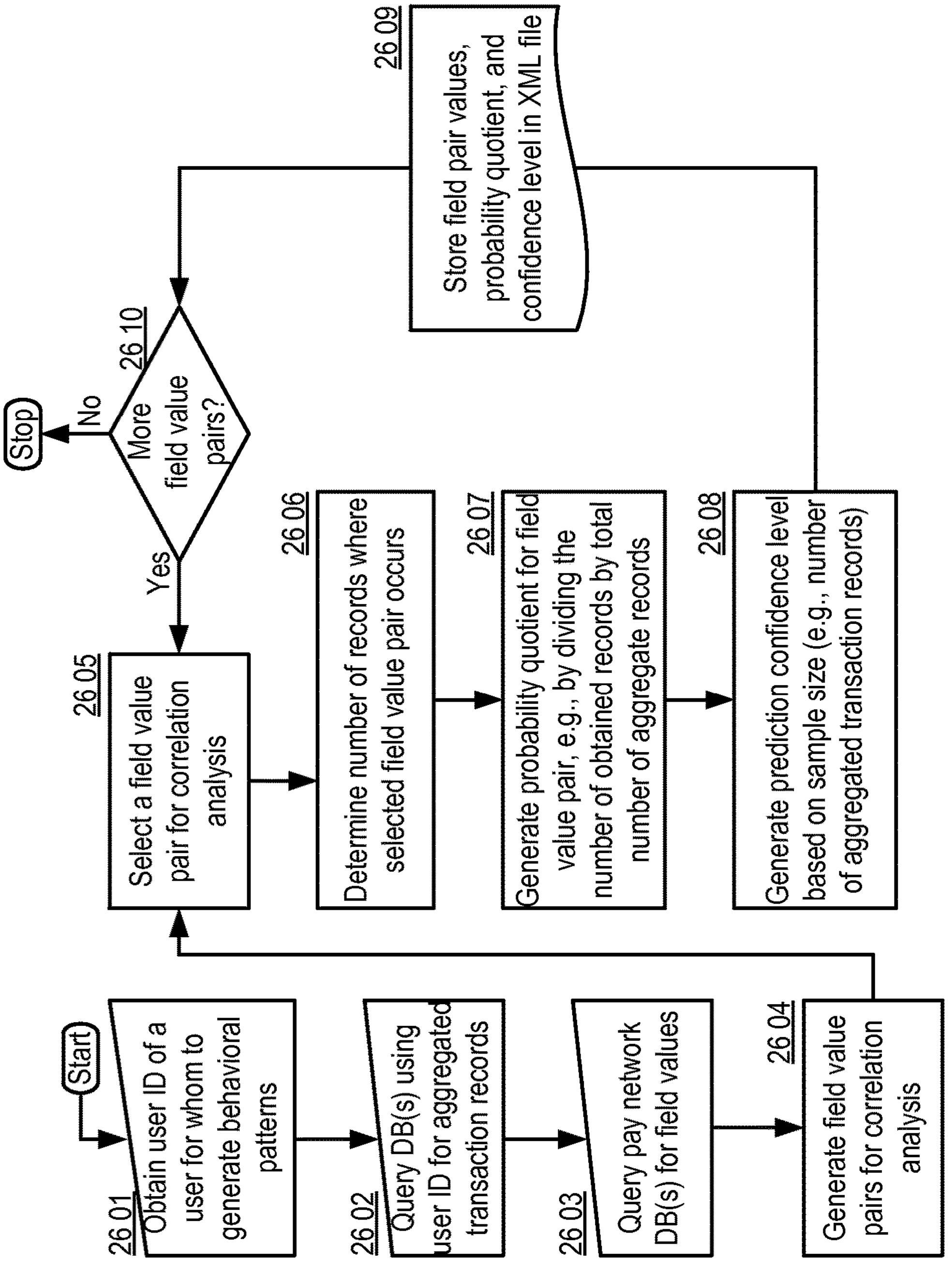
FIG. 26 shows a logic flow diagram illustrating example aspects of identifying user behavioral patterns from aggregated card-based transaction data in some embodiments of the CPDB, e.g., a User Patten Identification ("UPI") component.

FIG. 26 shows a logic flow diagram illustrating example aspects of identifying user behavioral patterns from aggregated card-based transaction data in some embodiments of the CPDB, e.g., a User Patten Identification ("UPI") component. In some implementations, a pay network server ("server") may obtain a user ID of a user for whom the server is required to generate user behavioral patterns, e.g., 2601. The server may query a database, e.g., a pay network database, for aggregated card transaction data records of the user, e.g., 2602. The server may also query, e.g., 2603, the pay network database for all possible field value that can be taken by each of the field values (e.g., AM/PM, zipcode, merchant_ID, merchant_name, transaction cost brackets, etc.). Using the field values of all the fields in the transaction data records, the server may generate field value pairs, for performing a correlation analysis on the field value pairs, e.g., 2604. An example field value pair is: 'time' is 'AM' and 'merchant' is 'Walmart'. The server may then generate probability estimates for each field value pair occurring in the aggregated transaction data records. For example, the server may select a field value pair, e.g., 2605. The server may determine the number of records within the aggregated transaction data records where the field value pair occurs, e.g., 2606. The server may then calculate a probability quotient for the field value pair by dividing the number determined for the occurrences of the field value pair by the total number of aggregate transaction data records, e.g., 2607. The server may also assign a confidence level for the probability quotient based on the sample size, e.g., total number of records in the aggregated transaction data records, e.g., 2608. The server may generate and store an XML snippet, such as described above with reference to FIGS. 23A-B, including the field value pair, the probability quotient, and the confidence level associated with the probability quotient, e.g., 2609. The server may perform such a computation for each field value pair (see 2610) generated in 2604.

Figure 27A:
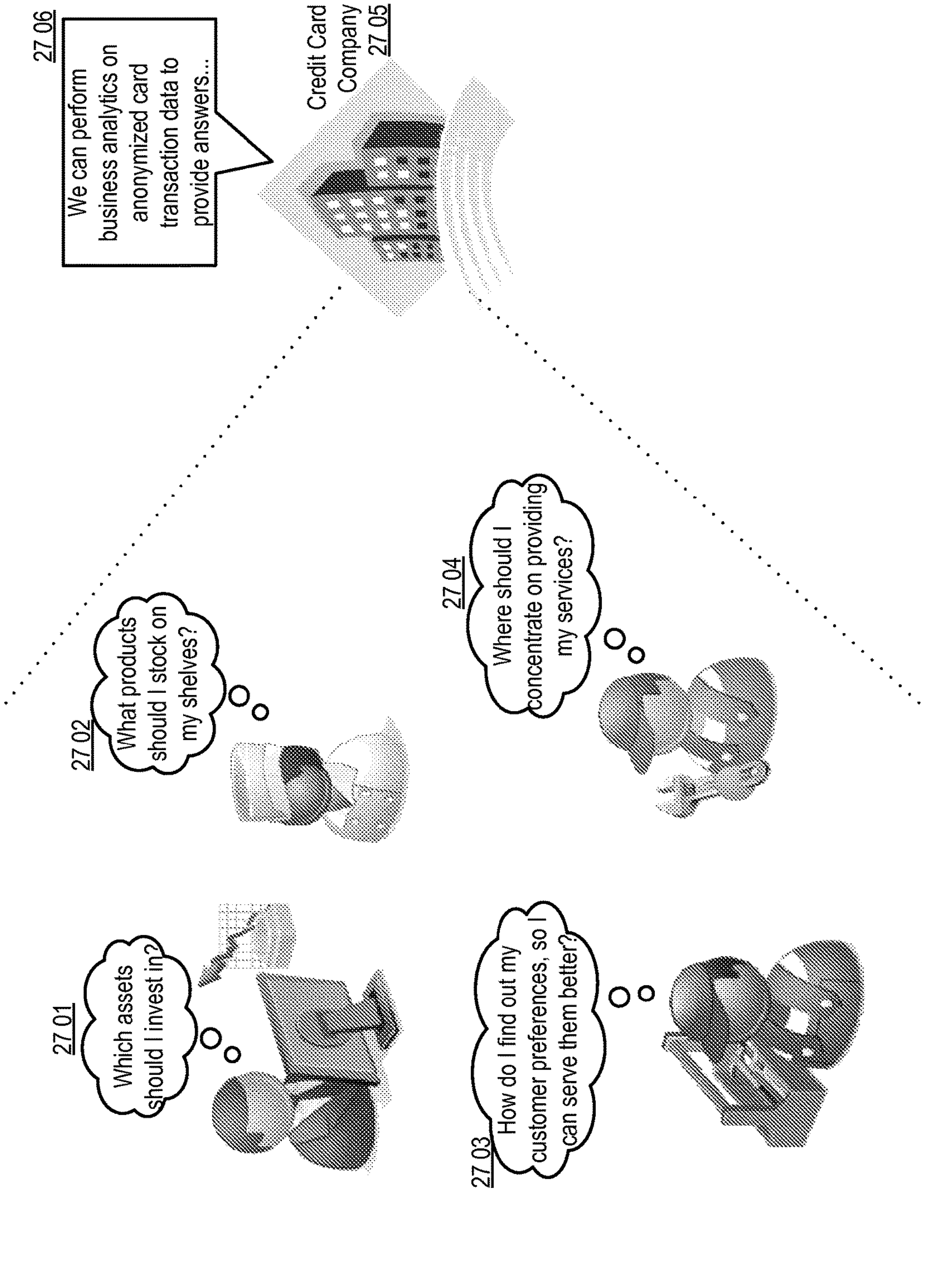
FIGS. 27A-B show block diagrams illustrating example aspects of merchant analytics in a second set of embodiments of the CPDB.
Figure 27B:
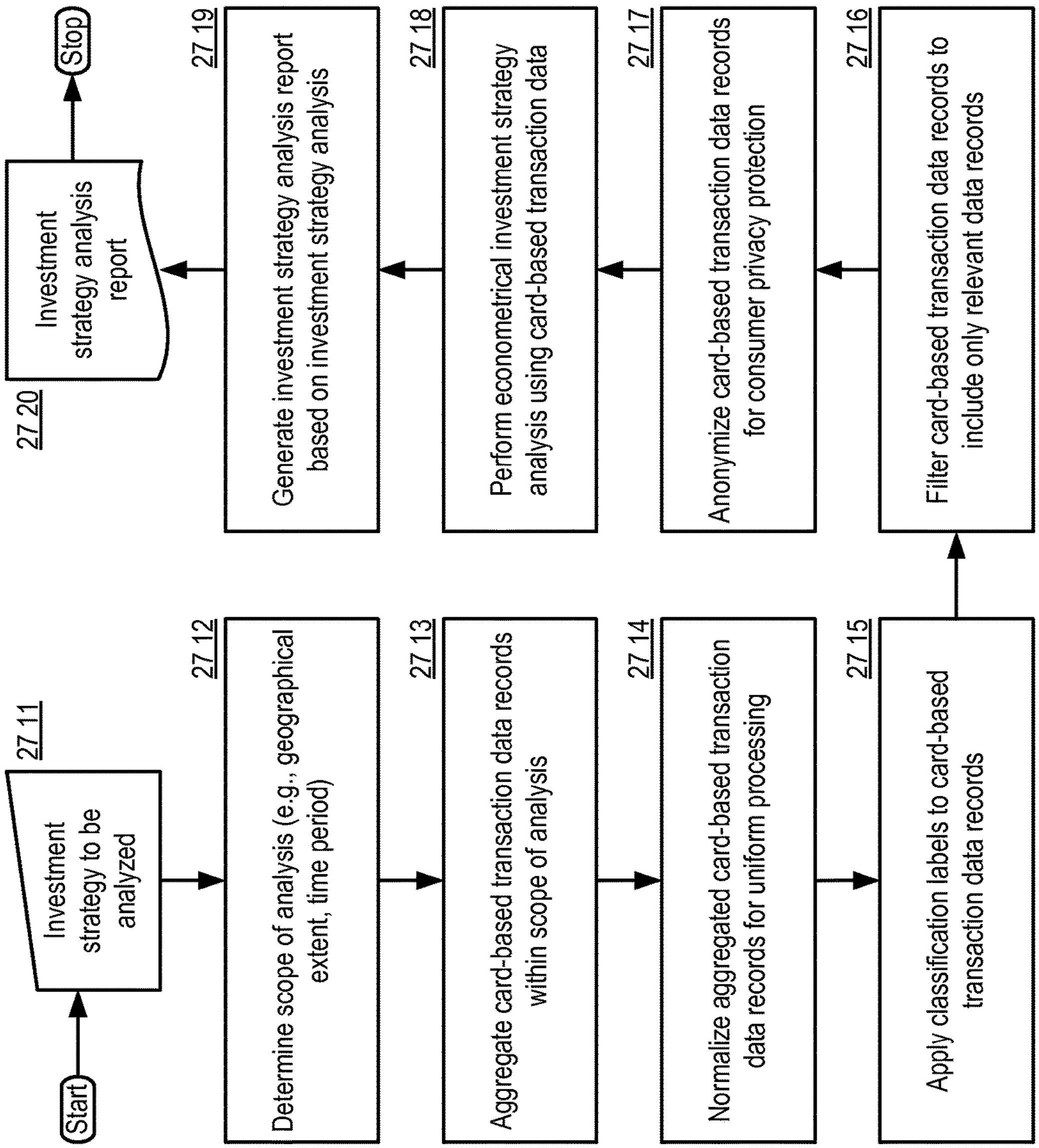

FIGS. 27A-B show block diagrams illustrating example aspects of merchant analytics in a second set of embodiments of the CPDB. With reference to FIG. 27A, in some implementations, the CPDB may provide merchant analytics reports to various users in order to facilitate their making calculated investment decisions. For example, a stock investor may desire business analytics to determine which stocks the investor should invest in, how the investor should modify the investor's portfolio, and/or the like, e.g., 2701. In another example, a retailer may desire to understand customer behavior better so that the retailer may determine which products to provide for customers to generate maximum retail sales, e.g., 2702. In another example, a serviceperson providing services to customers may desire to understand which services the customer tend to prefer, and/or a paying for in the marketplace, e.g., 2703. In another example, a service provider may desire to understand the geographical areas where business for the serviceperson is likely to be concentrated, e.g., 2704. In some implementations, a credit card company may have access to a large database of card-based transactions. The card-based transaction may have distributed among them information on customer behavior, demand, geographical distribution, industry sector preferences, and/or the like, which may be mined in order to provide investors, retailer, service personnel and/or other users business analytics information based on analyzing the card-based transaction data. In some implementations, the CPDB may take specific measures in order to ensure the anonymity of users whose card-based transaction data are analyzed for providing business analytics information for users. For example, the CPDB may perform business analytics on anonymized card-based transaction data to provide solutions to questions such as illustrated in 2701-2704.

With reference to FIG. 27B, in some implementations, the CPDB may obtain an investment strategy to be analyzed, e.g., 2711, for example, from a user. The CPDB may determine, e.g., 2712 the scope of the investment strategy analysis (e.g., geographic scope, amount of data required, industry segments to analyze, type of analysis to be generated, time-resolution of the analysis (e.g., minute, hour, day, month, year, etc.), geographic resolution (e.g., street, block, zipcode, metropolitan area, city, state, country, inter-continental, etc.). The CPDB may aggregate card-based transaction data in accordance with the determined scope of analysis, e.g., 2713. The CPDB may normalized aggregated card-based transaction data records for uniform processing, e.g., 2714. In some implementations, the CPDB may apply classification labels to card-based transaction data records, e.g., 2715, for investment strategy analysis. The CPDB may filter the card-based transaction data records to include only those records as relevant to the analysis, e.g., 2716. For example, the CPDB may utilize the classification labels corresponding to the transaction data records to determine which records are relevant to the analysis. In some implementations, the CPDB may anonymize transaction data records for consumer privacy protection prior to investment strategy analysis, e.g., 2717. The CPDB may perform econometrical investment strategy analysis, e.g., 2718, and generate an investment strategy analysis report based on the investment strategy analysis, e.g., 2719. The CPDB may provide the investment strategy analysis report for the user requesting the investment strategy analysis.

Figure 28A:
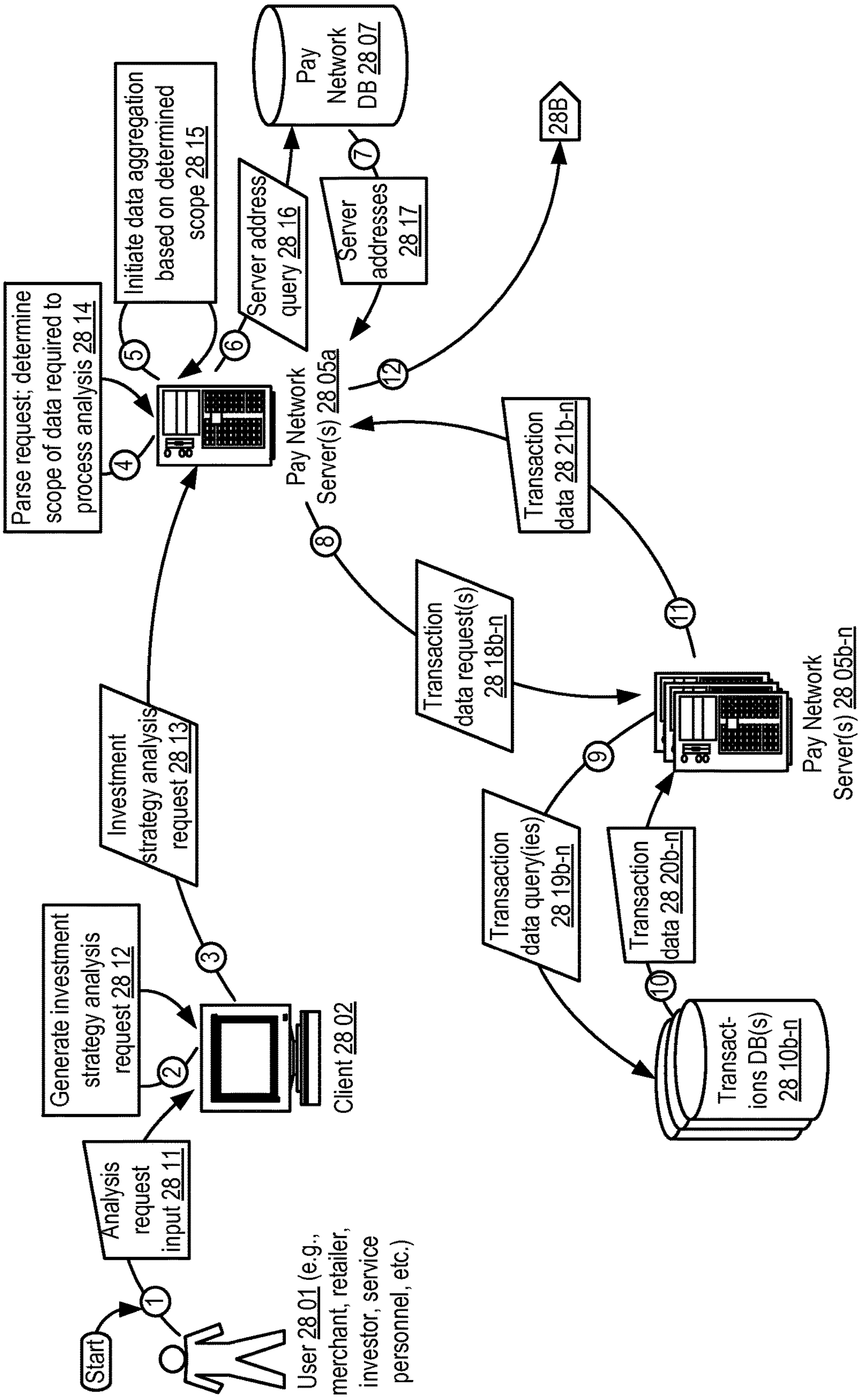
FIGS. 28A-C show data flow diagrams illustrating an example procedure for econometrical analysis of a proposed investment strategy based on card-based transaction data in some embodiments of the CPDB.
Figure 28B:
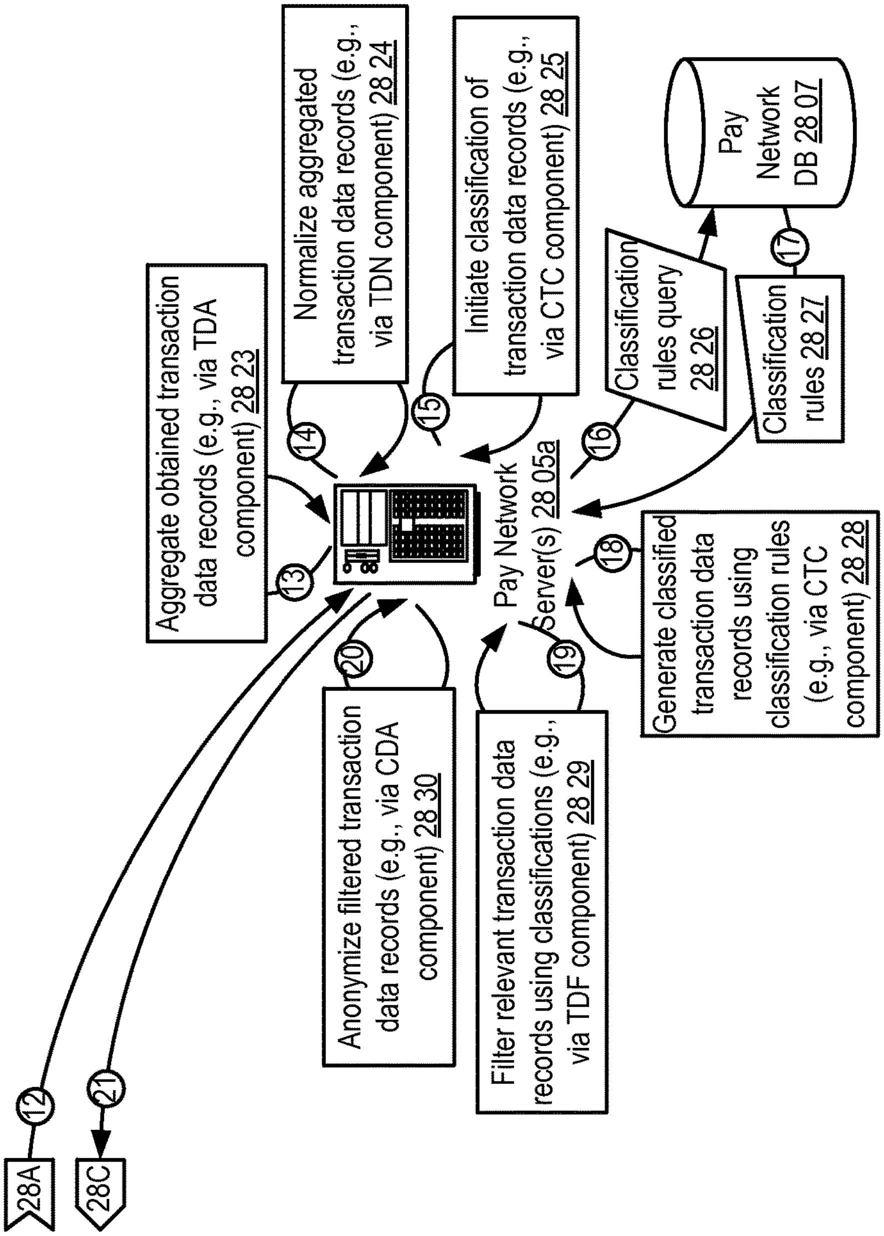
Figure 28C:
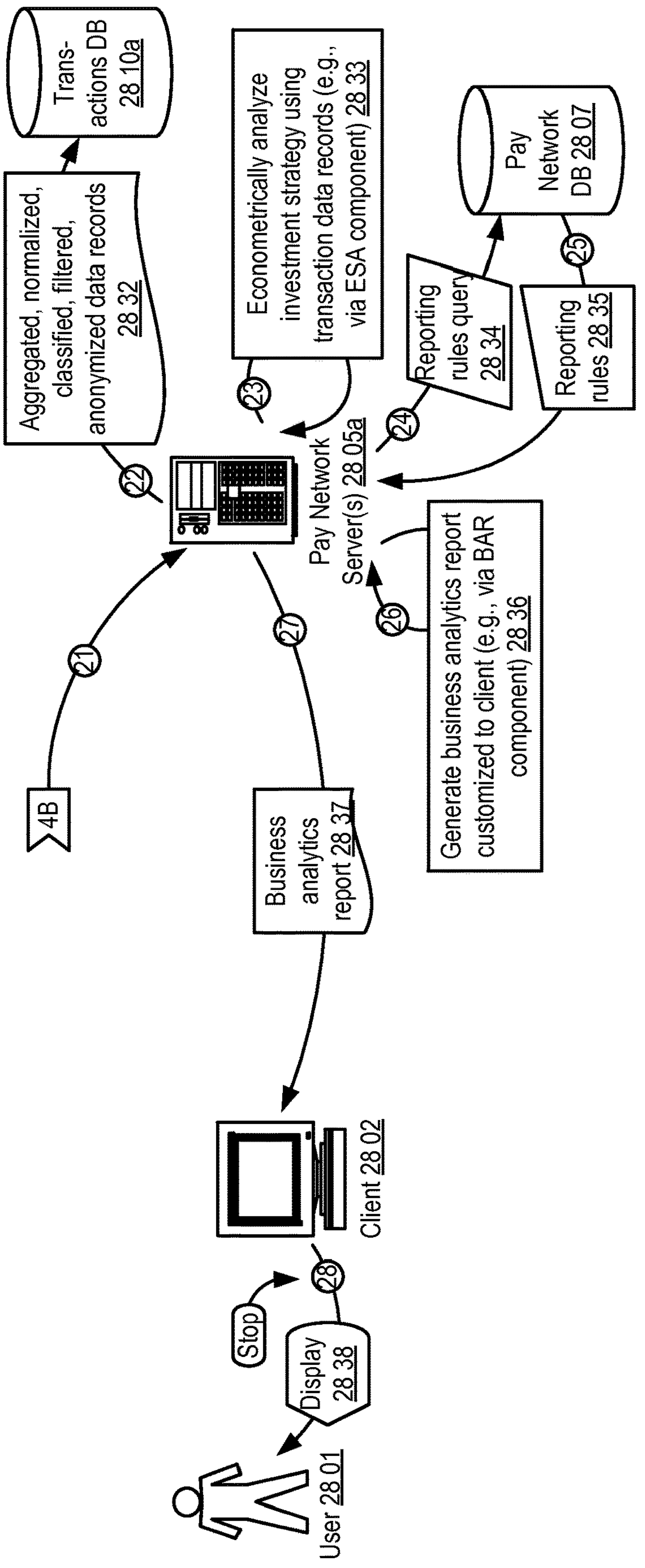

FIGS. 28A-C show data flow diagrams illustrating an example procedure for econometrical analysis of a proposed investment strategy based on card-based transaction data in some embodiments of the CPDB. With reference to FIG. 28A, in some implementations, a user, e.g., 2801, may desire to obtain an analysis of an investment strategy. For example, the user may be a merchant, a retailer, an investor, a serviceperson, and/or the like provider or products, services, and/or other offerings. The user may communicate with a pay network server, e.g., 2805*a*, to obtain an investment strategy analysis. For example, the user may provide user input, e.g., analysis request input 2811, into a client, e.g., 2802, indicating the user's desire to request an investment strategy analysis. In various implementations, the user input may include, but not be limited to: keyboard entry, mouse clicks, depressing buttons on a joystick/game console, voice commands, single/multi-touch gestures on a touch-sensitive interface, touching user interface elements on a touch-sensitive display, and/or the like. In some implementations, the client may generate an investment strategy analysis request, e.g., 2812, and provide, e.g., 2813, the generated investment strategy analysis request to the pay network server. For example, a browser application executing on the client may provide, on behalf of the user, a (Secure) Hypertext Transfer Protocol ("HTTP(S)") GET message including the investment strategy analysis request in the form of XML-formatted data. Below is an example HTTP(S) GET message including an XML-formatted investment strategy analysis request:

```
GET /analysisrequest.php HTTP/1.1
Host: www.paynetwork.com
Content-Type: Application/XML
Content-Length: 1306
<?XML version = "1.0" encoding = "UTF-8"?>
<analysis_request>
        <request_ID>EJ39FI1F</request_ID>
        <timestamp>2011-02-24 09:08:11</timestamp>
        <user_ID>investor@paynetwork.com</user_ID>
        <password>******</password>
        <request_details>
            <time_period>year 2011</time_period>
            <time_interval>month-to-month</time_interval>
            <area_scope>United States</area>
            <area_resolution>zipcode</area_resolution>
            <spend_sector>retail<sub>home
improvement</sub></spend_sector>
        </request_details>
        <client_details>
            <client_IP>192.168.23.126</client_IP>
            <client_type>smartphone</client_type>
            <client_model>HTC Hero</client_model>
            <OS>Android 2.2</OS>
            <app_installed_flag>true</app_installed_flag>
        </client_details>
</analysis_request>
```

In some implementations, the pay network server may parse the investment strategy analysis request, and determine the type of investment strategy analysis required, e.g., 2814. In some implementations, the pay network server may determine a scope of data aggregation required to perform the analysis. The pay network server may initiate data aggregation based on the determined scope, for example, via a Transaction Data Aggregation ("TDA") component such as described above with reference to FIG. 9. The pay network server may query, e.g., 2816, a pay network database, e.g., 2807, for addresses of pay network servers that may have stored transaction data within the determined scope of the data aggregation. For example, the pay network server may utilize PHP/SQL commands similar to the examples provided above. The database may provide, e.g., 2817, a list of server addresses in response to the pay network server's query. Based on the list of server addresses, the pay network server may issue transaction data requests, e.g., 2818*b-n*, to the other pay network servers, e.g., 2805*b-n*. The other the pay network servers may query their transaction databases, e.g., 2810*b-n*, for transaction data falling within the scope of the transaction data requests. In response to the transaction data queries, e.g., 2819*b-n*, the transaction databases may provide transaction data, e.g., 2820*b-n*, to the other pay network servers. The other pay network servers may return the transaction data obtained from the transactions databases, e.g., 2821*b-n*, to the pay network server making the transaction data requests, e.g., 2805*a*.

With reference to FIG. 28B, the pay network server 2805*a* may aggregate, e.g., 2823, the obtained transaction data records, e.g. via the TDA component. The pay network server may normalize, e.g., 2824, the aggregated transaction data so that all the data share a uniform data structure format, e.g., via a Transaction Data Normalization ("TDN") component such as described below with reference to FIG. 29. The pay network server may generate, e.g., 2825-2828, one or more classification labels for each of the transaction data records, e.g., via a Card-Based Transaction Classification ("CTC") component such as described below with reference to FIG. 30. The pay network server may query for classification rules, e.g., 2826, a database, e.g., pay network database 2807. Upon obtaining the classification rules, e.g., 2827, the pay network server may generate, e.g., 2828, classified transaction data records using the classification rules, e.g., via the CTC component. The pay network server may filter, e.g., 2829, relevant transaction data records using the classification labels, e.g., via a Transaction Data Filtering ("TDF") component such as described below with reference to FIG. 31. The pay network server may anonymize, e.g., 2830, the transaction data records, e.g., via a Consumer Data Anonymization ("CDA") component such as described below with reference to FIG. 32.

With reference to FIG. 28C, the pay network server may, in some implementations, store aggregated, normalized, classified, filtered, and/or anonymized data records, e.g., 2832, in a database, e.g., transactions database 2810*a*. In some implementations, the pay network server may econometrically analyze, e.g., 2833, aggregated, normalized, classified, filtered, and/or anonymized data records, e.g., via an Econometrical Strategy Analysis ("ESA") component such as described below with reference to FIG. 33. The pay network server may prepare a report customized to the client used by the user. The pay network server may provide a reporting rules query to a database, e.g., pay network database 2807, for reporting rules to use in preparing the business analytics report. Upon obtaining the reporting rules, e.g., 2835, the pay network server may generate a business analytics report customized to the client, e.g., 2836, for example via a Business Analytics Reporting ("BAR") such as described below with reference to FIG. 34. The pay network server may provide the business analytics report, e.g., 2837, to the client, e.g., 2802. The client may render and display, e.g., 2838, the business analytics report for the user.

Figure 29:
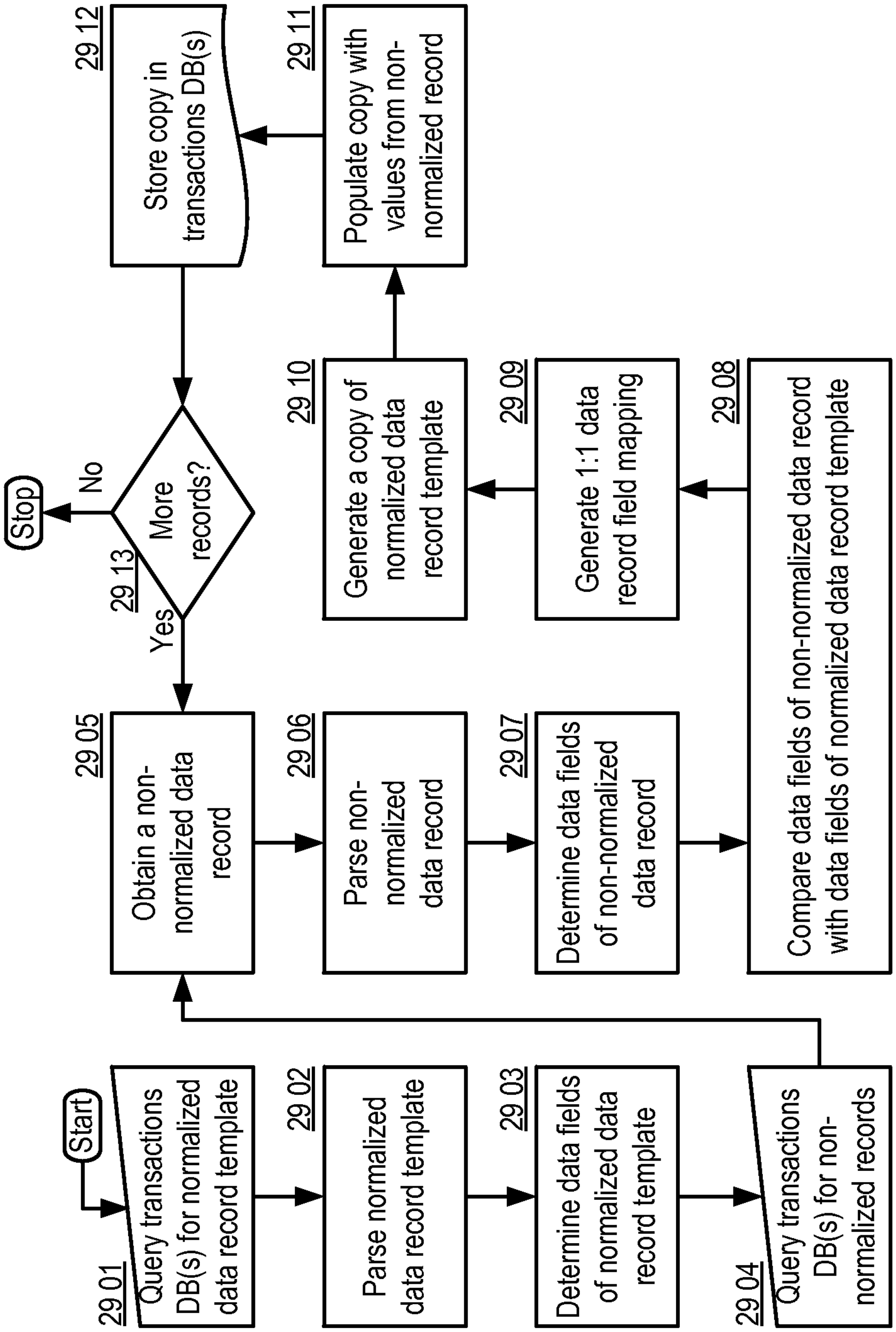
FIG. 29 shows a logic flow diagram illustrating example aspects of normalizing raw card-based transaction data into a standardized data format in some embodiments of the CPDB, e.g., a Transaction Data Normalization ("TDN") component.

FIG. 29 shows a logic flow diagram illustrating example aspects of normalizing raw card-based transaction data into a standardized data format in some embodiments of the CPDB, e.g., a Transaction Data Normalization ("TDN") component. In some implementations, a pay network server ("server") may attempt to convert any transaction data records stored in a database it has access to in a normalized data format. For example, the database may have a transaction data record template with predetermined, standard fields that may store data in pre-defined formats (e.g., long integer/double float/4 digits of precision, etc.) in a predetermined data structure. A sample XML transaction data record template is provided below:

```
<?XML version = "1.0" encoding = "UTF-8"?>
<transaction_record>
        <record_ID>00000000</record_ID>
        <norm_flag>false</norm_flag>
        <timestamp>yyyy-mm-dd hh:mm:ss</timestamp>
        <transaction_cost>$0,000,000,00</transaction_cost>
        <merchant_params>
            <merchant_id>00000000</merchant_id>
            <merchant_name>TBD</merchant_name>
            <merch_auth_key>0000000000000000
            </merch_auth_key>
        </merchant_params>
        <merchant_products>
            <num_products>000</num_products>
            <product>
                <product_type>TBD</product_type>
                <product_name>TBD</product_name>
                <class_labels_list>TBD<class_labels_list>
                <product_quantity>000</product_quantity>
                <unit_value>$0,000,000.00</unit_value>
                <sub_total>$0,000,000.00</sub_total>
                <comment>normalized transaction data record
template</comment>
            </product>
        </merchant_products>
        <user_account_params>
            <account_name>JTBD</account_name>
            <account_type>TBD</account_type>
            <account_num>0000000000000000</account_num>
            <billing_line1>TBD</billing_line1>
            <billing_line2>TBD</billing_line2>
            <zipcode>TBD</zipcode>
            <state>TBD</state>
            <country>TBD</country>
            <phone>00-00-000-000-0000</phone>
            <sign>TBD</sign>
        </user_account_params>
</transaction_record>
```

In some implementations, the server may query a database for a normalized transaction data record template, e.g., 2901. The server may parse the normalized data record template, e.g., 2902. Based on parsing the normalized data record template, the server may determine the data fields included in the normalized data record template, and the format of the data stored in the fields of the data record template, e.g., 2903. The server may obtain transaction data records for normalization. The server may query a database, e.g., 2904, for non-normalized records. For example, the server may issue PHP/SQL commands to retrieve records that do not have the 'norm flag' field from the example template above, or those where the value of the 'norm_flag' field is 'false'. Upon obtaining the non-normalized transaction data records, the server may select one of the non-normalized transaction data records, e.g., 2905. The server may parse the non-normalized transaction data record, e.g., 2906, and determine the fields present in the non-normalized transaction data record, e.g., 2907. The server may compare the fields from the non-normalized transaction data record with the fields extracted from the normalized transaction data record template. For example, the server may determine whether the field identifiers of fields in the non-normalized transaction data record match those of the normalized transaction data record template, (e.g., via a dictionary, thesaurus, etc.), are identical, are synonymous, are related, and/or the like. Based on the comparison, the server may generate a 1:1 mapping between fields of the non-normalized transaction data record match those of the normalized transaction data record template, e.g., 2909. The server may generate a copy of the normalized transaction data record template, e.g., 2910, and populate the fields of the template using values from the non-normalized transaction data record, e.g., 2911. The server may also change the value of the 'norm_flag' field to 'true' in the example above. The server may store the populated record in a database (for example, replacing the original version), e.g., 2912. The server may repeat the above procedure for each non-normalized transaction data record (see e.g., 2913), until all the non-normalized transaction data records have been normalized.

Figure 30:
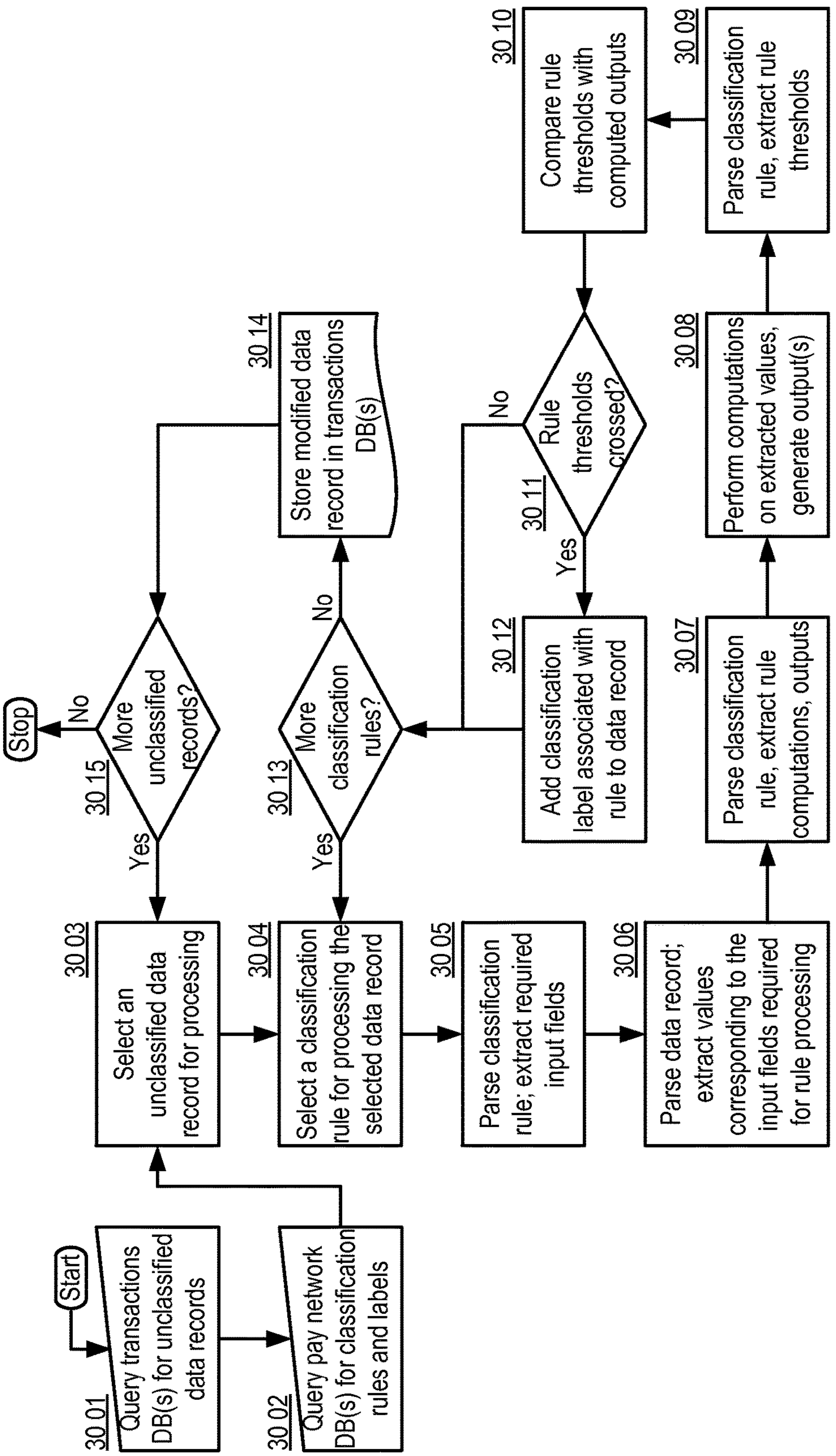
FIG. 30 shows a logic flow diagram illustrating example aspects of generating classification labels for card-based transactions in some embodiments of the CPDB, e.g., a Card-Based Transaction Classification ("CTC") component.

FIG. 30 shows a logic flow diagram illustrating example aspects of generating classification labels for card-based transactions in some embodiments of the CPDB, e.g., a Card-Based Transaction Classification ("CTC") component. In some implementations, a server may apply one or more classification labels to each of the transaction data records. For example, the server may classify the transaction data records, according to criteria such as, but not limited to: geo-political area, luxury level of the product, industry sector, number of items purchased in the transaction, and/or the like. The server may obtain transactions from a database that are unclassified, e.g., 3001, and obtain rules and labels for classifying the records, e.g., 3002. For example, the database may store classification rules, such as the exemplary illustrative XML-encoded classification rule provided below:

```
<rule>
    <id>NAICS44_45</id>
    <name>NAICS - Retail Trade</name>
    <inputs>merchant_id</inputs>
    <operations>
        <1>label = 'null'</1>
        <1>cat = NAICS_LOOKUP(merchant_id)</1>
        <2>IF (cat == 44 || cat ==45) label = 'retail trade'</2>
    </operations>
    <outputs>label</outputs>
</rule>
```

The server may select an unclassified data record for processing, e.g., 3003. The server may also select a classification rule for processing the unclassified data record, e.g., 3004. The server may parse the classification rule, and determine the inputs required for the rule, e.g., 3005. Based on parsing the classification rule, the server may parse the normalized data record template, e.g., 3006, and extract the values for the fields required to be provided as inputs to the classification rule. For example, to process the rule in the example above, the server may extract the value of the field 'merchant_id' from the transaction data record. The server may parse the classification rule, and extract the operations to be performed on the inputs provided for the rule processing, e.g., 3007. Upon determining the operations to be performed, the server may perform the rule-specified operations on the inputs provided for the classification rule, e.g., 3008. In some implementations, the rule may provide threshold values. For example, the rule may specify that if the number of products in the transaction, total value of the transaction, average luxury rating of the products sold in the transaction, etc. may need to cross a threshold in order for the label(s) associated with the rule to be applied to the transaction data record. The server may parse the classification rule to extract any threshold values required for the rule to apply, e.g., 3009. The server may compare the computed values with the rule thresholds, e.g., 3010. If the rule threshold(s) is crossed, e.g., 3011, option "Yes," the server may apply one or more labels to the transaction data record as specified by the classification rule, e.g., 3012. For example, the server may apply a classification rule to an individual product within the transaction, and/or to the transaction as a whole. In some implementations, the server may process the transaction data record using each rule (see, e.g., 3013). Once all classification rules have been processed for the transaction record, e.g., 3013, option "No," the server may store the transaction data record in a database, e.g., 3014. The server may perform such processing for each transaction data record until all transaction data records have been classified (see, e.g., 3015).

Figure 31:
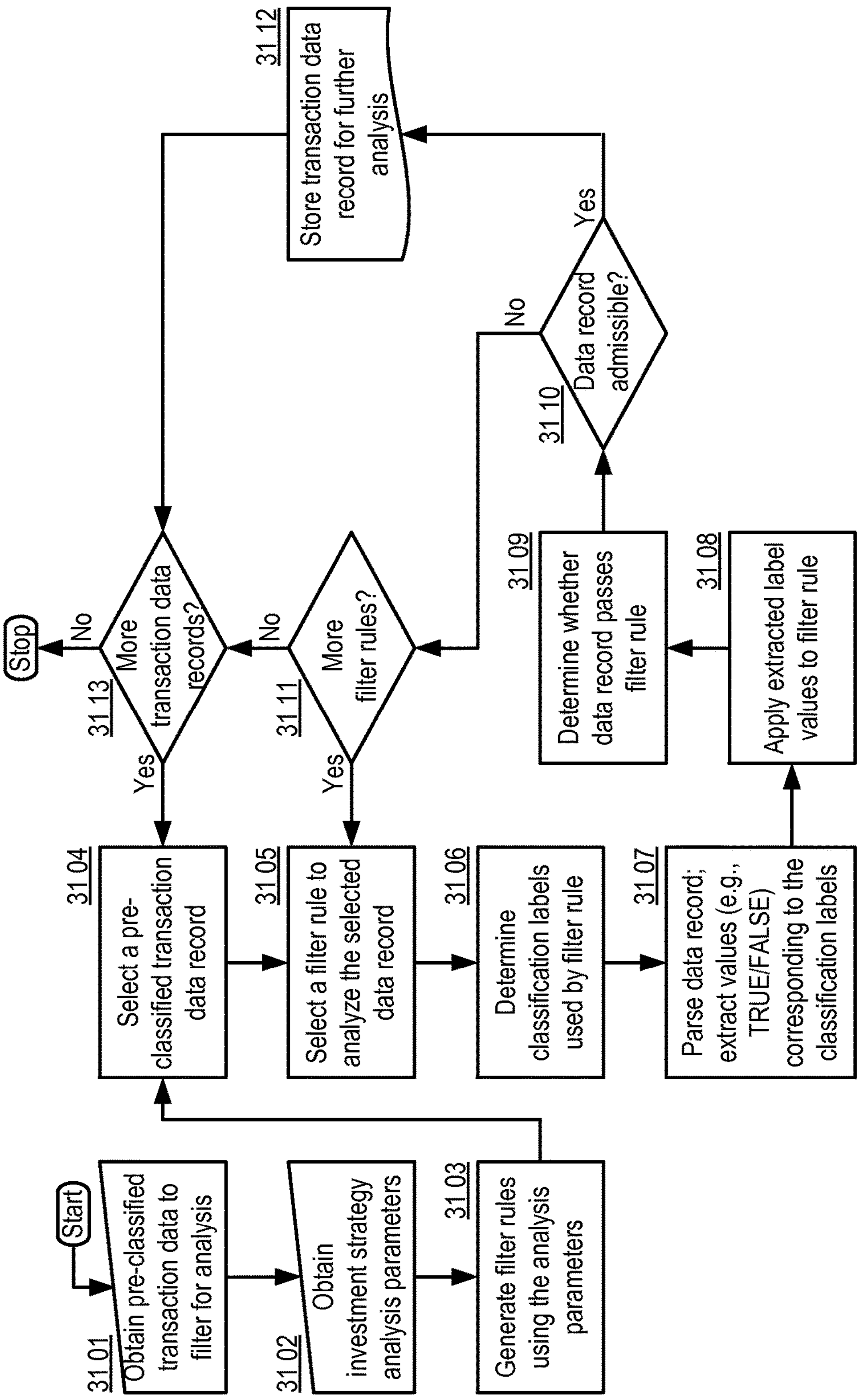
FIG. 31 shows a logic flow diagram illustrating example aspects of filtering card-based transaction data for econometrical investment strategy analysis in some embodiments of the CPDB, e.g., a Transaction Data Filtering ("TDF") component.

FIG. 31 shows a logic flow diagram illustrating example aspects of filtering card-based transaction data for econometrical investment strategy analysis in some embodiments of the CPDB, e.g., a Transaction Data Filtering ("TDF") component. In some implementations, a server may filter transaction data records prior to econometrical investment strategy analysis based on classification labels applied to the transaction data records. For example, the server may filter the transaction data records, according to criteria such as, but not limited to: geo-political area, luxury level of the product, industry sector, number of items purchased in the transaction, and/or the like. The server may obtain transactions from a database that are classified, e.g., 3101, and investment strategy analysis parameters, e.g., 3102. Based on the analysis parameters, the server may generate filter rules for the transaction data records, e.g., 3103. The server may select a classified data record for processing, e.g., 3104. The server may also select a filter rule for processing the classified data record, e.g., 3105. The server may parse the filter rule, and determine the classification labels required for the rule, e.g., 3106. Based on parsing the classification rule, the server may parse the classified data record, e.g., 3107, and extract values for the classification labels (e.g., true/false) required to process the filter rule. The server may apply the classification labels values to the filter rule, e.g., 3108, and determine whether the transaction data record passes the filter rule, e.g., 3109. If the data record is admissible in view of the filter rule, e.g., 3110, option "Yes," the server may store the transaction data record for further analysis, e.g., 3112. If the data record is not admissible in view of the filter rule, e.g., 3110, option "No," the server may select another filter rule to process the transaction data record. In some implementations, the server may process the transaction data record using each rule (see, e.g., 3111) until all rules are exhausted. The server may perform such processing for each transaction data record until all transaction data records have been filtered (see, e.g., 3113).

Figure 32:
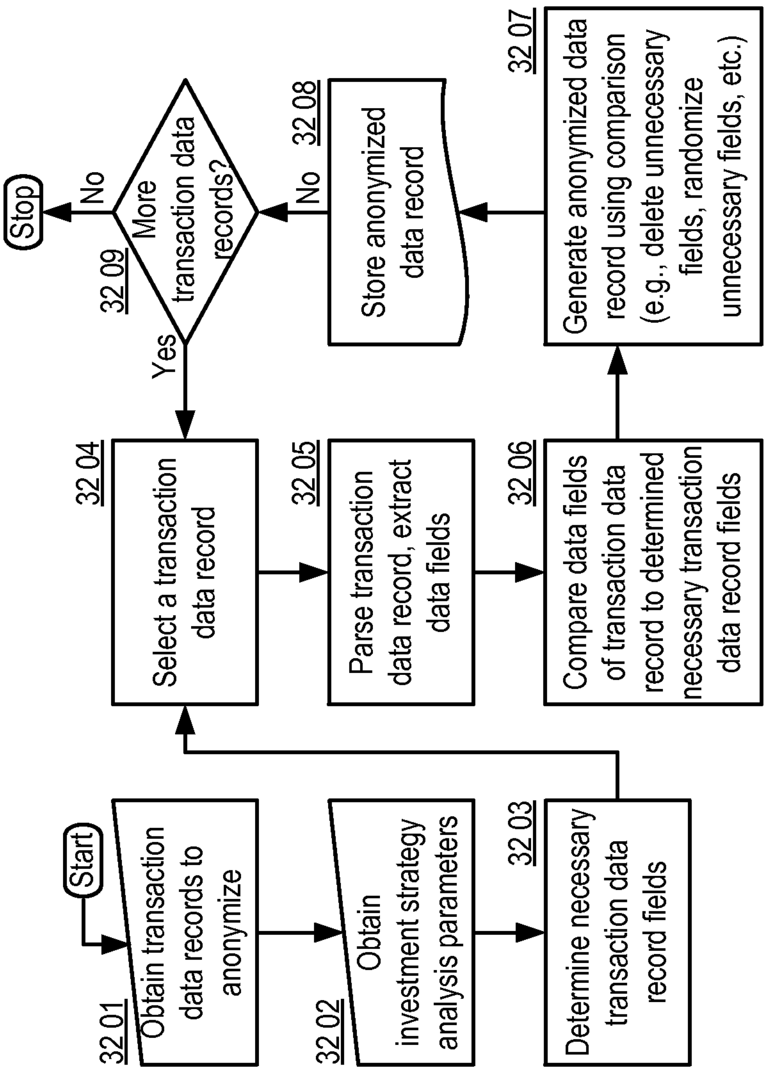
FIG. 32 shows a logic flow diagram illustrating example aspects of anonymizing consumer data from card-based transactions for econometrical investment strategy analysis in some embodiments of the CPDB, e.g., a Consumer Data Anonymization ("CDA") component.

FIG. 32 shows a logic flow diagram illustrating example aspects of anonymizing consumer data from card-based transactions for econometrical investment strategy analysis in some embodiments of the CPDB, e.g., a Consumer Data Anonymization ("CDA") component. In some implementations, a server may remove personal information relating to the user (e.g., those fields that are not required for econometrical investment strategy analysis) and/or merchant from the transaction data records. For example, the server may truncate the transaction data records, fill randomly generated values in the fields comprising personal information, and/or the like. The server may obtain transactions from a database that are to be anonymized, e.g., 3201, and investment strategy analysis parameters, e.g., 3202. Based on the analysis parameters, the server may determine the fields that are necessary for econometrical investment strategy analysis, e.g., 3203. The server may select a transaction data record for processing, e.g., 3204. The server may parse the transaction data record, e.g., 3205, and extract the data fields in the transactions data records. The server may compare the data fields of the transaction data record with the fields determined to be necessary for the investment strategy analysis, e.g., 3206. Based on the comparison, the server may remove any data fields from the transaction data record, e.g., those that are not necessary for the investment strategy analysis, and generate an anonymized transaction data record, e.g., 3207. The server may store the anonymized transaction data record in a database, e.g., 3208. In some implementations, the server may process each transaction data record (see, e.g., 3209) until all the transaction data records have been anonymized.

Figure 33A:
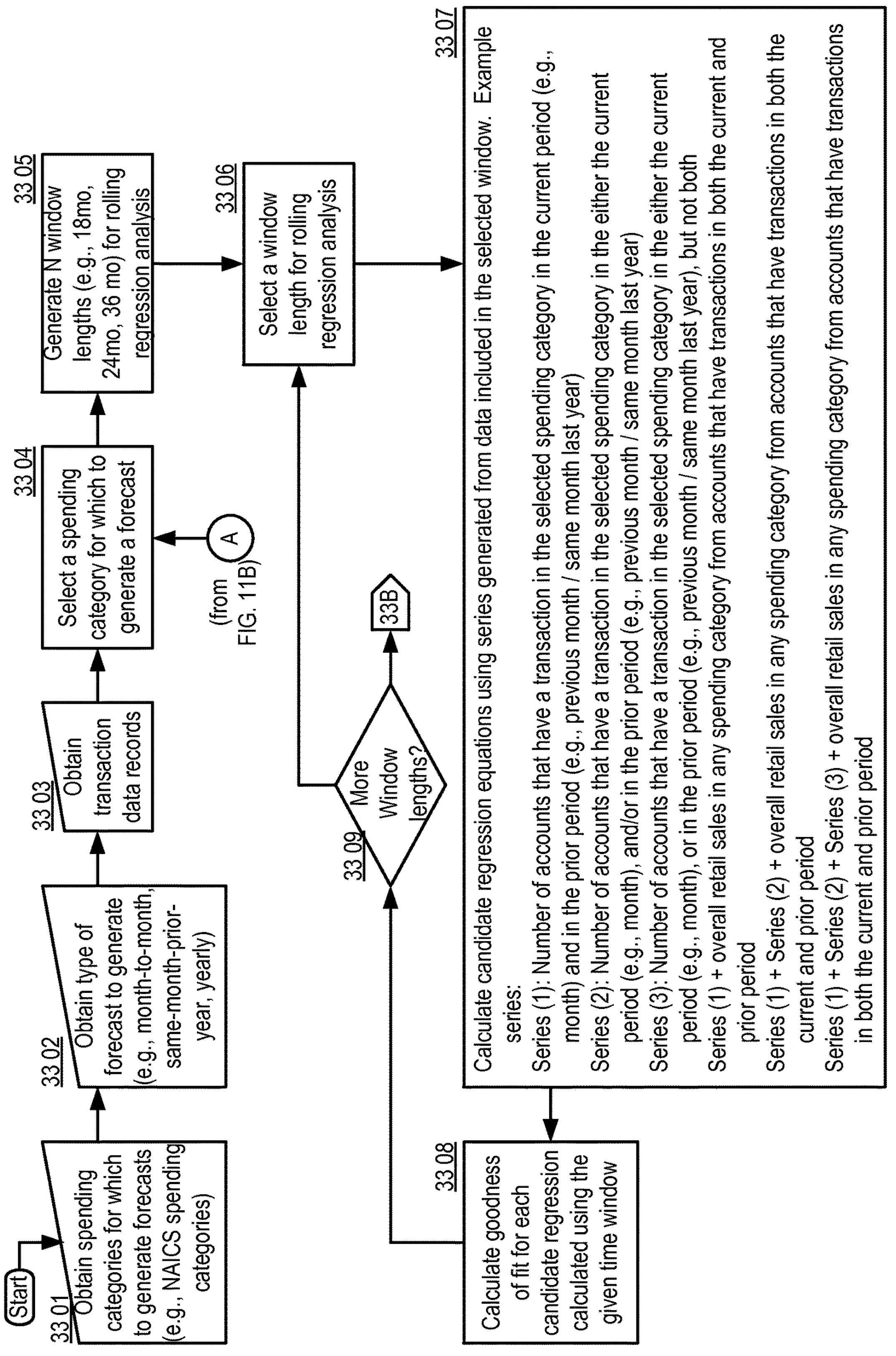
FIGS. 33A-B show logic flow diagrams illustrating example aspects of econometrically analyzing a proposed investment strategy based on card-based transaction data in some embodiments of the CPDB, e.g., an Econometrical Strategy Analysis ("ESA") component.
Figure 33B:
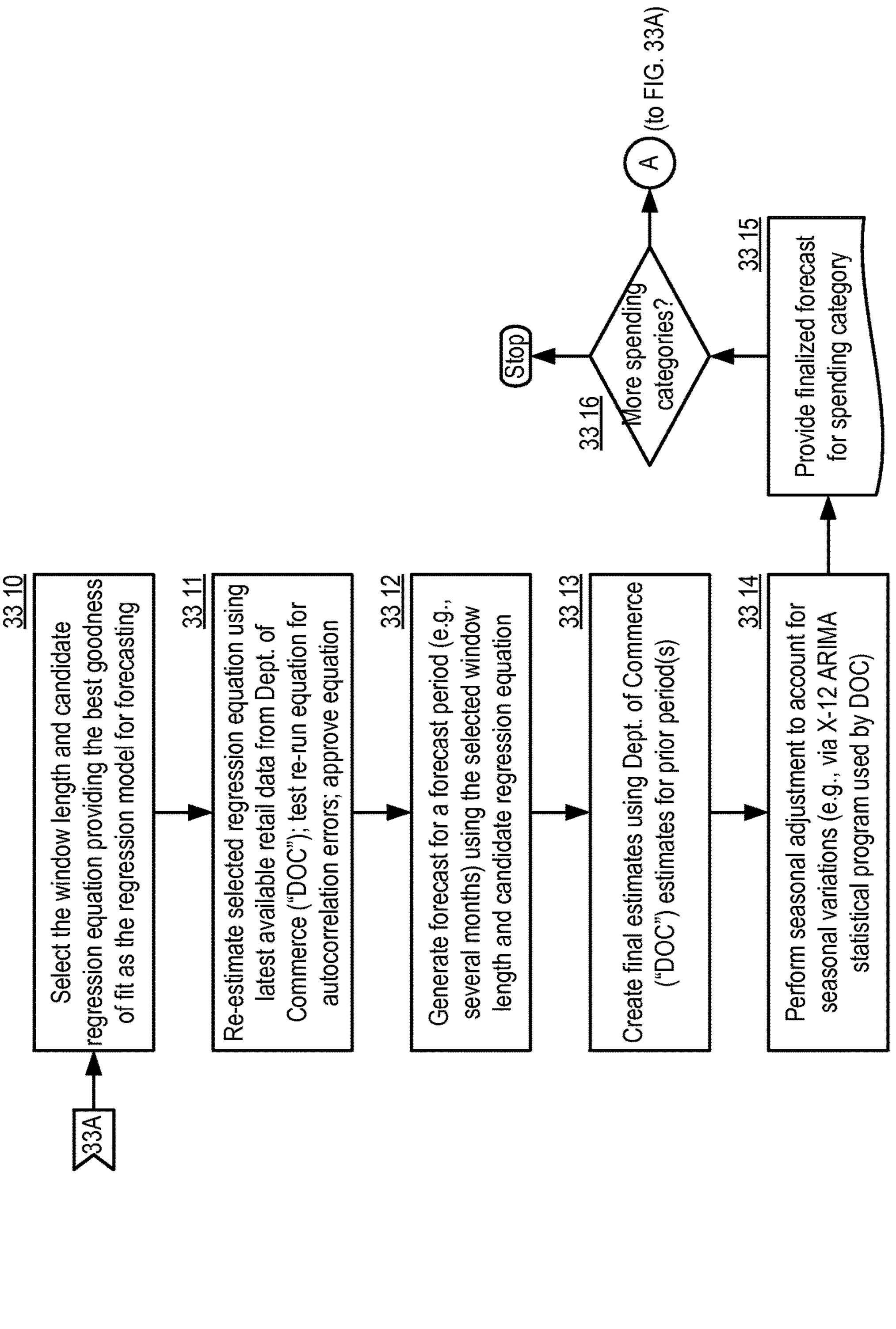

FIGS. 33A-B show logic flow diagrams illustrating example aspects of econometrically analyzing a proposed investment strategy based on card-based transaction data in some embodiments of the CPDB, e.g., an Econometrical Strategy Analysis ("ESA") component. With reference to FIG. 33A, in some implementations, the server may obtain spending categories (e.g., spending categories as specified by the North American Industry Classification System ("NAICS")) for which to generate estimates, e.g., 3301. The server may also obtain the type of forecast (e.g., month-to-month, same-month-prior-year, yearly, etc.) to be generated from the econometrical investment strategy analysis, e.g., 3302. In some implementations, the server may obtain the transaction data records using which the server may perform econometrical investment strategy analysis, e.g., 3303. For example, the server may select a spending category (e.g., from the obtained list of spending categories) for which to generate the forecast, e.g., 3304. For example, the forecast series may be several aggregate series (described below) and the 12 spending categories in the North American Industry Classification System (NAICS) such as department stores, gasoline, and so on, that may be reported by the Department of Commerce (DOC).

To generate the forecast, the server may utilize a random sample of transaction data (e.g., approximately 6% of all transaction data within the network of pay servers), and regression analysis to generate model equations for calculating the forecast from the sample data. For example, the server may utilize distributed computing algorithms such as Google MapReduce. Four elements may be considered in the estimation and forecast methodologies: (a) rolling regressions; (b) selection of the data sample ("window") for the regressions; (c) definition of explanatory variables (selection of accounts used to calculate spending growth rates); and (d) inclusion of the explanatory variables in the regression equation ("candidate" regressions) that may be investigated for forecasting accuracy. The dependent variable may be, e.g., the growth rate calculated from DOC revised sales estimates published periodically. Rolling regressions may be used as a stable and reliable forecasting methodology. A rolling regression is a regression equation estimated with a fixed length data sample that is updated with new (e.g., monthly) data as they become available. When a new data observation is added to the sample, the oldest observation is dropped, causing the total number of observations to remain unchanged. The equation may be estimated with the most recent data, and may be re-estimated periodically (e.g., monthly). The equation may then be used to generate a one-month ahead forecast for year-over-year or month over month sales growth.

Thus, in some implementations, the server may generate N window lengths (e.g., 18 mo, 24 mo, 36 mo) for rolling regression analysis, e.g., 3305. For each of the candidate regressions (described below), various window lengths may be tested to determine which would systemically provide the most accurate forecasts. For example, the server may select a window length may be tested for rolling regression analysis, e.g., 3306. The server may generate candidate regression equations using series generated from data included in the selected window, e.g., 3307. For example, the server may generate various series, such as, but not limited to:

Series (1): Number of accounts that have a transaction in the selected spending category in the current period (e.g., month) and in the prior period (e.g., previous month/same month last year);

Series (2): Number of accounts that have a transaction in the selected spending category in the either the current period (e.g., month), and/or in the prior period (e.g., previous month/same month last year);

Series (3): Number of accounts that have a transaction in the selected spending category in the either the current period (e.g., month), or in the prior period (e.g., previous month/same month last year), but not both;

Series (4): Series (1)+overall retail sales in any spending category from accounts that have transactions in both the current and prior period;

Series (5): Series (1)+Series (2)+overall retail sales in any spending category from accounts that have transactions in both the current and prior period; and Series (6): Series (1)+Series (2)+Series (3)+overall retail sales in any spending category from accounts that have transactions in both the current and prior period.

With reference to FIG. 33B, in some implementations, the server may calculate several (e.g., six) candidate regression equations for each of the series. For example, the server may calculate the coefficients for each of the candidate regression equations. The server may calculate a value of goodness of fit to the data for each candidate regression equations, e.g., 3308. For example, two measures of goodness of fit may be used: (1) out-of-sample (simple) correlation; and (2) minimum absolute deviation of the forecast from revised DOC estimates. In some implementations, various measures of goodness of fit may be combined to create a score. In some implementations, candidate regression equations may be generated using rolling regression analysis with each of the N generated window lengths (see, e.g., 3309). In some implementations, upon generation of all the candidate regression equations and their corresponding goodness of fit scores, the equation(s) with the best score is chosen as the model equation for forecasting, e.g., 3310. In some implementations, the equation(s) with the highest score is then re-estimated using latest retail data available, e.g., from the DOC, e.g., 3311. The rerun equations may be tested for auto correlated errors. If the auto correlation test is statistically significant then the forecasts may include an autoregressive error component, which may be offset based on the auto-correlation test.

In some implementations, the server may generate a forecast for a specified forecast period using the selected window length and the candidate regression equation, e.g., 3312. The server may create final estimates for the forecast using DOC estimates for prior period(s), e.g., 3313. For example, the final estimates (e.g., $F_t^Y$—year-over-year growth, $F_t^M$—month-over-month growth) may be calculated by averaging month-over-month and year-over-year estimates, as follows:

$$D_t^Y=(1+G_t^Y)\cdot R_{t-12}$$

$$D_t^M=(1+G_t^M)\cdot A_{t-1}$$

$$D_t=\text{Mean}(D_t^M,D_t^Y)$$

$$B_{t-1}^Y=(1+G_{t-1}^Y)\cdot R_{t-13}$$

$$B_{t-1}^M=A_{t-1}$$

$$B_{t-1}=\text{Mean}(B_{t-1}^M,B_{t-1}^Y)$$

$$F_t^Y=D_t/R_{t-12}-1$$

$$F_t^M=D_t/B_{t-1}-1$$

Here, G represents the growth rates estimated by the regressions for year (superscript Y) or month (superscript M), subscripts refer to the estimate period, t is the current forecasting period); R represents the DOC revised dollar sales estimate; A represents the DOC advance dollar estimate; D is a server-generated dollar estimate, B is a base dollar estimate for the previous period used to calculate the monthly growth forecast.

In some implementations, the server may perform a seasonal adjustment to the final estimates to account for seasonal variations, e.g., 3314. For example, the server may utilize the X-12 ARIMA statistical program used by the DOC for seasonal adjustment. The server may then provide the finalized forecast for the selected spending category, e.g., 3315. Candidate regressions may be similarly run for each spending category of interest (see, e.g., 3316).

Figure 34:
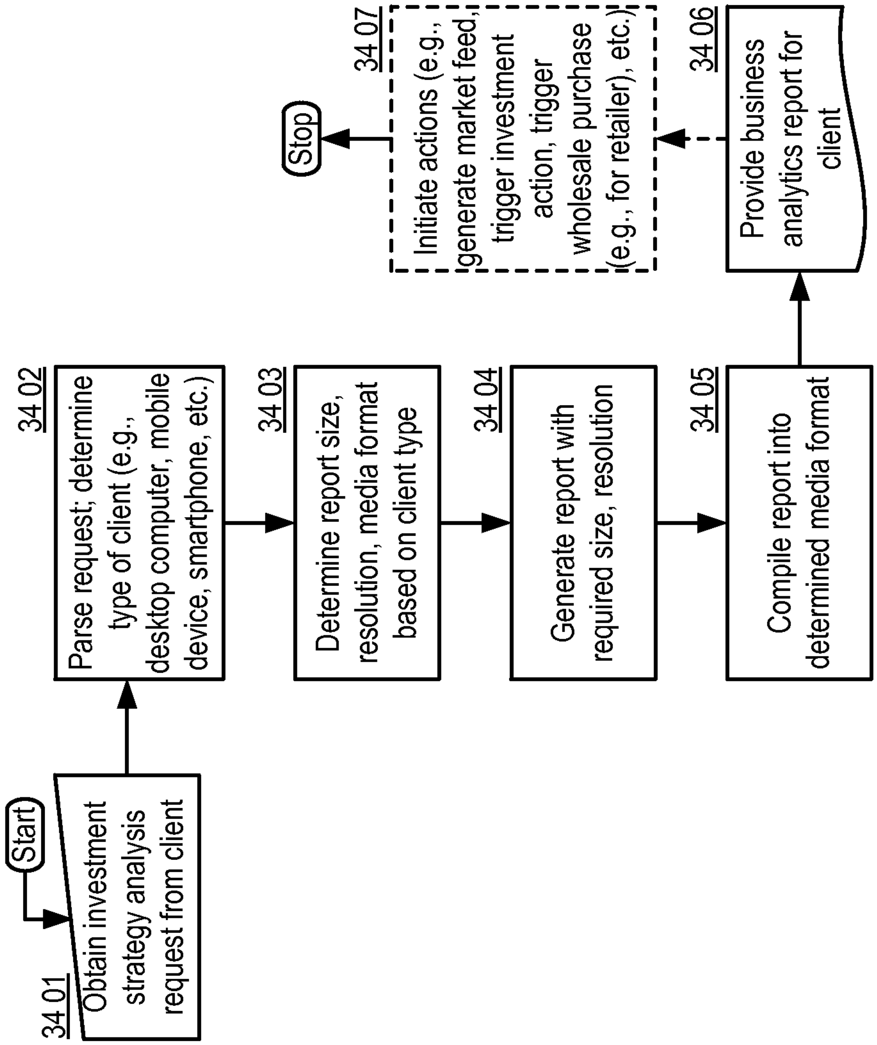
FIG. 34 shows a logic flow diagram illustrating example aspects of reporting business analytics derived from an econometrical analysis based on card-based transaction data in some embodiments of the CPDB, e.g., a Business Analytics Reporting ("BAR") component.

FIG. 34 shows a logic flow diagram illustrating example aspects of reporting business analytics derived from an econometrical analysis based on card-based transaction data in some embodiments of the CPDB, e.g., a Business Analytics Reporting ("BAR") component. In some implementations, the server may customize a business analytics report to the attributes of a client of the user requesting the investment strategy analysis, e.g., 3401. The server may obtain an investment strategy analysis request from a client. The request may include details about the client such as, but not limited to: client_type, client IP, client_model, client_OS, app_installed_flag, and/or the like. The server may parse the request, e.g., 3402, and determine the type of client (e.g., desktop computer, mobile device, smartphone, etc.). Based on the type of client, the server may determine attributes of the business analytics report, including but not limited to: report size; report resolution, media format, and/or the like, e.g., 3403. The server may generate the business analytics report according to the determined attributes, e.g., 3404. The server may compile the report into a media format according to the attributes of the client, e.g., 3405, and provide the business analytics report for the client, e.g., 3406. Optionally, the server may initiate actions (e.g., generate a market data feed, trigger an investment action, trigger a wholesale purchase of goods for a retailer, etc.) based on the business analytics report and/or data utilized in preparing the business analytics report, e.g., 3407.

Analytical Model Sharing

Thus, as seen from the discussion above, in various embodiments, the CPDB facilitates the creation of analytical models using which the data aggregated by the Centralized Personal Information Platform of the CPDB may be utilized to provide business or other intelligence to the various users of the CPDB. Examples of analytical models include the components discussed above in the discussion with reference to FIGS. 24 and 33A-B. In some implementations, the CPDB may facilitate the sharing of such analytical models among various users and/or other entities or components associated with the CPDB. For example, a developer of an analytical model such as the real-time offer merchant analytics report-generating component of FIG. 24 may distribute the analytical model to other users of the CPDB. Optionally, the model may be described according to an encryptmatics XML format, as discussed in detail further below in this disclosure. In some embodiments, the analytical model may be provide without providing the model data sets based on which the model was developed, so as to protect the privacy of the consumers whose data were included in the model data set. In alternate embodiments, the CPDB may utilize a consumer data anonymization component such as that described above with reference to FIG. 32, before sharing the model data set along with the analytical model.

Figure 35:
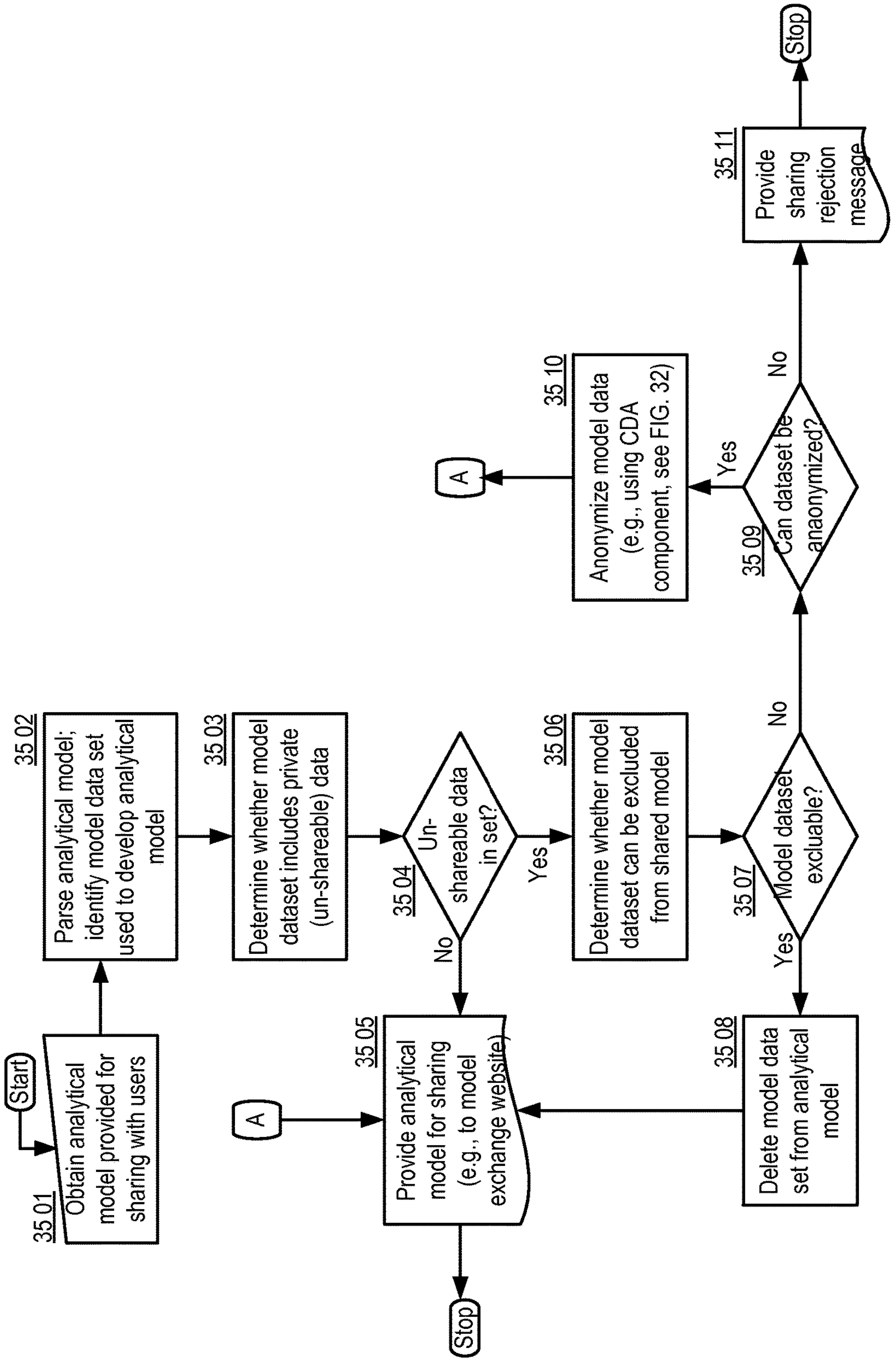
FIG. 35 shows a logic flow diagram illustrating example aspects of sharing an analytical model generated using data acquired using the centralized personal information platform in some embodiments of the CPDB, e.g., an Analytical Model Sharing ("AMS") component.

FIG. 35 shows a logic flow diagram illustrating example aspects of sharing an analytical model generated using data acquired using the centralized personal information platform in some embodiments of the CPDB, e.g., an Analytical Model Sharing ("AMS") component. In some embodiments, the CPDB may obtain an analytical model provided for sharing with other users, e.g., 3501. The CPDB may parse the analytical model, e.g., using one of the parsers described below with reference to FIG. 49. The CPDB may, based on the parsing of the model, identify any model data set used to develop the analytical model, that is included in the model provided for sharing, e.g., 3502. The CPDB may determine, if such a model dataset is included, whether the model dataset includes private data that may be shared on an open exchange, e.g., personally identifiable information, e.g., 3503. If the data is allowed to be shared, e.g., 3504, option "No," the CPDB may provide the analytical model for sharing, e.g., to a model exchange website, without any further processing, e.g., 3505. If however, the model dataset include data that may not be shared, e.g., 3504, option "Yes," the CPDB may determine whether the model dataset may be excluded from the model, while still allowing the model to be properly used, e.g., 3506. If the model dataset is excludable, e.g., 3507, option "Yes," the CPDB may delete the model dataset from the analytical model, e.g., 3508, and provide the modified analytical model for sharing, e.g., 3505. If however, the model dataset is not excludable, e.g., 3507, option "No," the CPDB may determine whether the dataset can be anonymized while still allowing the analytical model to function properly. If the dataset can be anonymized, e.g., 3509, option "Yes," the CPDB may anonymize the model dataset, e.g., using the CDA component discussed above with reference to FIG. 32, e.g., 3510. Then, the CPDB may provide the modified analytical model including the anonymized dataset for sharing, e.g., 3505. If however, the model dataset cannot be anonymized, e.g., 3509, option "No," the CPDB may generate and provide a sharing rejection message to the provider of the analytical model for sharing, e.g., 3511.

Encryptmatics XML Data Converter

In some embodiments, the CPDB may utilize metadata (e.g., easily configurable data) to drive an analytics and rule engine that may convert any structured data obtained via the centralized personal information platform, discussed above in this disclosure, into a standardized XML format ("encryptmatics" XML). See FIG. 14B for additional description. The encryptmatics XML may then be processed by an encryptmatics engine of the CPDB that is capable of parsing, transforming and analyzing data to generate decisions based on the results of the analysis. Accordingly, in some embodiments, the CPDB may implement a metadata-based interpretation engine that parses structured data, including, but not limited to: web content, graph databases, micro blogs, images or software code, and convert the structured data into commands in the encryptmatics XML file format. The structured data may include, without limitation, software code, images, free text, relational database queries, graph queries, sensory inputs, and/or the like. As an example, the CPDB may convert software code written in SAS integrated system of software products provided by SAS Institute, Inc., into a standard encryptmatics XML structure. The example below shows SAS code and encryptmatics XML that serves a similar purpose to the SAS code—defining a module's inputs, outputs, and function calls:

```
// SAS
filename myFTL "my.378.FTL";
data MyFile;
   length yyddd $5. ;
   infile myFTL lrecl=50000;
   input @21 yyddd ;
run;
// Encryptmatics XML
<lock name="F: Transaction Date : yyddd"
  inkeyid="0" inkeystart="21" inkeystop="25"
  outkeyid="31" outkeyindex="1"
  function="INSTANT"
  type="STRING"
/>
```

In the encryptmatics XML examples herein, a "key" represents a collection of data values. A "tumblar" represents a hash lookup table that may also allow wild card searches. A "lock" represents a definition including one or more input data sources, data types for the input sources, one or more data output storage variables, and functions/modules that may be called to process the input data from the input data sources. A "door" may refer to a collection of locks, and a vault may represent a model package defining the input, output, feature generation rules and analytical models. Thus, the encryptmatics XML may be thought of as a framework for calling functions (e.g., INSTANT—returns the raw value, LAG—return a key from a prior transaction, ADD—add two keys together, OCCURRENCE—returns the number of times a key value occurred in prior transactions, AVG—returns an average of past and current key values, etc.) and data lookups with a shared storage space to process a grouped data stream.

In some embodiments, a metadata based interpretation engine may populate a data/command object (e.g., an encryptmatics XML data structure defining a "vault") based on a given data record, using configurable metadata. The configurable metadata may define an action for a given glyph or keyword contained within a data record. The CPDB may obtain the structured data, and perform a standardization routine using the structured data as input (e.g., including script commands, for illustration). For example, the CPDB may remove extra line breaks, spaces, tab spaces, etc. from the structured data. The CPDB may determine and load a metadata library, using which the CPDB may parse subroutines or functions within the script, based on the metadata. In some embodiments, the CPDB may pre-parse conditional statements based on the metadata. The CPDB may also parse data to populate a data/command object based on the metadata and prior parsing. Upon finalizing the data/command object, the CPDB may export the data/command object as XML in standardized encryptmatics format. For example, the engine may process the object to export its data structure as a collection of encryptmatics vaults in a standard encryptmatics XML file format. The encryptmatics XML file may then be processed to provide various features by an encryptmatics engine.

As an example, using such a metadata based interpretation engine, the CPDB can generate the encryptmatics XML code, provided below, from its equivalent SAS code, provided beneath the encryptmatics XML code generated from it:

```
// SAS function code
myInput = filename("../data/30x.raw", "fixed", "../
metaData/ftl_302.meta");
data myout;
  set myInput;
  auth_amt = float(myInput.auth_amt);
  auth_amt2 = log(auth_amt);
run;
proc freq data = myout;
  tables auth_amt2 ;
run;
// Equivalent encryptmatics XML function code
<init>
loop=mainLoop
  <input>
    keyname=myinput
    file=../data/30x.raw
    format=fixed
      meta_data= ../metaData/ftl_302.meta
  </input>
  <output>
    keyname=myout
    file=VARRAY
    format=VARRAY
    meta_data= {'auth_amt2': (1, 0, 'String'), 'auth_amt':
    (0, 0, 'String')}
  </output>
</init>
<vault>
  <door>
    <lock>
      outkey=myout
      outkeyname=auth_amt
      inkey=myinput
      inkeyname=auth_amt
      function=float
      type=String
    </lock>
    <lock>
      outkey=myout
      outkeyname=auth_amt2
      inkey=myout
      inkeyname=auth_amt
      function=log
      type=String
    </lock>
  </door>
</vault>
<init>
summary_level=2
loop=mainLoop
  <input>
    keyname=myout
    file=VARRAY:myout
    format=array
      meta_data= {'auth_amt2': (1, 0, 'String'), 'auth_amt':
      (0, 0, 'String')}
  </input>
  <output>
    keyname=_output
    file=stdout
    format=VARRAY
    meta_data= {'_agg1': (0, 0, 'object')}
  </output>
</init>
<vault>
  <door>
    <lock>
      outkey=agg1
      outkeyname=auth_amt2
```

-continued

```
        inkey=myout
        inkeyname=auth__amt2
        function=instant
        type=String
      </lock>
    </door>
    <door>
      <lock>
        outkey=__output
        outkeyname=__agg1
        function=aggfreq
        type=object
        parser=noparse
        groupkeyname=agg1
      </lock>
    </door>
  </vault>
```

As another example, using such a metadata based interpretation engine, the CPDB can generate the encryptmatics XML code, provided below, from its equivalent SAS code, provided beneath the encryptmatics XML code generated from it:

```
// SAS function code
myInput        = filename("../data/vnd.test.json", "JSON",
"../metaData/enrollment.meta");
 myTumblar = tumblarname("../tumblars/enrollment.exp.tumblar");
data myOut;
  set myInput;
   customer__ipaddresstmp = tumble(myInput.customer__ipaddress ,
customer__ipaddress     );
   customer__ipaddress    =    myOut.customer__ipaddresstmp/1000;
   cvv__resulttmp = tumble(myInput.cv__result    ,    cv__result );
   cv__result    =    myOut.cvv__resulttmp/1000;
 keep customer__ipaddress cv__result;
 run;
proc model data = myOut out=Scored;
 features = customer__ipaddress cv__result ;
 weights = 1,1 ;
 type       = 'bayes' ;
run;
proc print data = Scored;
run;
// Equivalent encryptmatics XML function code
<init>
loop=mainLoop
  <input>
     keyname=myinput
     file=../data/vnd.test.json
     format=JSON
       meta__data= ../metaData/ftl__302.meta <br/>
       </input>
   <output>
     keyname=myout
     file=VARRAY
     format=VARRAY
     meta__data= {'cv__result': (1, 0, 'String'),
     'customer__ipaddress': (0, 0, 'String')}
   </output>
   <constant>
     indexname=__constant__1000
     value=1000
     type=float
   </constant>
</init>
<vault>
  <door>
    <lock>
     outkey=__old__myout
     outkeyname=customer__ipaddresstmp
     inkey=myinput
     inkeyname=customer__ipaddress
     function=INSTANT
     type=String
     tumblar=customer__ipaddress
    </lock>
    <lock>
     outkey=__old__myout
     outkeyname=customer__ipaddress
     inkey=__old__myout
     inkeyname=customer__ipaddresstmp
     inkey2=__constants
     inkey2name=__constant__1000
     function=divide
     type=String
    </lock>
    <lock>
     outkey=__old__myout
     outkeyname=cvv__resulttmp
     inkey=myinput
     inkeyname=cv__result
     function=INSTANT
     type=String
     tumblar=cv__result
    </lock>
    <lock>
     outkey=__old__myout
     outkeyname=cv__result
     inkey=__old__myout
     inkeyname=cvv__resulttmp
     inkey2=__constants
     inkey2name=__constant__1000
     function=divide
     type=String
    </lock>
    <lock>
     outkey=myout
     outkeyname=customer__ipaddress
     inkey=__old__myout
     inkeyname=customer__ipaddress
     function=instant
     type=String
    </lock>
    <lock>
     outkey=myout
     outkeyname=cv__result
     inkey=__old__myout
     inkeyname=cv__result
     function=instant
     type=String
    </lock>
  </door>
</vault>
  <init>
loop=mainLoop
  <input>
     keyname=myout
     file=VARRAY:myout
     format=array
      meta__data= {'cv__result': (1, 0, 'String'),
     'customer__ipaddress': (0, 0, 'String')}
  </input>
  <output>
    keyname=scored
    file=VARRAY
    format=VARRAY
    meta__data= {'__mdl1': (0, 0, 'float')}
  </output>
</init>
<vault>
  <door>
    <lock>
     outkey=mdl1
     outkeyname=customer__ipaddress
     inkey=myout
     inkeyname=customer__ipaddress
     function=instant
     type=String
    </lock>
    <lock>
     outkey=mdl1
     outkeyname=cv__result
     inkey=myout
     inkeyname=cv__result
```

-continued

```
      function=instant
      type=String
    </lock>
  </door>
  <door>
    <lock>
      outkey=scored
      outkeyname=__mdl1
      function=__mdl1
      type=float
      fnc-weights=1.0,1.0
      function=SUMPROB
      model=bayes
      parser=noparse
      groupkeyname=mdl1
    </lock>
  </door>
</vault>
  <init>
outputall=True
loop=print
  <input>
      keyname=scored
      file=VARRAY:scored
      format=array
       meta__data= {'__mdl1': (0, 0, 'float')}
  </input>
  <output>
    keyname=__output
    file=stdout
    format=VARRAY
    meta__data= {'__mdl1': (0, 0, 'String')}
    </output>
</init>
<vault>
  <door>
    <lock>
      outkey=__output
      outkeyname=__mdl1
      inkey=scored
      inkeyname=__mdl1
      function=instant
      type=String
    </lock>
  </door>
</vault>
```

Figure 36:
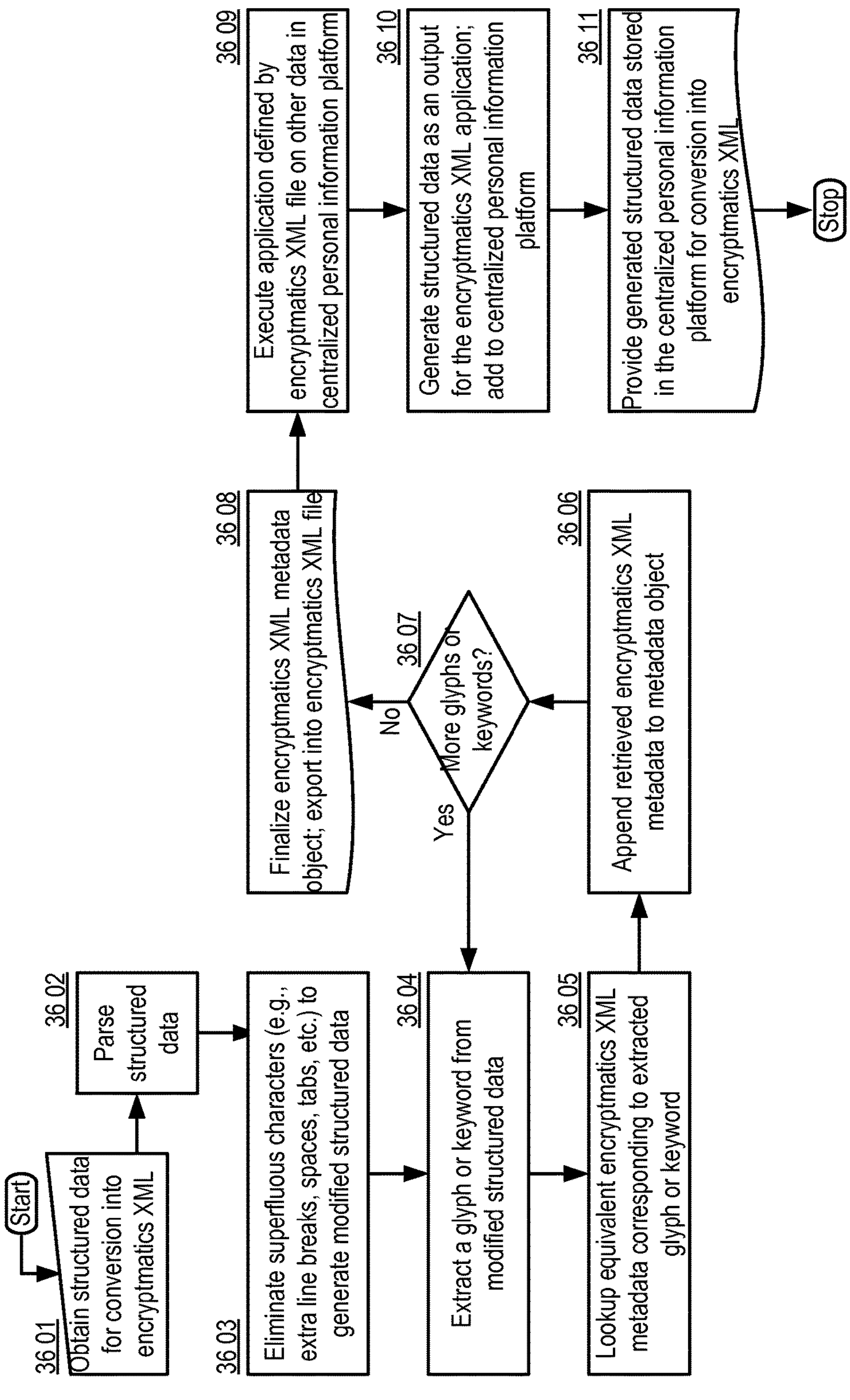
FIG. 36 shows a logic flow diagram illustrating example aspects of a metadata based interpretation engine of the CPDB that generates standardized encryptmatics XML from structured data obtained from various sources via the centralized personal information platform, e.g., an Encryptmatics XML Converter ("EXC") component.

FIG. 36 shows a logic flow diagram illustrating example aspects of a metadata based interpretation engine of the CPDB that generates standardized encryptmatics XML from structured data obtained from various sources via the centralized personal information platform, e.g., an Encryptmatics XML Converter ("EXC") component. In some embodiments, the CPDB may obtain a structured data object for conversion into encryptmatics XML format, e.g., 3601. The CPDB may parse the structured data, e.g., 3602. For example, the CPDB may utilize parsers such as the example parsers discussed below with reference to FIG. 49. In some embodiments, the CPDB may determine and load a metadata library, using which the CPDB may parse subroutines or functions within the script, based on the metadata. In some embodiments, the CPDB may pre-parse conditional statements based on the metadata. The CPDB may also parse data to populate a data/command object based on the metadata and prior parsing. The CPDB may obtain the structured data, and perform a standardization routine using the structured data as input (e.g., including script commands, for illustration). For example, the CPDB may optionally eliminate superfluous characters, e.g., extra line breaks, spaces, tabs, etc., to generate a modified structured data object, e.g., 3603. The CPDB may extract a glyph or keywords from the modified structured data, e.g., 3604. The CPDB may, using the metadata library, lookup a database (e.g., a metadata library) for an encryptmatics XML metadata code snippet corresponding to the extracted glyph or keyword, e.g., 3605, and append the retrieved encryptmatics XML metadata to a metadata object, e.g., 3606. The CPDB may perform such a routine until all glyphs or keywords are extracted and processed from the modified structured data, see e.g., 3607. Then, the CPDB may, upon finalizing the data/command object, export the data/command object as XML in standardized encryptmatics file format, e.g., 3608. For example, the engine may process the object to export its data structure as a collection of encryptmatics vaults in a standard encryptmatics XML file format. In some embodiments, the CPDB may execute an application defined by the exported encryptmatics file, e.g., on other structured data available in the centralized personal information platform, e.g., 3609.

Thus, in some embodiments, the CPDB may gradually convert the entire centralized personal information platform from structured data into standardized encryptmatics XML format. The CPDB may also generate structured data as an output from the execution of the standardized encryptmatics XML application, and add the structured data to the centralized personal information platform databases, e.g., 3610. In some embodiments, the CPDB may recursively provide structured data generated as a result of execution of the encryptmatics XML application as input into the EXC component, e.g. 3611.

Figure 37:
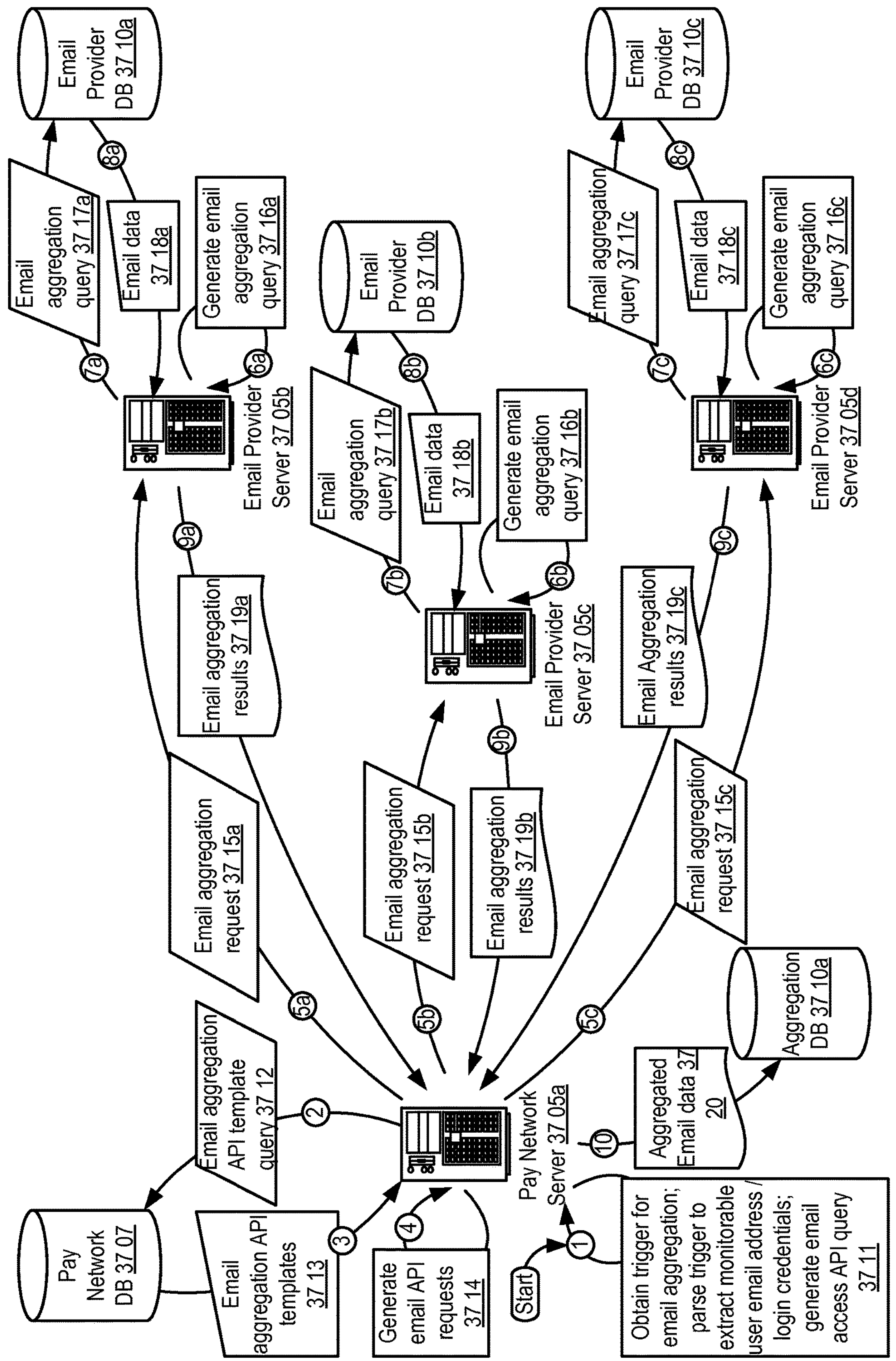
FIG. 37 shows a data flow diagram illustrating an example email data aggregation procedure, in one embodiment of the CPDB.

FIG. 37 shows a data flow diagram illustrating an example email data aggregation procedure in some embodiments of the CPDB. In some implementations, the pay network server may obtain a trigger to extract one or more monitorable user email addressees and generate an email access API query in order to monitor a user's email activity and aggregate the content thereof. For example, the pay network server may periodically perform an update of its aggregated database, e.g., 3710*a*, with new information available from the user's email account activity operating on the Internet. In one embodiment, the information aggregated is the raw content of email messages, including header information containing the server delivery path through which the message has passed. As another example, a request for email data aggregation update may be obtained as a result of a user wishing to enroll in a service, for which the pay network server may facilitate data entry by providing an automated web form filling system using information about the user obtained from the email data aggregation update. In some implementations, the pay network server may parse the trigger to extract access credentials with which to perform an email data aggregation update. The pay network server may generate a query for application programming interface (API) templates for various email provider services (e.g., Gmail™, Yahoo Mail™, etc.) from which to collect email data for aggregation. In some embodiments, the aggregation templates will be configured to provide access to the user's email account at the email service provider. In other embodiments, the aggregation templates will be configured to provide a mechanism to parse retrieved user email into a more suitable format for processing. In still other embodiments, the templates may indicate that an email transfer protocol (such as POP, IMAP, and/or the like) should be employed. In some instances, the email transfer protocol may be used over a secondary secured connection (such as SSH, PGP, and/or the like).

In one embodiment, the pay network server may query, e.g., 3712, a pay network database, e.g., 3707, for email aggregation API templates for the email provider services. For example, the pay network server may utilize PHP/SQL commands similar to the examples provided above. The database may provide, e.g., 3713, a list of email access API templates in response. Based on the list of API templates, the pay network server may generate email aggregation requests, e.g., 3714. The pay network server may issue the generated email aggregation requests, e.g., 3715*a-c*, to the email network servers, e.g., 3701*a-c*. For example, the pay network server may issue PHP commands to request the email provider servers for email data. An example listing of commands to issue email aggregation data requests 3715*a-c*, substantially in the form of PHP commands, is provided below:

```
<?php
$aggregated_email = "";
$mail = imap_open('{server.com:110/pop3}',
            $user,
            $password);
$headers = imap_headers($mail);
for ($i=1; $i<=count($headers); $i++) {
            $structure = imap_fetchstructure($mail, $i);
            $structure_parts = $structure->parts;
            $number_parts = count($structure_parts);
            for ($j=0; $j<=$number_parts; $j++) {
                  $text = imap_fetchbody($mail,$i,$j);
                  $aggregated_email .=
            nl2br(htmlspecialchars($text))."<br>";
  }
}
?>
```

In some embodiments, the email provider servers may query, e.g., 3717*a-c*, their databases, e.g., 3710*a-c*, for email aggregation results falling within the scope of the email aggregation request. In response to the queries, the databases may provide email data, e.g., 3718*a-c*, to the email provider servers. The email provider servers may return the email data obtained from the databases, e.g., 3719*a-c*, to the pay network server making the email aggregation requests. An example listing of email data 3719*a-c*, substantially in the form of JavaScript Object Notation (JSON)-formatted data, is provided below:

```
["data":[
 {"headers": "Delivered-To: MrSmith@gmail.com
Received: by 10.36.81.3 with SMTP1 id e3cs239nzb; Tue, 5 Mar 2020
15:11:47 - 0800 (PST)
Return-Path:
Received: from mail.emailprovider.com (mail.emailprovider.com
[111.111.11.111]) by mx.gmail.com with SMTP id
h19si826631rnb.2005.03.29.15.11.46; Tue, 5 Mar 2020 15:11:47 -0800
(PST)
Message-ID: <20050329231145.62086.mail@mail.emailprovider.com>
Received: from [11.11.111.111] by mail.emailprovider.com via HTTP;
Tue, 5 Mar 2020 15:11:45 PST
Date: Tue, 5 Mar 2020 15:11:45 -0800 (PST)
From: Mr Jones
Subject: Dinner at Patsy's this weekend?
To: Mr Smith",
   "from_addr": "MrJones@gmail.com",
   "from_name": "Mr Jones",
   "to_addr": "MrSmith@gmail.com",
   "subject": "Dinner at Patsy's this weekend?"
   "date": "The, 5 Mar 2020 15:11:45 -0800 (PST)",
   "msg_content": "Hey Frank,\n\nWould you like to meet at Patsy's
for dinner on Saturday night? Their chicken parm is as good as my
mom's (and that's pretty good!).\n\nRafael"
},
{
  ...
}
]]
```

In some embodiments, the pay network server may store the aggregated email data results, e.g., 3720, in an aggregated database, e.g., 3710*a*.

Figure 38:
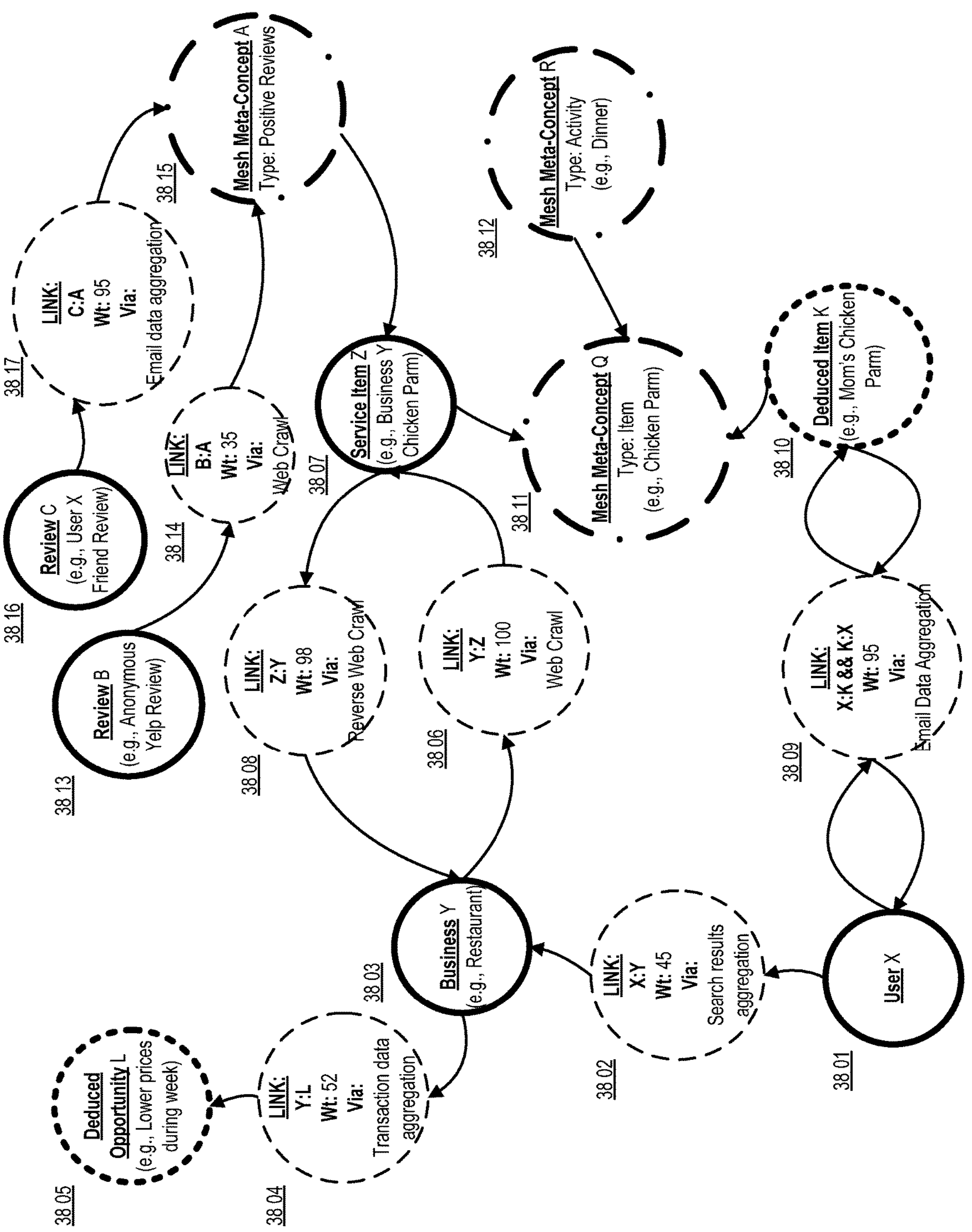
FIG. 38 shows a block diagram illustrating an example distributed linking node mesh, in one embodiment of the CPDB.

FIG. 38 is a block diagram illustrating an example structure of a distributed linking node mesh, in one embodiment of the CPDB. In one embodiment, the linking node mesh may be represented as a modified graph data structure that contains nodes for entities and edges that represent the associations between the nodes. In one embodiment, the nodes are actual observable entities, such as a user 3801, a business 3803, an item 3807, a review on an online web site, e.g., 3813, 3816, and/or the like. The graph mesh may also contain deduced entities that have been inserted by the CPDB as a result of the aggregation described herein, such as the aggregation of data from email, search queries, location aggregation, and/or the like. Non-limiting examples of deduced entity nodes that may be inserted into the graph mesh include a deduced item, i.e., 3810 or a deduced opportunity, i.e., 3805. A deduced item may be an item that the mesh determines exists based on scanning emails, e.g., 3809, to determine that a concept that occurs with some frequency in emails is associated with a concept that is not yet linked into the mesh graph. An example deduced item may be a user's mother's chicken parmesan 3810. In one embodiment, there may also be deduced opportunities added to the mesh graph, e.g. 3805. A deduced opportunity may be an opportunity that is determined based on aggregated transaction data, e.g., 3804. For example, through the use of aggregated transaction data it may be determined by the CPDB that the price of a given set of items declines at a restaurant, e.g., 3803, during the week, e.g., 3805. This decline in pricing may then allow the CPDB to determine that there exists a special weekday menu with lower prices. In so doing, an opportunity for use by the mesh in providing recommendations or information to users may be created, e.g., 3805, in order to facilitate searching the mesh.

In one embodiment, the mesh graph may also contain service items, e.g., 3807, such as a restaurants chicken parmesan or other menu item. The service item and its link to the business 3803, e.g., 3806, 3808, may be determined using a forward web crawl (such as by crawling from a business home page to its menu pages), or by a reverse web crawl, such as by crawling using an Optical Character Recognition scanned menu forwarded through an email exchange and aggregated by an email aggregating component of the CPDB.

In one embodiment, the mesh graph may additionally contain meta concepts, e.g., 3810, 3812, 3815. Meta-concepts are conceptual nodes added to the graph by CPDB that define not a specific entity (such as a user or a business) nor a specific deduced entity (such as a deduced item or a deduced opportunity), but rather indicate an abstract concept to which many more nodes may relate. For example, through web crawling, e.g., 3814, or email aggregation, e.g., 3817, user reviews may be imported as nodes within the mesh graph, e.g., 3813, 3816. Nodes may be anonymous, e.g., 3813, linked to a specific user's friend (such as to provide specific user recommendations based on a social graph link), e.g., 3816, and/or the like. These reviews may be analyzed for positive concepts or words such as "delightful meal" or "highly recommended" and thereafter be determined by the CPDB to be a positive review and linked to a mesh meta-concept of the kind positive review, e.g., 3815. In so doing, the CPDB allows disparate aggregated inputs such as email aggregation data, location aggregation data, web crawling or searching aggregated data, and/or the like to be used to roll up concepts into conceptual units.

In one embodiment, these conceptual meta concepts, e.g., 3815, may be further linked to actual items, e.g., 3807. In so doing connections can be formed between real world entities such as actual reviews of items, to meta-concepts such as a positive review or beneficial location, and further linked to actual items as a location. Further meta-concepts may include activities such as dinner, e.g., 3812, a non-entity specific item (e.g., not a restaurant's chicken parmesan and not a mother's chicken parmesan, but chicken parmesan as a concept), e.g., 3811. The connection of actual entity nodes with deduced entity nodes and meta-concept nodes allows the mesh to answer a virtually limitless number of questions regarding a given nodes connections and probable outcomes of a decision.

In one embodiment, nodes within the mesh graph are connected by edges that have no magnitude. In another embodiment, the edges themselves may have meta-data associated with them that enable faster or better querying of the mesh. Example meta data that may be stored at a graph edge include a relative magnitude of connection between nodes, path information regarding other nodes available from the edge, and/or the like. In still other embodiments, intermediate or link nodes, e.g., 3804, 3806, 3808, 3814, 3817, 3809, may be inserted by the CPDB into the mesh graph. These intermediate nodes may function as the equivalent of an edge, in that they may describe a relationship between two nodes. In one embodiment, the link nodes may contain information about the nodes that they connect to. In so doing, the number of nodes in the graph that need to be searched in order to find a given type, magnitude or value of connection may be reduced logarithmically. Additionally, the link nodes may contain data about how the relationship between the nodes it links was established, such as by indicating the connection was established via search aggregation, email aggregation, and/or the like.

In one embodiment, the distributed linking node mesh may be stored in a modified open source database such as Neo4j, OrientDB, HyperGraphDB, and/or the like. An example structure substantially in the form of XML suitable for storing a distributed linking node mesh is:

```
<mesh>
 <nodes>
  <node id="1" kind="entity" type="user">
   <name="John Doe">
  </node>
  <node id="2" kind="entity" type="item">
   <name="iPhone" />
  </node>
  <node id="3" kind="deduced_entity" type="business">
   <name="Apple Computer" />
   <attribute type="keyword" value="iPhone" />
   <deduced_from value="frequency_keyword" />
  </node>
  <node>
   ...
  </node>
 </nodes>
 <link_nodes>
  <linknode id="78" in_node="1" out_node="3" value="55" />
  <linknode id="97" in_node="1" out_node="2" value="124" />
  ...
 </link_nodes>
 <edges>
  <edge from_node="1" to_node="78" />
  <edge from_node="78" to_node="3" />
  ...
 </edges>
</mesh>
```

An example query suitable for querying a distributed linking node mesh is:

```
START user=node(5,4,1,2,3)
MATCH user-[:affinity]->"iphone"
WHERE entity.manufacturer =~ 'Apple.*', link.strength >= 40
RETURN user, user.affinity
```

In another embodiment, an example query suitable for querying a distributed linking node mesh is:

```
##MODEL QUERY Language (JSON FORMAT)
{
 1: {'LOWER': 100, 'BASETYPE': ['MODEL_001_001_00',
'MODEL_002_001_00', 'MODEL_003_001_00',
'MODEL_004_001_00'] , 'attribute': 'WEIGHT', 'rule': 'NEAR',
'OP': 'PROX', 'type': 'TOKENENTITY', 'HIGHER': 100},
2: {'type': ['USER', 'MCC'], 'rule': 'FOLLOW'},
3: {'rule': 'RESTRICTSUBTYPE', 'BASETYPE':
['MODEL_001_001_00', 'MODEL_002_001_00',
'MODEL_003_001_00', 'MODEL_004_001_00']}}
}
```

FIGS. 39A-E are an example block diagram illustrating a distributed linking node mesh search, in one embodiment, of the CPDB. The graph presented in FIG. 39A-E is similar to the graph presented in FIG. 38 but nodes of different type are represented similarly for ease of understanding. In one embodiment, a user 3901 may desire to find a good deal on dinner with friends at a restaurant nearby. The CPDB may be configured with a capability to extract sub-concepts from a natural form query question, such as by natural language processing. Example tools suitable for this type of processing may include OpenNLP, Graph Expression, FreeLing, and/or the like.

In one embodiment, the query portion relating to finding a good deal is performed as a CPDB search to arrive at a result of a deduced opportunity for lower prices during weekdays, e.g., 3902. The search may then progress to extract the concept of a good deal merged with a restaurant nearby. Using an integrated location capability of a user's device, the user's current location may additionally be provided to the CPDB for use in this portion of the query process, to produce a result containing a deduced opportunity for lower prices (e.g., a "good deal") at a business nearby wherein the lower prices are linked to the business nearby with a certain degree of weight, e.g., 3903. In one embodiment, the search may progress to find results for the concept of a dinner (e.g., meta-concept dinner 3904), which is itself linked through intermedia nodes to the business found in the previous portion of the search, e.g., 3905. In one embodiment, the search may then progress to find connections that indicate that the user 3901 will like the restaurant, e.g., 3906, and that the user's friends will similarly like the restaurant, e.g., 3907. The intermediate searches performed may be then merged to produce a unitary result, e.g., 3908, for a restaurant meeting the full criteria. In cases where no single entity meets all the criteria, the most important criteria to a user may be first determined using its own CPDB search, such as a search that determines that a user 3901 has never traveled to a nearby popular location area for dinner and therefore concluding that location is very important to the user. In one embodiment, multiple results 3908 may be returned and ranked for acceptability to both the user and his/her friends, enabling the user to then choose a preferred location.

Figure 39A:
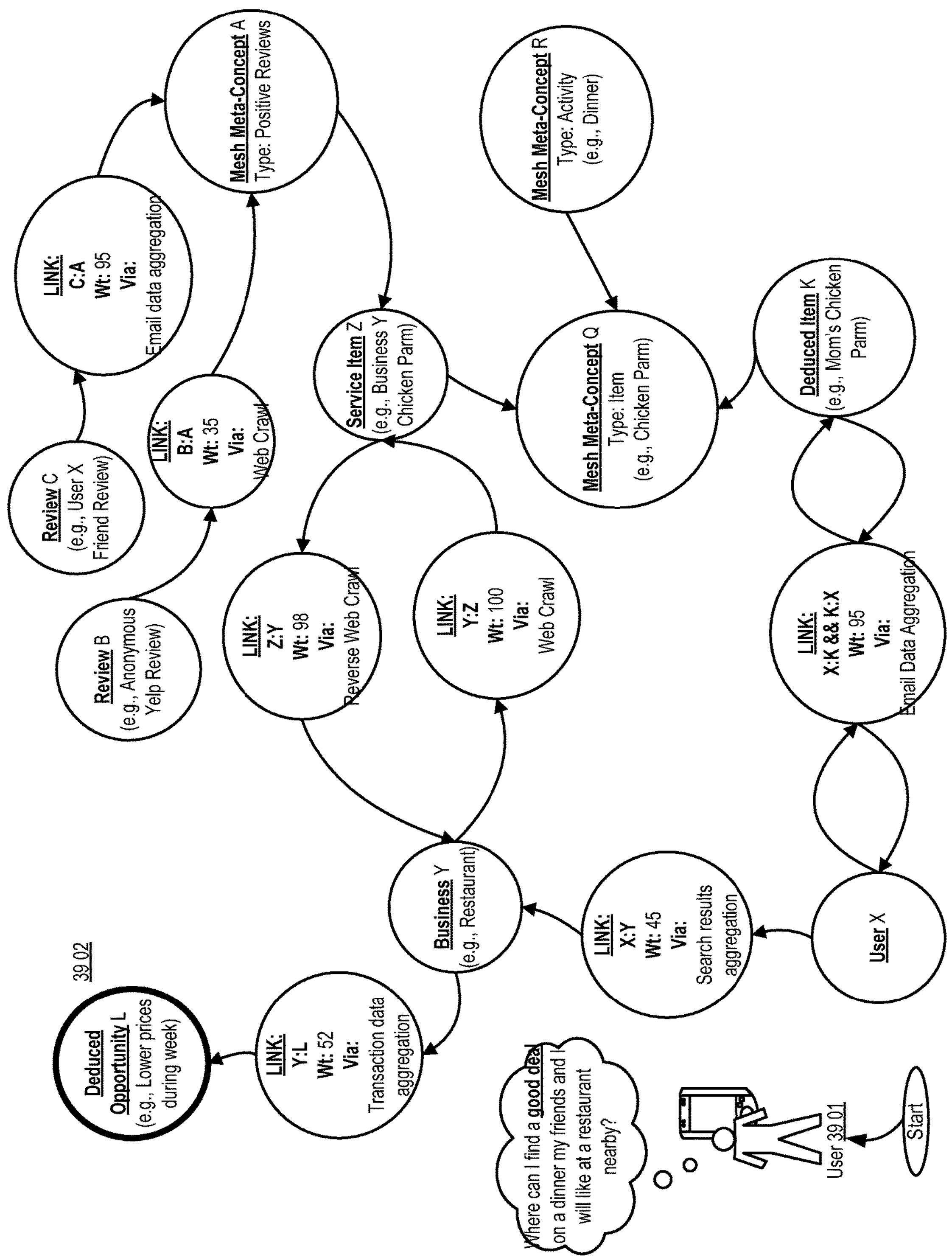
FIGS. 39A-F show a block diagram illustrating an example distributed linking node mesh search, in one embodiment of the CPDB.
Figure 39B:
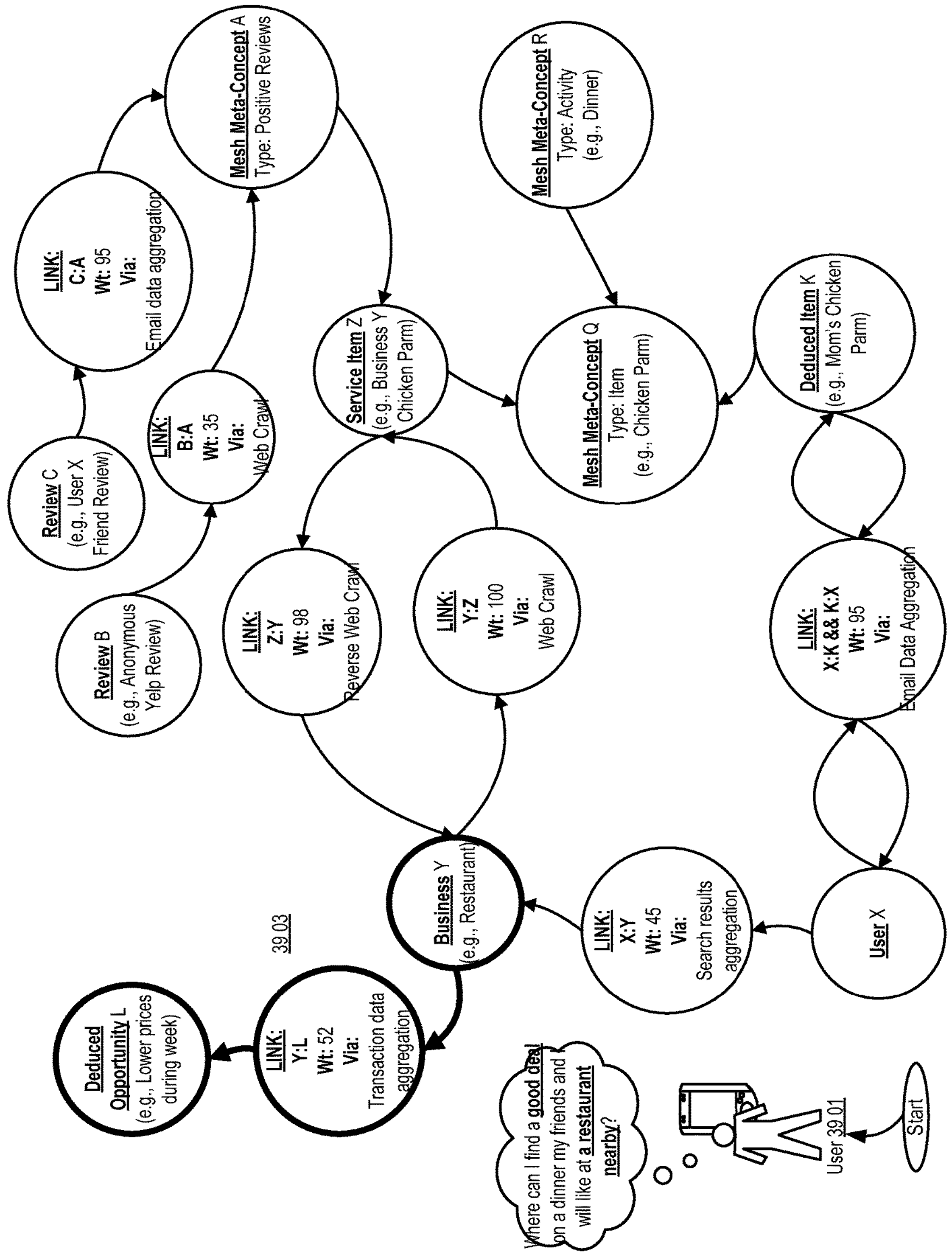
Figure 39C:
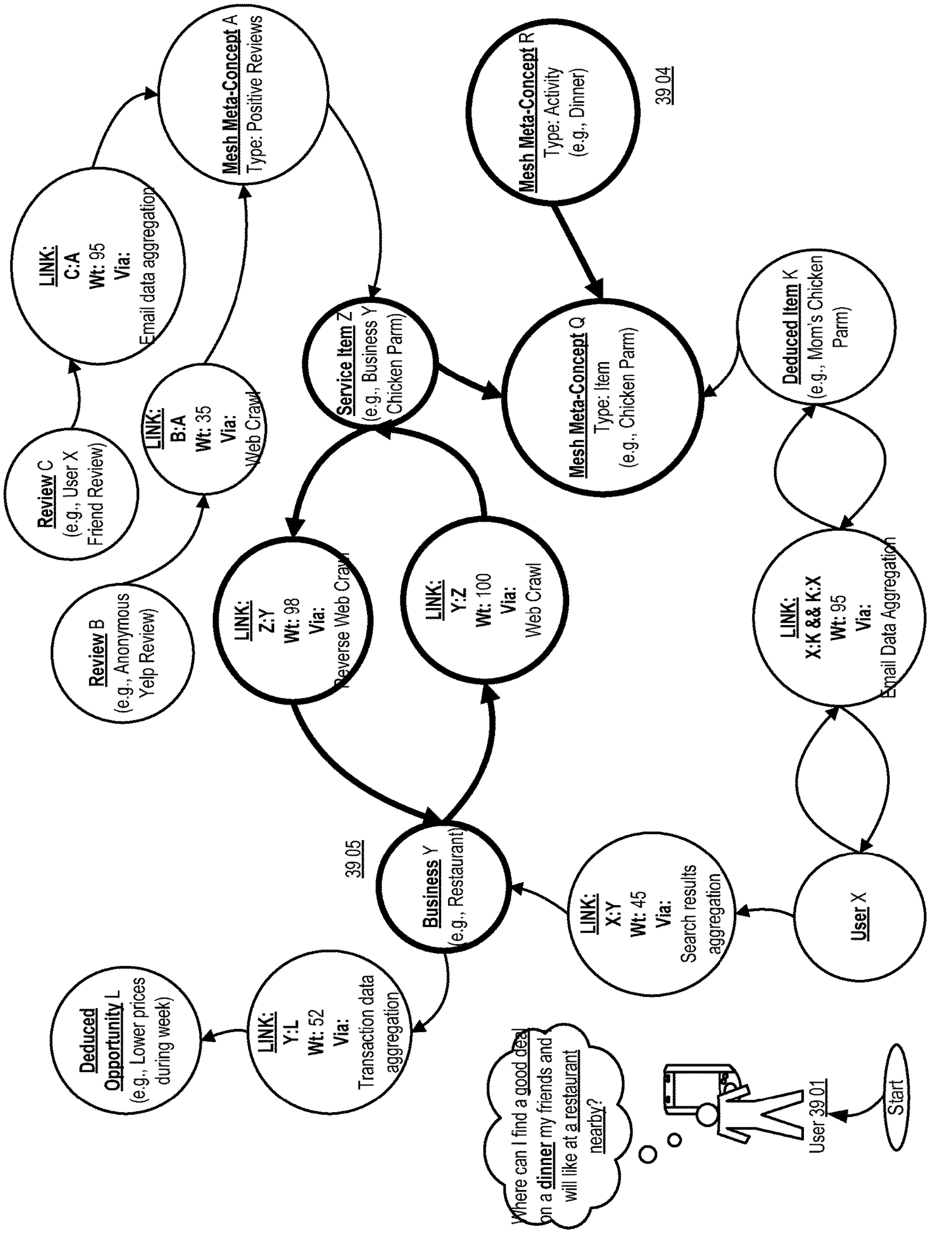
Figure 39D:
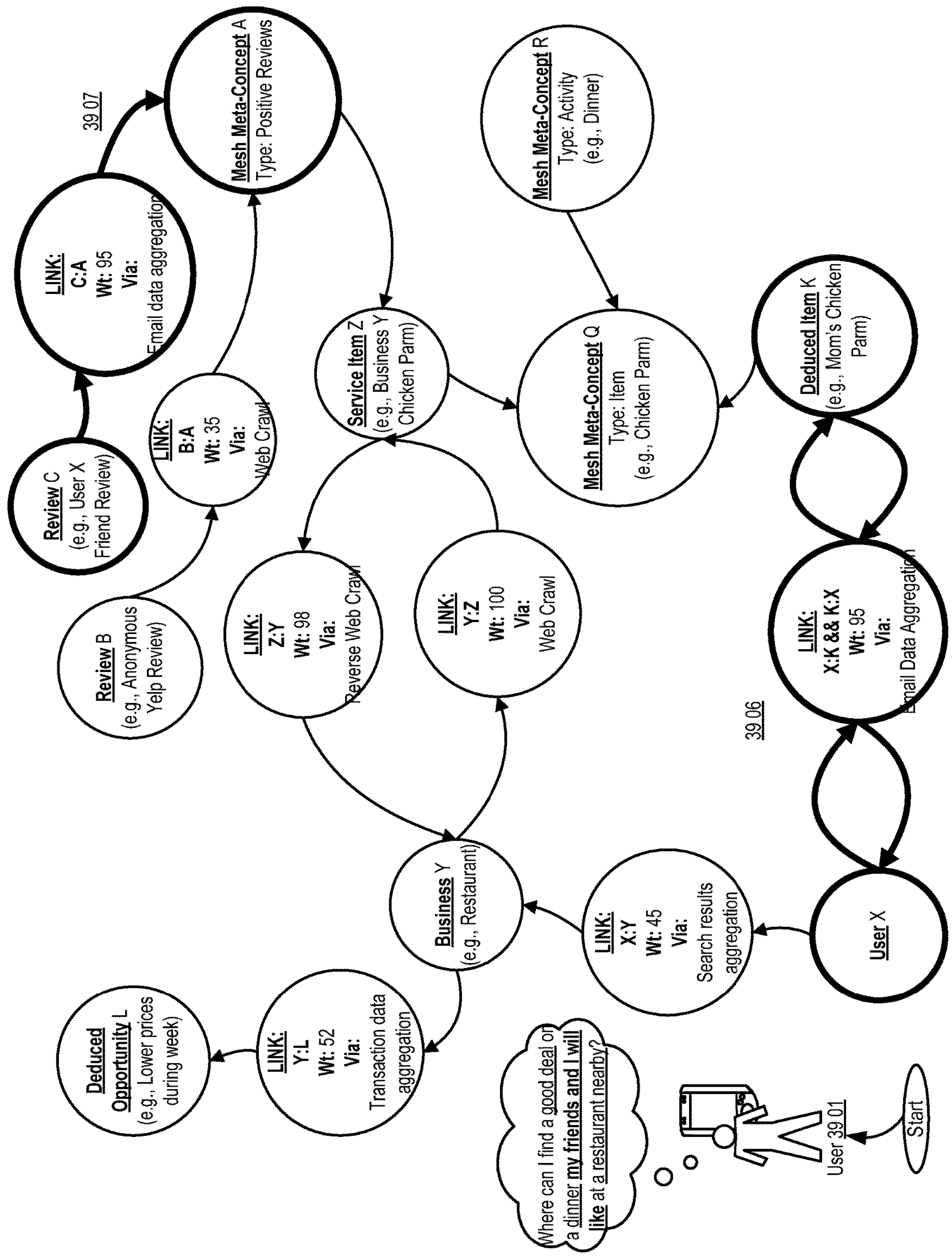
Figure 39E:
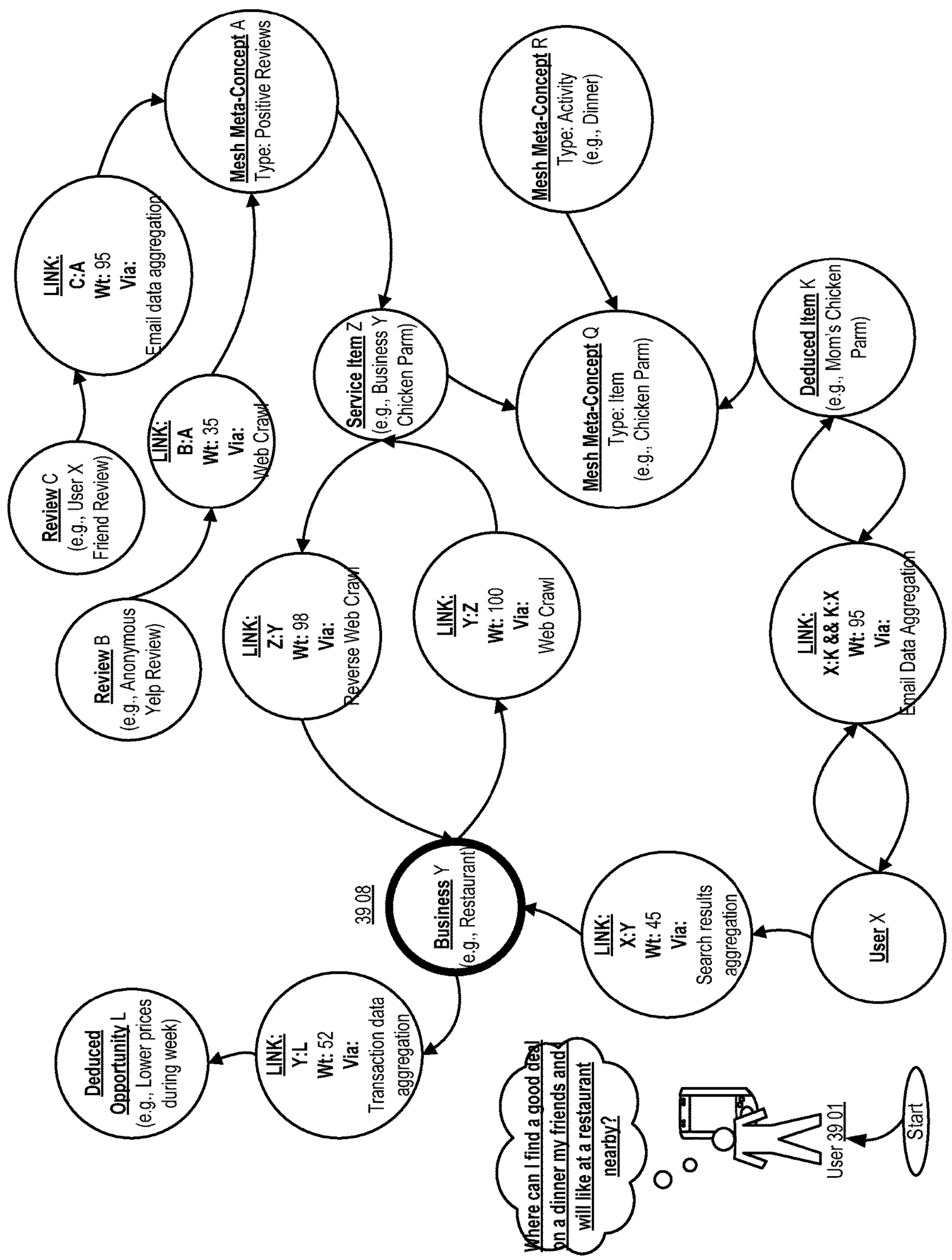
Figure 39F:
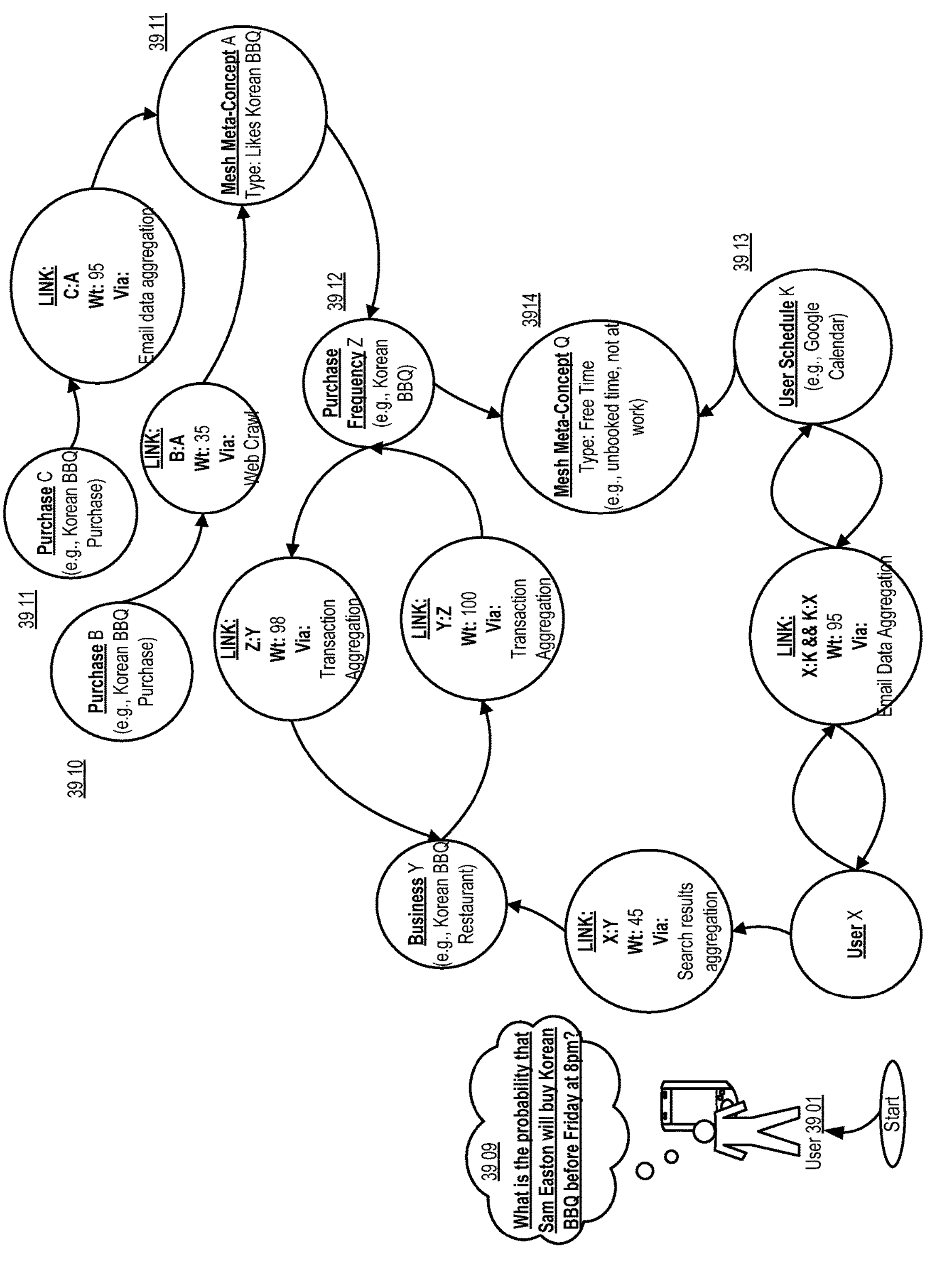

FIG. 39F shows an alternative embodiment of a distributed linking node mesh search. Here, mesh user 3901 wants to determine the probability that a user will buy Korean BBQ before a certain time, e.g., 3909. The distributed linking mesh may be queried. For example, the user's previous purchases of Korean BBQ (e.g., 3910, 3911), may be linked to a meta-concept that indicates an affinity for Korean BBQ, e.g., 3911. The affinity may be similarly linked to an entity indicating a purchase frequency for Korean BBQ, e.g., 3912. Similarly, by aggregating data from the user's email correspondence (i.e., calendar updates, and/or the like), the mesh may have an entity representing the user's schedule including free time, e.g., 3913. Both the purchase frequency 3912 and the user schedule 3913 may be linked to a mesh meta-concept of free time, e.g., 3914, which may indicate that the entities are related when the user has free time (e.g., the individual may be more likely to go for Korean BBQ when she is not working). By querying the distributed linking node mesh for interrelations between entities built from aggregation techniques (and deduced or input entities), a profile of the user's future behavior may be similarly built. For example, if the user schedule indicates that the user is free on both Wednesday and Thursday afternoons, and the aggregated purchase history indicates an affinity to purchase Korean BBQ both on those days (based on the purchase transaction entities) and when the user is free (based on the meta-concept of free time), then a mesh search can return a probability based on the respective weights of the constituent entity relationships with respect to the user.

Figure 40A:
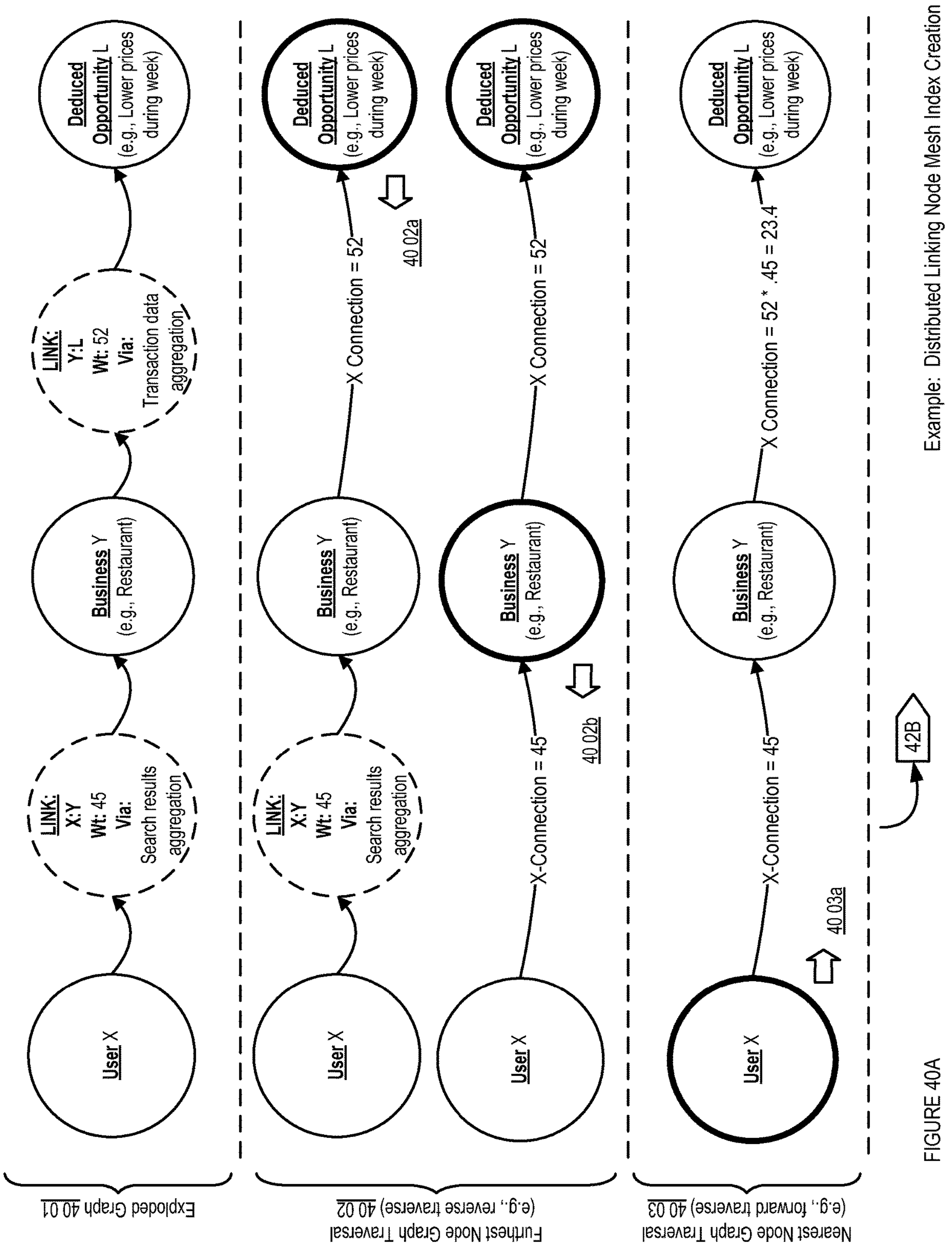
FIGS. 40A-C show a block diagram illustrating an example distributed linking node mesh index creation, in one embodiment of the CPDB.
Figure 40B:
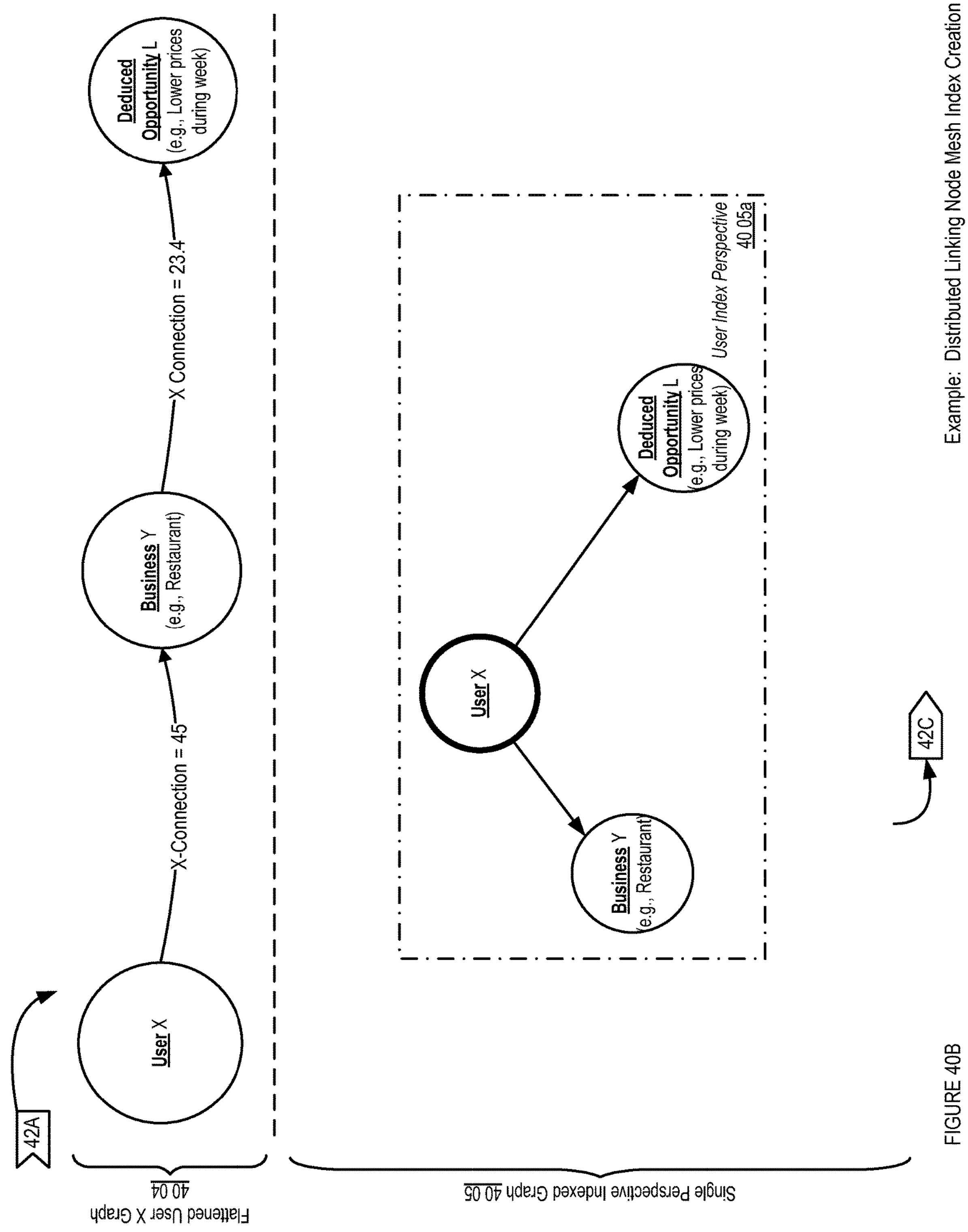
Figure 40C:
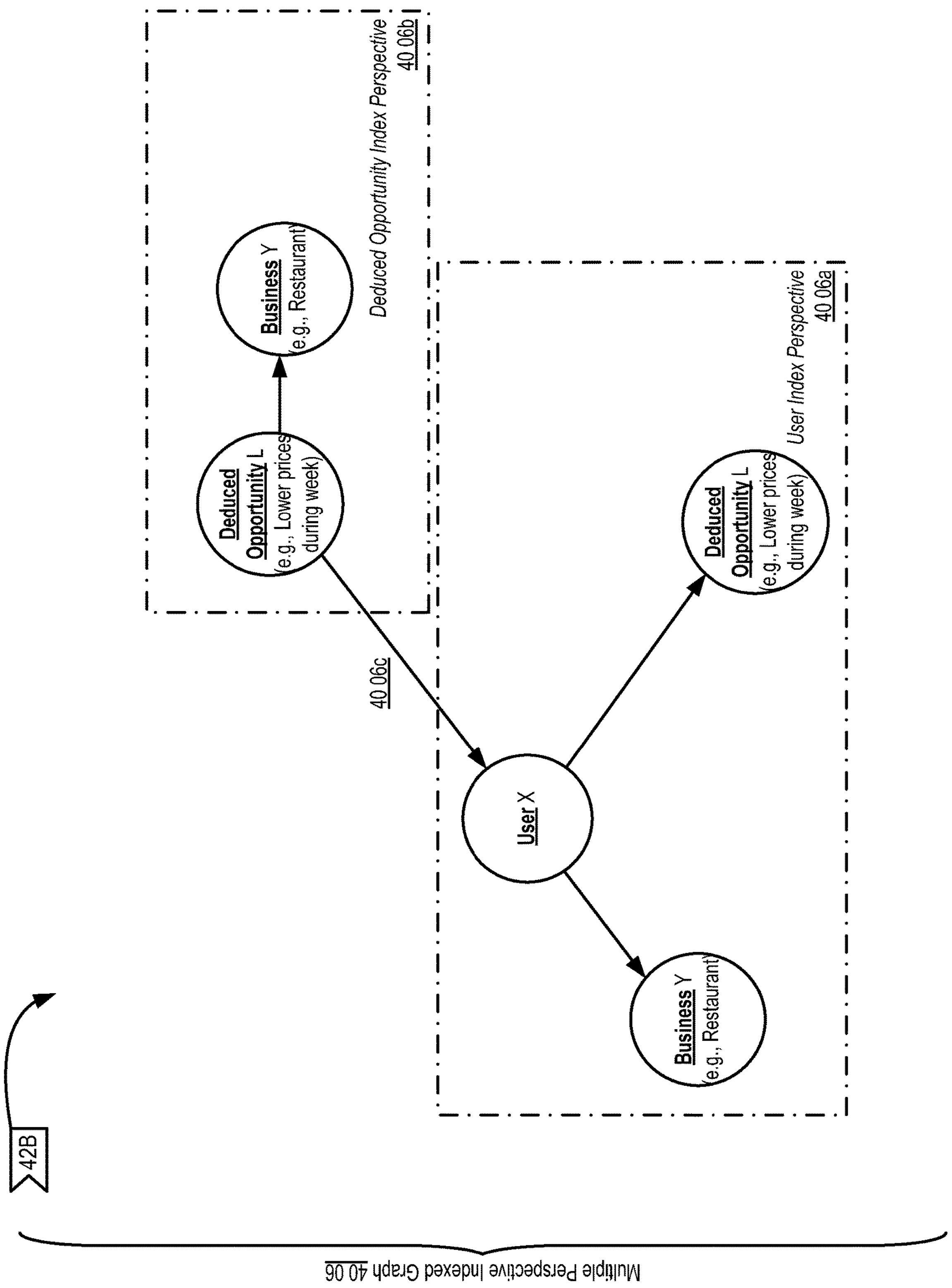

FIGS. 40A-C are an example block diagram illustrating index creation in a distributed linking node mesh, in one embodiment of the CPDB. In one embodiment, a non-indexed graph is exploded to form a chain of relationships from a single entity's perspective, e.g., 4001. A furthest node graph traversal is then performed, e.g., 4002, whereby the linking nodes are sequentially removed and replaced with a single edge which has a magnitude of the connection between the two nodes, e.g., 4002*a*, 4002*b*. A nearest node graph traversal may then be performed, e.g., 4003, whereby the magnitude of links further from the nearest node is modified by a factor of previous links. Modification proceed from nearest to furthest nodes, e.g., 4003*a*. In the example illustrated, a modification is made to the second edge encountered to make its value as a relation of magnitude with User X incident on both the relationship of User X to Business Y and of Business Y to Deduced Opportunity L. This procedure may produce a flattened graph from a single entity's perspective, e.g., 4004. The graph may then be further modified to a single perspective indexed graph, e.g., 4005, to reduce the number of hops in the graph from a given entity to any other entity within the indexed graph, so as to advantageously speed searching of the graph from the entity's perspective, e.g., 4005*a*. In one embodiment, the output of similar indexes performed from other entity perspectives, e.g., 4006*b*, may be linked 4006*c* to the generated perspective 4006*a*. In so doing, the index may form a graph that simultaneously allows easy searching from the perspective of a single entity while maintaining connection between entities of different perspectives.

Figure 41:
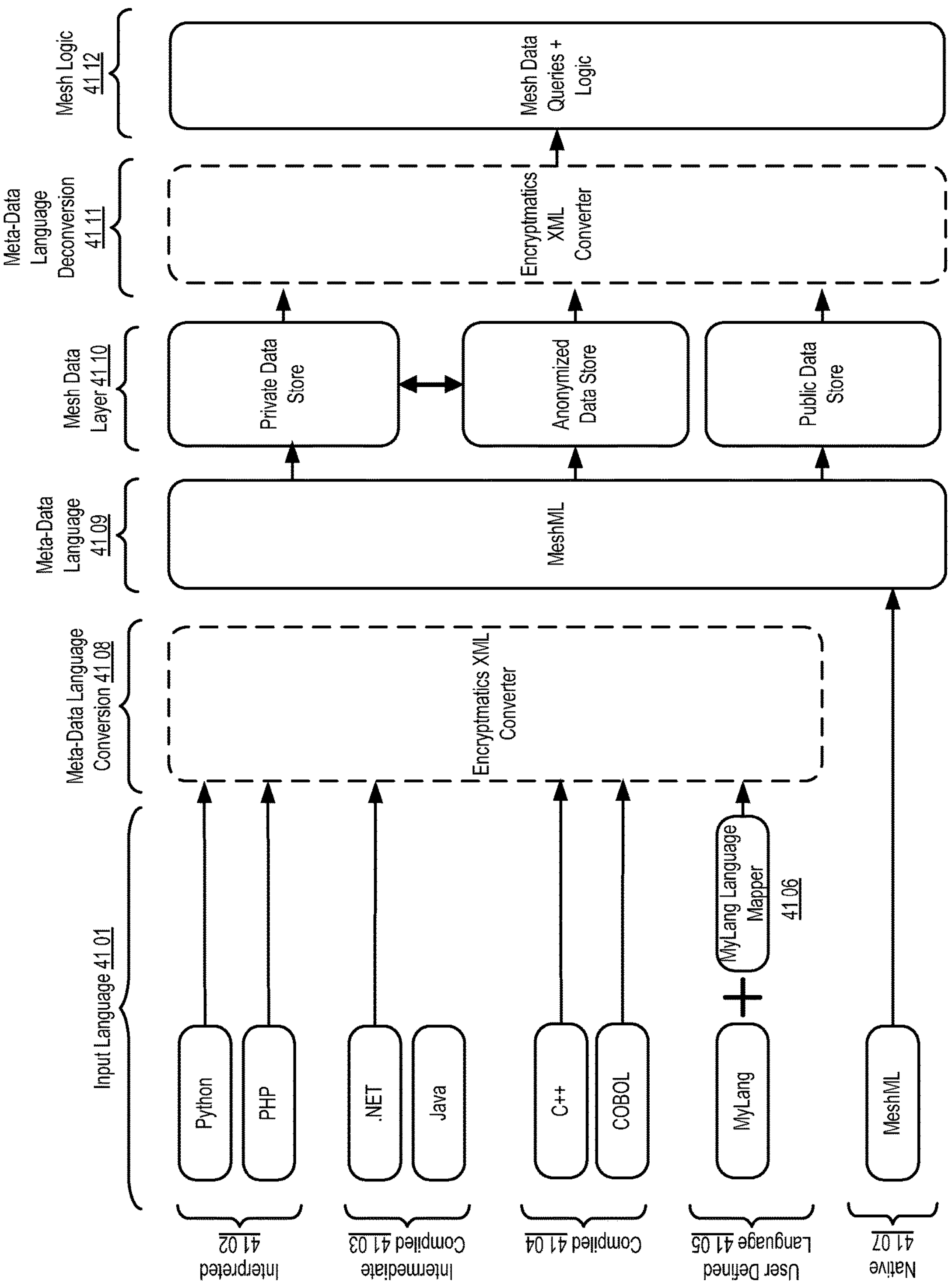
FIG. 41 shows a logic flow illustrating an example Encryptmatics XML Converter component, in one embodiment of the CPDB.

FIG. 41 is an example block diagram illustrating aspects of an Encryptmatics XML converter component. In one embodiment, models may be input in a number of disparate language, e.g., 4101. Languages may include interpreted languages such as Python, PHP, and/or the like, e.g., 4102, intermediate compiled languages such as .Net, Java, and/or the like, e.g., 4103, compiled languages such as C++, COBOL, and/or the like, e.g., 4104. A user defined language may also be input, e.g., 4105. In one embodiment, the user defined language will be input with a language mapper, e.g., 4106 that defines a mapping of the user defined language's functions, methods, supported types, and/or the like to a language known by the CPDB. In still other embodiments, a native meta-data language, e.g., 4107, may be input.

In one embodiment, languages other than a native meta-data language are passed to a meta-data language conversion component 4108, such as an Encryptmatics XML converter. The converter may convert the language to a meta-data language 4109. In one embodiment, the meta data language may describe data sources 4110 including a private data store (not available to the provided model), an anonymized data store that is based on the private data store (available to the provided model), and/or a public data store. In one embodiment, the meta-data language may be deconverted 4111 to produce data queries and model logic 4112 that is parseable by the CPDB interpreter.

Figure 42:
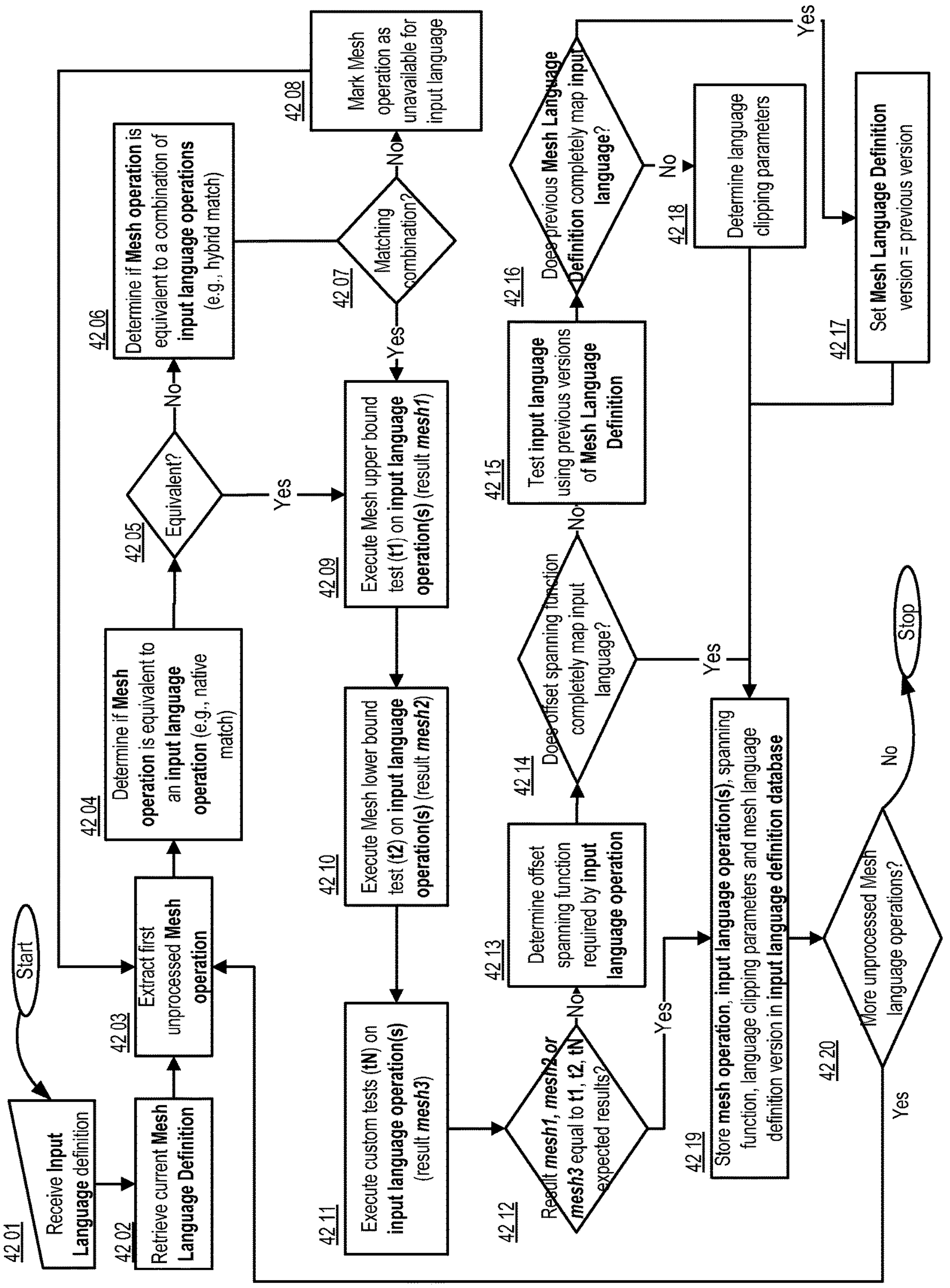
FIG. 42 shows a logic flow illustrating input language loading by an Encryptmatics XML Converter component, in one embodiment of the CPDB.

FIG. 42 is an example logic flow illustrating input language loading by an Encryptmatics XML converter component, in one embodiment of a CPDB. In one embodiment, an input language definition is received, e.g., 4201. The language definition may be a file containing information about the functions available within the input language. In one embodiment, the language definition is source code for the language to be loaded into the CPDB. In still other embodiments, the language definition is an executable binary file suitable for the CPDB to issue sample commands and receive output. In one embodiment, the current mesh language definition may be retrieved 4202. The mesh language may be an XML based meta-data language that allows the description of data sources, data source manipulations (both visible and not visible to the input model) and a model to be run against the data sources. A model may be a series of logic commands describing manipulations or conditional logic to apply to input or source data sources in order to reach a result. In one embodiment, language loading may facilitate the user providing the description of data sources, data source manipulations, the model, and/or the like in a language with which the user is already familiar. The CPDB may then use a loaded language definition to convert the language to a common meta-data based (e.g., XML based, JSON based, and/or the like) language with which to then parse and execute commands from.

In one embodiment, the first unprocessed mesh language operation is extracted from the mesh language definition. An example operation may be "TRIM", which may strip whitespace from the beginning and end of an input string. A determination is made if the mesh operation has an equivalent operation in the input language, e.g., 4204. Such a determination may be made by executing a sample command against the input binary and observing the output to determine if an error occurred. In other embodiments, a publically available language definition web site may be crawled to determine which function(s) within an input language likely map to the mesh operation equivalent(s). In some instances, there will be a one-to-one mapping between the input language and the meta-data based mesh language. If there is not a one-to-one equivalence, e.g., 4205, a determination is made (using a procedure similar to that employed above) to determine if a combination of input language functions may equate to a mesh language operation, e.g., 4206. For example, an input language that supports both a left-trim (strip space to left of string) and a right-trim operation (strip space to right of string) may be considered to support a mesh TRIM through a combination applying both the left-trim and right-trim operations, producing a substantially equivalent output result.

In one embodiment, if no matching combination is found, e.g., 4207, the mesh operation may be marked as unavailable for the input language, e.g., 4208 and the next unprocessed mesh operation may then be considered. If a matching combination is found, e.g., 4207, an upper bound test may be employed to test the upper bound behavior of the input language operation and compare that to the upper bound behavior of an equivalent mesh operation, e.g., 4209. For example, some languages may perform floating point rounding to a different degree of precision at upper bounds of input. By testing this case, a determination may be made if the equivalent input language function will produce output equivalent to the mesh operation at upper bounds. In one embodiment, a lower bound test may be employed to test the lower bound behavior of the input language operation and compare that to the lower bound behavior of an equivalent mesh operation, e.g., 4210. For example, some languages may perform floating point rounding to a different degree of precision at lower bounds of input. By testing this case, a determination may be made if the equivalent input language function will produce output equivalent to the mesh operation at upper bounds. In one embodiment, other custom tests may then be performed that may be dependent on the mesh operation or the input language operation(s), e.g., 4211. If the results of the test cases above produce output that is different than the expected output for the equivalent mesh operation, e.g., 4212, an offset spanning function may be generated to span the difference between the languages. For example, in the example above if the rounding function in the input language is determined to produce different behavior than the equivalent mesh operation at a lower bound, a function may be provided in the input or mesh language to modify any output of the given input language operations to create an equivalent mesh language operation output. For example, a given floating point number may be rounded to a given level of significant digits to produce equivalent behavior.

In one embodiment, the offset spanning function may not be capable of completely mapping the input language operation(s) to the mesh language operation, e.g., 4214. In one embodiment, previous versions of the mesh language definition, e.g., 4215, may then be tested using a procedure substantially similar to that described above to determine if they may completely map the input language, e.g., 4216. If the previous version of the mesh language definition completely maps the input language, the mesh language definition version for the input language may be set to the previous version, e.g., 4217. For example, a previous version of the mesh language definition may contain different capabilities or function behaviors that allow it to completely map to an input language. If previous versions of the mesh input language do not completely map to the input language, language clipping parameters may be generated, e.g., 4218. Language clipping parameters are input limitations that are placed on an input language such that any inputs within the input limitations range will produce compliant mesh operation output. Inputs outside that range may generate an error. In one embodiment, language clipping parameters may include limits to the upper bound or lower bound of acceptable input. Such limits may be determined by iteratively testing increasing or decreasing inputs in order to find an input range that maps completely to the mesh operation.

In one embodiment, the current mesh operation, input language operation(s) any spanning functions or language clipping parameters, the mesh language version, and/or the like may be stored in an input language definition database, e.g., 4219. If there are more unprocessed mesh language operations, e.g., 4220, the procedure may repeat.

Figure 43A:
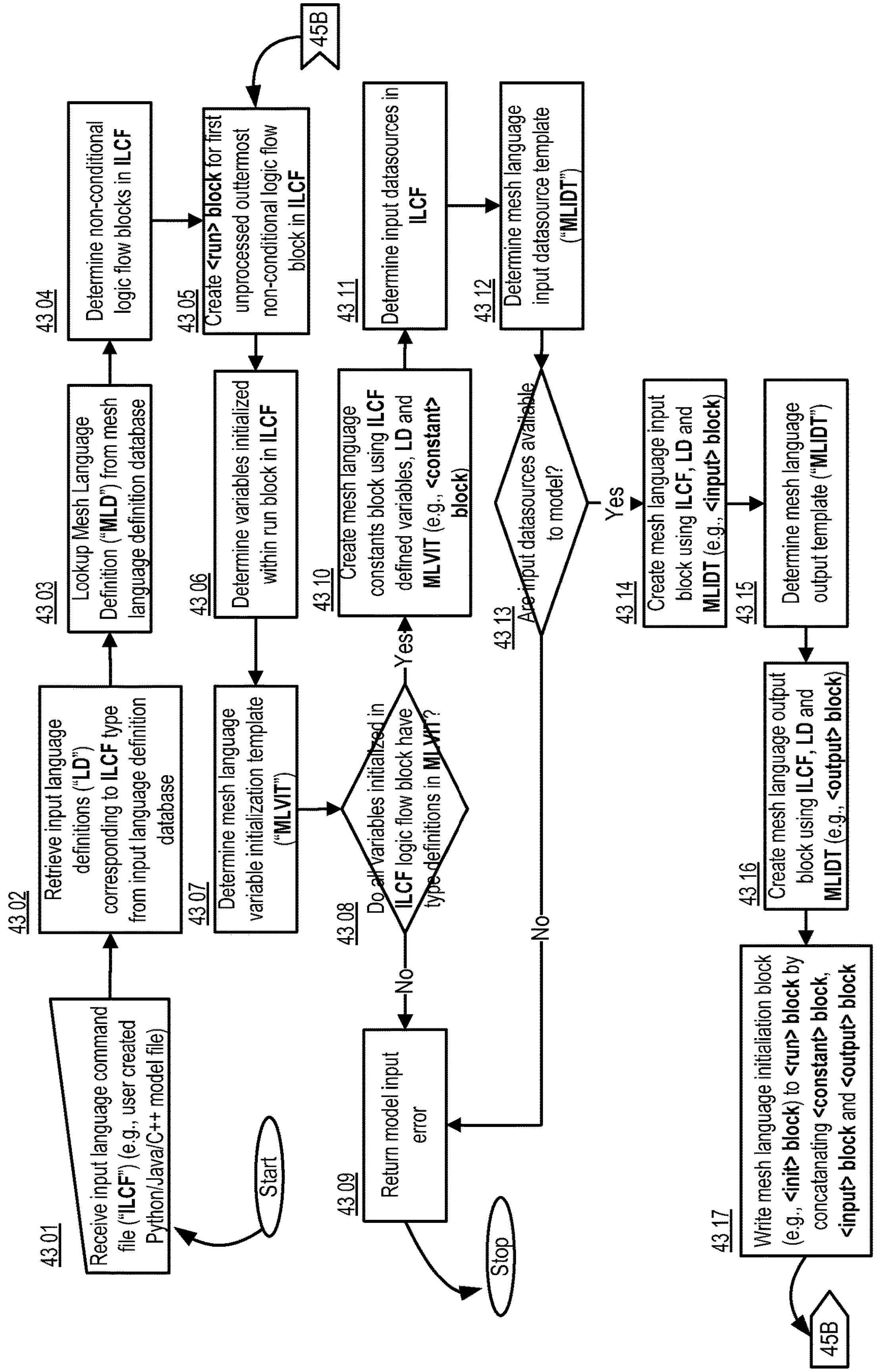
FIGS. 43A-B show a logic flow illustrating input model conversion by an Encryptmatics XML Converter component, in one embodiment of the CPDB.
Figure 43B:
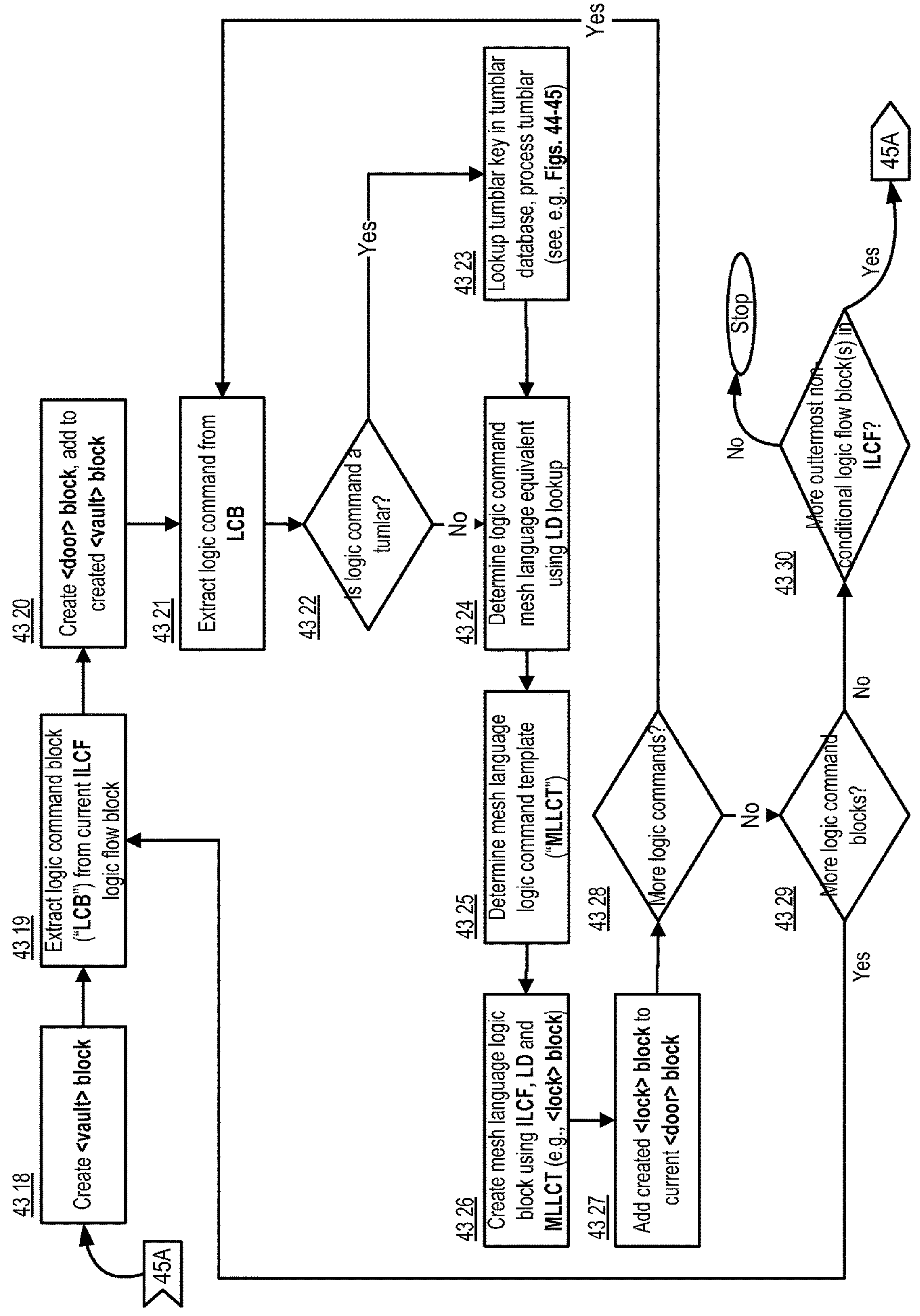

FIGS. 43A-B show an example logic flow for input model conversion, in one embodiment of an CPDB. In one embodiment, a language command file is received, e.g., 4301. The language command file may contain instructions in any language which has been loaded into the CPDB (e.g., FIG. 42). The input language command file may contain instructions that may describe a set of manipulations that may be performed on a data set (e.g., a data set that is input as part of the input language command file, a data set that is loaded from an external data source, and/or the like). In one embodiment, input language definitions corresponding to the language of the input language command file is retrieved, e.g., 4302. A mesh language definition, which may specify operations that are available within the mesh language, may also be retrieved, e.g., 4303. Non-conditional logic flow blocks in the input language command file may be determined, e.g., 4304. A non-conditional logic block represents the outermost logic contained within an input language command file. For example, if a file contains no conditional logic (i.e., no if/than/else blocks, and/or the like), then the outermost logic may be the complete set of input language commands themselves. In one embodiment, a run block is created for each outermost non-conditional logic flow block. The metadata run blocks are then populated with logic commands further in the procedure. In one embodiment, any variables that are initialized within the logic block corresponding to the run block are determined, e.g., 4306. A variable initialization template may then be determined, e.g., 4307. In one embodiment, the input language definition is used to determine if an equivalent meta-data based variable type is available in the mesh language definition for each of the variables initialized in the input language command file, e.g., 4308. If all variable types are not available, a model input error may be raised, e.g., 4309.

In one embodiment, the variable initialization template and the input language definition are used to create a constants block based on the variable initialization template, e.g., 4310. Within the constants block, any constants that were included in the input language command file may be stored as structured XML. An example constants block, substantially the form of XML is as follows:

```
<constant>
 indexname="0"
 value='row by row'
 Type="string"
</constant>
```

In one embodiment, there may be multiple constant blocks defined corresponding to multiple constant values in the input language command file. In other embodiments, constants may be collapsed to one block.

In one embodiment, the input datasources may then be determined based on the input language command file, e.g., 4311. For example, an input datasource may be defined directly in the input language command file (such as by declaring a variable as an array to values in the input language command file). In other embodiments, the inputs may be external to the input language command file, such as a third party library or loaded from an external source file (such as a comma delimited file, via a SQL query to an ODBC compliant database, and/or the like). A mesh language input datasource template may then be retrieved, e.g., 4312, to provide a structure to the CPDB to use in formatting the inputs as meta-data. The datasources may be scanned to determine if they are available to the model (such as by executing "Is-I" on a POSIX compliant Unix system), e.g., 4313. If the datasources are available to the model, then a meta data language input block may be created using the input datasource template, the language definition, and the input language command file, e.g., 4314. An example input block substantially in the form of XML is:

```
<input>
  keyname="test_by"
  file="<ecyptmatics install>/test_by.egd"
  format="ecdataformat"
  meta_data={'col8': (7, 0, 'string'), '_header': True, 'col_2': (1,0,'int'),
'col_3': (2,0,'int'), 'col_1': (0,0,'int'), 'col_6': (5,0,'julian'), 'col_7':
(6,0,'float'), 'col_4': (3,0,'ordinaldate'), 'col_5': (4,0,'date')}
</input>
```

In one embodiment, a mesh language output template is determined, e.g., 4315 and an output block is created using a procedure substantially similar to that described above with respect to the constant and input blocks, e.g., 4316. An example output block, substantially in the form of XML is:

```
      <output>
      keyname="myout"
      file="stdout"
      format="deliminated"
      meta_data={'col_2': (2, 0, 'String'), 'col_2_l': (4, 0,
'String'), 'test': (0, 0, 'String'), 'col_3': (3, 0, 'String'), 'col_1':
(1, 0, 'String'), 'sum_col_7': (5, 0, 'String')}
      deliminator= "csv"
      </output>
```

In one embodiment, the constant block, input block, and output block are added to a newly created initialization block and the initialization block is added to the current run block, e.g., 4317. An example run block with a complete initialization block included therein, substantially in the form of XML is as follows:

```
<run>
<init>
processor=process
   <input>
   keyname="test_by"
   file="<ecryptmatics install>/test/data/test_by.egd"
   format="ecdataformat"
   deliminator="csv"
    meta_data={'col_8': (7, 0, 'string'), '_header': True, 'col_2': (1, 0,
'int'), 'col_3': (2, 0, 'int'), 'col_1': (0, 0, 'int'), 'col_6': (5, 0, 'julian'),
'col_7': (6, 0, 'float'), 'col_4': (3, 0, 'ordinaldate'), 'col_5':
(4, 0, 'date')}
   </input>
   <output>
   keyname="myout"
   file="stdout"
   format="deliminated"
   meta_data={'col_2': (2, 0, 'String'), 'col_2_l': (4, 0, 'String'),
'test': (0, 0, 'String'), 'col_3': (3, 0, 'String'), 'col_1': (1, 0, 'String'),
'sum_col_7': (5, 0, 'String')}
   deliminator= "csv"
   </output>
   <constant>
    indexname="0"
    value='row by row'
    type="string"
```

-continued

```
   </constant>
</init>
</run>
```

In one embodiment, a vault block will then be created, e.g., 4318. A logic command block will be extracted from the input logic command file, e.g., 4319. A logic command block is a logic block that is a non-outermost non-conditional logic flow. A door block may then be added to the vault block, e.g., 4320. A logic command, representing a discrete logic operation, may then be extracted from the logic command block, e.g., 4321. The logic command may be a tumbler, e.g., 4322, in which case a tumbler key may be looked up in a tumbler database and the tumbler may be processed, e.g., 4323. Further detail with respect to tumbler processing may be found with respect to FIGS. 44-45. The logic command may then be mapped to a mesh language equivalent by using the language definition file, e.g., 4324. A mesh template logic command template, containing formatting information for a logic command, may be retrieved, e.g., 4325. In one embodiment, a lock block may be created using the mesh language definition, the language definition, and the logic command, e.g., 4326. The created lock block may be added to the current door block, e.g., 4327. In one embodiment, if there are more logic commands, e.g., 4328, the procedure may continue. If there are more logic command blocks, e.g., 4329, the procedure may similarly continue. In one embodiment, if there are more outermost non-conditional logic flow blocks in the input language command file, e.g., 4330, the procedure may continue with respect to FIG. 43A.

Figure 44:
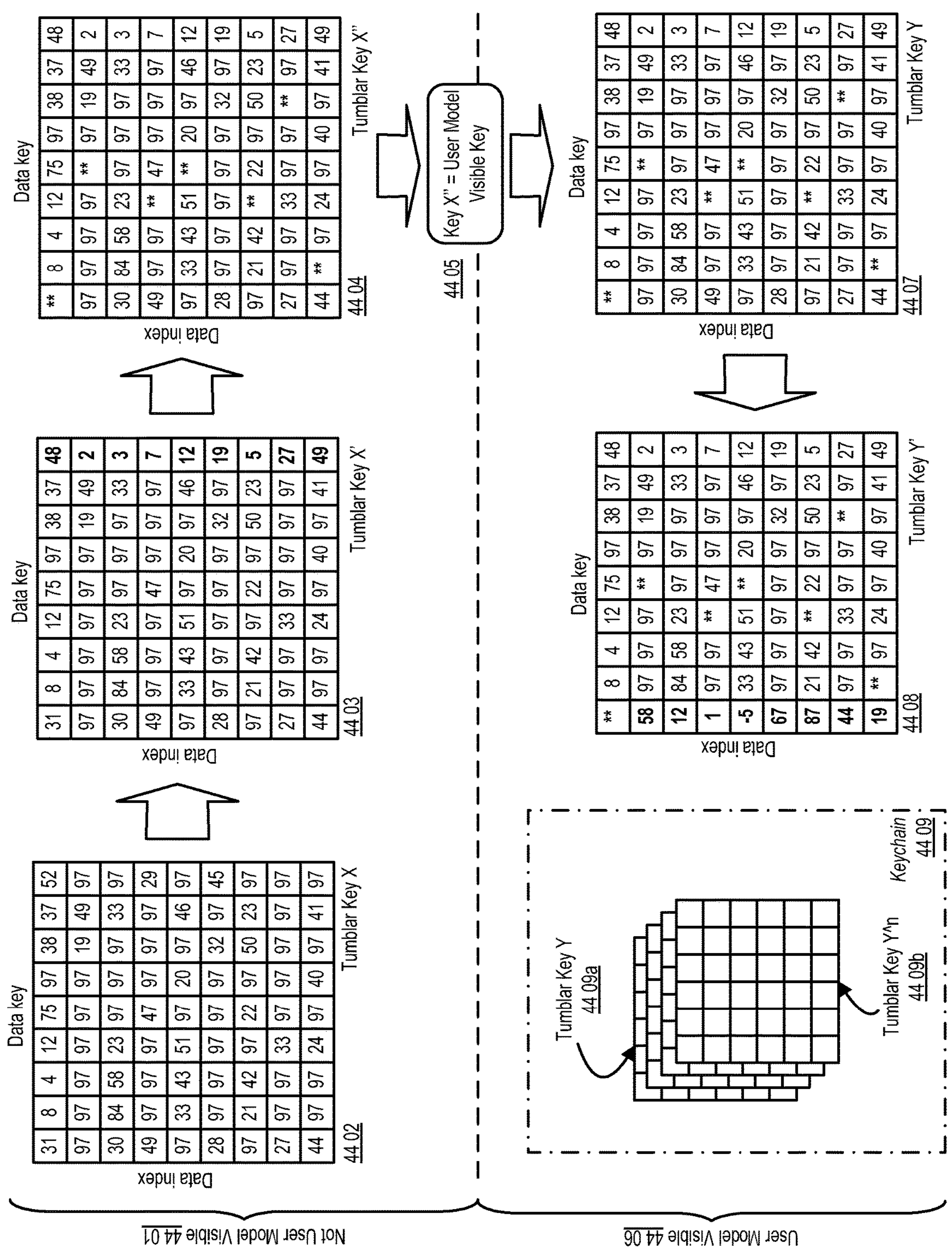
FIG. 44 shows a block diagram illustrating aspects of a tumblar data source manipulation/anonymization component, e.g., a TDS component, in one embodiment of the CPDB.

FIG. 44 is an example block diagram illustrating a tumbler data source manipulation and anonymization component, e.g., a TDS Component. In one embodiment, a user model may call a tumbler as part of a logic command block processing (e.g., in order to perform a hash table lookup, to provide third-party data, to import anonymized transaction data, and/or the like). In one embodiment, portions of the data manipulation may not be visible, e.g., 4401, to the user model in order to maintain privacy for the record owners, to preserve business secrets, and/or the like. In one embodiment, the data source to be anonymized is loaded into a key/value table, e.g., 4402. The entire matrix may be considered as a tumblar key. In other embodiments, a single cell within the matrix may be a tumblar key. In still other embodiments, the matrix may take the form of a n x n matrix of arbitrary size (e.g., a 4×4×4×4 matrix, and/or the like) In one embodiment, the keys or values may be pointers to underlying data records. In another embodiment, the keys or values may themselves be the data for manipulation. Commands may be read from the tumblar file (which may, in some embodiments, have a format substantially similar to an input language command file, e.g., 4301). The commands may change some values in the matrix to other values, such as may be done to anonymize user payment card information, e.g., 4403. In other embodiments, data may be removed from the matrix and replaced with other data values, e.g., 4404. When indicated by the tumblar file, when a set number such as 5 anonymization operations have been performed, or when the tumblar key has reached a certain value, the tumblar key may be considered visible to the user model, e.g., 4405. In so doing, the current keychain may be visible to the user model, e.g., 4407. Additional operations may then be performed on the key, extending the keychain, e.g., 4408. A keychain is a representation of current and past values of a key/value store. In one embodiment, the keychain 4409 may be returned. The keychain may contain an n×n sized matrix (i.e., a single 2D matrix, a 3D collection of 2D matrix, a 4D matrix, and/or the like), e.g., 4409*a*, 4409*b*.

In one embodiment, a tumblar file may be substantially in the form of XML as follows:

```
<xml>
<run>
<init>
processor=process
tumblar_name=None
tumblar_path=c:\1m\Ecryptmatics\ecryptmatics\test\tumblars\flare
tumblarkey=flare
    <input>
    keyname="flares"
    file="<ecryptmatics install>/test/data/flare.data1"
    format="deliminated"
    deliminator=""
      meta_data={'evolution': (4, 0, 'Evolution'), 'prev_activity':
(5, 0, 'Previous 24 hour flare activity code'), 'area': (8, 0, 'Area'),
'are_largest_spot': (9, 0, 'Area of the largest spot'),
'histocially_complex': (6, 0, 'Historically-complex'), 'complex':
(7, 0, "Did region become historically complex on this pass across the
sun's disk"), 'class_cd': (0, 0, 'Code for class (modified Zurich
class)'), 'activity': (3, 0, 'Activity'), 'spot_dict_cd': (2, 0, 'Code
for spot distribution'), largets_spot_cd': (1, 0, 'Code for largest
spot size'), '_header': False}
   </input>
   <output>
   keyname="myout"
   file="stdout"
   format="deliminated"
   meta_data={'evolution': (3, 0, 'String'), 'area': (1, 0, 'String'),
'complex': (2, 0, 'String'), 'activity': (0, 0, 'String')}
   deliminator= "csv"
   </output>
</init>
<vault>
   <door>
      <lock>
   outkey="myout"
   outkeyname="activity"
   inkey="flares"
   inkeyname="activity"
   function="tumble"
   type="String"
   tumblar-masks="*"
   fnc-tumblar-key-table="flare.activity"
   tumblar-default="None"
      </lock>
      <lock>
   outkey="myout"
   outkeyname="area"
   inkey="flares"
   inkeyname="area"
   function="tumble"
   type="String"
   tumblar-masks="*"
   fnc-tumblar-key-table="flare.area"
   tumblar-default="None"
      </lock>
      <lock>
   outkey="myout"
   outkeyname="complex"
   inkey="flares"
   inkeyname="complex"
   function="tumble"
   type="String"
   tumblar-masks="*"
   fnc-tumblar-key-table="flare.complex"
   tumblar-default="None"
      </lock>
      <lock>
   outkey="myout"
   outkeyname="evolution"
   inkey="flares"
   inkeyname="evolution"
   function="tumble"
```

-continued

```
   type="String"
   tumblar-masks="*"
   fnc-tumblar-key-table="flare.evolution"
   tumblar-default="None"
      </lock>
   </door>
</vault>
</run>
</xml>
```

Figure 45:
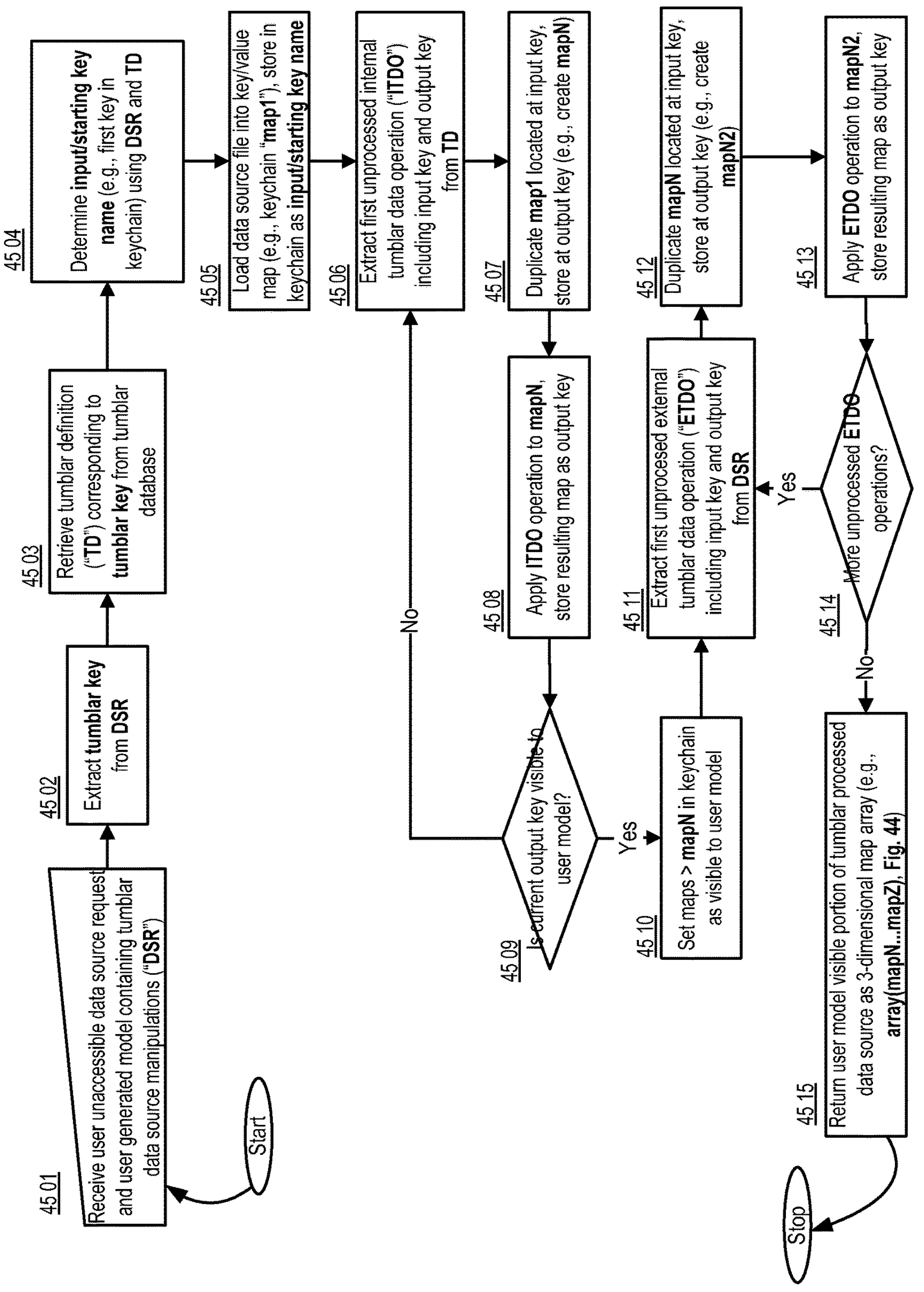
FIG. 45 shows a logic flow diagram illustrating an example tumblar data source manipulation/anonymization component, in one embodiment of the CPDB.

FIG. 45 is an example logic flow showing a tumblar data source anonymization component, e.g., a TDS component, in one embodiment of a CPDB. In one embodiment, a user unaccessible data source request and a user generated model containing tumblar data source manipulations may be received, e.g., 4501. In one embodiment, a tumblar key may be extracted, e.g., 4502. A tumblar definition corresponding to the tumblar key may be retrieved from a tumblar database, e.g., 4503. A tumblar definition may contain manipulations (e.g., functions, methods, and/or the like) that may be performed on a given source file before the data is made available for use in a user model. In one embodiment, an input/starting key name may be determined (e.g., by inspecting an init block or by inspecting the input key values in the first lock of the first door of the first vault in the first run block in the tumblar file), e.g., 4505. An unprocessed internal tumblar data operation may be extracted including an input and an output key, e.g., 4506. An internal tumblar operation may be an operation that is performed before a user model has access to the data store, such as data manipulations that anonymize data. Manipulation operations may include bit shifting, replacing or masking certain field values in the data set, swapping data values between records (such as may be done to maintain a total of all values or the average of all values while not revealing to the user model the underlying data). In one embodiment, the current map located at the input key may be duplicated and stored, e.g., 4507. The operation may then be performed on the data copy, e.g., 4508. In so doing, a chain (e.g., a key chain) of values may be created for a single data point. If the current output key is visible to the user model (such as if the output key is >a given value such as 31, the output has undergone a given number of operations, and/or the like), e.g., 4509, then any maps equal to or greater than the current map may be marked as visible to the user model, e.g., 4510. Manipulation operations may continue on the data and an unprocessed external tumblar data operation (e.g., an operation visible to the user model) may be extracted, e.g., 4511. The current map may be duplicated, e.g., 4512, and stored as a new map also visible to the user model, e.g., 4512. In one embodiment, the external tumblar data operation may then be applied to the copied map, e.g., 4513. If there are no more processed external tumblar data operations, e.g., 4514, the user model visible portion of the keychain may be returned, e.g., 4515.

Figure 46:
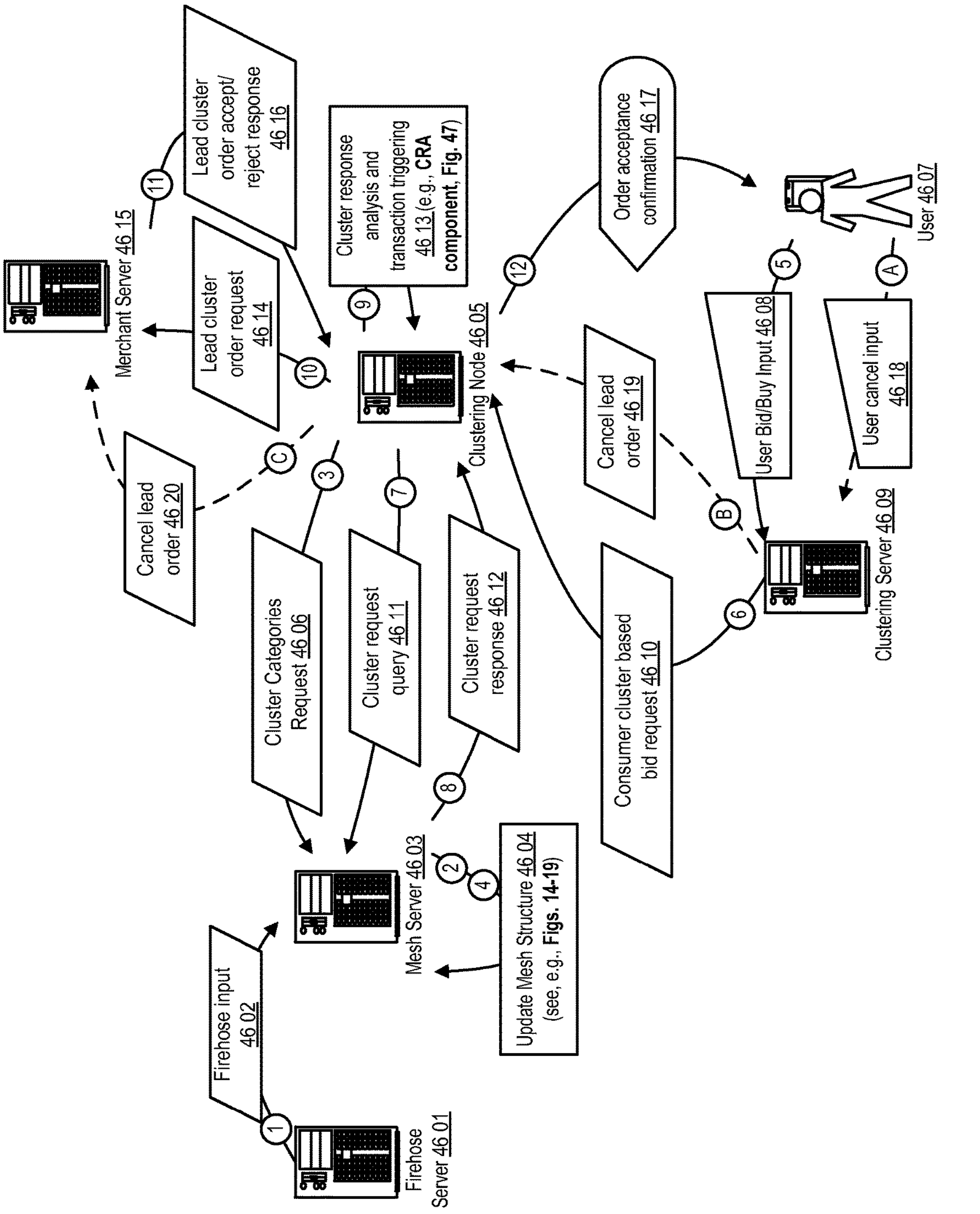
FIG. 46 shows an example data flow illustrating mesh aggregation and cluster querying, in one embodiment of a CPDB.

FIG. 46 is an example data flow illustrating mesh aggregation and cluster querying, in one embodiment of a CPDB. In one embodiment, a firehose server 4601 provides firehose input, e.g., 4602 to a mesh server 4603. A firehose server may be a server capable of accepting input from one or more data sources (e.g., Twitter or Facebook posts, transaction records, email data, and/or the like) at a high relative flow rate. In one embodiment, the firehose server may perform some manipulations on the received data before it is input to the mesh server 4603. An example firehose input 4602, substantially in the form of XML formatted data is:

```
<firehose_input>
  <input type="email" id="1">
    <dictionary_entry>
      {id: "1h65323765gtyuf#uy76355",
      type: email,
      category: {cat1: "food", cat2: "dinner"},
      from_addr: "john.doe@gmail.com",
      to_addr: "jane.doe@gmail.com",
      subject: "Korean BBQ this weekend?",
      dictionary_keywords: "Korean, dinner, nyc",
      content_hash: "7m865323476feeaniiji"}
    </dictionary_entry>
    <datetime>Jan 20, 2020 15:23:43 UTC</datetime>
    <from_addr>john.doe@gmail.com</from_addr>
    <to_addr>jane.doe@gmail.com</to_addr>
    <subject>Korean BBQ this weekend?</subject>
    <content>
Received: by 10.36.81.3 with SMTP1 id e3cs239nzb; Tue, 5 Mar 2020
15:11:47 - 0800 (PST)
Return-Path:
Received: from mail.emailprovider.com (mail.emailprovider.com
[111.111.11.111]) by mx.gmail.com with SMTP id
h19si826631rnb.2005.03.29.15.11.46; Tue, 5 Mar 2020 15:11:47 -0800
(PST)
Message-ID: <20050329231145.62086.mail@mail.emailprovider.com>
Received: from [11.11.111.111] by mail.emailprovider.com via HTTP;
Tue, 5 Mar 2020 15:11:45 PST
Date: Tue, 5 Mar 2020 15:11:45 -0800 (PST)
From: John Doe <john.doe@gmail.com>
Subject: Korean BBQ this weekend?
To: Jane Doe <jane.doe@gmail.com>
Hi Jane,
Would you like to meet up in New York city this weekend for Korean
BBQ? I know this great place down on Spring Street.
John
    </content>
  </input>
  <input type="tweet" id="2">
    ...
  </input>
  <input type="purchase_transaction" id="3">
    ...
  </input>
  <input type="web_search" id="4">
    ...
  </input>
  <input id="n">
    ...
  </input>
</firehost_input>
```

In one embodiment, the mesh structure may then be updated, e.g., 4604. Further detail regarding updating the mesh structure can be found throughout this specification, drawing and claims, and particularly with reference to FIGS. 15-19. In one embodiment, a clustering node 4605 may send a cluster categories request 4606 to the mesh server. A cluster categories request may contain a category or deduced concept that is to be added to the mesh. In one embodiment, the category may have no pre-existing associations in the mesh (e.g., the category to be added may be an orphan category). An example cluster categories request 4606, substantially in the form of an HTTP(S) POST message including XML is:

```
POST /cluster_categories.php HTTP/1.1
Host: www.meshserver.com
Content-Type: Application/XML
Content-Length: 667
<?XML version = "1.0" encoding = "UTF-8"?>
<cluster_categories_request>
    <cluster operation="add">
        <concept value="iphone" />
        <concept_related_concept value="apple" />
        <concept_keyword value="64GB" />
        <concept_keyword value="Steve Jobs" />
    </cluster>
    <cluster>
        ...
    </cluster>
</cluster_categories_request>
```

In an alternative embodiment, an example cluster categories request 4606, substantially in the form of an HTTP(S) POST message including XML is:

```
POST /cluster_categories.php HTTP/1.1
Host: www.meshserver.com
Content-Type: Application/XML
Content-Length: 667
<?XML version = "1.0" encoding = "UTF-8"?>
<cluster_categories_request>
    <cluster operation="add">
        <concept value="portable music player" />
        <manufacturer>Apple Computer</manufacturer>
        <model>iPod Touch 32GB</model>
        <size>32GB</size>
    </cluster>
    <cluster>
        ...
    </cluster>
</cluster_categories_request>
```

In one embodiment, the cluster categories request above may be modified by the CPDB as a result of aggregated data. For example, a request to create a cluster for an iPod of a given size may be supplemented with alternative models/sizes. In so doing, the mesh may expand a recommendation, graph entity, and/or the like to encompass concepts that are connected with the primary concept. In one embodiment, this modified cluster may take the form a the form of XML substantially similar to:

```
<cluster>
    <concept value="portable music player" />
    <manufacturer>Apple Computer</manufacturer>
    <model>
        <1>iPod Touch 32GB</1>
        <2>iPod Touch 64GB</2>
        <3>iPod Touch 128GB</3>
        <4>iPhone 32GB</4>
        <5>iPhone 64GB</5>
        <6>iPhone 128GB</6>
    </model>
    <size>32GB OR 64GB OR 128GB</size>
</cluster>
```

In one embodiment, the mesh structure may be updated in response to the cluster categories request, e.g., 4604. In one embodiment, a user 4607 may use his/her mobile device to indicate that they wish to purchase an item based on cluster concepts, e.g., a user bid/buy input 4608. For example, a user may query "I want the TV that AV Geeks thinks is best and I'll pay $1,500 for it". In one embodiment, the query may be substantially in the form of a language input such as the above, which may be parsed using natural language processing packages such as FreeLing, LingPipe, OpenNLP, and/or the like. In other embodiments, the user may be presented with a structured query interface on their mobile device that allows a restricted set of options and values from which to build a bid/buy input 4608. For example, a user may be given a list of categories (such as may be built by querying a categories database as described with respect to FIG. 49) from which to choose when making a bid/buy input. In one embodiment, a clustering server 4609 may receive the user bid/buy input 4608 and generate a consumer cluster based bid request, e.g., 4610 and provide same to a clustering node 4605. An example consumer cluster based bid request 4610, substantially in the form of an HTTP(S) POST message including XML is:

```
POST /consumer_bid_request.php HTTP/1.1
Host: www.meshserver.com
Content-Type: Application/XML
Content-Length: 667
<?XML version = "1.0" encoding = "UTF-8"?>
<consumer_cluster_based_bid_request>
    <datetime>Jan 21, 2020 5:34:09 UTC</datetime>
    <user_id>43246</user_id>
    <request>
        <type>bid</type>
        <item>
            <item_query>LCD Television</item_query>
            <type_desired value="best" />
            <cluster_source value="AV Geeks.com" />
            <cluster_min_expertise_level value="top2prct" />
            <max_price value="1500.00" currency="USD" />
            <expire_request value="30days" />
            <payment type="credit">
                <card_type>VISA</card_type>
                <card_num>98765436598766732</card_num>
                <card_exp>0525</card_exp>
            </payment>
            <shipping_address>
                <addr1>100 Main St.</addr1>
                <city>Anytown</city>
                <state>CA</state>
                <zip>90145</zip>
            </shipping_address>
        </item>
    </request>
</consumer_cluster_based_bid_request>
```

Figure 48A:
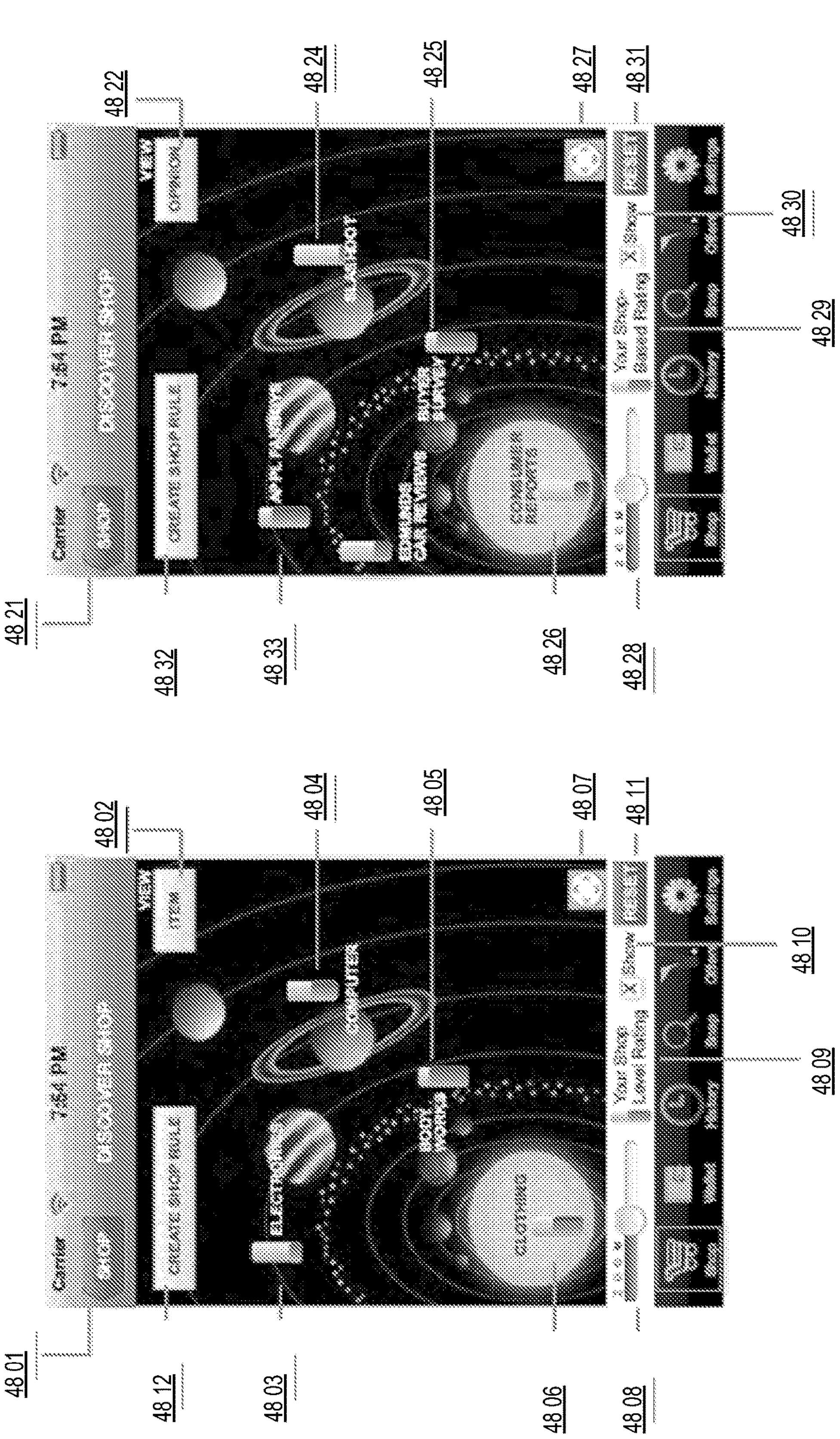
FIG. 48A-C illustrate an example CPDB application embodiment, in one embodiment of the CPDB.
Figure 48B:
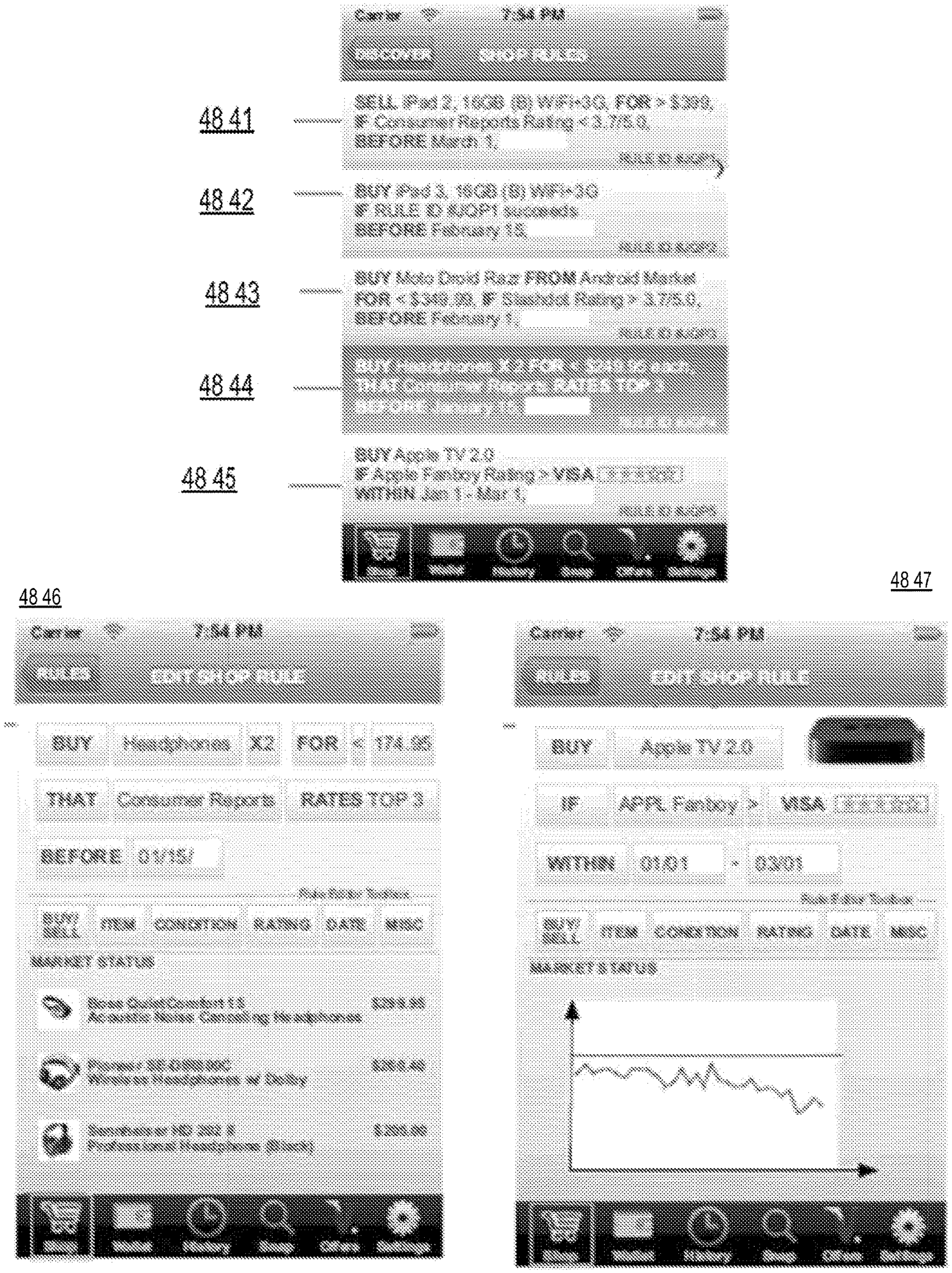

In an alternative embodiment, the consumer cluster based bid request may be generated using the user interface described herein and with respect to FIG. 48A-B. In one embodiment, the consumer cluster based bid request 4610, generated using the interface may be substantially in the form of an HTTP(S) POST message including XML:

```
POST /consumer_bid_request.php HTTP/1.1
Host: www.meshserver.com
Content-Type: Application/XML
Content-Length: 667
<?XML version = "1.0" encoding = "UTF-8"?>
<consumer_cluster_based_bid_request>
    <datetime>Jan 21, 2020 5:34:09 UTC</datetime>
    <user_id>43246</user_id>
    <request>
        <type>bid</type>
        <item>
            <item_query>headphones</item_query>
            <quantity value="2" />
            <requirement value="rated_top_3" />
            <cluster_source value="consumerreports.com" />
            <max_price value="249.95" currency="USD" />
            <expire_request value="January 15, 2020" />
            <payment type="credit">
                <card_type>VISA</card_type>
                <card_num>98765436598766732</card_num>
                <card_exp>0525</card_exp>
            </payment>
            <shipping_address>
                <addr1>100 Main St.</addr1>
                <city>Anytown</city>
                <state>CA</state>
                <zip>90145</zip>
            </shipping_address>
```

-continued

```
        </item>
    </request>
</consumer_cluster_based_bid_request>
```

In one embodiment, in response to the consumer cluster based bid request 4610, the clustering node 4605 may generate a cluster request 4611. A cluster request may be a request to search the mesh in order to find results (e.g., items matching a cluster's buying habits, merchants offering an item, alternative items for purchase, friends that have already purchased items, items the user already owns—based on, for example, past purchase transactions—that may satisfy the request, and/or the like). An example query suitable for querying a distributed linking node mesh is:

```
START user=node(5,4,1,2,3)
MATCH entity-[:affinity]->"consumer_reports"
WHERE entity.recommended >= '3',
    entity.recommendation.item.type ~= "headphones"
RETURN entity.recommendation.item.name,
    entity.recommendation.item.model,
    entity.recommendation.item.averageprice
```

In one embodiment, the mesh server may provide a cluster request response 4612. An example cluster request response 4612 substantially in the form of an HTTP(S) POST message including XML is:

```
POST /cluster_request_response.php HTTP/1.1
Host: www.clusteringnode.com
Content-Type: Application/XML
Content-Length: 667
<?XML version = "1.0" encoding = "UTF-8"?>
<cluster_request_response>
    <requested_item>
        <item_query>LCD Television</item_query>
        <type_desired value="best" />
        <cluster_source value="AV Geeks.com" />
        <cluster_min_expertise_level value="top2prct" />
        <max_price value="1500.00" currency="USD" />
    </requested_item>
    <cluster_results>
        <num_users_meeting_cluster value="2541" />
        <average_user_feedback_ranking value="94%" />
        <cluster_user_purchases>
            <item rank="1">
                <desc>Sony Bravada 50" LCD 645</desc>
                <model>KDL50EX645</model>
            </item>
            <item rank="2">
                <desc>Sony Bravada 50" LCD 655</desc>
                <model>KDL50EX655</model>
            </item>
            <item>
                ...
            </item>
        </cluster_user_purchases>
    </cluster_results>
</cluster_request_response>
```

In an alterative embodiment, an example cluster request response 4612 substantially in the form of an HTTP(S) POST message including XML is:

```
POST /cluster_request_response.php HTTP/1.1
Host: www.clusteringnode.com
Content-Type: Application/XML
Content-Length: 667
```

```
<?XML version = "1.0" encoding = "UTF-8"?>
<cluster_request_response>
    <requested_item>
            <item_query>headphones</item_query>
            <quantity value="2" />
            <requirement value="rated_top_3" />
            <cluster_source value="consumerreports.com" />
            <max_price value="249.95" currency="USD" />
            <expire_request value="January 15, 2020" />
    </requested_item>
    <cluster_results>
        <cluster_consumer_reports_ranking>
            <item consumer_reports_rank="1">
                <desc>Panasonic Technics Pro DJ</desc>
                <model>RP-DH1250</model>
                <avg_price>$235.55</avg_price>
            </item>
            <item consumer_reports_rank="2">
                <desc>Coby In Ear Headphones</desc>
                <model>CVEM76PNK</model>
                <avg_price>$245.55</avg_price>
            </item>
            <item consumer_reports_rank="3">
                <desc>Shure E2c-n Sound Isolating Earphones</desc>
                <model>SHE2CN</model>
                <avg_price>$249.95</avg_price>
            </item>
        </cluster_consumer_reports_ranking>
    </cluster_results>
</cluster_request_response>
```

In one embodiment, the clustering node 4605 may then process the cluster response and create transaction triggers. Further details regarding cluster request response 4612 processing may be found throughout the specification, drawings and claims and particularly with reference to FIG. 47, e.g., a CRA Component.

In one embodiment, a lead cluster order request may be generated for merchants that were identified as a result of the cluster response analysis, e.g., 4613. In other embodiments, a default list of merchants may be used. A lead cluster order request may contain information relating to the identified purchase that the user 4607 wishes to engage in. In the example above, for example, the analysis may have determined that based on the aggregated AV Geeks user expert preference information, the user should purchase Sony television model KDL50EX645 or KDL50EX655. The analysis may also have determined that a given merchant sells those models of television (such as by using aggregated sales transaction data as described herein). A request may then be sent to the merchant indicating a purchase item, a user lead that may execute the purchase and a price the user is willing to pay. In one embodiment, the user identity is not provided or is anonymized such that the merchant does not have information sufficient to determine the actual identity of the user but may determine if they wish to execute the sale to the user. An example lead cluster order request 4614, substantially in the form of an HTTP(S) POST message containing XML data:

```
POST /lead_cluster_order_request.php HTTP/1.1
Host: www.merchantserver.com
Content-Type: Application/XML
Content-Length: 667
<?XML version = "1.0" encoding = "UTF-8"?>
<lead_cluster_order_request>
    <lead validFor="30_days">
        <type>television</type>
        <items join="OR">
            <item model="KDL50EX645" />
            <item model="KDL50EX655" />
        </items>
        <user_information>
            <name>John Doe</name>
            <email>john.doe@gmail.com</email>
            <phone>865-765-3465</phone>
        </user_information>
        <payment type="credit">
            <card_type>VISA</card_type>
            <card_num>98765436598766732</card_num>
            <card_exp>0525</card_exp>
        </payment>
        <shipping_address>
            <addr1>100 Main St.</addr1>
            <city>Anytown</city>
            <state>CA</state>
            <zip>90145</zip>
        </shipping_address>
    </lead>
    <lead>
        ...
    </lead>
</lead_cluster_order_request>
```

In one embodiment, a merchant may accept the order and generate a lead cluster order accept/reject response. In other embodiments, the merchant may indicate that they wish to hold the lead opportunity open and may accept at a later time if no other merchant has filled the lead cluster order request. In still other embodiments, the merchant response may contain a counteroffer for the user (e.g., $1600), which the user may then accept or decline. In one embodiment, the user receives an order acceptance confirmation 4617 indicating that their order has been fulfilled.

In one embodiment, a user may cancel a cluster based bid request prior to the merchant fulfilling the order. For example, a user may transmit a user cancel input 4618 to clustering server 4609. The clustering server may forward the cancel message to the clustering node 4605, e.g., 4619, which may in turn forward the cancel message to the merchant(s) server 4615, e.g., 4620.

Figure 47:
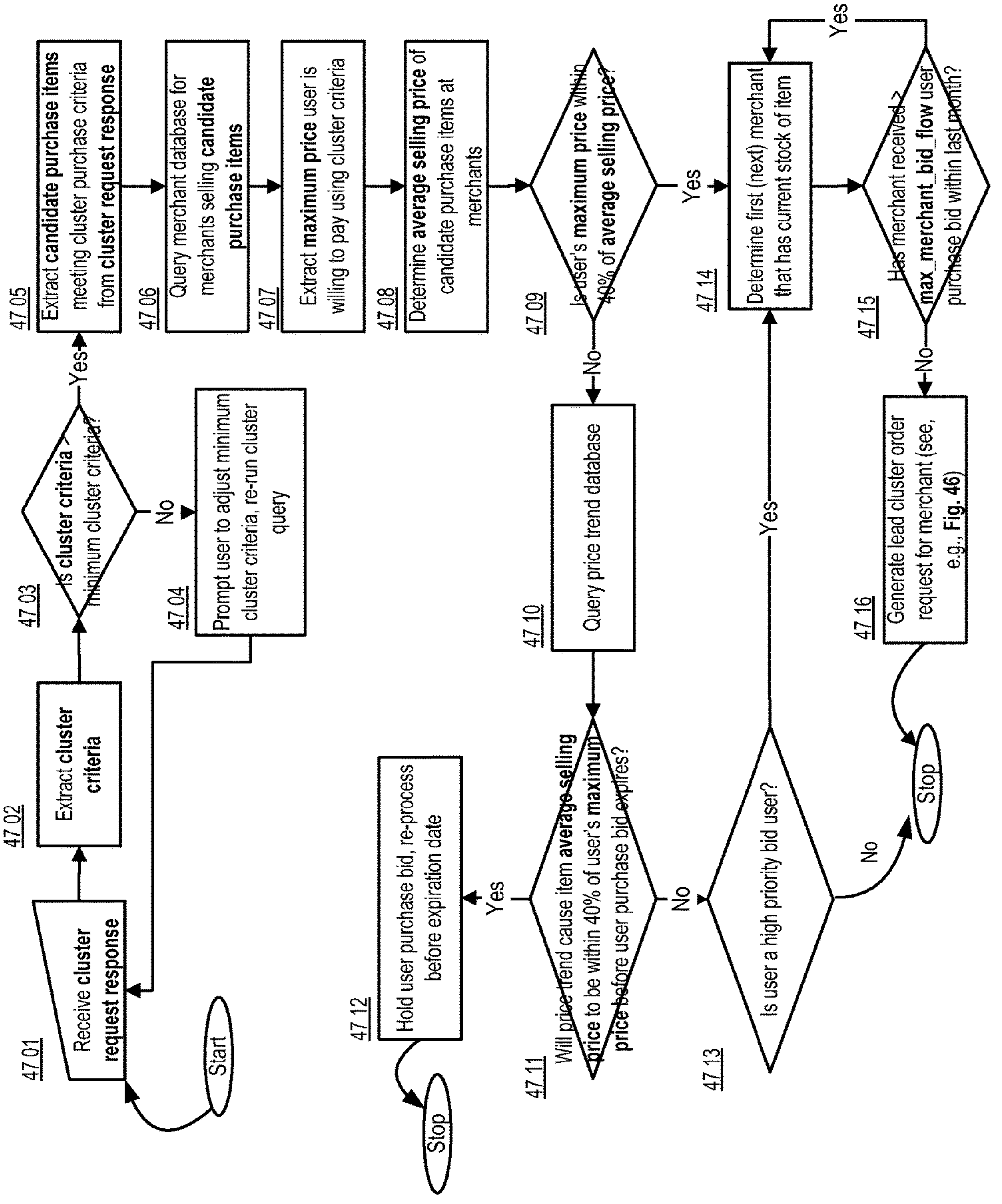
FIG. 47 shows an example logic flow illustrating cluster response analysis and transaction triggering, in one embodiment of a CPDB.

FIG. 47 is an example logic flow illustrating cluster response analysis and transaction triggering, e.g., a CRA component, in one embodiment of a CPDB. In one embodiment, a cluster request response is received, e.g., 4701. Cluster criteria (i.e., user requesting cluster, the criteria for the cluster, payment/shipping information for the user purchase bid, and/or the like) may be extracted from the cluster request response, e.g., 4702. In one embodiment, the cluster criteria is examined to determine if it meets the minimum cluster criteria, e.g., 4703. Examples of minimum cluster criteria include minimum feedback ranking of users in cluster, minimum years of expertise of users in cluster, median value of items returned, and/or the like. If the cluster criteria is not greater than the minimum cluster criteria, the user may be prompted to adjust the minimum criteria and a search may be re-run, e.g., 4704. In other embodiments, the criteria may be adjusted automatically by the CPDB or a third-party database may be queried to determine new minimum criteria (e.g., a user expertise ranking service, a user review site, and/or the like).

In one embodiment, candidate purchase items may be extracted from the cluster request response, e.g., 4705. A merchant database may be queried to determine merchants selling the candidate purchase items. An example merchant database query, substantially in the form of PHP/SQL commands is provided below:

```
<?PHP
header('Content-Type: text/plain');
mysql_connect("localhost",$DBserver,$password);
mysql_select_db("merchants.sql");
$query = "SELECT merchant_id, merchant_name, price,
quantity_on_hand FROM merchants WHERE merchant_item_id LIKE
'%' $cluster_returned_model_num";
$result = mysql_query($query); // perform the search query
mysql_close("merchants.sql"); // close database access
?>
```

In one embodiment, a maximum price the user is willing to pay is determined, e.g., 4707. An average selling price of the candidate purchase items may be determine (such as by querying a merchant table containing price history, querying a price history table, performing a live crawl of a merchant's web site, and/or the like). If the user's maximum price is not within a given range of the average merchant item price, e.g., 4709, a price trend database may be queried, e.g., 4710. A price trend database may contain historical information relating to the price of an item over time. If the price trend (i.e., the linear extrapolation of the historical prices, and/or the like) shows that the average price of the item will be within 40% of the user's maximum price before the user purchase bid expires, e.g., 4711, the user purchase bid request may be held, e.g., 4712, so that the cluster response analysis may be re-run again before the bid expires. In another embodiment, even if the user's price will not be within a range of the average price of an item at the queried merchants, the user procedure may continue if the user has been marked as a high priority bid user (e.g., a frequent bidder, a new bidder, and/or the like), e.g., 4713. In one embodiment, the first merchant that has stock of the item may be selected, e.g., 4714. If the merchant has received greater than a set amount of bids in a time period, e.g., 4715, another merchant may be selected. In so doing, one merchant may not be overwhelmed with bids. In one embodiment, a lead cluster order request is created and transmitted to the merchant, e.g., 4716.

Figure 48C:
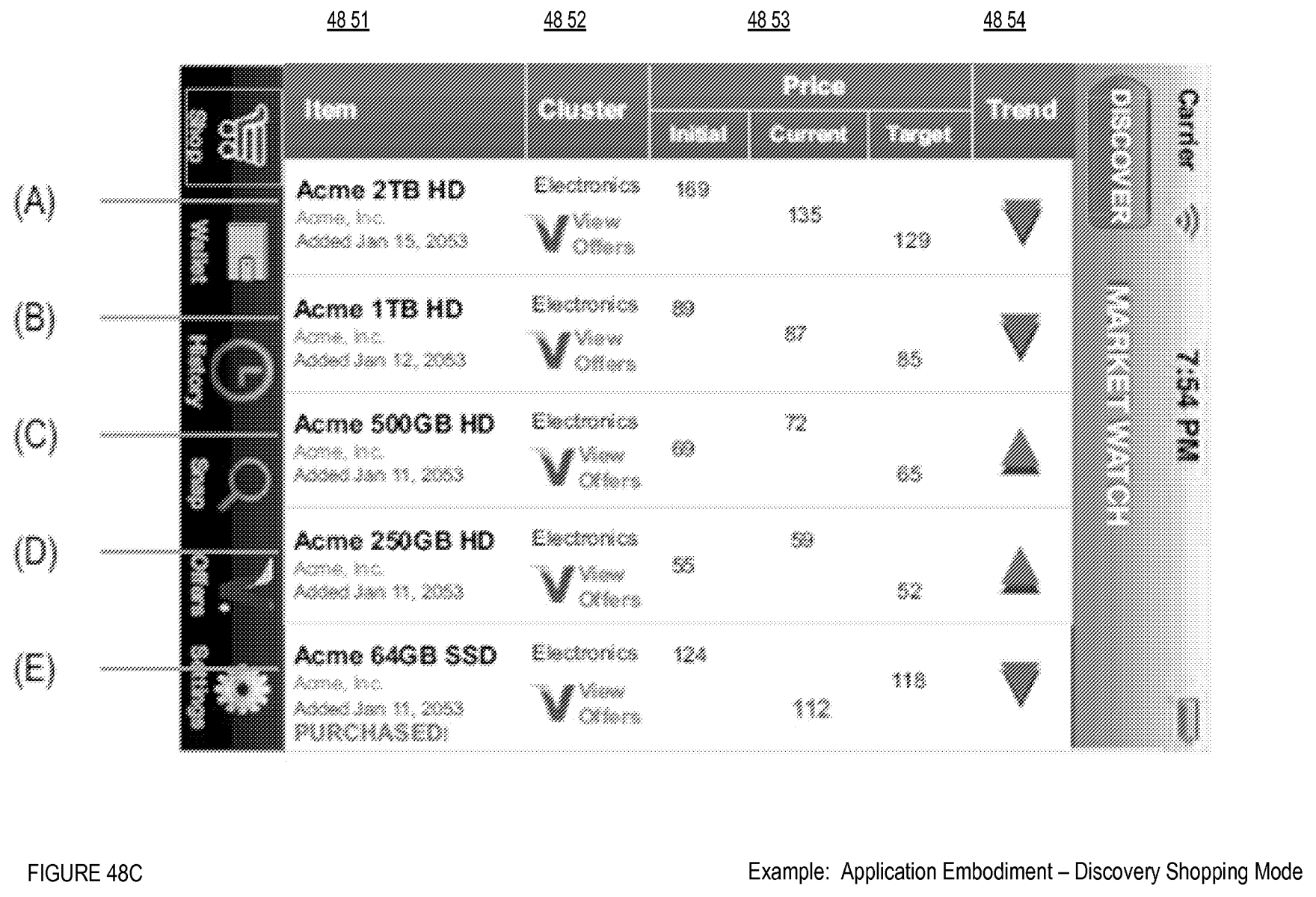

FIGS. 48A-C show user interface diagrams illustrating example aspects of a discovery shopping mode of a virtual wallet application in some embodiments of the CPDB. In some embodiments, the virtual wallet application may provide a 'discovery shopping' mode for the user. For example, the virtual wallet application may obtain information on aggregate purchasing behavior of a sample of a population relevant to the user, and may provide statistical/aggregate information on the purchasing behavior for the user as a guide to facilitate the user's shopping. For example, with reference to FIG. 48A, the discovery shopping mode 4801 may provide a view of aggregate consumer behavior, divided based on product category (see 4802). Thus, the virtual wallet application may provide visualization of the magnitude of consumer expenditure in particular market segment, and generate visual depictions representative of those magnitudes of consumer expenditure (see 4803-4806). In some embodiments, the virtual wallet application may also provide an indicator (see 4809) of the relative expenditure of the user of the virtual wallet application (see blue bars); thus the user may be able to visualize the differences between the user's purchasing behavior and consumer behavior in the aggregate. The user may be able to turn off the user's purchasing behavior indicator (see 4810). In some embodiments, the virtual wallet application may allow the user to zoom in to and out of the visualization, so that the user may obtain a view with the appropriate amount of granularity as per the user's desire (see 4807-4808). At any time, the user may be able to reset the visualization to a default perspective (see 4811).

Similarly, the discovery shopping mode 4821 may provide a view of aggregate consumer response to opinions of experts, divided based on opinions of experts aggregated form across the web (see 4802). Thus, the virtual wallet application may provide visualizations of how well consumers tend to agree with various expert opinion on various product categories, and whose opinions matter to consumers in the aggregate (see 4823-4826). In some embodiments, the virtual wallet application may also provide an indicator (see 4829) of the relative expenditure of the user of the virtual wallet application (see blue bars); thus the user may be able to visualize the differences between the user's purchasing behavior and consumer behavior in the aggregate. The user may be able to turn off the user's purchasing behavior indicator (see 4830). In some embodiments, the virtual wallet application may allow the user to zoom in to and out of the visualization, so that the user may obtain a view with the appropriate amount of granularity as per the user's desire (see 4827-4828). At any time, the user may be able to reset the visualization to a default perspective (see 4831).

With reference to FIG. 48B, in some implementations, the virtual wallet application may allow users to create targeted shopping rules for purchasing (see FIG. 48A, 4812, 4822). For example, the user may utilize the consumer aggregate behavior and the expert opinion data to craft rules on when to initiate purchases automatically. As an example, rule 4841 specifies that the virtual wallet should sell the users iPad2 if its consumer reports rating falls below 3.75/5.0, before March 1, provided a sale price of $399 can be obtained. As another example, rule 4842 specifies that the virtual wallet should buy an iPad3 if rule 4841 succeeds before February 15. As another example, rule 4843 specifies that the wallet should buy a Moto Droid Razr from the Android Market for less than $349.99 if its Slashdot rating is greater than 3.75 before February 1. Similarly, numerous rules with a wide variety of variations and dependencies may be generated for targeted shopping in the discovery mode. In some implementations, the virtual wallet user may allow the user to modify a rule. For example, the wallet may provide the user with an interface similar to 4846 or 4847. The user may utilize tools available in the rule editor toolbox to design the rule according to the user's desires. In some implementations, the wallet may also provide a market status for the items that are subject to the targeted shopping rules.

With reference to FIG. 48C, in some implementations, the virtual wallet application may provide a market watch feature, wherein the trends associated with items subject to targeted shopping rules may be tracked and visually represented for the user. For example, the visualization may take, in some implementations, the form of a ticker table, wherein against each item 4851(A)-(E) are listed a product category or cluster of expert opinions to which the product is related 4852, pricing indicators, including, but not limited to: price at the time of rule creation 4852, price at the time of viewing the market watch screen 4853, and a target price for the items (A)-(E). Based on the prices, the market watch screen may provide a trending symbol (e.g., up, down, no change, etc.) for each item that is subject to a targeted shopping rule. Where an item satisfied the targeted rule (see item (E)), the virtual wallet may automatically initiate a purchase transaction for that item once the target price is satisfied.

CPDB Controller

Figure 49:
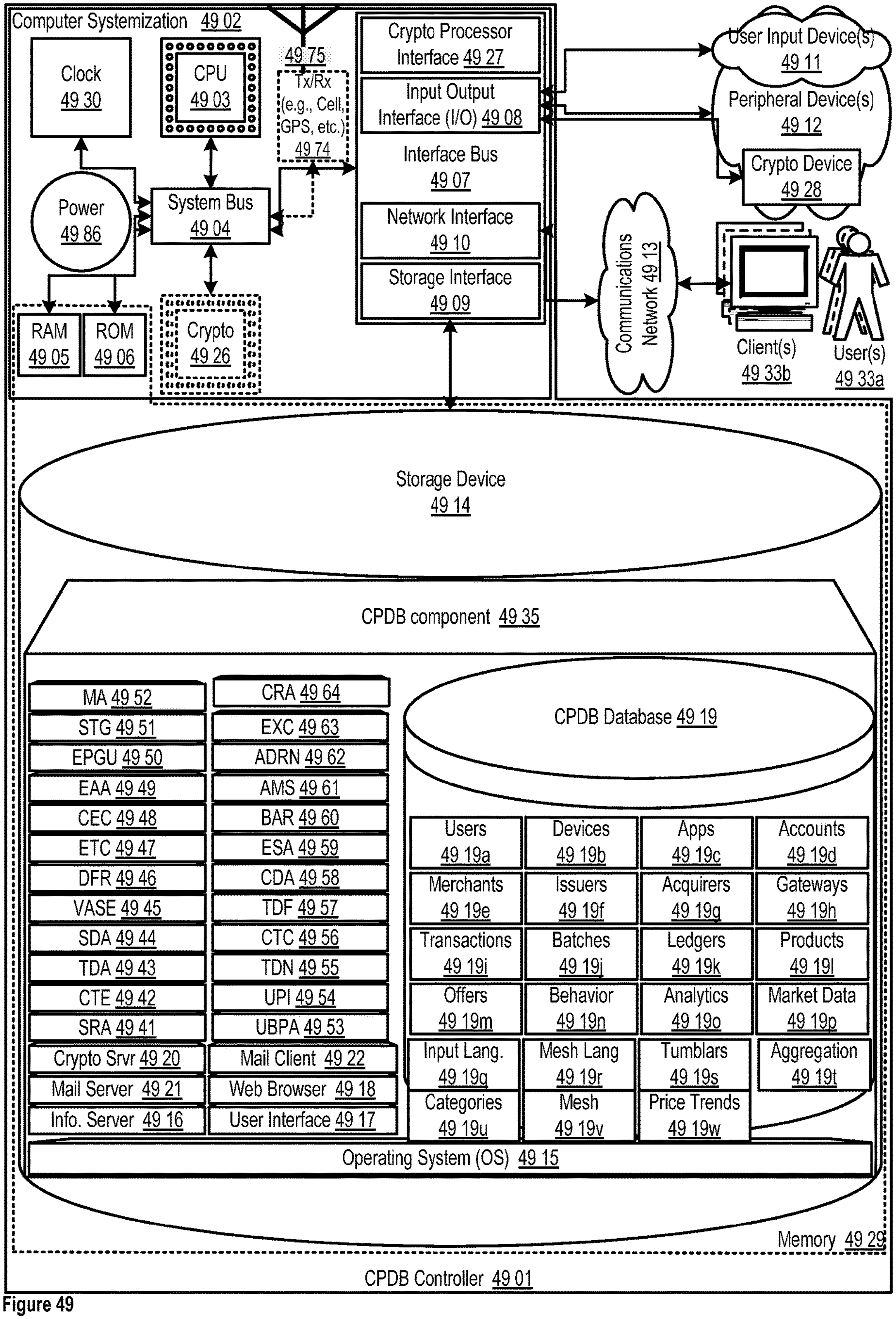
FIG. 49 shows a block diagram illustrating embodiments of a CPDB controller.

FIG. 49 shows a block diagram illustrating embodiments of a CPDB controller. In this embodiment, the CPDB controller 4901 may serve to aggregate, process, store, search, serve, identify, instruct, generate, match, and/or facilitate interactions with a computer through various technologies, and/or other related data.

Typically, users, which may be people and/or other systems, may engage information technology systems (e.g., computers) to facilitate information processing. In turn, computers employ processors to process information; such processors 4903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 4929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the CPDB controller 4901 may be connected to and/or communicate with entities such as, but not limited to: one or more users from user input devices 4911; peripheral devices 4912; an optional cryptographic processor device 4928; and/or a communications network 4913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The CPDB controller 4901 may be based on computer systems that may comprise, but are not limited to, components such as: a computer systematization 4902 connected to memory 4929.

Computer Systematization

A computer systematization 4902 may comprise a clock 4930, central processing unit ("CPU(s)" and/or "processor (s)" (these terms are used interchangeable throughout the disclosure unless noted to the contrary)) 4903, a memory 4929 (e.g., a read only memory (ROM) 4906, a random access memory (RAM) 4905, etc.), and/or an interface bus 4907, and most frequently, although not necessarily, are all interconnected and/or communicating through a system bus 4904 on one or more (mother)board(s) 4902 having conductive and/or otherwise transportive circuit pathways through which instructions (e.g., binary encoded signals) may travel to effectuate communications, operations, storage, etc. The computer systematization may be connected to a power source 4986; e.g., optionally the power source may be internal. Optionally, a cryptographic processor 4926 and/or transceivers (e.g., ICs) 4974 may be connected to the system bus. In another embodiment, the cryptographic processor and/or transceivers may be connected as either internal and/or external peripheral devices 4912 via the interface bus I/O. In turn, the transceivers may be connected to antenna(s) 4975, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing CPDB controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systematization's circuit pathways. The clock is typically coupled to the system bus and various clock multipliers that will increase or decrease the base operating frequency for other components interconnected in the computer systematization. The clock and various components in a computer systematization drive signals embodying information throughout the system. Such transmission and reception of instructions embodying information throughout a computer systematization may be commonly referred to as communications. These communicative instructions may further be transmitted, received, and the cause of return and/or reply communications beyond the instant computer systematization to: communications networks, input devices, other computer systematizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 4929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the CPDB controller and beyond through various interfaces. Should processing requirements dictate a greater amount speed and/or capacity, distributed processors (e.g., Distributed CPDB), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the CPDB may be achieved by implementing a microcontroller such as CAST's R8051XC2 microcontroller; Intel's MCS 51 (i.e., 8051 microcontroller); and/or the like. Also, to implement certain features of the CPDB, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the CPDB component collection (distributed or otherwise) and/or features may be implemented via the microprocessor and/or via embedded components; e.g., via ASIC, coprocessor, DSP, FPGA, and/or the like. Alternately, some implementations of the CPDB may be implemented with embedded components that are configured and used to achieve a variety of features or signal processing.

Depending on the particular implementation, the embedded components may include software solutions, hardware solutions, and/or some combination of both hardware/software solutions. For example, CPDB features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the CPDB features. A hierarchy of programmable interconnects allow logic blocks to be interconnected as needed by the CPDB system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the CPDB may be developed on regular FPGAs and then migrated into a fixed version that more resembles ASIC implementations. Alternate or coordinating implementations may migrate CPDB controller features to a final ASIC instead of or in addition to FPGAs. Depending on the implementation all of the aforementioned embedded components and microprocessors may be considered the "CPU" and/or "processor" for the CPDB.

Power Source

The power source 4986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 4986 is connected to at least one of the interconnected subsequent components of the CPDB thereby providing an electric current to all subsequent components. In one example, the power source 4986 is connected to the system bus component 4904. In an alternative embodiment, an outside power source 4986 is provided through a connection across the I/O 4908 interface. For example, a USB and/or IEEE 1394 connection carries both data and power across the connection and is therefore a suitable source of power.

Interface Adapters

Interface bus(ses) 4907 may accept, connect, and/or communicate to a number of interface adapters, conventionally although not necessarily in the form of adapter cards, such as but not limited to: input output interfaces (I/O) 4908, storage interfaces 4909, network interfaces 4910, and/or the like. Optionally, cryptographic processor interfaces 4927 similarly may be connected to the interface bus. The interface bus provides for the communications of interface adapters with one another as well as with other components of the computer systematization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 4909 may accept, communicate, and/or connect to a number of storage devices such as, but not limited to: storage devices 4914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 4910 may accept, communicate, and/or connect to a communications network 4913. Through a communications network 4913, the CPDB controller is accessible through remote clients **4933*b* (e.g., computers with web browsers) by users 4933*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed CPDB), architectures may similarly be employed to pool, load balance, and/or otherwise increase the communicative bandwidth required by the CPDB controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 4910 may be used to engage with various communications network types 4913**. For example, multiple network interfaces may be employed to allow for the communication over broadcast, multicast, and/or unicast networks.

Input Output interfaces (I/O) 4908 may accept, communicate, and/or connect to user input devices 4911, peripheral devices 4912, cryptographic processor devices 4928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systematization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 4911 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 4912 may be connected and/or communicate to I/O and/or other facilities of the like such as network interfaces, storage interfaces, directly to the interface bus, system bus, the CPU, and/or the like. Peripheral devices may be external, internal and/or part of the CPDB controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the CPDB controller may be embodied as an embedded, dedicated, and/or monitor-less (i.e., headless) device, wherein access would be provided over a network interface connection.

Cryptographic units such as, but not limited to, microcontrollers, processors 4926, interfaces 4927, and/or devices 4928 may be attached, and/or communicate with the CPDB controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 4929. However, memory is a fungible technology and resource, thus, any number of memory embodiments may be employed in lieu of or in concert with one another. It is to be understood that the CPDB controller and/or a computer systematization may employ various forms of memory 4929. For example, a computer systematization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 4929 will include ROM 4906, RAM 4905, and a storage device 4914. A storage device 4914 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systematization generally requires and makes use of memory.

Component Collection

The memory 4929 may contain a collection of program and/or database components and/or data such as, but not limited to: operating system component(s) 4915 (operating system); information server component(s) 4916 (information server); user interface component(s) 4917 (user interface); Web browser component(s) 4918 (Web browser);

database(s) 4919; mail server component(s) 4921; mail client component(s) 4922; cryptographic server component(s) 4920 (cryptographic server); the CPDB component(s) 4935; and/or the like (i.e., collectively a component collection). These components may be stored and accessed from the storage devices and/or from storage devices accessible through an interface bus. Although non-conventional program components such as those in the component collection, typically, are stored in a local storage device 4914, they may also be loaded and/or stored in memory such as: peripheral devices, RAM, remote storage facilities through a communications network, ROM, various forms of memory, and/or the like.

Operating System

The operating system component 4915 is an executable program component facilitating the operation of the CPDB controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP/Win7 (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the CPDB controller to communicate with other entities through a communications network 4913. Various communication protocols may be used by the CPDB controller as a subcarrier transport mechanism for interaction, such as, but not limited to: multicast, TCP/IP, UDP, unicast, and/or the like.

Information Server

An information server component 4916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C #and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the CPDB controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the CPDB database 4919, operating systems, other program components, user interfaces, Web browsers, and/or the like.

Access to the CPDB database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the CPDB. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the CPDB as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery UI, MooTools, Prototype, script.aculo.us, SWFObject, Yahoo! User Interface, any of which may be used and provide a baseline and means of accessing and displaying information graphically to users.

A user interface component 4917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 4918 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Firefox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the CPDB enabled nodes. The combined application may be nugatory on systems employing standard Web browsers.

Mail Server

A mail server component 4921 is a stored program component that is executed by a CPU 4903. The mail server may be a conventional Internet mail server such as, but not limited to send mail, Microsoft Exchange, and/or the like. The mail server may allow for the execution of program components through facilities such as ASP, ActiveX, (ANSI) (Objective-) C (++), C #and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAP I)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the CPDB.

Access to the CPDB mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 4922 is a stored program component that is executed by a CPU 4903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 4920 is a stored program component that is executed by a CPU 4903, cryptographic processor 4926, cryptographic processor interface 4927, cryptographic processor device 4928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the CPDB may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the CPDB component to engage in secure transactions if so desired. The cryptographic component facilitates the secure accessing of resources on the CPDB and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The CPDB Database

The CPDB database component 4919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the CPDB database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the CPDB database is implemented as a data-structure, the use of the CPDB database 4919 may be integrated into another component such as the CPDB component 4935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 4919 includes several tables 4919*a-w*. A Users table 4919*a* may include fields such as, but not limited to: user_id, ssn, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a CPDB. A Devices table 4919*b* may include fields such as, but not limited to: device_id, user_id, client_ip, client_type, client_model, operating_system, os_version, app_installed_flag, and/or the like. An Apps table 4919*c* may include fields such as, but not limited to: app_id, app_name, app_type, OS_compatibilities_list, version, timestamp, developer_id, and/or the like. An Accounts table 4919*d* may include fields such as, but not limited to: account_id, account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. A Merchants table 4919*e* may include fields such as, but not limited to: merchant_id, merchant_name, provi merchant_address, ip_address, mac_address, auth_key, port_ num, security_settings_list, and/or the like. An Issuers table 4919*f* may include fields such as, but not limited to: issuer_id, issuer_name, issuer_address, ip_address, mac_address, auth_key, port_num, security_settings_list, and/or the like. An Acquirers table 4919*g* may include fields such as, but not limited to: acquirer_id, account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. A Gateways table 4919*h* may include fields such as, but not limited to: gateway_id, gateway_name, merchant_id, issuer_id, acquirer_id, user_id, and/or the like. A Transactions table 4919*i* may include fields such as, but not limited to: transaction_id, order id, user_id, timestamp, transaction_cost, purchase_details_list, num_products, products_ list, product_type, product_params_list, product_title, product_summary, quantity, user_id, client_id, client_ip, client_type, client_model, operating_system, os_version, app_installed_flag, user_id, account_firstname, account_lastname, account_type, account_num, billingaddress_line1, billingaddress_line2, billing_ zipcode, billing_state, shipping_preferences, shippingaddress_line1, shippingaddress_ line2, shipping_zipcode, shipping_state, merchant_id, merchant_name, merchant_auth_key, and/or the like. A Batches table 4919*j* may include fields such as, but not limited to: batch_id, parent_batch_id, transaction_id, account_id, user_id, app_id, batch_rules, and/or the like. A Ledgers table 4919*k* may include fields such as, but not limited to: ledger_id, transaction_id, user_id, merchant_id, issuer_id, acquirer_id, aggregation_id, ledger_name, ledger_value, and/or the like. A Products table 4919*l* may include fields such as, but not limited to: product_id, product_name, sku, price, inventory_level, stores_carrying, unit_of_measure, and/or the like. A Offers table 4919*m* may include fields such as, but not limited to: offer_id, merchant_id, offered_to_user_id, offer_type, offer_description, start date, end_date, num_ times_redeemed, and/or the like. A Behavior table 4919*n* may include fields such as, but not limited to: behavior_id, user_id, behavior_description, behavior_type, behavior_value, date_time_behavior, and/or the like. An Analytics table 4919*o* may include fields such as, but not limited to: analytics_id, batch_id, user_id, transaction_id, generated_graph, generated_results_set, generated_results_set_json, input_data_set, date_time_generated, and/or the like. A Market Data table 4919*p* may include fields such as, but not limited to: market_data_id, index_name, index_value, last_updated_index_datetime, and/or the like. An Input Languages table 4919*q* may include fields such as, but not limited to: input_language_id, function_name, function_definition, parent_input_language_id, mesh_language_id, user_id, tumbler_id, aggregation_id, and/or the like. A Mesh Language table 4919*r* may include fields such as, but not limited to: mesh_language_id, operation_name, operation_min_test_case, operation_max_test_case, operation_custom_test_case, mesh_language_version, mesh_language_updated_date, and/or the like. A Tumblars table 4919*s* may include fields such as, but not limited to: tumbler_id, user_visible_model_commands, non_user_visible_model_commands, input_key, output_key, and/or the like. An Aggregation table 4919*t* may include fields such as, but not limited to: aggregation_id, aggregation_data_source, key, value, parent_aggregation_id, and/or the like. A Category table 4919*u* may include fields such as, but not limited to: category_id, mesh_id, user_id, category_name, category_type, entity_name, is_present_in_mesh, and/or the like. A Mesh table 4919*v* may include fields such as, but not limited to: mesh_id, mesh_node, mesh_node_value, mesh_edge, mesh_edge_value, mesh_link, mesh_link value, attributes, tags, keywords, and/or the like. A Price Trends table 4919*w* may include fields such as, but not limited to: price_trends_id, merchant_id, date_price_observed, number_observations, observed_price, next_check_date, inventory_quantity, and/or the like.

In one embodiment, the CPDB database may interact with other database systems. For example, employing a distributed database system, queries and data access by search CPDB component may treat the combination of the CPDB database, an integrated data security layer database as a single database entity.

In one embodiment, user programs may contain various user interface primitives, which may serve to update the CPDB. Also, various accounts may require custom database tables depending upon the environments and the types of clients the CPDB may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systematizations and/or storage devices. Similarly, configurations of the decentralized database controllers may be varied by consolidating and/or distributing the various database components 4919*a-w*. The CPDB may be configured to keep track of various settings, inputs, and parameters via database controllers.

The CPDB database may communicate to and/or with other components in a component collection, including itself, and/or facilities of the like. Most frequently, the CPDB database communicates with the CPDB component, other program components, and/or the like. The database may contain, retain, and provide information regarding other nodes and data.

The CPDBS

The CPDB component 4935 is a stored program component that is executed by a CPU. In one embodiment, the CPDB component incorporates any and/or all combinations of the aspects of the CPDB that was discussed in the previous figures. As such, the CPDB affects accessing, obtaining and the provision of information, services, transactions, and/or the like across various communications networks. The features and embodiments of the CPDB discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the CPDB's features and facilities, and in many cases reduce the costs, energy consumption/requirements, and extend the life of CPDB's underlying infrastructure; this has the added benefit of making the CPDB more reliable. The generation of the mesh graph and dictionary entries by the CPDB has the technical effect of allowing more transaction, search, enrollment and email data to be analyzed and queried by the CPDB user without a corresponding increase in data storage server/processing infrastructure. For example, by utilizing the aggregated data record normalization 306, data field recognition 307, entity type classification 308, cross-entity correlation 309, and entity attribute 310 components of the CPDB, raw aggregated data may be stored in a more efficient manner and indexed and searched in a manner requiring less physical infrastructure and supporting faster querying with reduced latency (e.g., through the use of a distributed linking node mesh search component). Aspects of the CPDB facilitate faster transaction processing by reducing consumer decision latency (e.g., through the provision of customized offers requiring decreased user input and therefore reduced data transfer requirements). Similarly, many of the features and mechanisms are designed to be easier for users to use and access, thereby broadening the audience that may enjoy/employ and exploit the feature sets of the CPDB; such ease of use also helps to increase the reliability of the CPDB. In addition, the feature sets include heightened security as noted via the Cryptographic components 4920, 4926, 4928 and throughout, making access to the features and data more reliable and secure.

The CPDB component may transform data aggregated from various computer resources via CPDB components into updated entity profiles and/or social graphs, and/or the like and use of the CPDB. In one embodiment, the CPDB component 4935 takes inputs such as aggregated data from various computer resources, and transforms the inputs via various components (e.g., SRA 4941, CTE 4942, TDA 4943 SDA 4944, VASE 4945, DFR 4946, ETC 4947, CEC 4948, EAA 4949, EPGU 4950, STG 4951, MA 4952, UBPA 4953, UPI 4954, TDN 4955, CTC 4956, TDF 4957, CDA 4958, ESA 4959, BAR 4960, AMS 4961, ADRN 4962, EXC 4963, CRA 4964, and/or the like), into outputs such as updated entity profiles and social graphs within the CPDB.

The CPDB component enabling access of information between nodes may be developed by employing standard development tools and languages such as, but not limited to: Apache components, Assembly, ActiveX, binary executables, (ANSI) (Objective-) C (++), C #and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the CPDB server employs a cryptographic server to encrypt and decrypt communications. The CPDB component may communicate to and/or with other components in a component collection, including itself, and/or facilities of the like. Most frequently, the CPDB component communicates with the CPDB database, operating systems, other program components, and/or the like. The CPDB may contain, communicate, generate, obtain, and/or provide program component, system, user, and/or data communications, requests, and/or responses.

Distributed CPDBS

The structure and/or operation of any of the CPDB node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the CPDB controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the CPDB controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
//set ip address and port to listen to for incoming data
$address = '192.168.0.100';
$port = 255;
//create a server-side SSL socket, listen
//for/accept incoming communication
$sock = socket_create(AF_INET, SOCK_STREAM, 0);
socket_bind($sock, $address, $port)
    or die('Could not bind to address');
socket_listen($sock);
$client = socket_accept($sock);
//read input data from client device in 1024 byte
//blocks until end of message
```

-continued

```
do {
        $input = "";
        $input = socket_read($client, 1024);
        $data .= $input;
} while($input != "");
// parse data to extract variables
$obj = json_decode($data, true);
// store input data in a database
mysql_connect("10.1.1.1",$srvr,$pass ); // access database server
mysql_select("CLIENT_DB.SQL"); // select database to append
mysql_query("INSERT INTO UserTable (transmission) VALUES
($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments of the CPDB may include:

1. A centralized personal information platform processor-implemented system for enhancing transaction speed through the reduction of user input data transfer requirements, comprising:

means to aggregate data records from a plurality of content sources;

means to query a data aggregation database for at least one data aggregation normalization template corresponding to the aggregated data records;

means to determine at least one data field type in the aggregated data records using the at least one data aggregation normalization template;

means to identify at least one entity in the aggregated data records using the at least one data field type and associated field data values;

means to generate an updated distributed linking node mesh database; and means to provide the distributed linking node mesh database for searching.

2. The system of embodiment 1, wherein the content source is search results.

3. The system of embodiment 1, wherein the content source is purchase transaction data.

4. The system of embodiment 1, wherein the content source is service usage data.

5. The system of embodiment 1, wherein the content source is service enrollment data.

6. The system of embodiment 1, wherein the content source is email data.

7. The system of embodiment 1, wherein the content is social data.

8. The system of embodiment 1, additionally comprising:

means to query a dictionary database to determine a dictionary short-hashing template corresponding to the aggregated data records; and means to apply the dictionary short-hashing template to the aggregated data records.

9. The system of embodiment 8, wherein applying the dictionary short-hashing template to the aggregated data records includes storing the result in a distributed dictionary lookup mesh.

10. The system of embodiment 9, additionally comprising:

means to generate a key containing a plurality of identified fields in the aggregated data records.

11. The system of embodiment 10, additionally comprising:

means to store a modified version of the aggregated data records in the distributed dictionary lookup mesh.

12. The system of embodiment 12, wherein the modified version of the aggregated data records is associated with the key containing a plurality of identified fields in the aggregated data records.

13. The system of embodiment 1, additionally comprising: means to extract a logic procedure from the at least one data aggregation normalization template.

14. The system of embodiment 13, additionally comprising: means to execute the logic procedure on the aggregated data records.

15. The system of embodiment 1, wherein generating an updated distributed linking node mesh database includes identifying a deduced entity not present in the distributed linking node mesh database.

16. The system of embodiment 15, wherein the deduced entity is a product.

17. The system of embodiment 15, wherein the deduced entity is an item for sale.

18. The system of embodiment 15, wherein the deduced entity is a user preference to engage in transactions during time periods.

19. The system of embodiment 15, wherein the deduced entity is a user's affinity for a product type.

Additional embodiments of the CPDB may include:

1. A centralized personal information platform processor-implemented apparatus for enhancing transaction speed through the reduction of user input data transfer requirements, comprising:

a memory;

a processor disposed in communication with said memory, and configured to issue a plurality of processing instructions stored in the memory, wherein the processor issues instructions to:

aggregate data records from a plurality of content sources;

query a data aggregation database for at least one data aggregation normalization template corresponding to the aggregated data records;

determine at least one data field type in the aggregated data records using the at least one data aggregation normalization template;

identify at least one entity in the aggregated data records using the at least one data field type and associated field data values;

generate an updated distributed linking node mesh database; and provide the distributed linking node mesh database for searching.

2. The apparatus of embodiment 1, wherein the content source is search results.

3. The apparatus of embodiment 1, wherein the content source is purchase transaction data.

4. The apparatus of embodiment 1, wherein the content source is service usage data.

5. The apparatus of embodiment 1, wherein the content source is service enrollment data.

6. The apparatus of embodiment 1, wherein the content source is email data.

7. The apparatus of embodiment 1, wherein the content is social data.

8. The apparatus of embodiment 1, additionally comprising instructions to:

query a dictionary database to determine a dictionary short-hashing template corresponding to the aggregated data records; and apply the dictionary short-hashing template to the aggregated data records.

9. The apparatus of embodiment 8, wherein applying the dictionary short-hashing template to the aggregated data records includes storing the result in a distributed dictionary lookup mesh.

10. The apparatus of embodiment 9, additionally comprising instructions to: generate a key containing a plurality of identified fields in the aggregated data records.

11. The apparatus of embodiment 10, additionally comprising instructions to: store a modified version of the aggregated data records in the distributed dictionary lookup mesh.

12. The apparatus of embodiment 12, wherein the modified version of the aggregated data records is associated with the key containing a plurality of identified fields in the aggregated data records.

13. The apparatus of embodiment 1, additionally comprising instructions to: extract a logic procedure from the at least one data aggregation normalization template.

14. The apparatus of embodiment 13, additionally comprising instructions to: execute the logic procedure on the aggregated data records.

15. The apparatus of embodiment 1, wherein generating an updated distributed linking node mesh database includes identifying a deduced entity not present in the distributed linking node mesh database.

16. The apparatus of embodiment 15, wherein the deduced entity is a product.

17. The apparatus of embodiment 15, wherein the deduced entity is an item for sale.

18. The apparatus of embodiment 15, wherein the deduced entity is a user preference to engage in transactions during time periods.

19. The apparatus of embodiment 15, wherein the deduced entity is a user's affinity for a product type.

Additional embodiments of the CPDB may include:

1. A non-transitory medium storing processor-issuable instructions for a centralized personal information platform to:

aggregate data records from a plurality of content sources;

query a data aggregation database for at least one data aggregation normalization template corresponding to the aggregated data records;

determine at least one data field type in the aggregated data records using the at least one data aggregation normalization template;

identify at least one entity in the aggregated data records using the at least one data field type and associated field data values;

generate an updated distributed linking node mesh database; and provide the distributed linking node mesh database for searching.

2. The medium of embodiment 1, wherein the content source is search results.

3. The medium of embodiment 1, wherein the content source is purchase transaction data.

4. The medium of embodiment 1, wherein the content source is service usage data.

5. The medium of embodiment 1, wherein the content source is service enrollment data.

6. The medium of embodiment 1, wherein the content source is email data.

7. The medium of embodiment 1, wherein the content is social data.

8. The medium of embodiment 1, additionally comprising instructions to:

query a dictionary database to determine a dictionary short-hashing template corresponding to the aggregated data records; and apply the dictionary short-hashing template to the aggregated data records.

9. The medium of embodiment 8, wherein applying the dictionary short-hashing template to the aggregated data records includes storing the result in a distributed dictionary lookup mesh.

10. The medium of embodiment 9, additionally comprising instructions to: generate a key containing a plurality of identified fields in the aggregated data records.

11. The medium of embodiment 10, additionally comprising instructions to:

store a modified version of the aggregated data records in the distributed dictionary lookup mesh.

12. The medium of embodiment 12, wherein the modified version of the aggregated data records is associated with the key containing a plurality of identified fields in the aggregated data records.

13. The medium of embodiment 1, additionally comprising instructions to:

extract a logic procedure from the at least one data aggregation normalization template.

14. The medium of embodiment 13, additionally comprising instructions to: execute the logic procedure on the aggregated data records.

15. The medium of embodiment 1, wherein generating an updated distributed linking node mesh database includes identifying a deduced entity not present in the distributed linking node mesh database.

16. The medium of embodiment 15, wherein the deduced entity is a product.

17. The medium of embodiment 15, wherein the deduced entity is an item for sale.

18. The medium of embodiment 15, wherein the deduced entity is a user preference to engage in transactions during time periods.

19. The medium of embodiment 15, wherein the deduced entity is a user's affinity for a product type.

Additional embodiments of the CPDB may include:

1. A centralized personal information platform processor-implemented method for enhancing transaction speed through the reduction of user input data transfer requirements, comprising:

aggregating data records including search results, purchase transaction data, service usage data, service enrollment data, email data and social data;

identifying data field types within the data records and their associated data values;

identifying an entity from the data field types and their associated data values;

generating, via a processor, correlations of the entity to other entities identifiable from the data field types and their associated data values;

associating, via the processor, attributes to the entity by drawing inferences related to the entity from the data field types and their associated data values;

generating an updated profile and social graph of the entity using the generated correlations and associated attributes; and providing the updated profile and social graph for an automated web form filling request.

2. The method of embodiment 1, further comprising:

generating a search query using the updated profile; and providing the generated search query for further data aggregation.

3. The method of embodiment 2, wherein the search query is a web search query.

4. The method of embodiment 2, wherein the search query is a social search query.

5. The method of embodiment 2, wherein the search query is an email data aggregation query.

6. The method of embodiment 4, wherein the updated profile includes a social login credential; and wherein the social search query utilizes the social login credential.

7. The method of embodiment 1, further comprising:

generating a search query using the updated social graph; and providing the generated search query for further data aggregation.

8. The method of embodiment 6, wherein the search query is a web search query.

9. The method of embodiment 6, wherein the search query is a social search query.

10. The method of embodiment 8, wherein the updated profile includes a social login credential; and wherein the social search query utilizes the social login credential.

11. The method of embodiment 1, wherein the entity is one of: an Internet Protocol address; an individual; a pair of associated individuals; and a household; an office space; and an organization.

12. A merchant analytics platform processor-implemented method for reduced transaction wait processing requirements through the use of customized transaction parameters based on a distributed linking node mesh, comprising:

obtaining a request for a merchant analytics report including a user identification;

aggregating user data of the user in a centralized personal information database;

retrieving the aggregated user data in response to obtaining the request for the merchant analytics report;

generating a user behavior profile using an analytical model, based on the aggregated user data retrieved from the centralized personal information database;

providing the user behavior profile as part of the merchant analytics report.

13. The method of embodiment 12, further comprising:

retrieving aggregated user data for a plurality of users from the centralized personal information database;

generating a statistical user behavior profile using an analytical model, based on the aggregated user data for the plurality of users retrieved from the centralized personal information database; and providing the statistical user behavior profile as part of the merchant analytics report for the merchant.

14. The method of embodiment 12, wherein the retrieved aggregated user data includes personally identifiable data associated with the user identification.

15. The method of embodiment 14, further comprising:

anonymizing the retrieved aggregated user data by removing the personally identifiable data from the retrieved aggregated user data.

16. The method of embodiment 12, wherein the aggregated user data includes social data obtained from a social networking website.

17. The method of embodiment 16, wherein the user behavior profile is generated using the social data obtained from the social networking website.

18. The method of embodiment 18, wherein the social data includes user social posts to the social networking website.

19. The method of embodiment 12, further comprising:

determining a product or service having maximum likelihood of being purchased by the user; and providing an identification of the product or service as part of the merchant analytics report.

20. The method of embodiment 13, wherein the statistical user behavior profile is generated using aggregated social data obtained from social networking websites for the plurality of users, and retrieved from the centralized personal information database.

21. The method of embodiment 12, further comprising:

triggering an investment action based on the merchant analytics report.

22. An analytical model sharing processor-implemented method for privacy enhanced analytical model sharing through the use of contextual privacy dataset modifications, comprising:

obtaining a request to publish an analytical model operating on user data retrieved from a centralized personal information database;

determining whether the analytical model includes a model dataset;

upon determining that the analytical model includes a model dataset, determining whether the model dataset includes personally identifiable information; and generating a determination of whether to accept the request to publish the analytical model based on whether the model dataset includes personally identifiable information.

23. The method of embodiment 22, further comprising:

determining that model dataset does not include personally identifiable information;

generating a notification of acceptance of the request to publish the analytical model;

providing the analytical model for publication; and providing the notification of acceptance of the request to publish the analytical model.

24. The method of embodiment 22, further comprising:

determining that model dataset includes personally identifiable information;

upon determining that the model dataset includes personally identifiable information, determining whether the analytical model can be run in the absence of the personally identifiable information; and generating a determination of whether to accept the request to publish the analytical model based on whether the analytical model can be run in the absence of the personally identifiable information.

25. The method of embodiment 24, further comprising:

determining that analytical model can be run in the absence of the personally identifiable information;

extracting the personally identifiable information from the model dataset;

providing the analytical model for publication excluding the personally identifiable information from the model dataset; and providing the notification of acceptance of the request to publish the analytical model.

26. The method of embodiment 24, further comprising:

determining that the analytical model cannot be run in the absence of the personally identifiable information;

upon determining that the analytical model cannot be run in the absence of the personally identifiable information, determining whether the analytical model can be run after anonymization of the personally identifiable information; and generating a determination of whether to accept the request to publish the analytical model based on whether the analytical model can be run after anonymization of the personally identifiable information.

27. The method of embodiment 26, further comprising:

determining that the analytical model can be run after anonymization of the personally identifiable information;

anonymizing the personally identifiable information in the model dataset;

providing the analytical model for publication including the anonymized personally identifiable information in the model dataset; and providing the notification of acceptance of the request to publish the analytical model.

28. The method of embodiment 26, further comprising:

determining that the analytical model cannot be run after anonymization of the personally identifiable information; and providing a notification of rejection of the request to publish the analytical model.

29. The method of embodiment 22, wherein the user data retrieved from a centralized personal information database is that of a single user.

30. The method of embodiment 22, wherein the user data retrieved from a centralized personal information database is aggregated user data.

31. The method of embodiment 22, wherein the analytical model is published to a publicly-accessible model sharing website.

32. An encryptmatics extensible markup language data conversion processor-implemented method for increased efficiency in contextless user model sharing through the use of intermediary meta-language processing, comprising:

receiving an input model containing non-meta-data based language commands;

retrieving input language definition records corresponding to the input model language commands;

retrieving meta-data based language definition records; and generating a meta-data based language command file using the input language definition records and the meta-based language definition records.

33. The method of embodiment 32, additionally comprising:

determining at least one non-conditional logic flow block in the input model language commands; and generating a meta-data based language execution block for the at least one non-conditional logic flow block.

34. The method of embodiment 32, additionally comprising:

determining a meta-data based language variable initialization template; and creating a meta-data based language content block based on the variable initialization template and non-variable definitions contained within the input language model commands.

35. The method of embodiment 32, additionally comprising:

determining that the input model language commands contain instructions to manipulate an external data source;

determining that the external data source contains data that may not be used by the input model;

executing iterative sequential anonymization commands on the external data source; determining that the external data source is available for use by the input model; and providing the anonymized external data source to the input model commands for model execution on the anonymized data.

36. The method of embodiment 35, wherein determining that the external data source is available for use by the input model includes an indication that a minimum count of iterative sequential anonymization commands have been executed on the external data source.

37. The method of embodiment 32, additionally comprising:

providing the meta-data based language command file to a user model sharing service if it is determined that the model does not contain commands to manipulate an external data source that contains data requiring anonymization.

38. An processor-implemented method, comprising:

aggregating, from a plurality of entities, raw mesh entries comprising any of: emails, engagement transactions, financial transactions, social media entries, into memory;

determining an mesh entry type for each raw mesh entry;

placing contents of each raw mesh entry into an unprocessed mesh entry structure;

setting the mesh entry type for the unprocessed mesh entry from the determined mesh entry type;

generating a dictionary hash entry from the raw mesh entry and saving it into the unprocessed mesh entry structure;

updating a mesh entry dictionary with the unprocessed mesh entry structure;

replicating the mesh entry dictionary to another location without the raw mesh entry in the mesh entry structure, wherein the replicated mesh entry dictionary is actionable for analysis without the raw mesh entry and with the dictionary has entry and set mesh entry type;

storing the unprocessed mesh entry structure into a multi-directionally linked multimedia data mesh (MLMD mesh);

determining correlations within the unprocessed mesh entry structure with other stored mesh entry structures in the MLMD mesh;

creating links to the determined correlated stored mesh entry structures and storing them in the stored unprocessed mesh entry structure;

marking the unprocessed mesh entry structure as a processed mesh entry structure.

39. The method of embodiment 38, wherein processed mesh entry structures are updated with category, interest group, product type, price, and location information.

40. The method of embodiment 39, further, comprising:

obtaining a purchase request for a specified interest group, a specified interest group qualifier, an unspecified merchant, an unspecified product for a specified amount.

41. The method of embodiment 40, further, comprising:

wherein the unspecified product is determined by a consumer specified interest group qualifier of the specified interest group.

42. The method of embodiment 41, wherein the consumer specified interest group qualifier is any of best, most popular, most expensive, most exclusive, best deal.

43. The method of embodiment 42, further, comprising:

querying the MLMD mesh with the purchase request for a specified amount;

obtaining MLMD mesh query results for the purchase request;

querying merchants with the MLMD mesh query results for purchase items satisfying the purchase request;

placing an order for purchase items satisfying the purchase request.

44. The method of embodiment 43, further, comprising:

wherein if no purchase items satisfy the purchase request, the purchase request is maintained until cancelled.

45. The method of embodiment 44, further, comprising:

wherein the maintained purchase request may result in a purchase when merchant items satisfy the purchase request as such items parameters change with time.

46. A centralized personal information platform processor-implemented system for enhancing transaction speed through the reduction of user input data transfer requirements, comprising:

means to aggregate data records including search results, purchase transaction data, service usage data, service enrollment data, email data and social data;

means to identify data field types within the data records and their associated data values;

means to identify an entity from the data field types and their associated data values;

means to generate, via a processor, correlations of the entity to other entities identifiable from the data field types and their associated data values;

means to associate, via the processor, attributes to the entity by drawing inferences related to the entity from the data field types and their associated data values;

means to generate an updated profile and social graph of the entity using the generated correlations and associated attributes; and means to provide the updated profile and social graph for an automated web form filling request.

47. The system of embodiment 46, further comprising:

means to generate a search query using the updated profile; and means to provide the generated search query for further data aggregation.

48. The system of embodiment 47, wherein the search query is a web search query.

49. The system of embodiment 47, wherein the search query is a social search query.

50. The system of embodiment 47, wherein the search query is an email data aggregation query.

51. The system of embodiment 49, wherein the updated profile includes a social login credential; and wherein the social search query utilizes the social login credential.

52. The system of embodiment 46, further comprising:

means to generate a search query using the updated social graph; and means to provide the generated search query for further data aggregation.

53. The system of embodiment 51, wherein the search query is a web search query.

54. The system of embodiment 51, wherein the search query is a social search query.

55. The system of embodiment 53, wherein the updated profile includes a social login credential; and wherein the social search query utilizes the social login credential.

56. The system of embodiment 46, wherein the entity is one of: an Internet Protocol address; an individual; a pair of associated individuals; and a household; an office space; and an organization.

57. A merchant analytics platform processor-implemented system for reduced transaction wait processing requirements through the use of customized transaction parameters based on a distributed linking node mesh, comprising:

means to obtain a request for a merchant analytics report including a user identification;

means to aggregate user data of the user in a centralized personal information database;

means to retrieve the aggregated user data in response to obtaining the request for the merchant analytics report;

means to generate a user behavior profile using an analytical model, based on the aggregated user data retrieved from the centralized personal information database;

means to provide the user behavior profile as part of the merchant analytics report.

58. The system of embodiment 57, further comprising:

means to retrieve aggregated user data for a plurality of users from the centralized personal information database;

means to generate a statistical user behavior profile using an analytical model, based on the aggregated user data for the plurality of users retrieved from the centralized personal information database; and means to provide the statistical user behavior profile as part of the merchant analytics report for the merchant.

59. The system of embodiment 57, wherein the retrieved aggregated user data includes personally identifiable data associated with the user identification.

60. The system of embodiment 59, further comprising:

means to anonymize the retrieved aggregated user data by removing the personally identifiable data from the retrieved aggregated user data.

61. The system of embodiment 57, wherein the aggregated user data includes social data obtained from a social networking website.

62. The system of embodiment 61, wherein the user behavior profile is generated using the social data obtained from the social networking website.

63. The system of embodiment 63, wherein the social data includes user social posts to the social networking website.

64. The system of embodiment 57, further comprising:

means to determine a product or service having maximum likelihood of being purchased by the user; and means to provide an identification of the product or service as part of the merchant analytics report.

65. The system of embodiment 58, wherein the statistical user behavior profile is generated using aggregated social data obtained from social networking websites for the plurality of users, and retrieved from the centralized personal information database.

66. The system of embodiment 57, further comprising:

means to trigger an investment action based on the merchant analytics report.

67. An analytical model sharing processor-implemented system for privacy enhanced analytical model sharing through the use of contextual privacy dataset modifications, comprising:

means to obtain a request to publish an analytical model operating on user data retrieved from a centralized personal information database;

means to determine whether the analytical model includes a model dataset;

means to upon determining that the analytical model includes a model dataset, determining whether the model dataset includes personally identifiable information; and means to generate a determination of whether to accept the request to publish the analytical model based on whether the model dataset includes personally identifiable information.

68. The system of embodiment 67, further comprising:

means to determine that model dataset does not include personally identifiable information;

means to generate a notification of acceptance of the request to publish the analytical model;

means to provide the analytical model for publication; and means to provide the notification of acceptance of the request to publish the analytical model.

69. The system of embodiment 67, further comprising:

means to determine that model dataset includes personally identifiable information;

means to upon determining that the model dataset includes personally identifiable information, determining whether the analytical model can be run in the absence of the personally identifiable information; and means to generate a determination of whether to accept the request to publish the analytical model based on whether the analytical model can be run in the absence of the personally identifiable information.

70. The system of embodiment 69, further comprising:

means to determine that analytical model can be run in the absence of the personally identifiable information;

means to extract the personally identifiable information from the model dataset;

means to provide the analytical model for publication excluding the personally identifiable information from the model dataset; and means to provide the notification of acceptance of the request to publish the analytical model.

71. The system of embodiment 69, further comprising:

means to determine that the analytical model cannot be run in the absence of the personally identifiable information;

means to upon determining that the analytical model cannot be run in the absence of the personally identifiable information, determining whether the analytical model can be run after anonymization of the personally identifiable information; and means to generate a determination of whether to accept the request to publish the analytical model based on whether the analytical model can be run after anonymization of the personally identifiable information.

72. The system of embodiment 71, further comprising:

means to determine that the analytical model can be run after anonymization of the personally identifiable information;

means to anonymize the personally identifiable information in the model dataset;

means to provide the analytical model for publication including the anonymized personally identifiable information in the model dataset; and means to provide the notification of acceptance of the request to publish the analytical model.

73. The system of embodiment 71, further comprising:

means to determine that the analytical model cannot be run after anonymization of the personally identifiable information; and means to provide a notification of rejection of the request to publish the analytical model.

74. The system of embodiment 67, wherein the user data retrieved from a centralized personal information database is that of a single user.

75. The system of embodiment 67, wherein the user data retrieved from a centralized personal information database is aggregated user data.

76. The system of embodiment 67, wherein the analytical model is published to a publicly-accessible model sharing website.

77. An encryptmatics extensible markup language data conversion processor-implemented system for increased efficiency in contextless user model sharing through the use of intermediary meta-language processing, comprising:

means to receive an input model containing non-meta-data based language commands;

means to retrieve input language definition records corresponding to the input model language commands;

means to retrieve meta-data based language definition records; and means to generate a meta-data based language command file using the input language definition records and the meta-based language definition records.

78. The system of embodiment 77, additionally comprising:

means to determine at least one non-conditional logic flow block in the input model language commands; and means to generate a meta-data based language execution block for the at least one non-conditional logic flow block.

79. The system of embodiment 77, additionally comprising:

means to determine a meta-data based language variable initialization template; and means to create a meta-data based language content block based on the variable initialization template and non-variable definitions contained within the input language model commands.

80. The system of embodiment 77, additionally comprising:

means to determine that the input model language commands contain instructions to manipulate an external data source;

means to determine that the external data source contains data that may not be used by the input model;

means to execute iterative sequential anonymization commands on the external data source; determining that the external data source is available for use by the input model; and means to provide the anonymized external data source to the input model commands for model execution on the anonymized data.

81. The system of embodiment 80, wherein determining that the external data source is available for use by the input model includes an indication that a minimum count of iterative sequential anonymization commands have been executed on the external data source.

82. The system of embodiment 77, additionally comprising:

means to provide the meta-data based language command file to a user model sharing service if it is determined that the model does not contain commands to manipulate an external data source that contains data requiring anonymization.

83. An processor-implemented system, comprising:

means to aggregate, from a plurality of entities, raw mesh entries comprising any of: emails, engagement transactions, financial transactions, social media entries, into memory;

means to determine an mesh entry type for each raw mesh entry;

means to place contents of each raw mesh entry into an unprocessed mesh entry structure;

means to set the mesh entry type for the unprocessed mesh entry from the determined mesh entry type;

means to generate a dictionary hash entry from the raw mesh entry and saving it into the unprocessed mesh entry structure;

means to update a mesh entry dictionary with the unprocessed mesh entry structure;

means to replicate the mesh entry dictionary to another location without the raw mesh entry in the mesh entry structure, wherein the replicated mesh entry dictionary is actionable for analysis without the raw mesh entry and with the dictionary has entry and set mesh entry type;

means to store the unprocessed mesh entry structure into a multi-directionally linked multimedia data mesh (MLMD mesh);

means to determine correlations within the unprocessed mesh entry structure with other stored mesh entry structures in the MLMD mesh;

means to create links to the determined correlated stored mesh entry structures and storing them in the stored unprocessed mesh entry structure;

means to mark the unprocessed mesh entry structure as a processed mesh entry structure.

84. The system of embodiment 83, wherein processed mesh entry structures are updated with category, interest group, product type, price, and location information.

85. The system of embodiment 84, further, comprising:

means to obtain a purchase request for a specified interest group, a specified interest group qualifier, an unspecified merchant, an unspecified product for a specified amount.

86. The system of embodiment 85, further, comprising:

wherein the unspecified product is determined by a consumer specified interest group qualifier of the specified interest group.

87. The system of embodiment 86, wherein the consumer specified interest group qualifier is any of best, most popular, most expensive, most exclusive, best deal.

88. The system of embodiment 87, further, comprising:

means to query the MLMD mesh with the purchase request for a specified amount;

means to obtain MLMD mesh query results for the purchase request;

means to query merchants with the MLMD mesh query results for purchase items satisfying the purchase request;

means to place an order for purchase items satisfying the purchase request.

89. The system of embodiment 88, further, comprising:

wherein if no purchase items satisfy the purchase request, the purchase request is maintained until cancelled.

90. The system of embodiment 89, further, comprising:

wherein the maintained purchase request may result in a purchase when merchant items satisfy the purchase request as such items parameters change with time.

91. A centralized personal information platform processor-implemented apparatus for enhancing transaction speed through the reduction of user input data transfer requirements, comprising:

a memory;

a processor disposed in communication with said memory, and configured to issue a plurality of processing instructions stored in the memory, wherein the processor issues instructions to:

- aggregate data records including search results, purchase transaction data, service usage data, service enrollment data, email data and social data;
- identify data field types within the data records and their associated data values;
- identify an entity from the data field types and their associated data values;
- generate, via a processor, correlations of the entity to other entities identifiable from the data field types and their associated data values;
- associate, via the processor, attributes to the entity by drawing inferences related to the entity from the data field types and their associated data values;
- generate an updated profile and social graph of the entity using the generated correlations and associated attributes; and
- provide the updated profile and social graph for an automated web form filling request.

92. The apparatus of embodiment 91, further comprising instructions to:

generate a search query using the updated profile; and provide the generated search query for further data aggregation.

93. The apparatus of embodiment 92, wherein the search query is a web search query.

94. The apparatus of embodiment 92, wherein the search query is a social search query.

95. The apparatus of embodiment 92, wherein the search query is an email data aggregation query.

96. The apparatus of embodiment 94, wherein the updated profile includes a social login credential; and wherein the social search query utilizes the social login credential.

97. The apparatus of embodiment 91, further comprising instructions to:

generate a search query using the updated social graph; and provide the generated search query for further data aggregation.

98. The apparatus of embodiment 96, wherein the search query is a web search query.

99. The apparatus of embodiment 96, wherein the search query is a social search query.

100. The apparatus of embodiment 98, wherein the updated profile includes a social login credential; and wherein the social search query utilizes the social login credential.

101. The apparatus of embodiment 91, wherein the entity is one of: an Internet Protocol address; an individual; a pair of associated individuals; and a household; an office space; and an organization.

102. A merchant analytics platform processor-implemented apparatus for reduced transaction wait processing requirements through the use of customized transaction parameters based on a distributed linking node mesh, comprising:

a memory;

a processor disposed in communication with said memory, and configured to issue a plurality of processing instructions stored in the memory, wherein the processor issues instructions to:

obtaining a request for a merchant analytics report including a user identification;

aggregate user data of the user in a centralized personal information database;

retrieve the aggregated user data in response to obtaining the request for the merchant analytics report;

generate a user behavior profile using an analytical model, based on the aggregated user data retrieved from the centralized personal information database;

provide the user behavior profile as part of the merchant analytics report.

103. The apparatus of embodiment 102, further comprising instructions to:

retrieve aggregated user data for a plurality of users from the centralized personal information database;

generate a statistical user behavior profile using an analytical model, based on the aggregated user data for the plurality of users retrieved from the centralized personal information database; and provide the statistical user behavior profile as part of the merchant analytics report for the merchant.

104. The apparatus of embodiment 102, wherein the retrieved aggregated user data includes personally identifiable data associated with the user identification.

105. The apparatus of embodiment 104, further comprising instructions to:

anonymize the retrieved aggregated user data by removing the personally identifiable data from the retrieved aggregated user data.

106. The apparatus of embodiment 102, wherein the aggregated user data includes social data obtained from a social networking website.

107. The apparatus of embodiment 106, wherein the user behavior profile is generated using the social data obtained from the social networking website.

108. The apparatus of embodiment 108, wherein the social data includes user social posts to the social networking website.

109. The apparatus of embodiment 102, further comprising instructions to:

determine a product or service having maximum likelihood of being purchased by the user; and provide an identification of the product or service as part of the merchant analytics report.

110. The apparatus of embodiment 103, wherein the statistical user behavior profile is generated using aggregated social data obtained from social networking websites for the plurality of users, and retrieved from the centralized personal information database.

111. The apparatus of embodiment 102, further comprising instructions to:

trigger an investment action based on the merchant analytics report.

112. An analytical model sharing processor-implemented apparatus for privacy enhanced analytical model sharing through the use of contextual privacy dataset modifications, comprising:

a memory;

a processor disposed in communication with said memory, and configured to issue a plurality of processing instructions stored in the memory, wherein the processor issues instructions to:

obtain a request to publish an analytical model operating on user data retrieved from a centralized personal information database;

determine whether the analytical model includes a model dataset;

upon determining that the analytical model includes a model dataset, determining whether the model dataset includes personally identifiable information; and generate a determination of whether to accept the request to publish the analytical model based on whether the model dataset includes personally identifiable information.

113. The apparatus of embodiment 112, further comprising instructions to:

determine that model dataset does not include personally identifiable information;

generate a notification of acceptance of the request to publish the analytical model;

provide the analytical model for publication; and provide the notification of acceptance of the request to publish the analytical model.

114. The apparatus of embodiment 112, further comprising instructions to:

determine that model dataset includes personally identifiable information;

upon determining that the model dataset includes personally identifiable information, determining whether the analytical model can be run in the absence of the personally identifiable information; and generate a determination of whether to accept the request to publish the analytical model based on whether the analytical model can be run in the absence of the personally identifiable information.

115. The apparatus of embodiment 114, further comprising instructions to:

determine that analytical model can be run in the absence of the personally identifiable information;

extract the personally identifiable information from the model dataset;

provide the analytical model for publication excluding the personally identifiable information from the model dataset; and provide the notification of acceptance of the request to publish the analytical model.

116. The apparatus of embodiment 114, further comprising instructions to:

determine that the analytical model cannot be run in the absence of the personally identifiable information;

upon determining that the analytical model cannot be run in the absence of the personally identifiable information, determining whether the analytical model can be run after anonymization of the personally identifiable information; and generate a determination of whether to accept the request to publish the analytical model based on whether the analytical model can be run after anonymization of the personally identifiable information.

117. The apparatus of embodiment 116, further comprising instructions to:

determine that the analytical model can be run after anonymization of the personally identifiable information;

anonymize the personally identifiable information in the model dataset;

provide the analytical model for publication including the anonymized personally identifiable information in the model dataset; and provide the notification of acceptance of the request to publish the analytical model.

118. The apparatus of embodiment 116, further comprising instructions to:

determine that the analytical model cannot be run after anonymization of the personally identifiable information; and provide a notification of rejection of the request to publish the analytical model.

119. The apparatus of embodiment 112, wherein the user data retrieved from a centralized personal information database is that of a single user.

120. The apparatus of embodiment 112, wherein the user data retrieved from a centralized personal information database is aggregated user data.

121. The apparatus of embodiment 112, wherein the analytical model is published to a publicly-accessible model sharing website.

122. An encryptmatics extensible markup language data conversion processor-implemented apparatus for increased efficiency in contextless user model sharing through the use of intermediary meta-language processing, comprising:

a memory;

a processor disposed in communication with said memory, and configured to issue a plurality of processing instructions stored in the memory, wherein the processor issues instructions to:

- receive an input model containing non-meta-data based language commands;
- retrieve input language definition records corresponding to the input model language commands;
- retrieve meta-data based language definition records; and
- generate a meta-data based language command file using the input language definition records and the meta-based language definition records.

123. The apparatus of embodiment 122, additionally comprising instructions to:

determine at least one non-conditional logic flow block in the input model language commands; and generate a meta-data based language execution block for the at least one non-conditional logic flow block.

124. The apparatus of embodiment 122, additionally comprising instructions to:

determine a meta-data based language variable initialization template; and create a meta-data based language content block based on the variable initialization template and non-variable definitions contained within the input language model commands.

125. The apparatus of embodiment 122, additionally comprising instructions to:

determine that the input model language commands contain instructions to manipulate an external data source;

determine that the external data source contains data that may not be used by the input model;

execute iterative sequential anonymization commands on the external data source; determining that the external data source is available for use by the input model; and provide the anonymized external data source to the input model commands for model execution on the anonymized data.

126. The apparatus of embodiment 125, wherein determining that the external data source is available for use by the input model includes an indication that a minimum count of iterative sequential anonymization commands have been executed on the external data source.

127. The apparatus of embodiment 122, additionally comprising instructions to:

provide the meta-data based language command file to a user model sharing service if it is determined that the model does not contain commands to manipulate an external data source that contains data requiring anonymization.

128. An processor-implemented apparatus, comprising:

a memory;

a processor disposed in communication with said memory, and configured to issue a plurality of processing instructions stored in the memory, wherein the processor issues instructions to:

- aggregate, from a plurality of entities, raw mesh entries comprising any of: emails, engagement transactions, financial transactions, social media entries, into memory;
- determine an mesh entry type for each raw mesh entry; place contents of each raw mesh entry into an unprocessed mesh entry structure;
- set the mesh entry type for the unprocessed mesh entry from the determined mesh entry type;
- generate a dictionary hash entry from the raw mesh entry and saving it into the unprocessed mesh entry structure;
- update a mesh entry dictionary with the unprocessed mesh entry structure;
- replicate the mesh entry dictionary to another location without the raw mesh entry in the mesh entry structure, wherein the replicated mesh entry dictionary is actionable for analysis without the raw mesh entry and with the dictionary has entry and set mesh entry type;
- store the unprocessed mesh entry structure into a multi-directionally linked multimedia data mesh (MLMD mesh);
- determine correlations within the unprocessed mesh entry structure with other stored mesh entry structures in the MLMD mesh;
- create links to the determined correlated stored mesh entry structures and storing them in the stored unprocessed mesh entry structure;
- mark the unprocessed mesh entry structure as a processed mesh entry structure.

129. The apparatus of embodiment 128, wherein processed mesh entry structures are updated with category, interest group, product type, price, and location information.

130. The apparatus of embodiment 129, further, comprising instructions to:

obtain a purchase request for a specified interest group, a specified interest group qualifier, an unspecified merchant, an unspecified product for a specified amount.

131. The apparatus of embodiment 130, further, comprising instructions to:

wherein the unspecified product is determined by a consumer specified interest group qualifier of the specified interest group.

132. The apparatus of embodiment 131, wherein the consumer specified interest group qualifier is any of best, most popular, most expensive, most exclusive, best deal.

133. The apparatus of embodiment 132, further, comprising instructions to:

query the MLMD mesh with the purchase request for a specified amount;

obtain MLMD mesh query results for the purchase request;

query merchants with the MLMD mesh query results for purchase items satisfying the purchase request;

place an order for purchase items satisfying the purchase request.

134. The apparatus of embodiment 133, further, comprising instructions to:

wherein if no purchase items satisfy the purchase request, the purchase request is maintained until cancelled.

135. The apparatus of embodiment 134, further, comprising instructions to:

wherein the maintained purchase request may result in a purchase when merchant items satisfy the purchase request as such items parameters change with time.

136. A non-transitory medium storing processor-issuable instructions for a centralized personal information platform processor-implemented to:

aggregate data records including search results, purchase transaction data, service usage data, service enrollment data, email data and social data;

identify data field types within the data records and their associated data values;

identify an entity from the data field types and their associated data values;

generate, via a processor, correlations of the entity to other entities identifiable from the data field types and their associated data values;

associate, via the processor, attributes to the entity by drawing inferences related to the entity from the data field types and their associated data values;

generate an updated profile and social graph of the entity using the generated correlations and associated attributes; and provide the updated profile and social graph for an automated web form filling request.

137. The medium of embodiment 136, further comprising instructions to:

generate a search query using the updated profile; and provide the generated search query for further data aggregation.

138. The medium of embodiment 137, wherein the search query is a web search query.

139. The medium of embodiment 137, wherein the search query is a social search query.

140. The medium of embodiment 137, wherein the search query is an email data aggregation query.

141. The medium of embodiment 139, wherein the updated profile includes a social login credential; and wherein the social search query utilizes the social login credential.

142. The medium of embodiment 136, further comprising instructions to:

generate a search query using the updated social graph; and provide the generated search query for further data aggregation.

143. The medium of embodiment 141, wherein the search query is a web search query.

144. The medium of embodiment 141, wherein the search query is a social search query.

145. The medium of embodiment 143, wherein the updated profile includes a social login credential; and wherein the social search query utilizes the social login credential.

146. The medium of embodiment 136, wherein the entity is one of: an Internet Protocol address; an individual; a pair of associated individuals; and a household; an office space; and an organization.

147. A merchant analytics platform processor-implemented medium storing instructions for reduced transaction wait processing requirements through the use of customized transaction parameters based on a distributed linking node mesh to:

obtain a request for a merchant analytics report including a user identification;

aggregate user data of the user in a centralized personal information database;

retrieve the aggregated user data in response to obtaining the request for the merchant analytics report;

generate a user behavior profile using an analytical model, based on the aggregated user data retrieved from the centralized personal information database;

provide the user behavior profile as part of the merchant analytics report.

148. The medium of embodiment 147, further comprising instructions to:

retrieve aggregated user data for a plurality of users from the centralized personal information database;

generate a statistical user behavior profile using an analytical model, based on the aggregated user data for the plurality of users retrieved from the centralized personal information database; and provide the statistical user behavior profile as part of the merchant analytics report for the merchant.

149. The medium of embodiment 147, wherein the retrieved aggregated user data includes personally identifiable data associated with the user identification.

150. The medium of embodiment 149, further comprising instructions to:

anonymize the retrieved aggregated user data by removing the personally identifiable data from the retrieved aggregated user data.

151. The medium of embodiment 147, wherein the aggregated user data includes social data obtained from a social networking website.

152. The medium of embodiment 151, wherein the user behavior profile is generated using the social data obtained from the social networking website.

153. The medium of embodiment 153, wherein the social data includes user social posts to the social networking website.

154. The medium of embodiment 147, further comprising instructions to:

determine a product or service having maximum likelihood of being purchased by the user; and provide an identification of the product or service as part of the merchant analytics report.

155. The medium of embodiment 148, wherein the statistical user behavior profile is generated using aggregated social data obtained from social networking websites for the plurality of users, and retrieved from the centralized personal information database.

156. The medium of embodiment 147, further comprising instructions to:

trigger an investment action based on the merchant analytics report.

157. An analytical model sharing processor-implemented medium for privacy enhanced analytical model sharing through the use of contextual privacy dataset modifications, comprising instructions to:

obtain a request to publish an analytical model operating on user data retrieved from a centralized personal information database;

determine whether the analytical model includes a model dataset;

upon determining that the analytical model includes a model dataset, determining whether the model dataset includes personally identifiable information; and generate a determination of whether to accept the request to publish the analytical model based on whether the model dataset includes personally identifiable information.

158. The medium of embodiment 157, further comprising instructions to:

determine that model dataset does not include personally identifiable information;

generate a notification of acceptance of the request to publish the analytical model;

provide the analytical model for publication; and provide the notification of acceptance of the request to publish the analytical model.

159. The medium of embodiment 157, further comprising instructions to:

determine that model dataset includes personally identifiable information;

upon determining that the model dataset includes personally identifiable information, determining whether the analytical model can be run in the absence of the personally identifiable information; and generate a determination of whether to accept the request to publish the analytical model based on whether the analytical model can be run in the absence of the personally identifiable information.

160. The medium of embodiment 159, further comprising instructions to:

determine that analytical model can be run in the absence of the personally identifiable information;

extract the personally identifiable information from the model dataset;

provide the analytical model for publication excluding the personally identifiable information from the model dataset; and provide the notification of acceptance of the request to publish the analytical model.

161. The medium of embodiment 159, further comprising instructions to:

determine that the analytical model cannot be run in the absence of the personally identifiable information;

upon determining that the analytical model cannot be run in the absence of the personally identifiable information, determining whether the analytical model can be run after anonymization of the personally identifiable information; and generate a determination of whether to accept the request to publish the analytical model based on whether the analytical model can be run after anonymization of the personally identifiable information.

162. The medium of embodiment 161, further comprising instructions to:

determine that the analytical model can be run after anonymization of the personally identifiable information;

anonymize the personally identifiable information in the model dataset;

provide the analytical model for publication including the anonymized personally identifiable information in the model dataset; and provide the notification of acceptance of the request to publish the analytical model.

163. The medium of embodiment 161, further comprising instructions to:

determine that the analytical model cannot be run after anonymization of the personally identifiable information; and provide a notification of rejection of the request to publish the analytical model.

164. The medium of embodiment 157, wherein the user data retrieved from a centralized personal information database is that of a single user.

165. The medium of embodiment 157, wherein the user data retrieved from a centralized personal information database is aggregated user data.

166. The medium of embodiment 157, wherein the analytical model is published to a publicly-accessible model sharing website.

167. An encryptmatics extensible markup language data conversion processor-implemented medium storing instructions for increased efficiency in contextless user model sharing through the use of intermediary meta-language processing to:

receive an input model containing non-meta-data based language commands;

retrieve input language definition records corresponding to the input model language commands;

retrieve meta-data based language definition records; and generate a meta-data based language command file using the input language definition records and the meta-based language definition records.

168. The medium of embodiment 167, additionally comprising instructions to:

determine at least one non-conditional logic flow block in the input model language commands; and generate a meta-data based language execution block for the at least one non-conditional logic flow block.

169. The medium of embodiment 167, additionally comprising instructions to:

determine a meta-data based language variable initialization template; and create a meta-data based language content block based on the variable initialization template and non-variable definitions contained within the input language model commands.

170. The medium of embodiment 167, additionally comprising instructions to:

determine that the input model language commands contain instructions to manipulate an external data source;

determine that the external data source contains data that may not be used by the input model;

execute iterative sequential anonymization commands on the external data source; determine that the external data source is available for use by the input model; and provide the anonymized external data source to the input model commands for model execution on the anonymized data.

171. The medium of embodiment 170, wherein determining that the external data source is available for use by the input model includes an indication that a minimum count of iterative sequential anonymization commands have been executed on the external data source.

172. The medium of embodiment 167, additionally comprising instructions to:

provide the meta-data based language command file to a user model sharing service if it is determined that the model does not contain commands to manipulate an external data source that contains data requiring anonymization.

173. An processor-implemented medium containing instructions to:

aggregate, from a plurality of entities, raw mesh entries comprising any of: emails, engagement transactions, financial transactions, social media entries, into memory;

determine an mesh entry type for each raw mesh entry;

place contents of each raw mesh entry into an unprocessed mesh entry structure;

set the mesh entry type for the unprocessed mesh entry from the determined mesh entry type;

generate a dictionary hash entry from the raw mesh entry and saving it into the unprocessed mesh entry structure;

update a mesh entry dictionary with the unprocessed mesh entry structure;

replicate the mesh entry dictionary to another location without the raw mesh entry in the mesh entry structure, wherein the replicated mesh entry dictionary is actionable for analysis without the raw mesh entry and with the dictionary has entry and set mesh entry type;

store the unprocessed mesh entry structure into a multi-directionally linked multimedia data mesh (MLMD mesh);

determine correlations within the unprocessed mesh entry structure with other stored mesh entry structures in the MLMD mesh;

create links to the determined correlated stored mesh entry structures and storing them in the stored unprocessed mesh entry structure;

mark the unprocessed mesh entry structure as a processed mesh entry structure.

174. The medium of embodiment 173, wherein processed mesh entry structures are updated with category, interest group, product type, price, and location information.

175. The medium of embodiment 174, further, comprising instructions to:

obtain a purchase request for a specified interest group, a specified interest group qualifier, an unspecified merchant, an unspecified product for a specified amount.

176. The medium of embodiment 175, further, comprising instructions to:

wherein the unspecified product is determined by a consumer specified interest group qualifier of the specified interest group.

177. The medium of embodiment 176, wherein the consumer specified interest group qualifier is any of best, most popular, most expensive, most exclusive, best deal.

178. The medium of embodiment 177, further, comprising instructions to:

query the MLMD mesh with the purchase request for a specified amount;

obtain MLMD mesh query results for the purchase request;

query merchants with the MLMD mesh query results for purchase items satisfying the purchase request;

place an order for purchase items satisfying the purchase request.

179. The medium of embodiment 178, further, comprising instructions to:

wherein if no purchase items satisfy the purchase request, the purchase request is maintained until cancelled.

180. The medium of embodiment 179, further, comprising instructions to:

wherein the maintained purchase request may result in a purchase when merchant items satisfy the purchase request as such items parameters change with time.

In order to address various issues and advance the art, the entirety of this application for CPDB (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a CPDB individual and/or enterprise user, database configuration and/or relational model, data type, data transmission and/or network framework, syntax structure, and/or the like, various embodiments of the CPDB, may be implemented that enable a great deal of flexibility and customization. For example, aspects of the CPDB may be adapted for restaurant dining, online shopping, brick-and-mortar shopping, secured information processing, and/or the like. While various embodiments and discussions of the CPDB have been directed to electronic purchase transactions, however, it is to be understood that the embodiments described herein may be readily configured and/or customized for a wide variety of other applications and/or implementations.

The invention claimed is:

1. A centralized personal information platform processor-implemented method for enhancing transaction speed through reduction of user input data transfer requirements, comprising:

aggregating data records from a plurality of content sources;

identifying a data aggregation normalization template corresponding to the aggregated data records;

determining that at least one first data field included in the aggregated data records includes a data field type that matches a data field type of at least one normalization data field included in the data aggregation normalization template, wherein each of the at least one first data field includes a data value;

creating a copy of the data aggregation normalization template;

populating the at least one normalization data field in the copy of the data aggregation normalization template with the data value from the at least one first data field;

identifying a first entity in the aggregated data records using the data value populated into the at least one normalization data field;

associating attributes to the first entity by applying inference rules to the data value;

identifying a second entity associated with at least one second data field including a data value and data field type that matches the data value and data field type of the at least one first data field;

establishing a cross-entity correlation between the first entity and the second entity based on the matching of the data value and data field type of the at least one first and second data fields;

generating an updated profile and a social graph of the first entity using the associated attributes and the cross-entity correlation, wherein the social graph graphically depicts interrelationships at least between the first entity and the second entity; and generating an updated distributed linking node mesh database using the first entity based on the updated profile and social graph of the first entity.

2. The method of claim 1, wherein the content source is search results.

3. The method of claim 1, wherein the content source is purchase transaction data.

4. The method of claim 1, wherein the content source is service usage data.

5. The method of claim 1, wherein the content source is service enrollment data.

6. The method of claim 1, wherein the content source is email data.

7. The method of claim 1, wherein the content is social data.

8. The method of claim 1, additionally comprising:

querying a dictionary database to determine a dictionary short-hashing template corresponding to the aggregated data records; and applying the dictionary short-hashing template to the aggregated data records.

9. The method of claim 8, wherein applying the dictionary short-hashing template to the aggregated data records includes storing the result in a distributed dictionary lookup mesh.

10. The method of claim 9, additionally comprising:

wherein a hybrid key/value structured file system is used for utilizing capabilities of both a key/value store and a structured file system.

11. The method of claim 10, additionally comprising:

storing a modified version of the aggregated data records in the distributed dictionary lookup mesh.

12. The method of claim 11, wherein the modified version of the aggregated data records is associated with the key containing a plurality of identified fields in the aggregated data records.

13. The method of claim 1, additionally comprising:

extracting a logic procedure from the data aggregation normalization template.

14. The method of claim 13, additionally comprising:

executing the logic procedure on the aggregated data records.

15. The method of claim 1, wherein generating an updated distributed linking node mesh database includes identifying a deduced entity not present in the distributed linking node mesh database.

16. The method of claim 15, wherein the deduced entity is a product.

17. The method of claim 15, wherein the deduced entity is an item for sale.

18. The method of claim 15, wherein the deduced entity is a user preference to engage in transactions during time periods.

19. The method of claim 15, wherein the deduced entity is a user's affinity for a product type.

20. A centralized personal information platform processor-implemented method for enhancing transaction speed through reduction of user input data transfer requirements, comprising:

aggregating data records including search results, purchase transaction data, service usage data, service enrollment data, email data and social data;

identifying a data aggregation normalization template corresponding to the aggregated data records;

parsing the data aggregation normalization template to determine at least one normalization data field with a normalization data field type included in the data aggregation normalization template;

parsing the aggregated data records to determine at least one data field in the aggregated data records, the at least one data field having a data field type that matches the normalization data field type;

based on the determination of the at least one matched data field type, generating a 1:1 mapping between data fields of the data aggregation normalization template and the aggregated data records;

creating a copy of the data aggregation normalization template;

populating the at least one normalization data field in the copy of the data aggregation normalization template with at least one data value from the at least one data field;

identifying at least one entity based on the at least one data value populated into the at least one normalization data field;

associating attributes to the at least one entity by applying inference rules to the at least one data value;

generating an updated profile and a social graph of the at least one entity using the associated attributes, wherein the social graph graphically depicts interrelationships at least between the at least one entity and additional entities; and updating a distributed linking node mesh database using the at least one entity based on the updated profile and social graph of the at least one entity.

* * * * *